(12) United States Patent
Zhang et al.

(10) Patent No.: US 12,204,479 B2
(45) Date of Patent: *Jan. 21, 2025

(54) NETWORK-ON-CHIP DATA PROCESSING METHOD AND DEVICE

(71) Applicant: Shanghai Cambricon Information Technology Co., Ltd., Pudong New Area (CN)

(72) Inventors: Yao Zhang, Pudong New Area (CN); Shaoli Liu, Pudong New Area (CN); Jun Liang, Pudong New Area (CN); Yu Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 857 days.

This patent is subject to a terminal disclaimer.

(21) Appl. No.: 17/278,812

(22) PCT Filed: Oct. 18, 2019

(86) PCT No.: PCT/CN2019/111977
§ 371 (c)(1),
(2) Date: Mar. 23, 2021

(87) PCT Pub. No.: WO2020/078470
PCT Pub. Date: Apr. 23, 2020

(65) Prior Publication Data
US 2022/0035762 A1 Feb. 3, 2022

(30) Foreign Application Priority Data

Oct. 18, 2018 (CN) .......................... 201811215820.7
Oct. 18, 2018 (CN) .......................... 201811215978.4
(Continued)

(51) Int. Cl.
*G06F 40/205* (2020.01)
*G06F 13/40* (2006.01)
(Continued)

(52) U.S. Cl.
CPC ........... *G06F 13/4068* (2013.01); *G06N 3/04* (2013.01)

(58) Field of Classification Search
None
See application file for complete search history.

(56) References Cited

U.S. PATENT DOCUMENTS

| 7,353,362 B2 | 4/2008 | Georgiou et al. |
| 8,966,222 B2 | 2/2015 | Pakhunov et al. |

(Continued)

FOREIGN PATENT DOCUMENTS

| CN | 101227486 A | 7/2008 |
| CN | 102075578 A | 5/2011 |

(Continued)

OTHER PUBLICATIONS

Xu et al., "A Seed-driven Bottom-up Machine Learning Framework for Extracting Relations of Various Complexity", Jun. 2007, Association for Computational Linguistics (Year: 2007).*

(Continued)

*Primary Examiner* — Hyun Nam
(74) *Attorney, Agent, or Firm* — Getech Law LLC; Jun Ye

(57) ABSTRACT

The present application relates to a network-on-chip data processing method. The method is applied to a network-on-chip processing system, the network-on-chip processing system is used for executing machine learning calculation, and the network-on-chip processing system comprises a storage device and a calculation device. The method comprises: accessing the storage device in the network-on-chip (Continued)

processing system by means of a first calculation device in the network-on-chip processing system, and obtaining first operation data; performing an operation on the first operation data by means of the first calculation device to obtain a first operation result; and sending the first operation result to a second calculation device in the network-on-chip processing system. According to the method, operation overhead can be reduced and data read/write efficiency can be improved.

11 Claims, 71 Drawing Sheets

(30) Foreign Application Priority Data

| Oct. 18, 2018 | (CN) | ................. 201811216718.9 |
| Oct. 18, 2018 | (CN) | ................. 201811216857.1 |
| Nov. 21, 2018 | (CN) | ................. 201811390409.3 |
| Nov. 21, 2018 | (CN) | ................. 201811390428.6 |
| Nov. 21, 2018 | (CN) | ................. 201811392232.0 |
| Nov. 21, 2018 | (CN) | ................. 201811392262.1 |
| Nov. 21, 2018 | (CN) | ................. 201811392270.6 |
| Nov. 21, 2018 | (CN) | ................. 201811392279.7 |
| Nov. 21, 2018 | (CN) | ................. 201811393352.2 |

(51) Int. Cl.
*G06F 30/27* (2020.01)
*G06N 3/04* (2023.01)

(56) References Cited

U.S. PATENT DOCUMENTS

| 10,936,942 | B2 | 3/2021 | Dasari et al. | |
| 11,514,291 | B2 | 11/2022 | Baum et al. | |
| 2009/0128571 | A1 | 5/2009 | Smith et al. | |
| 2011/0075596 | A1 | 3/2011 | Moreira et al. | |
| 2012/0083338 | A1 | 4/2012 | Decasa et al. | |
| 2012/0303848 | A1* | 11/2012 | Vallapaneni | G06F 13/364 710/110 |
| 2012/0303933 | A1* | 11/2012 | Manet | G06F 15/17337 712/30 |
| 2015/0358393 | A1* | 12/2015 | Pande | H04L 45/122 709/201 |
| 2017/0083338 | A1 | 3/2017 | Burger et al. | |
| 2017/0147513 | A1 | 5/2017 | Hilton et al. | |
| 2017/0308383 | A1 | 10/2017 | Espasa et al. | |
| 2018/0004518 | A1 | 1/2018 | Plotnikov et al. | |
| 2018/0293692 | A1* | 10/2018 | Koker | G06F 9/3851 |
| 2019/0244083 | A1* | 8/2019 | Franca-Neto | G06N 3/063 |
| 2020/0134105 | A1* | 4/2020 | Chen | G06N 3/105 |
| 2020/0273573 | A1* | 8/2020 | Perera | G16H 50/20 |
| 2022/0156215 | A1 | 5/2022 | Zhang et al. | |

FOREIGN PATENT DOCUMENTS

| CN | 102591759 A | 7/2012 |
| CN | 102868644 A | 1/2013 |
| CN | 103218208 A | 7/2013 |
| CN | 103580890 A | 2/2014 |
| CN | 105183662 A | 12/2015 |
| CN | 107316078 A | 11/2017 |
| CN | 107578095 A | 1/2018 |
| CN | 107920025 A | 4/2018 |
| CN | 107992329 A | 5/2018 |
| CN | 108427990 A | 8/2018 |
| CN | 108431770 A | 8/2018 |
| CN | 108470009 A | 8/2018 |
| JP | H01179515 A | 7/1989 |
| JP | H04507027 A | 12/1992 |
| JP | H05274455 A | 10/1993 |
| JP | H09120391 A | 5/1997 |
| JP | 2738141 B2 | 4/1998 |
| JP | 2001501755 A | 2/2001 |
| JP | 2006286002 A | 10/2006 |
| JP | 2008301109 A | 12/2008 |
| JP | 2015509183 A | 3/2015 |
| JP | 2018514872 A | 6/2018 |
| KR | 100520807 B1 | 10/2005 |
| KR | 1020100044278 A | 4/2010 |
| KR | 1020100125331 A | 11/2010 |
| KR | 101306354 B1 | 9/2013 |
| KR | 1020160127100 A | 11/2016 |
| KR | 1020170125396 A | 11/2017 |
| WO | 2015087424 A1 | 6/2015 |
| WO | 2017185418 A1 | 11/2017 |
| WO | 2018103736 A1 | 6/2018 |
| WO | 2018126073 A1 | 7/2018 |

OTHER PUBLICATIONS

CN201811216857.1—Second Office Action mailed on Jun. 1, 2023, 19 pages. (With Brief English Explanation).
KR 10-2020-7034126—Office Action, mailed on Jul. 25, 2022, 13 pages.
KR 10-2020-7034138—Office Action, mailed on Jul. 19, 2022, 15 pages.
KR 10-2020-7034145—Office Action, mailed on Jul. 25, 2022, 7 pages.
EP 19873122.6—Extended European Search Report, mailed May 20, 2022, 13 pages.
EP 21217802.4—Extended European Search Report, mailed May 3, 2022, 11 pages.
EP 212178099—Extended European Search Report, mailed May 10, 2022, 11 pages.
EP 21217811.5—Extended European Search Report, mailed May 9, 2022, 11 pages.
KR 1020207034133—Notification of reason for refusal, mailed Jul. 14, 2022, 11 pages.
CN201811216857.1—Chinese Office Action mailed on Jan. 3, 2023, 22 pages. (With Brief English Explanation).
Ebrahimi et al., "Cluster-based topologies for 3D Networks-on-Chip using advanced inter-layer bus architecture", Journal of Computer and System Sciences, vol. 79, Issue 4, Jun. 2013, pp. 475-491.
PCT /CN2019/111977—International Search Report and Written Opinion mailed on Jan. 22, 2020, 13 pages.
CN 201811215820.7—First Office Action, mailed Aug. 26, 2021, 31 pages. (with English translation).
CN 201811215978.4—First Office Action, mailed Aug. 26, 2021, 32 pages. (with English translation).
CN 201811216718.9—First Office Action, mailed Aug. 26, 2021, 21 pages. (with English translation).
CN 201811390409.—First Office Action, mailed Feb. 20, 2021, 10 pages. (with English translation).
CN 201811392232.0—First Office Action, mailed Feb. 10, 2021, 11 pages. (with English translation).
CN 201811392270.6—First Office Action, mailed Aug. 18, 2021, 12 pages. (with English translation).
JP 2020206272—Notice of Reasons for Refusal, mailed Nov. 24, 2021, 7 pages. (with English translation).
JP 2020206281—Notice of Reasons for Refusal, mailed Dec. 9, 2021, 8 pages. (with English translation).
JP 2020206293—Notice of Reasons for Refusal, mailed Dec. 9, 2021, 8 pages. (with English translation).
JP 2020206306—Notice of Reasons for Refusal, mailed Dec. 9, 2021, 8 pages. (with English translation).
JP 2020569113—Notice of Reasons for Refusal, mailed Nov. 24, 2021, 7 pages. (with English translation).
KR20207034126—Written Decision on Registration mailed on May 8, 2023, 6 pages.
KR20207034133—Written Decision on Registration mailed on May 8, 2023, 6 pages.
KR20207034138—Written Decision on Registration mailed on May 8, 2023, 6 pages.

(56) References Cited

OTHER PUBLICATIONS

KR20207034145—Written Decision on Registration mailed on May 8, 2023, 6 pages.
PCT/CN2019/111977—International Search Report, mailed Jan. 22, 2020, 9 pages. (no English translation).
KR 10-2020-7034145—Office Action, mailed on Jul. 25, 2022, 9 pages. (With brief English explanation).
U.S. Appl. No. 17/564,529—Notice of Allowance mailed on Sep. 20, 2023, 7 pages.
U.S. Appl. No. 17/564,529—Notice of Allowance mailed on Oct. 4, 2023, 7 pages.
U.S. Appl. No. 17/564,509—Notice of Allowance mailed on Aug. 16, 2023, 4 pages.
U.S. Appl. No. 17/564,509—Notice of Allowance mailed on Jul. 28, 2023, 7 pages.
U.S. Appl. No. 17/564,492—Notice of Allowance mailed on Sep. 20, 2023, 7 pages.
U.S. Appl. No. 17/564,431—Notice of Allowance mailed on Sep. 22, 2023, 9 pages.
U.S. Appl. No. 17/564,411—Notice of Allowance mailed on Aug. 30, 2023, 5 pages.
U.S. Appl. No. 17/564,411—Notice of Allowance mailed on Jul. 13, 2023, 8 pages.
U.S. Appl. No. 17/564,398—Notice of Allowance mailed on Sep. 18, 2023, 7 pages.
U.S. Appl. No. 17/564,398—Corrected Notice of Allowability mailed on Oct. 2, 2023, 3 pages.
U.S. Appl. No. 17/564,389—Notice of Allowance mailed on Jul. 31, 2023, 7 pages.
U.S. Appl. No. 17/564,389—Corrected Notice of Allowability mailed on Aug. 18, 2023, 2 pages.
U.S. Appl. No. 17/564,366—Notice of Allowance mailed on Dec. 28, 2023, 9 pages.
U.S. Appl. No. 17/564,366—Non-Final Office Action mailed on May 11, 2023, 11 pages.
U.S. Appl. No. 17/564,398—Non-Final Office Action mailed on Mar. 16, 2023, 14 pages.
U.S. Appl. No. 17/564,389—Non-Final Office Action mailed on Mar. 15, 2023, 15 pages.
U.S. Appl. No. 17/564,492—Non-Final Office Action mailed on Mar. 28, 2023, 10 pages.
U.S. Appl. No. 17/564,431—Non-Final Office Action mailed on Mar. 17, 2023, 9 pages.
U.S. Appl. No. 17/564,411—Non-Final Office Action mailed on Mar. 10, 2023, 15 pages.
U.S. Appl. No. 17/564,509—Non-Final Office Action mailed on Mar. 10, 2023, 12 pages.
U.S. Appl. No. 17/564,560—Final Office Action mailed on Sep. 15, 2023, 9 pages.
U.S. Appl. No. 17/564,529—Non-Final Office Action mailed on Mar. 10, 2023, 10 pages.
U.S. Appl. No. 17/564,560—Non-Final Office Action mailed on Mar. 20, 2023, 12 pages.

* cited by examiner determining, by the transmission circuit, a dependence of adjacent parsed data operation signals to obtain a determination result, wherein the dependence represents whether there is an association between an s-th data operation signal and an s-1-th data operation signal before the s-th data operation signal — S4501 if the determination result is that there is a dependency between the s-th data operation signal and the s-1-th data operation signal, caching, by the transmission circuit, the s-th data operation signal, and after the s-1-th data operation signal is executed, fetching the s-th data operation signal. — S4502

FIG.42

NETWORK-ON-CHIP DATA PROCESSING METHOD AND DEVICE

CROSS REFERENCES

This application claims the benefit of priority from Chinese Application No. 201811216718.9 with the title of "Network-On-Chip Processing System and Network-On-Chip Data Processing Method", Chinese Application No. 201811215820.7 with the title of "Network-On-Chip Processing System and Network-On-Chip Data Processing Method", Chinese Application No. 201811215978.4 with the title of "Network-on-Chip Processing System and Network-on-Chip Data Processing Method", and Chinese Application No. 201811216857.1 with the title of "Network-on-Chip Data Processing Method, Storage Medium, Computer Equipment and Device", all of which were filed on Oct. 18, 2018; this application also claims the benefit of priority from Chinese Application No. 201811392232.0 with the title of "Data Processing Method, Device, and Related Product", Chinese Application No. 201811392262.1 with the title of "Data Processing Method, Device, and Related Product", Chinese Application No. 201811392279.7 with the title of "Data Processing Device, Method, and Related Product", Chinese Application No. 201811393352.2 with the title of "Data Processing Device, Method, and Related Product", Chinese Application No. 201811390409.3 with the title of "Data Processing Device, Method, and Related Product", Chinese Application No. 201811390428.6 with the title of "Data Processing Device and Related Product", and Chinese Application No. 201811392270.6 with the title of "Data Processing Device and Related Product", all of which were filed on Nov. 21, 2018. The disclosures of the above applications are incorporated herein by reference in their entirety.

TECHNICAL FIELD

The present disclosure relates to the field of information processing technology, and particularly relates to a network-on-chip data processing method and device.

BACKGROUND

With the development of semi-conductor technology, it has become a reality to integrate hundreds of millions of transistors on a single chip. The network-on-chip (NoC) is capable of integrating plenty of computation resources on a single chip and implementing on-chip communication.

As plenty of computations are required in a neural network, some of the computations, such as a forward operation, a backward operation, and weight update, need to be processed in parallel. In a chip architecture with a large number of transistors, chip design may face problems such as high memory access overhead, high bandwidth blockage, and low data reading/writing efficiency.

SUMMARY

In order to at least overcome the problems existing in the related technology to a certain extent, the present disclosure provides an interaction method, a device, and a smart terminal. In a first aspect, a network-on-chip (NoC) processing system is provided. The system includes: a storage device and a plurality of computation devices, where the storage device and the plurality of computation devices are arranged on a same chip. At least one computation device is connected to the storage device, and at least two computation devices are connected to each other.

In an embodiment, any two of the plurality of computation devices are directly connected to each other.

In an embodiment, the plurality of computation devices include a first computation device and a plurality of second computation devices, where the first computation device is connected to the storage device, and at least one of the plurality of second computation devices is connected to the first computation device.

In an embodiment, at least two of the plurality of second computation devices are connected to each other, and are connected to the storage device through the first computation device.

In an embodiment, any two of the plurality of second computation devices are directly connected to the first computation device.

In an embodiment, each of the plurality of computation devices is connected to the storage device, and at least two computation devices are connected to each other.

In a second aspect, an embodiment of the present disclosure provides a neural network operation device, where the operation device includes one or more computation devices in the Noc processing system. The neural network operation device is configured to obtain data to be operated and control information from other processing devices, execute a specified machine learning operation, and transfer an execution result to other processing devices through an I/O interface.

When the neural network operation device includes a plurality of the computation devices, the plurality of computation devices may be interconnected and transfer data to each other through a specific structure, where
  the plurality of computation devices are interconnected and transfer data to each other through a PCIE bus to support a larger-scale machine learning operation; the plurality of computation devices share a same control system or have respective control systems; the plurality of computation devices share a memory or have respective memories; and an interconnection mode of the plurality of computation devices is any interconnection topology.

In a third aspect, an embodiment of the present disclosure provides a combined processing device, where the combined processing device includes the machine learning processing device of the second aspect, a universal interconnection interface, and other processing devices. The neural network operation device interacts with the other processing devices to jointly complete operations specified by a user. The combined processing device may also include a storage device, where the storage device is connected to the neural network operation device and the other processing devices respectively, and the storage device is configured to store data of the neural network computation device and the other processing devices.

In a fourth aspect, an embodiment of the present disclosure provides a neural network chip, where the chip includes the computation device in the NoC processing system, the neural network computation device of second aspect, or the combined processing device of the third aspect.

In a fifth aspect, an embodiment of the present disclosure provides a neural network chip package structure, where the package structure includes the neural network chip of the fourth aspect.

In a sixth aspect, an embodiment of the present disclosure provides a board card, where the board card includes the neural network chip package structure of the fifth aspect.

In a seventh aspect, an embodiment of the present disclosure provides an electronic device, where the electronic device includes the neural network chip of the fourth aspect or the board card of the sixth aspect.

In an eighth aspect, an embodiment of the present disclosure also provides an NoC data processing method. The method is used to perform a machine learning operation, and includes:
   accessing a storage device by using a first computation device to obtain first operation data;
   performing an operation on the first operation data by using the first computation device to obtain a first operation result; and
   sending the first operation result to a second computation device.

In an embodiment, the method further includes: accessing the storage device by using the second computation device to obtain second operation data.

In an embodiment, the method further includes: performing an operation on the second operation data and the first operation result by using the second computation device to obtain a second operation result.

An embodiment of the present disclosure provides an NoC processing system, where the system includes a storage device and a plurality of computation device clusters. The storage device and the plurality of computation device clusters are arranged on a same chip. Each computation device cluster includes a plurality of computation devices. At least one of the plurality of computation device clusters is connected to the storage device, and at least two computation device clusters are connected to each other.

In an embodiment, any two clusters of the plurality of computation device clusters are directly connected to each other.

In an embodiment, at least one computation device in each of the computation device clusters is connected to at least one computation device in other computation device clusters.

In an embodiment, the plurality of computation device clusters are connected to each other through any one of the plurality of computation device clusters.

In an embodiment, at least one computation device in each computation device cluster is connected to the storage device, and at least two computation devices are connected to each other.

In an embodiment, any two computation devices in each computation device cluster are directly connected to each other.

In an embodiment, each of the computation device clusters includes a first computation device and a plurality of second computation devices, where the first computation device is connected to the storage device, and at least one of the plurality of the second computation devices is connected to the first computation device.

In an embodiment, at least two of the plurality of the second computation devices in each of the computation device clusters are connected to each other, and are connected to the storage device through the first computation device.

In an embodiment, any two of the plurality of the second computation devices in each of the computation device clusters are directly connected to the first computation device.

In an embodiment, each of the plurality of computation devices in each of the computation device clusters is connected to the storage device, and at least two computation devices are connected to each other.

In an embodiment, the plurality of computation device clusters includes a primary computation device cluster and a plurality of computation device sub-clusters, where the primary computation device cluster is connected to the storage device, and at least one of the plurality of computation device sub-clusters is connected to the primary computation device cluster.

In an embodiment, at least two of the plurality of computation device sub-clusters are connected to each other, and are connected to the storage device through the primary computation device cluster.

In an embodiment, any two of the plurality of computation device sub-clusters are directly connected to the primary computation device cluster.

In an embodiment, each of the plurality of computation device clusters is connected to the storage device, and at least two computation device clusters are connected to each other.

An embodiment of the present disclosure also provides an NoC data processing method, where the method includes:
   accessing a storage device by using a first computation device cluster to read a plurality of first operation data, where the first operation device cluster includes a plurality of first computation devices;
   performing an operation on the plurality of the first operation data by using the first computation device cluster to obtain a first operation result; and
   sending the first operation result to a second computation device cluster.

In an embodiment, the method further includes: accessing the storage device by using the second computation device cluster to obtain second operation data, where the second computation device cluster includes a plurality of the second computation devices.

In an embodiment, the method further includes: performing an operation on the second operation data and the first operation result by using the second computation device cluster to obtain a second operation result.

In an embodiment, the performing an operation on the second operation data and the first operation result by using the second computation device cluster to obtain a second operation result includes:
   operating and forwarding the second operation data and the first operation result among the plurality of the second computation devices to obtain the second operation result.

An embodiment of the present disclosure provides an NoC processing system, where the system includes a plurality of interconnected NoC processing modules. The plurality of NoC processing modules are arranged on a same chip. Each of the NoC processing modules includes at least one storage device and a plurality of computation devices. In each of the NoC processing modules, at least one computation device is connected to at least one storage device inside the NoC processing modules, and at least two of the plurality of computation devices are connected to each other.

In an embodiment, the plurality of computation devices in each NoC processing module includes a first computation device and a plurality of second computation devices. The first computation device is connected to at least one storage device in the NoC processing module, and at least one of the plurality of second computation devices is connected to the first computation device.

In an embodiment, at least two of the second computation devices in each NoC processing module are connected to each other, and are connected to at least one storage device in the NoC processing module through the first computation device.

In an embodiment, any two of the second computation devices in each NoC processing module are directly connected to the first computation device.

In an embodiment, each computation device in each NoC processing module is connected to at least one storage device in the NoC processing module, and at least two of the computation devices are connected to each other.

In an embodiment, any two of the computation devices in each NoC processing module are directly connected to each other.

In an embodiment, each NoC processing module includes a plurality of storage devices, and in the NoC processing module, at least one computation device is connected to the plurality of storage devices in the NoC processing module.

In an embodiment, each computation device in each NoC processing module is connected to the plurality of storage devices in the NoC processing module.

In an embodiment, each NoC processing module includes at least one computation device and at least one computation device in other NoC processing modules.

In an embodiment, the plurality of NoC processing modules are connected to each other through any one of the computation devices in each NoC processing module.

In an embodiment, in each NoC processing module, each computation device is connected to the storage device, where a distance between each of the computation devices and the storage device is a first communication distance.

In an embodiment, any two of the NoC processing modules are directly connected to each other.

An embodiment of the present disclosure also provides an NoC data processing method, where the method includes:
  obtaining first operation data by using a first NoC processing module, where the first NoC processing module includes a first storage device and a plurality of first computation devices, and the first operation data is stored in the first storage device;
  performing an operation on the first operation data through the plurality of the first operation devices in the first NoC processing module to obtain a first operation result; and
  sending the first operation result to a second NoC processing module.

In an embodiment, the method further includes: obtaining second operation data by using the second NoC processing module, where the second NoC processing module includes a second storage device and a plurality of second computation devices. The second operation data is stored in the second storage device.

In an embodiment, the method further includes: performing an operation on the second operation data and the first operation result by using the plurality of the second operation devices in the second NoC processing module to obtain a second operation result.

In an embodiment, the method further includes:
  operating the second operation data and the first operation result among the plurality of the second computation devices to obtain the second operation result; and
  storing the second operation result in the second storage device.

In an embodiment, the method further includes:
  accessing the first storage device by using a first primary computation device in the first NoC processing module to obtain the first operation data;
  forwarding the first operation data between a first primary computation device and a plurality of first secondary computation devices in the first NoC processing module; and
  performing an operation on the first operation data by using the first primary computation device and the plurality of the first secondary computation devices in the first NoC processing module to obtain the first operation result, where
  the first computation device includes a first primary computation device and the plurality of the first secondary computation devices.

An embodiment of the present disclosure provides an NoC data processing method, where the method is applied to an NoC processing system. The NoC processing system is used to perform a machine learning operation, and includes a storage device and a computation device. The method includes:
  accessing the storage device in the NoC processing system by using a first computation device in the NoC processing system to obtain first operation data;
  performing an operation on the first operation data by using the first computation device to obtain a first operation result; and
  sending the first operation result to a second computation device in the NoC processing system.

In an embodiment, the computation device includes: an operation unit and a controller unit.

The accessing the storage device in the NoC processing system by using the first computation device in the NoC processing system to obtain first operation data includes:
  obtaining, by the controller unit in the first computation device, the first operation data and a computation instruction from the storage device.

In an embodiment, the operation unit includes: a primary processing circuit and a plurality of secondary processing circuits.

The performing an operation on the first operation data by using the first computation device to obtain a first operation result includes:
  parsing, by the controller unit in the first computation device, the computation instruction to obtain a plurality of operation instructions; and sending, by the controller unit in the first computation device, the plurality of operation instructions and the first operation data to the primary processing circuit in the first computation device;
  performing preorder processing on the first operation data by using the primary processing circuit in the first computation device, and sending data and operation instructions among the plurality of secondary processing circuits in the first computation device;
  performing, by the plurality of secondary processing circuits in the first computation device, an intermediate operation in parallel according to the operation data and the operation instructions sent from the primary processing circuit in the first computation device to obtain a plurality of intermediate results, and transferring the plurality of intermediate results to the primary processing circuit in the first computation device; and
  performing, by the primary processing circuit in the first computation device, subsequent processing on the plurality of intermediate results to obtain the first operation result of the computation instruction.

In an embodiment, the sending the first operation result to a second computation device in the NoC processing system includes:

transferring, by the controller unit in the first computation device, the first operation result to the second computation device in the NoC processing system.

In an embodiment, the machine learning computation includes: an artificial neural network operation; the first operation data includes: input neuron data and weight data; and the first operation result is output neuron data.

In an embodiment, the computation device further includes: a storage unit and a direct memory access unit. The storage unit includes any combination of a register and a cache, where the cache is configured to store the first operation data; and the register is configured to store a scalar in the first operation data.

In an embodiment, the controller unit includes: an instruction storage unit, an instruction processing unit, and a storage queue unit, where the instruction storage unit is configured to store a computation instruction associated with the artificial neural network operation;

the instruction processing unit is configured to parse the computation instruction to obtain a plurality of operation instructions; and the storage queue unit is configured to store an instruction queue, where the instruction queue includes: a plurality of operation instructions and/or a computation instruction to be executed in an order of the instruction queue.

In an embodiment, the primary processing circuit includes: a dependency processing unit.

The dependency processing unit determines whether there is an association between a first operation instruction and a zeroth operation instruction before the first operation instruction. If there is an association between the first operation instruction and the zeroth operation instruction, the dependency processing unit caches the first operation instruction in the instruction storage unit, and after the zeroth operation instruction is executed, the dependency processing unit fetches the first operation instruction from the instruction storage unit and sends the first operation instruction to the operation unit;

the determining whether there is an association between the first operation instruction and the zeroth operation instruction before the first operation instruction includes:

fetching a first storage address interval of data required in the first operation instruction according to the first operation instruction, fetching a zeroth storage address interval of data required in the zeroth operation instruction according to the zeroth operation instruction; if the first storage address interval and the zeroth storage address interval have an overlapping area, determining that there is an association between the first operation instruction and the zeroth operation instruction; and if the first storage address interval and the zeroth storage address interval do not have an overlapping area, determining that there is no association between the first operation instruction and the zeroth operation instruction.

In an embodiment, the operation unit includes: a tree module which includes a root port and a plurality of branch ports, where the root port is connected to the primary processing circuit, and each of the plurality of branch ports is respectively connected to one of the plurality of secondary processing circuits; and the tree module forwards a data block, a weight, and an operation instruction between the primary processing circuit and the plurality of secondary processing circuits.

In an embodiment, the operation unit further includes one or more branch processing circuits, where each of the branch processing circuits is connected to at least one secondary processing circuit;

the primary processing circuit determines that the input neuron is broadcast data, the weight is distribution data, partitions the distribution data into a plurality of data blocks, and sends at least one of the plurality of data blocks, the broadcast data, and at least one of the plurality of operation instructions to the branch processing circuit;

the branch processing circuit forwards the data blocks, the broadcast data, and the operation instruction between the primary processing circuit and the plurality of secondary processing circuits;

the plurality of secondary processing circuits perform an operation on the received data block and broadcast data according to the operation instruction to obtain an intermediate result, and transfer the intermediate results to the branch processing circuit; and the primary processing circuit performs subsequent processing on the intermediate results sent by the branch processing circuit to obtain a first operation result of the computation instruction, and sends the first operation result of the computation instruction to the controller unit.

In an embodiment, the plurality of secondary processing circuits are distributed in an array; each secondary processing circuit is connected to other adjacent secondary processing circuits, and the primary processing circuit is connected to k of the plurality of secondary processing circuits, where the k secondary processing circuits are: n secondary processing circuits in a first row, n secondary processing circuits in an $m^{th}$ row, and m secondary processing circuits in a first column;

the k secondary processing circuits forward data and instructions between the primary processing circuit and the plurality of secondary processing circuits;

the primary processing circuit determines that the input neuron is broadcast data, the weight is distribution data, partitions the distribution data into a plurality of data blocks, and sends at least one of the plurality of data blocks and at least one of the plurality of operation instructions to the k secondary processing circuits;

the k secondary processing circuits convert data between the primary processing circuit and the plurality of secondary processing circuits;

the plurality of secondary processing circuits perform an operation on the received data block according to the operation instruction to obtain an intermediate result, and transfer the operation result to the k secondary processing circuits; and the primary processing circuit performs subsequent processing on the intermediate results sent by the k secondary processing circuits to obtain a first operation result of the computation instruction, and sends the first operation result of the computation instruction to the controller unit.

In an embodiment, the primary processing circuit combines and sorts the intermediate results sent by the plurality of processing circuits to obtain the first operation result of the computation instruction;

or the primary processing circuit combines, sorts, and activates the intermediate results sent by the plurality of processing circuits to obtain the first operation result of the computation instruction.

In an embodiment, the primary processing circuit includes: one or more of a conversion processing circuit, an activation processing circuit, and an addition processing circuit, where the conversion processing circuit performs preorder processing on the first operation data, which specifically includes: performing conversion between a first data structure and a second data structure on the data or intermediate results received by the primary processing circuit; or performing conversion between a first data type and a second data type on the data or intermediate results received by the primary processing circuit;

the activation processing circuit executes the subsequent processing, which specifically includes performing an activation operation of data in the primary processing circuit; and the addition processing circuit executes the subsequent processing, which specifically includes performing an addition operation or an accumulation operation.

In an embodiment, the secondary processing circuit includes: a multiplication processing circuit, where the multiplication processing circuit performs a multiplication operation on a received data block to obtain a product result.

In an embodiment, the secondary processing circuit further includes: an accumulation processing circuit, where the accumulation processing circuit performs an accumulation operation on the product result to obtain the intermediate result.

In an embodiment, the tree module is an n-ary tree structure, where n is an integer greater than or equal to 2.

In an embodiment, the method further includes: accessing a storage device in the NoC processing system through a second computation device in the NoC processing system to obtain second operation data.

In an embodiment, the method further includes: performing an operation on the second operation data and the first operation result by using a second computation device in the on-chip network processing system to obtain a second operation result.

An embodiment of the present disclosure provides an NoC data processing device configured to perform a machine learning operation. The NoC data processing device includes: an obtaining module configured to access a storage device in the NoC processing system by using a first computation device in the NoC processing system to obtain first operation data;

an operation module configured to perform an operation on the first operation data by using the first computation device to obtain a first operation result; and a sending module configured to send the first operation result to a second computation device in the NoC processing system.

An embodiment of the present disclosure provides a data processing method, where the method includes:

receiving a data operation signal sent by an internal or external device, where the data operation signal includes an operation field and an opcode, where the opcode includes a first-type flag bit, and the operation field includes a second-type flag bit. The first-type flag bit is used to indicate whether the data operation signal is an I/O instruction, and the second-type flag bit is used to indicate whether the data operation signal is a broadcast or multicast instruction in the I/O instruction; and performing a corresponding operation according to the data operation signal on data to be operated in the memory to obtain required input data.

In an embodiment, the operation field further includes a data reception flag bit which is used to indicate a device or a processing circuit that receives the input data.

In an embodiment, a count of data reception flag bits represents a count of devices or processing circuits that can interact with the memory.

In an embodiment, the operation field further includes information of data to be operated, where the information of the data to be operated includes a source address of the data to be operated in the memory, a length of the data to be operated, and a data return address after the data is operated; the performing a corresponding operation on the data to be operated in the memory according to the data operation signal to obtain the required input data includes:

reading the memory from the source address to obtain input data that satisfies the data length;

determining a device or a processing circuit that receives the input data according to the data reception flag bit; and according to the data return address, returning the input data to a storage space corresponding to the data return address in the device or processing circuit.

In an embodiment, the operation field further includes a jump sub-operation-field, where the jump sub-operation-field includes a jump stride and a jump data length which is obtained after each jump operation; the reading the memory from the source address to obtain input data that satisfies the data length includes:

reading the memory from the source address, and obtaining first jump data according to a jump data length after a current jump;

obtaining a last address of the jump data, and jumping from the last address to a target jump address according to the jump stride; and starting from the target jump address, obtaining second jump data according to a length of jump data after the jump until the length of the jump data obtained after each jump satisfies the data length.

In an embodiment, the jump sub-operation-field includes a stride operation field and/or a segment operation field, where the stride operation field is used to indicate a stride for each jump of the data operation signal, and the segment operation field is used to indicate a preset size for each segment of the data operation signal.

In an embodiment, the operation field further includes a function flag bit which is used to indicate a processing operation performed on data that is read.

In an embodiment, the method further includes:
if a value of the first-type flag bit is I/O, determining that the data operation signal is an I/O instruction; and
if a value of the second-type flag bit is 1, determining that the data operation signal is a broadcast or multicast instruction in the I/O instruction.

In an embodiment, the receiving a data operation signal sent by an internal or external device includes:

parsing the data operation signal to obtain a type flag bit of the data operation signal and information of data to be operated; and executing the parsed data operation signal according to an instruction queue, where the instruction queue is used to indicate an execution order of the data operation signal.

In an embodiment, before executing the parsed data operation signal according to the instruction queue, the method further includes:

determining a dependency of adjacent parsed data operation signals to obtain a determination result, where the dependency represents whether there is an association between an $s^{th}$ data operation signal and an $s-1^h$ data operation signal before the $s^{th}$ data operation signal; and if the determination result is that there is an association between the $s^{th}$ data operation signal and the $s-1^{th}$ data operation signal, caching the $s^{th}$ data operation signal, and after the $s-1^{th}$ data operation signal is executed, fetching the $s^{th}$ data operation signal.

In an embodiment, the determining the dependency of adjacent parsed data operation signals includes:

obtaining a first storage address interval of required data in the $s^{th}$ data operation signal fetched according to the $s^{th}$ data operation signal, and obtaining a zeroth storage address interval of required data in the $s-1^{th}$ data operation signal fetched according to the $s-1^{th}$ data operation signal, respectively;

if the first storage address interval and the zeroth storage address interval have an overlapping area, determining that there is a dependency between the $s^{th}$ data operation signal and the $s-1^{th}$ data operation signal; and if the first storage address interval and the zeroth storage address interval do not have an overlapping area, determining that there is no dependency between the $s^{th}$ data operation signal and the $s-1^{th}$ data operation signal.

An embodiment of the present disclosure provides a data processing device, where the device includes a processor and a memory. The memory stores a computer program, and the processor implements the following steps when executing the computer program:

receiving a data operation signal sent by an internal or external device, where the data operation signal includes an operation field and an opcode; the opcode includes a first-type flag bit, and the operation field includes a second-type flag bit; the first-type flag bit is used to indicate whether the data operation signal is an I/O instruction, and the second-type flag bit is used to indicate whether the data operation signal is a broadcast or multicast instruction in the I/O instruction; and performing a corresponding operation according to the data operation signal on data to be operated in the memory to obtain required input data.

An embodiment of the present disclosure provides a data processing method, where the method includes:

receiving a data operation signal sent by an internal or external device, where the data operation signal includes an opcode; the opcode includes the type flag bit which is used to indicate a broadcast or multicast instruction of the data operation signal; and performing a corresponding operation according to the data operation signal on data to be operated in the memory to obtain required input data.

An embodiment of the present disclosure provides a data processing device, where the device includes a processor and a memory. The memory stores a computer program, and the processor implements the following steps when executing the computer program:

receiving a data operation signal sent by an internal or external device, where the data operation signal includes an opcode; the opcode includes the type flag bit which is used to indicate a broadcast or multicast instruction of the data operation signal; and performing a corresponding operation according to the data operation signal on data to be operated in the memory to obtain required input data.

In an embodiment, the data operation signal further includes an operation field, where the operation field further includes a data reception flag bit which is used to indicate a device or a processing circuit that receives the input data.

In an embodiment, a count of data reception flag bits represents a count of devices or processing circuits that can interact with the memory.

In an embodiment, the method further includes:

if a value of the type flag bit is CAST, determining that the data operation signal is a broadcast or multicast instruction.

In an embodiment, the receiving a data operation signal sent by an internal or external device includes:

parsing the data operation signal to obtain a type flag bit of the data operation signal and information of data to be operated; and executing a parsed data operation signal according to an instruction queue, where the instruction queue is used to indicate an execution order of the data operation signal.

An embodiment of the present disclosure provides a data processing device for processing machine learning data. The data processing device includes: a machine learning device, a transmission circuit, and a shared memory, where the machine learning device is connected to the transmission circuit, and the transmission circuit is connected to the shared memory;

the transmission circuit is configured to obtain input data required by the machine learning device from the shared memory according to the data operation signal sent by the machine learning device, and return the input data to the machine learning device. The data operation signal carries a type flag bit of a data operation signal and information of data to be operated.

In an embodiment, the machine learning device is configured to perform a machine learning operation according to the input data to obtain output data.

In an embodiment, the machine learning device is further configured to transfer the output data to the shared memory through the transmission circuit for data storage.

In an embodiment, the machine learning device includes at least one machine learning unit;

the data operation signal further includes a data reception flag bit which is used to indicate a target machine learning unit that receives the input data.

In an embodiment, the value of the type flag bit of the data operation signal includes CAST, which indicates that the data operation signal is a broadcast or multicast instruction.

In an embodiment, the type flag bit of the data operation signal includes a first-type flag bit and a second-type flag bit, where a value of the first-type flag bit includes I/O, which indicates whether the data operation signal is an I/O instruction; and the second-type flag bit is used to indicate whether the data operation signal is a broadcast or multicast instruction in the I/O instruction.

In an embodiment, the information of the data to be operated includes at least one of a source address of the data to be operated in the shared memory, a length of the data to be operated, and a data return address after the data is operated.

In an embodiment, the data operation signal further includes jump information, where the jump information includes a jump stride and a data length operated after each jump.

In an embodiment, the jump information includes stride jump information and/or segment jump information, where
- the stride jump information is used to indicate a stride for each jump of the data operation signal; and
- the segment jump information is used to indicate a preset size for each segment of the data operation signal.

In an embodiment, the data operation signal further includes a function flag bit which is used to indicate a processing operation performed by the transmission circuit on read data.

An embodiment of the present disclosure further provides a data processing method which is applied to the above data processing device, where the method includes:
- receiving, by a transmission circuit in the data processing device, a data operation signal sent by a machine learning device in the data processing device, where the data operation signal carries a type flag of the data operation signal and information of data to be operated;
- determining, by the transmission circuit, an operation performed on data in a shared memory according to the type flag bit of the data operation signal; performing, by the transmission circuit, the operation on the data to be operated according to the information of the data to be operated to obtain input data required by the machine learning device; and returning, by the transmission circuit, the input data to the machine learning device; and
- performing, by the machine learning device, a machine learning operation according to the input data to obtain output data; using the output data as new input data, and transferring the new input data to the shared memory through the transmission circuit for data storage.

In an embodiment, the machine learning device includes at least one machine learning unit, and the data operation signal further includes a data reception flag bit. The returning the input data to the machine learning device includes:
- determining, by the transmission circuit, a target machine learning unit that receives the input data according to the value of the data reception flag bit, and sending the input data to the target machine learning unit.

In an embodiment, the information of the data to be operated includes a source address of the data to be operated in the shared memory, a length of the data to be operated, and a data return address after the data is operated; the step of performing the operation on the data to be operated according to the information of the data to be operated to obtain input data required by the machine learning device and returning the input data to the machine learning device includes:
- reading, by the transmission circuit, the shared memory from the source address; and obtaining the input data that satisfies the data length; and
- returning, by the transmission circuit, the input data to the target machine learning unit according to the data return address and the data reception flag bit.

An embodiment of the present disclosure provides a data processing device, where the device includes a machine learning device, a transmission circuit, and a shared memory. The machine learning device includes at least one machine learning unit, where a unicast read operation and a broadcast operation performed by the machine learning unit share a same data receiving interface. The machine learning unit is connected to the transmission circuit through a sending interface and a shared data receiving interface, and the transmission circuit is connected to the shared memory; and
- the transmission circuit is configured to obtain input data required by the machine learning device from the shared memory according to a data operation signal sent by the machine learning device through the sending interface, and return the input data to the machine learning device through the shared data receiving interface.

In an embodiment, the machine learning device is configured to perform a machine learning operation according to the input data to obtain output data.

In an embodiment, the machine learning device is further configured to transfer the output data to the shared memory through the transmission circuit for data storage.

In an embodiment, the sending interface includes: a unicast read signal sending interface and a broadcast signal sending interface. The machine learning unit is connected to the transmission circuit through the unicast read signal sending interface and the shared data receiving interface respectively to implement the unicast read operation, and is connected to the transmission circuit through the broadcast signal sending interface and the shared data receiving interface to implement the broadcast operation.

In an embodiment, the transmission circuit includes: a second transmission interface, a read/write processing circuit connected to the second transmission interface, and an arbitration circuit connected to the read/write processing circuit, where
- the read/write processing circuit is configured to receive a data operation signal sent by the at least one machine learning unit through the transmission interface and the second transmission interface, transmit the data operation signal to the arbitration circuit, and return the data obtained by the arbitration circuit from the shared memory to the machine learning unit corresponding to the data operation signal through the second transmission interface and the shared data receiving interface; and
- the arbitration circuit is configured to arbitrate the data operation signal received from the read/write processing circuit according to a preset arbitration rule, and operate the data in the shared memory according to the data operation signal that has been successfully arbitrated.

In an embodiment, the read/write processing circuit includes: a unicast read processing circuit and a broadcast processing circuit, where the unicast read processing circuit is configured to process a unicast read signal, and the broadcast processing circuit is configured to process a broadcast signal and/or a multicast signal.

In an embodiment, the second transmission interface includes: at least one cluster of unicast read signal receiving interface and unicast read data sending interfaces that are connected to the unicast read processing circuit, and at least one cluster of broadcast signal receiving interfaces and broadcast data sending interfaces that are connected to the broadcast processing circuit, where the unicast read signal receiving interfaces are connected to the unicast read signal sending interfaces of the machine learning unit, the broadcast signal receiving interfaces are connected to the broadcast signal sending interfaces of the machine learning unit, and the unicast read data sending interfaces and the broadcast data sending interfaces in the transmission circuit are respectively connected to the shared data receiving interface of the machine learning unit.

In an embodiment, the read/write processing circuit includes: a broadcast processing circuit and a plurality of unicast read processing circuits, where the plurality of unicast read processing circuits and the plurality of machine learning units are connected one to one, and the broadcast processing circuit and the plurality of machine learning units are connected one-to-many.

In an embodiment, the second transmission interface includes: a cluster of broadcast interfaces connected to the broadcast processing circuit, where each of the broadcast interfaces include a broadcast signal receiving interface and a broadcast data sending interface. The plurality of machine learning units are connected to the broadcast processing circuit through the cluster of broadcast processing interfaces.

In an embodiment, the second transmission interface includes: a plurality of clusters of unicast read signal receiving interfaces and shared read data sending interfaces that are one-to-one connected to the plurality of unicast read processing circuit, and a broadcast signal receiving interface that is connected to the broadcast processing circuit, where each of the unicast read signal receiving interfaces is connected to each of the unicast read signal sending interfaces of the machine learning unit, each of the broadcast signal receiving interfaces is connected to each of the broadcast signal sending interfaces of the machine learning unit, and each of the shared data sending interfaces is connected to each of the shared data receiving interfaces of the machine learning unit.

An embodiment of the present disclosure further provides a data processing method which is applied to a data processing device. The data processing device includes: a machine learning device, a transmission circuit, and a shared memory. The machine learning device includes at least one machine learning unit, where a unicast read operation and a broadcast operation performed by the machine learning unit share a same data receiving interface. The machine learning unit is connected to the transmission circuit through a sending interface and a shared data receiving interface, and the transmission circuit is connected to the shared memory. The method includes:
  sending, by the machine learning device, a data operation signal to the transmission circuit through the sending interface; and
  obtaining, by the transmission circuit, input data required by the machine learning device from the shared memory according to the data operation signal, and returning the input data to the machine learning device through the shared data receiving interface.

In an embodiment, the data operation signal is a broadcast signal and/or a multicast signal, and the returning the input data to the machine learning device through the shared data receiving interface includes:
  sending, by the transmission circuit, the input data to a plurality of machine learning units corresponding to the broadcast signal and/or the multicast signal through the shared data receiving interface.

An embodiment of the present disclosure provides a data processing device, where the device includes a machine learning device, a transmission circuit, and a shared memory. The machine learning device includes at least one machine learning unit, where at least two of a unicast read operation, a unicast write operation, and a broadcast operation performed by the machine learning unit share a same sending interface in the machine learning unit. The machine learning unit is connected to the transmission circuit, and the transmission circuit is connected to the shared memory;
  the transmission circuit is configured to obtain input data required by the machine learning device from the shared memory according to a data operation signal sent by the at least one sending interface in the machine learning unit of the machine learning device, and return the input data to the machine learning device through the receiving interface.

In an embodiment, the read/write processing circuit is divided into a plurality of processing circuit clusters, where one machine learning unit corresponds to one processing circuit cluster, and the processing circuit cluster includes a unicast read processing circuit, a unicast write processing circuit, and a broadcast processing circuit.

In an embodiment, the data returned by the unicast read processing circuit and the broadcast processing circuit in the processing circuit cluster share a same shared data receiving interface in the machine learning unit.

In an embodiment, the at least one sending interface includes: a shared signal sending interface shared by a unicast write operation and a broadcast operation, and a unicast read signal sending interface.

In an embodiment, the second transmission interface includes a plurality of interface clusters, where each of the processing circuit clusters corresponds to one interface cluster. The interface cluster includes: a unicast read signal receiving interface and a unicast read data sending interface that are connected to the unicast read processing circuit, a unicast read signal receiving interface connected to the unicast write processing circuit, and a broadcast signal receiving interface and a broadcast data sending interface connected to the broadcasting processing circuit.

In an embodiment, the unicast write processing circuit and the broadcast processing circuit in one processing circuit cluster share a same shared signal receiving interface in the corresponding interface cluster, and the shared signal receiving interface corresponding to the processing circuit cluster is connected to the shared signal sending interface of the machine learning unit corresponding to the processing circuit cluster, and the unicast read signal receiving interface in the processing circuit cluster is connected to the unicast read signal sending interface of the machine learning unit corresponding to the processing circuit cluster.

In an embodiment, the unicast read processing circuit and the broadcast processing circuit in the one processing circuit cluster share one shared data transmission interface in the corresponding interface cluster, and the shared data transmission interface corresponding to the processing circuit cluster is connected to the shared data receiving interface of the machine learning unit corresponding to the processing circuit cluster.

In an embodiment, the shared signal receiving interface corresponding to the processing circuit cluster, which is respectively connected to the unicast write processing circuit and the broadcast processing circuit in the processing circuit cluster, is configured to receive a data operation signal sent by the shared signal sending interface of the machine learning unit, divide the data operation signal into two identical data operation signals, and send the two data operation signals to the unicast write processing circuit and the broadcast processing circuit respectively.

An embodiment of the present disclosure further provides a data processing method which is applied to a data processing device, where the data processing device includes: a machine learning device, a transmission circuit, and a shared memory. The machine learning device includes at least one machine learning unit, where the machine learning unit includes at least one sending interface and at least one receiving interface. At least two data operations among a unicast read operation, a unicast write operation, and a broadcast operation performed by the machine learning unit share a same sending interface in the machine learning unit. The machine learning unit is connected to the transmission circuit, and the transmission circuit is connected to the shared memory. The method includes:

sending, by the machine learning device, a data operation signal to the transmission circuit through the at least one sending interface; and obtaining, by the transmission circuit, input data required by the machine learning device from the shared memory according to the data operation signal, and returning the input data to the machine learning device through the receiving interface.

In an embodiment, the data operation signal is a broadcast signal and/or a multicast signal. The returning the input data to the machine learning device through the receiving interface includes:

sending, by the transmission circuit, the input data to a plurality of machine learning units corresponding to the broadcast signal and/or the multicast signal through the shared data receiving interface.

An embodiment of the present disclosure provides a data processing device, where the device includes a machine learning device, a transmission circuit, and a shared memory. The machine learning device is connected to the transmission circuit through a first transmission interface, and the transmission circuit is connected to the shared memory;

the transmission circuit is configured to obtain input data required by the machine learning device from the shared memory according to a data operation signal sent by the machine learning device, and return the input data to the machine learning device, where the data operation signal represents an operation mode for data in the shared memory.

In an embodiment, the machine learning device includes at least one machine learning unit, where the machine learning unit includes: at least one operation unit, and a controller unit connected to the operation unit; the operation unit includes a primary processing circuit and a plurality of secondary processing circuits, where the operation unit is connected to the transmission circuit through the first transmission interface;

the controller unit is configured to send the data operation signal and the output data to the transmission circuit through a sending interface in the first transmission interface, receive the input data obtained by the transmission circuit from the shared memory through the receiving interface in the first transmission interface, and send the input data to the primary processing circuit and/or the secondary processing circuits;

the primary processing circuit is configured to distribute the input data to the plurality of secondary processing circuits; the plurality of secondary processing circuits are configured to perform intermediate operations in parallel according to the data transferred by the primary processing circuit to obtain a plurality of intermediate results, and transfer the plurality of intermediate results to the primary processing circuit; and the primary processing circuit is further configured to perform subsequent processing on the plurality of intermediate results to obtain a computation result.

In an embodiment, a structure of the primary processing circuit and the secondary processing circuits includes at least one of an H-type, a systolic array type, and a tree structure.

In an embodiment, the transmission circuit includes: a second transmission interface, at least one read/write processing circuit connected to a second transmission interface, and an arbitration circuit connected to the read/write processing circuit; the at least one machine learning unit is connected to the transmission circuit through a connection between the first transmission interface and the second transmission interface;

the read/write processing circuit is configured to receive the data operation signal sent by the at least one machine learning unit through the first transmission interface and the second transmission interface, transmit the data operation signal to the arbitration circuit, and transfer the data read from the shared memory to the at least one machine learning unit through the second transmission interface; and the arbitration circuit is configured to arbitrate the data operation signal received from the at least one read/write processing circuit according to a preset arbitration rule, and operate the data in the shared memory according to the data operation signal that has been successfully arbitrated.

In an embodiment, the read/write processing circuit includes at least one of the following processing circuits: a unicast read processing circuit, a unicast write processing circuit, and a broadcast processing circuit; the data operation signal includes at least one of the following: a unicast read request, a unicast write request, a unicast read instruction, a unicast write instruction, a multicast instruction, and a broadcast instruction, where a unicast-type processing circuit is configured to process a unicast-type signal, and a broadcast-type processing circuit is configured to process a multicast-type or broadcast-type signal.

In an embodiment, if the data operation signal is an instruction-type signal, the read/write processing circuit is specifically configured to parse the instruction-type signal, generate a request-type signal, and transmit the request-type signal to the arbitration circuit.

In an embodiment, if the data operation signal is a multicast instruction, the multicast instruction carries identifiers of a plurality of target machine learning units that receive data; and the read/write processing circuit is specifically configured to send the data obtained by the arbitration circuit from the shared memory to the plurality of target machine learning units.

In an embodiment, if the data operation signal is a broadcast instruction, the read/write processing circuit is specifically configured to transfer the data obtained by the arbitration circuit from the shared memory to all machine learning units.

In an embodiment, the input data includes input neuron data and/or weight data; and the output data includes output neuron data.

In an embodiment, the data processing device is divided into at least one cluster, where each cluster includes a plurality of machine learning units, a transmission circuit, and at least one shared memory;

the transmission circuit further includes: a first type of direct memory access controller DMA connected to an arbitration circuit in the cluster and a shared memory in the cluster, and/or, a second type of DMA connected to the arbitration circuit in the cluster and shared memories in other clusters, where the first type of DMA is configured to control data interaction between the arbitration circuit in the cluster and the shared memory in the cluster; and the second type of DMA is configured to control data interaction between the arbitration circuit in the cluster and shared memories in other clusters, and control data interaction between the arbitration circuit in the cluster and an off-chip memory.

In an embodiment, the transmission circuit further includes: a first selection transmission circuit connected to the first type of DMA, and a second selection transmission circuit connected to the second type of DMA, where the first selection transmission circuit is configured to selectively connect a shared memory in a cluster where the first selection transmission circuit is located; and the second selection transmission circuit is configured to selectively connect shared memories in a cluster where the second selection transmission circuit is located and other clusters, and the off-chip memory.

In an embodiment, the transmission circuit further includes: a caching circuit connected to the arbitration circuit and the shared memory. The caching circuit is configured to temporarily store data obtained by the arbitration circuit from the shared memory, and temporarily store data written by the arbitration circuit to the shared memory.

In an embodiment, a transmission bandwidth between the transmission circuit and the shared memory is greater than a transmission bandwidth between the transmission circuit and the machine learning unit.

An embodiment of the present disclosure provides a data processing device configured to process machine learning data. The data processing device includes a machine learning device, a transmission circuit, and a shared memory. The transmission circuit includes a plurality of read/write processing circuits and an arbitration circuit, the machine learning device includes a plurality of machine learning units, where each of the machine learning units includes at least one operation unit, the plurality of machine learning units are connected to the transmission circuit through a first transmission interface, the transmission circuit is connected to the shared memory;

the arbitration circuit is configured to arbitrate data operation signals sent by the plurality of machine learning units, and obtain input data required by the machine learning device from the shared memory according to data operation signals that have been successfully arbitrated; and the read/write processing circuit is configured to determine a target machine learning unit or a target operation unit from the plurality of machine learning units according to address information carried by the data operation signals that have been successfully arbitrated or types of the data operation signals, and return the input data to the target machine learning unit or the target operation unit.

In an embodiment, the arbitration circuit is specifically configured to determine priorities of data operation signals sent by the plurality of read/write processing circuits, and use a data operation signal with a highest priority as a data operation signal that has been successfully arbitrated.

In an embodiment, the arbitration circuit is specifically configured to, when priorities of the data operation signals sent by the plurality of read/write processing circuits are identical, determine a data operation signal that has been successfully arbitrated according to the types of the plurality of data operation signals and a preset execution condition.

In an embodiment, if the data operation signal is a unicast-type signal, the execution condition includes: a channel of a machine learning unit that sends the unicast-type signal is idle, or a channel of an operation unit in the machine learning unit that sends the unicast-type signal is idle.

In an embodiment, if the data operation signal is a multicast-type signal, the execution condition includes: a channel of a machine learning unit that sends the multicast-type signal is idle, and a channel of a target machine learning unit specified by the multicast-type signal is idle; or, a channel of an operation unit in the machine learning unit that sends the multicast-type signal is idle, and a channel of a target operation unit specified by the multicast-type signal is idle.

In an embodiment, if the data operation signal is a broadcast-type signal, the execution condition includes: a channel of a machine learning unit that sends the broadcast-type signal is idle, and channels of other remaining machine learning units are idle; or, a channel of an operation unit in the machine learning unit that sends the broadcast-type signal is idle, and channels of operation units in other remaining machine learning units are idle.

In an embodiment, the transmission circuit further includes a second transmission interface, where each interface in the second transmission interface is connected to each interface in the first transmission interface in a one-to-one correspondence, and one machine learning unit is correspondingly connected to one read/write processing circuit.

In an embodiment, a plurality of operation units in one machine learning unit share a same sending interface in the first transmission interface, and each operation unit corresponds to one data receiving interface.

In an embodiment, each of the plurality of operation units in one machine learning unit respectively corresponds to one sending interface and one data receiving interface in the first transmission interface.

In an embodiment, the transmission circuit further includes a second transmission interface, and the plurality of machine learning units share a signal receiving interface and a data return interface in the second transmission interface.

In an embodiment, the read/write processing circuit further includes a signal queue, where the signal queue is used to store data operation signals sent by each machine learning unit;

the read/write processing circuit is further configured to determine whether there is remaining space in the request queue when receiving the data operation signals; if there is remaining space, the read/write processing circuit is configured to cache the data operation signals in the request queue; otherwise the read/write processing circuit is configured to block the data operation signals.

In an embodiment, if the read/write processing circuit is a broadcast processing circuit, the signal queue includes an instruction queue and a request queue, where the instruction queue is used to cache instruction-type signals received by the broadcast processing circuit; and the request queue is used to cache request-type signals obtained after parsing the instruction-type signals.

In an embodiment, the machine learning unit further includes: a controller unit connected to the operation unit;

the operation unit includes a primary processing circuit and a plurality of secondary processing circuits, and the operation unit is connected to the transmission interface through the first transmission circuit;

the controller unit is configured to send the data operation signal and the output data to the transmission circuit through the transmission interface in the first transmission interface, receive the input neuron data and the weight data obtained from the shared memory through the receiving interface in the first transmission interface, and send the input neuron data and the weight data to the primary processing circuit and/or the secondary processing circuits;

the primary processing circuit is configured to distribute the input data to the plurality of secondary processing circuits; the plurality of secondary processing circuits are configured to perform intermediate operations in parallel according to neuron data and weight data transferred by the primary processing circuit to obtain a plurality of intermediate results, and transfer the plurality of intermediate results to the primary processing circuit; and the primary processing circuit is further configured to perform subsequent processing on the plurality of intermediate results to obtain a computation result.

In an embodiment, the input data includes input data, and the output data includes output data.

It should be understood that the above general descriptions and the following detailed descriptions are only exemplary and illustrative, and are not intended to limit the present disclosure.

BRIEF DESCRIPTION OF THE DRAWINGS

The accompanied drawings herein are incorporated into the specification and constitute a part of the specification, illustrate embodiments that conform to the present disclosure, and are used together with the specification to explain principles of the present disclosure.

FIG. 42 is a flowchart of a data processing method according to an embodiment;

DETAILED DESCRIPTION OF THE EMBODIMENTS

Figure 1:
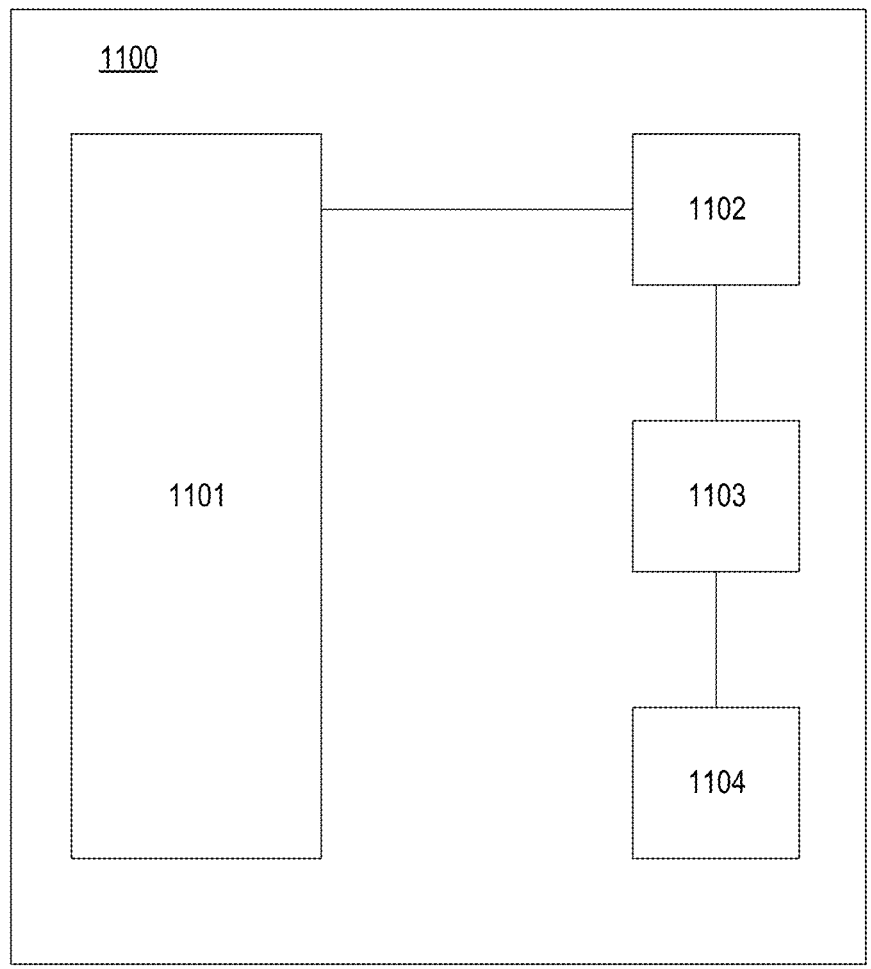
FIG. 1 is a schematic structural diagram of a network-on-chip (NoC) processing system 1100 according to an embodiment.

The exemplary embodiments will be described in detail, and examples thereof are shown in the accompanied drawings. Unless otherwise indicated, identical numbers in different drawings indicate identical or similar elements. The implementation manners described in the following exemplary embodiments do not represent all implementation manners consistent with the present disclosure. On the contrary, the implementation manners are only examples of devices and methods which are consistent with some aspects of the present disclosure and specifically described in the appended claims.

In an embodiment, the present disclosure provides a network-on-chip (NoC) processing system. The system includes a storage device and a plurality of computation devices, where the storage device and the plurality of computation devices are arranged on a same chip, at least one computation device is connected to the storage device, and at least two computation devices are connected to each other.

Network-on-chip (NoC) refers to an on-chip communication network that integrates a large amount of computation resources and connects these resources on a single chip. Optionally, each computation device in the chip can use its own interface to access the NoC, and communicate with a target module to be communicated by using shared network resources. The storage device and the plurality of computation devices are arranged on the same chip, which specifically means that the storage device and the plurality of computation devices are integrated on the same chip. Processor cores in the computation device are connected to an off-chip storage device through NoC, and NoC also supports communication among a plurality of processor cores.

NoC processing systems in the embodiments of the present disclosure are all based on NoC to implement on-chip communication. In addition, the NoC processing systems in the embodiment of the present disclosure can perform both on-chip storage and off-chip storage. In other words, operation data during processing of a neural network processor can be stored in an on-chip storage device or an off-chip storage device. Due to limited on-chip storage capacity of an NoC processing system, operation data and intermediate results generated during an operation process can be temporarily stored in an off-chip storage device, and then be read from the off-chip storage device into NoC when needed. In the embodiments of the present disclosure, the storage devices in the NoC processing system all refer to on-chip storage devices; the computation device in the NoC processing system includes a neural network processor.

In an embodiment, the present disclosure also provides an NoC processing system. The system includes a storage device and a plurality of computation devices, where the plurality of computation devices include a first computation device and a plurality of second computation devices. The storage device and the plurality of computation devices are arranged on a same chip, where the first computation device is connected to the storage device, and at least one of the plurality of second computation devices is connected to the first computation device.

In an embodiment, a neural network chip is provided. The chip includes a storage device, a plurality of computation devices, a first interconnection device, and a second interconnection device, where at least one computation device is connected to the storage device through the first interconnection device, and the plurality of computation devices are connected to each other through the second interconnection device. Further, the computation device may implement a read/write operation on the storage device through the first interconnection device, and a plurality of computation devices may also perform data transfer through the second interconnection device.

The NoC processing system and a neural network chip are respectively described below.

As shown in FIG. 1, FIG. 1 is an NoC processing system 1100 provided by one of the embodiments. The NoC processing system 1100 includes: a storage device 1101, a first computation device 1102, a second computation device 1103, and a second computation device 1104, where the storage device 1101, the first computation device 1102, the second computation device 1103, and the second computation device 1104 are arranged on a same chip of the NoC processing system 1100. The first computation device 1102 is connected to the storage device 1101, the second computation device 1103 is connected to the first computation device 1102, and the second computation device 1103 is also connected to the second computation device 1104. Only the first computation device 1102 can access the storage device 1101, in other words, only the first computation device 1102 can read/write data from the storage device 1101. The first computation device 1102, the second computation device 1103, and the second computation device 1104 can transfer data to each other.

Specifically, when the second computation device 1104 needs to read data, the first computation device 1102 accesses the storage device 1101 and reads the data required by the second computation device 1104 from the storage device 1101, the first computation device 1102 sends the data to the second computation device 1103, and the second computation device 1103 sends the data to the second computation device 1104. Optionally, in addition to the first computation device 1102, the second computation device 1103 and the second computation device 1104 can also be connected to the storage device 1101, as long as at least one of the first computation device 1102, the second computation device 1103, and the second computation device 1104 is ensured to be connected to the storage device 1101, which is not specifically limited herein. Optionally, the second computation device 1103 can be connected to the second computation device 1104 or the first computation device 1102, as long as at least two of the first computation device 1102, the second computation device 1103, and the second computation device 1104 are ensured to be connected to each other, which is not specifically limited herein.

Figure 2:
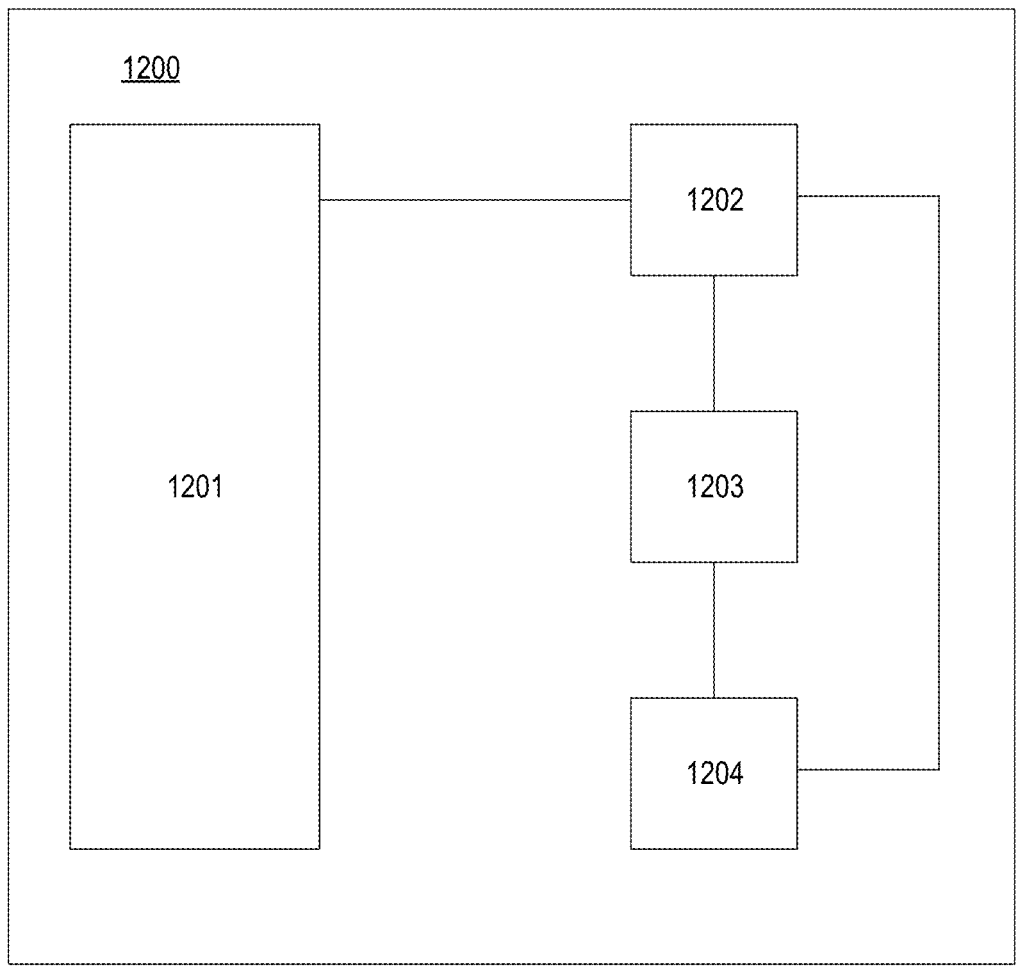
FIG. 2 is a schematic structural diagram of an NoC processing system 1200 according to an embodiment.

As shown in FIG. 2, FIG. 2 is an NoC processing system 1200 provided by one of the embodiments. The NoC processing system 1200 includes: a storage device 1201, a first computation device 1202, a second computation device 1203, and a second computation device 1204, where the storage device 1201, the first computation device 1202, the second computation device 1203, and the second computation device 1204 are arranged on a same chip of the NoC processing system 1200. The first computation device 1202 is connected to the storage device 1201, and the computation device 1203 and the second computation device 1204 are directly connected to the first computation device 1202. In other words, the second computation device 1204 is connected to both the second computation device 1203 and the first computation device 1201, and does not need to establish a connection with the first computation device 1201 through the second computation device 1203. Only the first computation device 1202 can access the storage device 1201, in other words, only the first computation device 1202 can read/write data from the storage device 1201. The first computation device 1202, the second computation device 1203, and the second computation device 1204 can transfer data to each other.

Specifically, when the second computation device 1204 needs to read data, the first computation device 1202 accesses the storage device 1201 and reads data required by the second computation device 1204 from the storage device 1201, and the first computation device 1202 directly sends the data to the second computation device 1204 with no need for the second computation device 1203 to forward the data first. Optionally, the first computation device 1202, the second computation device 1203, and the second computation device 1204 can all be connected to the storage device 1201, as long as at least one of the first computation device 1202, the second computation device 1203, and the second computation device 1204 are ensured to be connected to the storage device 1201, which is not specifically limited herein. Optionally, the second computation device 1203 can be connected to the second computation device 1204 or the first computation device 1202, as long as at least two of the first computation device 1202, the second computation device 1203, and the second computation device 1204 are ensured to be connected to each other, which is not specifically limited herein.

In the above NoC processing system, by establishing a connection between a plurality of computation devices arranged on a same chip, data can be transferred among a plurality of computation devices, which may avoid excessive connection bandwidth overhead caused by a plurality of computation devices all reading data from the storage device, and improve efficiency of reading and writing data.

In an embodiment, the present disclosure provides an NoC processing system. The system includes: a storage device and a plurality of computation devices, where the storage device and the plurality of computation devices are arranged on a same chip, each of the plurality of computation devices is connected to the storage device, and at least two computation devices are connected to each other.

Figure 3:
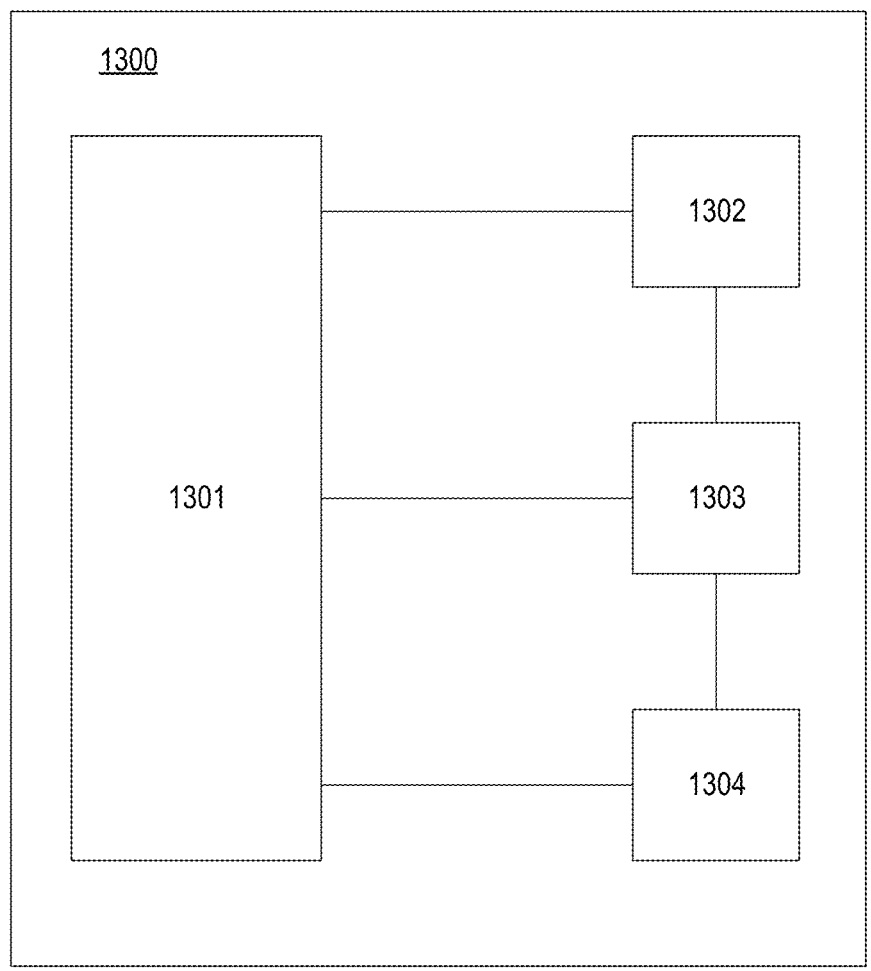
FIG. 3 is a schematic structural diagram of an NoC processing system 1300 according to an embodiment.

As shown in FIG. 3, FIG. 3 is an NoC processing system 1300 provided by one of the embodiments. The NoC processing system 1300 includes a storage device 1301, a computation device 1302, a computation device 1303, and a computation device 1304. The storage device 1301, the computation device 1302, the computation device 1303, and the computation device 1304 are arranged on a same chip of the NoC processing system 1300. The computation device 1302, the computation device 1303, and the computation device 1304 are all connected to the storage device 1301, and the computation device 1302 and the computation device 1303 are connected to each other. At the same time, the computation device 1303 and the computation device 1304 are connected to each other. The computation device 1302, the computation device 1303, and the computation device 1304 can all access the storage device 1201. The computation device 1302 and the computation device 1303 can transfer data to each other, and the computation device 1303 and the computation device 1304 can transfer data to each other.

Specifically, when the computation device 1304 needs to read data, the computation device 1304 can directly access the storage device 1301; or the computation device 1303 can access the storage device 1301 and read data required by the computation device 1304 from the storage device 1301, and then the computation device 1303 sends the data to the computation device 1304; or the computation device 1302 can access the storage device 1301 and read data required by the computation device 1304 from the storage device 1301, the computation device 1302 sends the data to the computation device 1303, and then the computation device 1303 sends the data to the computation device 1304. Optionally, it only needs to be ensured that at least one of the computation device 1302, the computation device 1303, and the computation device 1304 is connected to the storage device 1301, which is not specifically limited herein. Optionally, it only needs to be ensured that at least two of the computation device 1302, the computation device 1303, and the computation device 1304 are connected to each other, which is not specifically limited herein.

In the above NoC processing system on a chip, by establishing a connection among a plurality of computation devices set on a same chip, data required by any computation device can be transferred among a plurality of computation devices. This system may reduce computation devices that simultaneously read a storage device interface, which reduces bandwidth blockage.

Figure 4:
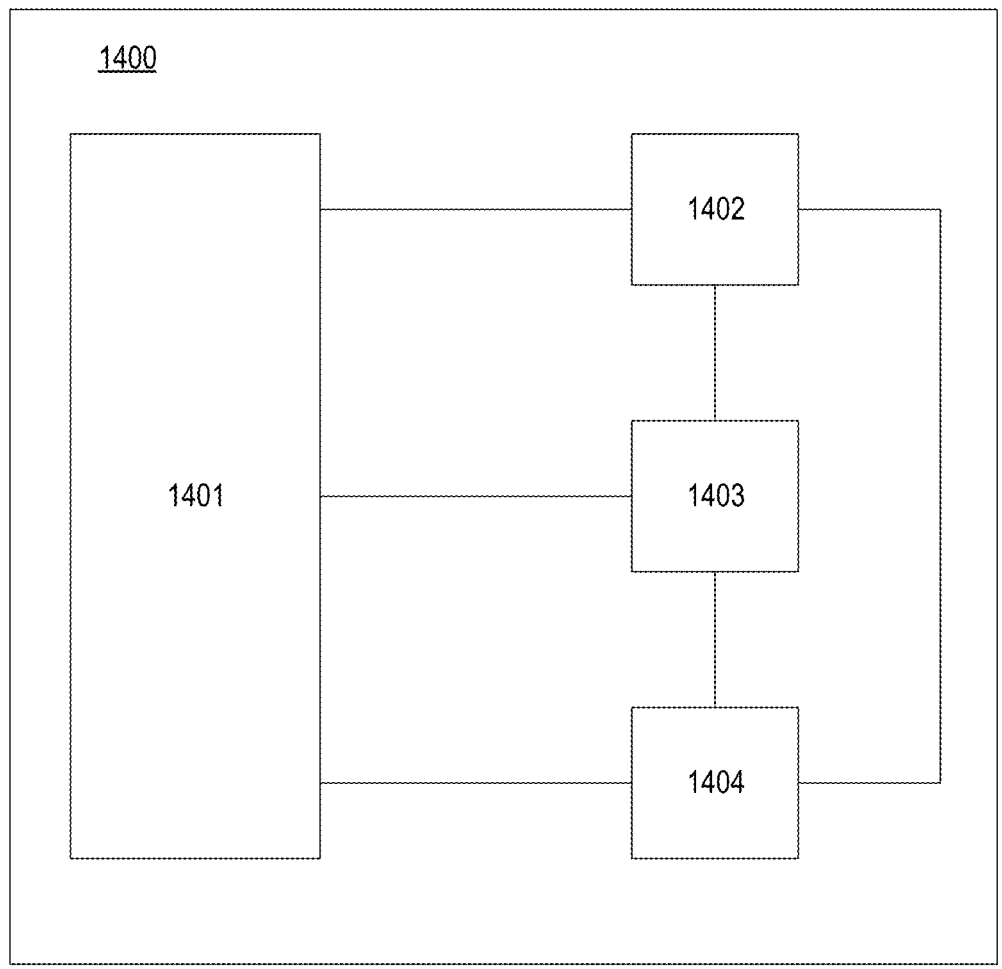
FIG. 4 is a schematic structural diagram of an NoC processing system 1400 according to an embodiment.

As shown in FIG. 4, one of embodiments provides an NoC processing system 1400, where the system includes: a storage device 1401, a computation device 1402, a computation device 1403, and a computation device 1404. The storage device 1401, a computation device 1402, the computation device 1403, and the computation device 1404 are arranged on a same chip of the NoC processing system 1400. The computation device 1402, the computation device 1403, and the computation device 1404 are all connected to the storage device 1401; and the computation device 1402, the computation device 1403, and the computation device 1404 are connected to each other. The computation device 1402, the computation device 1403, and the computation device 1404 can all access the storage device 1401; and the computation device 1402, the computation device 1403, and the computation device 1404 can transfer data to each other.

Specifically, when the computation device 1404 needs to read data, the computation device 1404 can directly access the storage device 1401; or the computation device 1403 can access the storage device 1401, and data required by the computation device 1404 can be read from the storage device 1401, and the computation device 1403 sends the data to the computation device 1404; the computation device 1402 can also access the storage device 1401, read the data required by the computation device 1404 from the storage device 1401, and the computation device 1402 directly sends the data to the computation device 1404, and there is no need to forward through the computation device 1403. Optionally, it only needs to be ensured that at least one of the computation device 1402, the computation device 1403, and the computation device 1404 is connected to the storage device 1401, which is not specifically limited herein. Optionally, it only needs to be ensured that at least two of the computation device 1402, the computation device 1403, and the computation device 1404 are connected to each other, which is not specifically limited herein.

In the above-mentioned network-on-chip processing system, by establishing a direct connection between the plurality of computation devices arranged on the same chip without using a storage device, data can be directly transferred between the two computation devices, which can improve the efficiency of reading and writing data.

In one embodiment, the present disclosure also provides an NoC processing system. The system includes: a storage device and a plurality of computation device clusters, where the storage device and the plurality of computation device clusters are arranged on the same chip. Each computation device cluster includes a plurality of computation devices, where at least one of the plurality of computation device clusters is connected to the storage device, and at least two computation device clusters are connected to each other.

In one embodiment, a neural network chip is provided. The chip includes a storage device, a plurality of computation device clusters, a first interconnection device, and a second interconnection device, where at least one of the plurality of computation device clusters is connected to the storage device through the first interconnection device, and the plurality of computation device clusters are connected to each other through the second interconnection device. Further, the computation device cluster may perform a read/write operation on the storage device through the first interconnection device, and the plurality of computation device clusters may perform data transfer through the second interconnection device. A plurality of computation devices may be divided into a plurality of clusters, and a count of computation devices in each cluster is not specifically limited. For example, one cluster may include four computation devices.

Figure 5A:
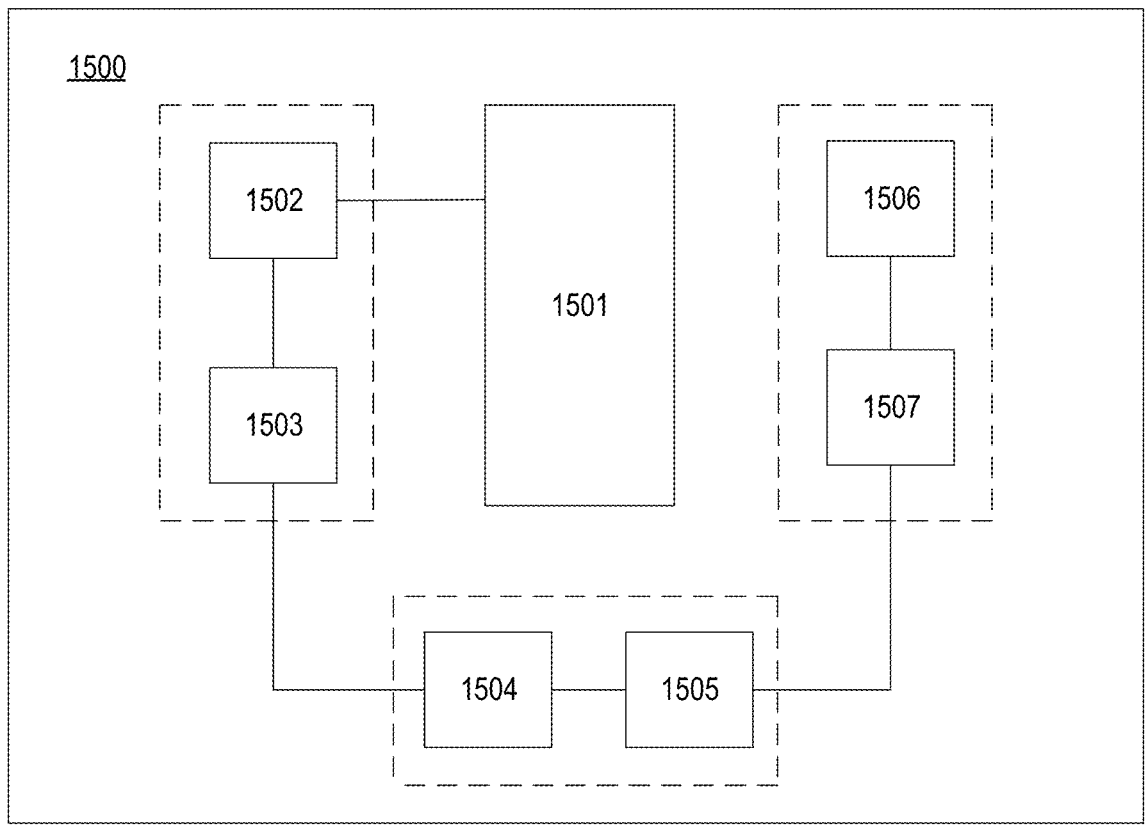
FIG. 5a is a schematic structural diagram of an NoC processing system 1500 according to an embodiment.

As shown in FIG. 5a, one embodiment provides an NoC processing system 1500, where the system includes: a storage device 1501 and six computation devices (computation devices 1502 to 1507). The storage device 1501 and the six computation devices (the computation devices 1502 to 1507) are arranged on a same chip of the NoC processing system 1500. For example, the six computation devices may be divided into three clusters, and each cluster includes two computation devices. For example, the computation device 1502 and the computation device 1503 are designated as a first computation device cluster (cluster1), the computation device 1504 and the computation device 1505 are designated as a second computation device cluster (cluster2), and the computation device 1506 and the computing device 1507 are designated as a third computation device cluster (cluster3), where cluster1 is a primary computation device cluster, and cluster2 and cluster3 are computation device sub-clusters. The storage device 1501 is only connected to cluster1, while cluster1, cluster2, and cluster3 are connected to each other. The computation device 1502 in cluster1 is connected to the storage device 1501, the computation device 1503 in cluster1 is connected to the computation device 1504 in cluster2, and the computation device 1505 in cluster2 is connected to the computation device 1507 in cluster3.

Specifically, when cluster3 needs to read data, cluster1 may access the storage device 1501 and read data required by cluster3 from the storage device 1501, then cluster1 sends the data to cluster2 and cluster2 sends the data to cluster3. A plurality of computation devices may be designated into a plurality of clusters, and a count of computation devices in each cluster is not specifically limited. For example, one cluster may include four computation devices.

Optionally, not all of the plurality of computation devices are required to be connected to the storage device 1501, as long as at least one of the two computation device clusters is connected to the storage device 1501, which is not specifically limited herein. Optionally, cluster1 may be connected to cluster2 or cluster3, as long as at least two of the three computation device clusters are ensured to be connected to each other, which is not specifically limited herein. Optionally, each of the computation device clusters includes at least one computation device connected to at least one computation device in other computing device cluster. In other words, each computation device in cluster1 may be connected to the second device cluster, as long as at least one computation device in cluster1 is connected to at least one computation device in cluster2, which is not specifically limited herein. Optionally, the plurality of computation device clusters are connected to each other through any one of the plurality of computation device clusters. In other words, any computation device in cluster1 may be connected to any computation device in cluster2, which is not limited herein.

Figure 5B:
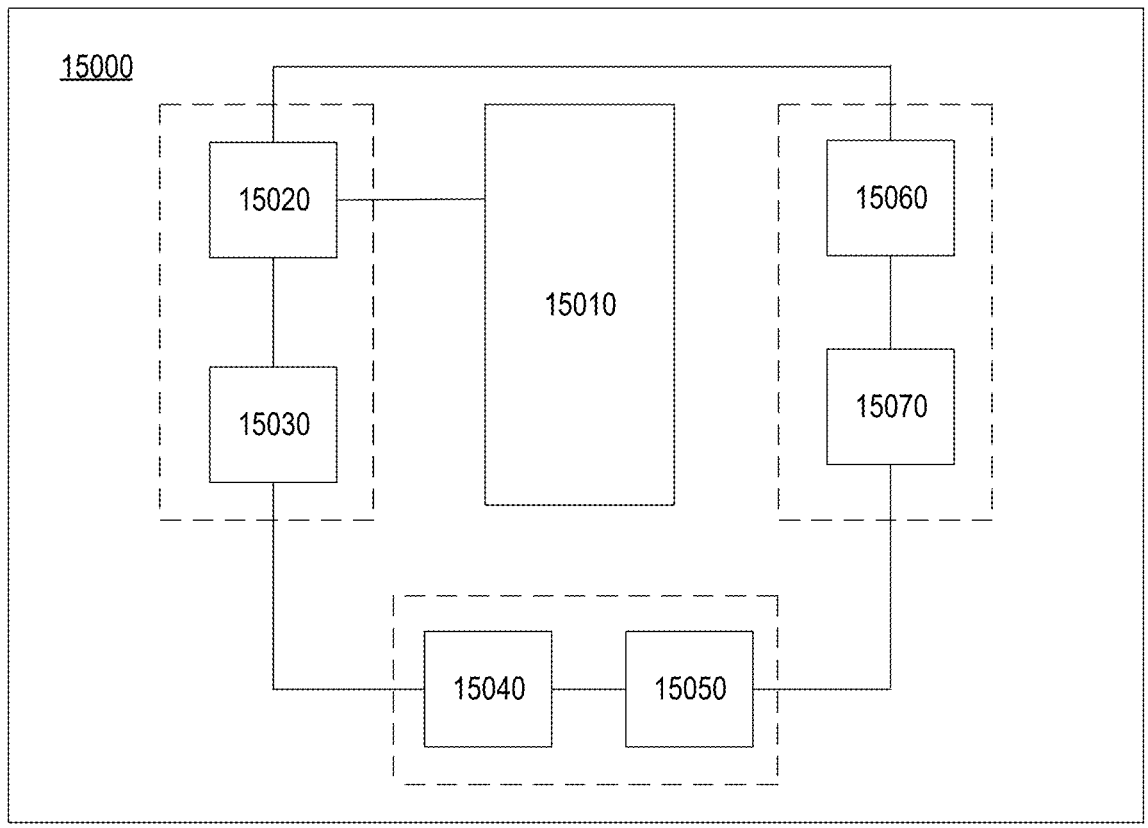
FIG. 5b is a schematic structural diagram of an NoC processing system 15000 according to an embodiment.

As shown in FIG. 5b, one embodiment provides an NoC processing system 15000, where the system includes: a storage device 15010 and six computation devices (computation devices 15020 to 15070). The storage device 15010 and the six computation devices (the computation devices 15020 to 15070) are arranged on a same chip of the NoC processing system 15000. The six computation devices may be divided into three clusters: the computation device 15020 and the computation device 15030 are designated as a first computation device cluster (cluster1), the computation device 15040 and the computation device 15050 are designated as a second computation device cluster (cluster2), and the computation device 15060 and the computing device 15070 are designated as a third computation device cluster (cluster3), where cluster1 is a primary computation device cluster, and cluster2 and cluster3 are computation device sub-clusters. The storage device 15010 is only connected to cluster1, while cluster1, cluster2, and cluster3 are connected to each other. The computation device 15020 in cluster1 is connected to the storage device 15010, the computation device 15030 in cluster1 is connected to the computation device 15040 in cluster2, the computation device 15050 in cluster2 is connected to the computation device 15070 in cluster3, and the computation device 15060 in cluster3 is connected to the computation device 15020 in cluster1.

Specifically, when cluster3 needs to read data, cluster1 may access the storage device 1501 and read data required by cluster3 from the storage device 1501, then cluster1 directly sends the data to cluster3. A plurality of computation devices may be designated into a plurality of clusters, and a count of computation devices in each cluster is not specifically limited. For example, one cluster may include four computation devices.

Optionally, not all of the plurality of computation devices are required to be connected to the storage device 15010, as long as at least one of the two computation device clusters is connected to the storage device 15010, which is not specifically limited herein. Optionally, cluster1 may be connected to cluster2 or cluster3, as long as at least two of the three computation device clusters are ensured to be connected to each other, which is not specifically limited herein. Optionally, each of the computation device clusters includes at least one computation device connected to at least one computation device in other computing device cluster. In other words, each computation device in cluster1 may be connected to the second device cluster, as long as at least one computation device in cluster1 is connected to at least one computation device in cluster2, which is not specifically limited herein. Optionally, the plurality of computation device clusters are connected to each other through any one of the plurality of computation device clusters. In other words, any computation device in cluster1 may be connected to any computation device in cluster2, which is not limited herein.

In the above-mentioned NoC processing system, by establishing a connection between a plurality of computation device clusters arranged on the same chip, inter-cluster communication may be realized among a plurality of computation device clusters. The system may reduce computation devices which simultaneously read interfaces of the storage device through inter-cluster data transfer, which may reduce energy consumption of memory access; at the same time, a plurality of computation devices arranged on the same chip establish inter-cluster communication in a plurality of connection manners, establish a plurality of communication channels among the plurality of computation devices, and select an optimal channel for data transfer according to current network congestion, which may save energy consumption and improve data processing efficiency.

In one embodiment, the present disclosure also provides an NoC processing system. The system includes: a storage device and a plurality of computation device clusters, where the storage device and the plurality of computation device clusters are arranged on a same chip. Each computation device cluster includes a plurality of computation devices, where at least one of the plurality of computation device clusters is connected to the storage device, and the plurality of computation device clusters are connected to each other.

Figure 6:
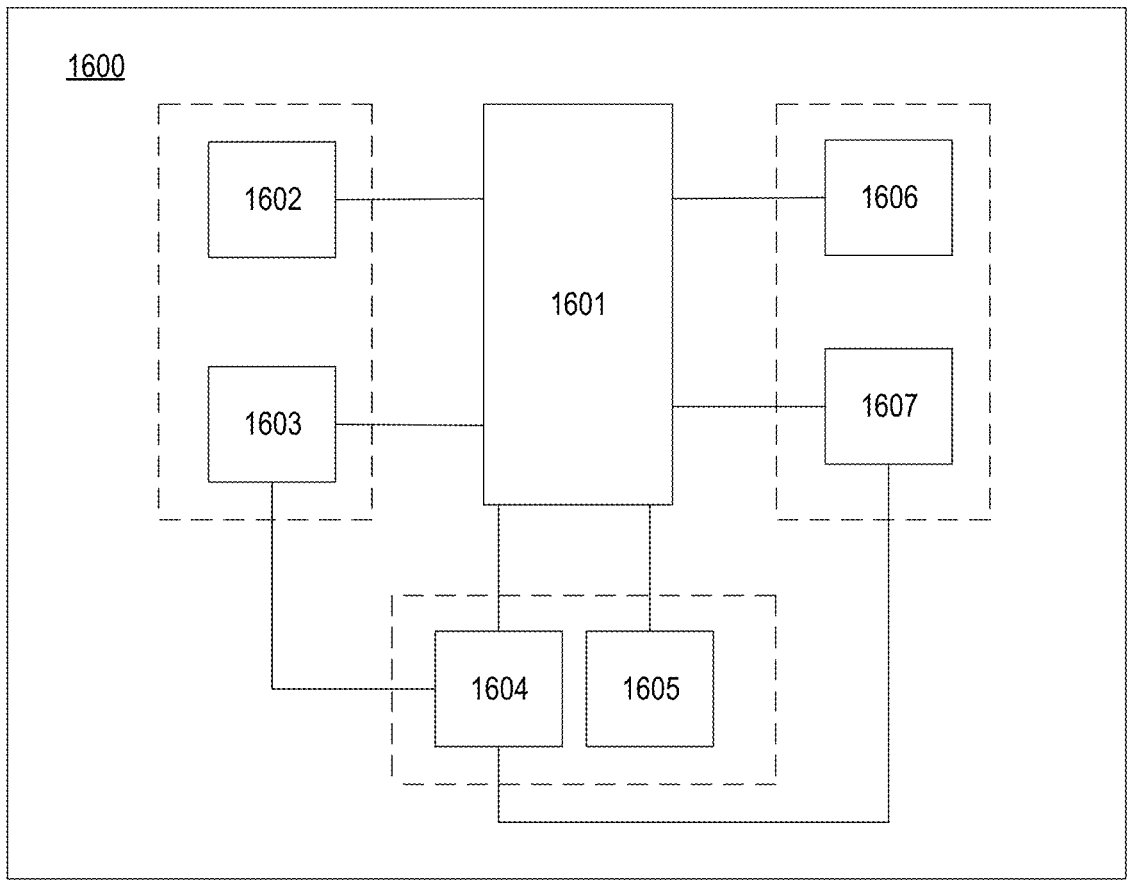
FIG. 6 is a schematic structural diagram of an NoC processing system 1600 according to an embodiment.

As shown in FIG. 6, one embodiment provides an NoC processing system 1600, where the system includes: a storage device 1601 and six computation devices (computation devices 1602 to 1607). The storage device 1601 and the six computation devices (the computation devices 1602 to 1607) are arranged on a same chip of the NoC processing system 1600. For example, the six computation devices may be divided into three clusters: the computation device 1602 and the computation device 1603 are designated as a first computation device cluster (cluster1), the computation device 1604 and the computation device 1605 are designated as a second computation device cluster (cluster2), and the computation device 1606 and the computing device 1607 are designated as a third computation device cluster (cluster3), where cluster1, cluster2, and cluster3 are all connected to the storage device 1601, cluster1 is connected to cluster2, and cluster 2 is connected to cluster3. The computation devices 1602 to 1607 are all connected to the storage device 1601. The computation device 1603 in cluster1 is connected to the computation device 1604 in cluster2, and the computation device 1604 in cluster2 is connected to the computation device 1607 in cluster3.

Specifically, when cluster3 needs to read data, cluster2 may access the storage device 1601 and read data required by cluster3 from the storage device 1601; or cluster1 may access the storage device 1601, read data required by cluster3 from the storage device 1601, and send the data to cluster2, then cluster2 sends the data to cluster3. A plurality of computation devices may be divided into a plurality of clusters, and a count of computation devices in each cluster is not specifically limited. For example, one cluster may include four computation devices.

Optionally, not all of the plurality of computation devices are required to be connected to the storage device 1601, as long as at least one of the two computation device clusters is connected to the storage device 1911, which is not specifically limited herein. Optionally, each computation device in cluster1 may be connected to the second device cluster and/or cluster3, as long as at least one computation device in cluster1 is ensured to be connected to at least one computation device in cluster2 and/or cluster3, which is not specifically limited herein. Optionally, any computation device in cluster1 may be connected to any computation device in cluster2 and/or cluster3, which is not limited herein.

In the above NoC processing system on a chip, by establishing a connection among a plurality of computation device clusters arranged on a same chip, data required by any computation device cluster can be transferred among a plurality of computation device clusters. This system may reduce computation devices that simultaneously read a storage device interface, which reduces bandwidth blockage.

In one embodiment, the present disclosure also provides an NoC processing system. The system includes: a storage device and a plurality of computation device clusters, where the storage device and the plurality of computation device clusters are arranged on a same chip. Each computation device cluster includes a plurality of computation devices, where at least one of the plurality of computation device clusters is connected to the storage device, and any two clusters of the plurality of computation device clusters are connected to each other.

Figure 7:
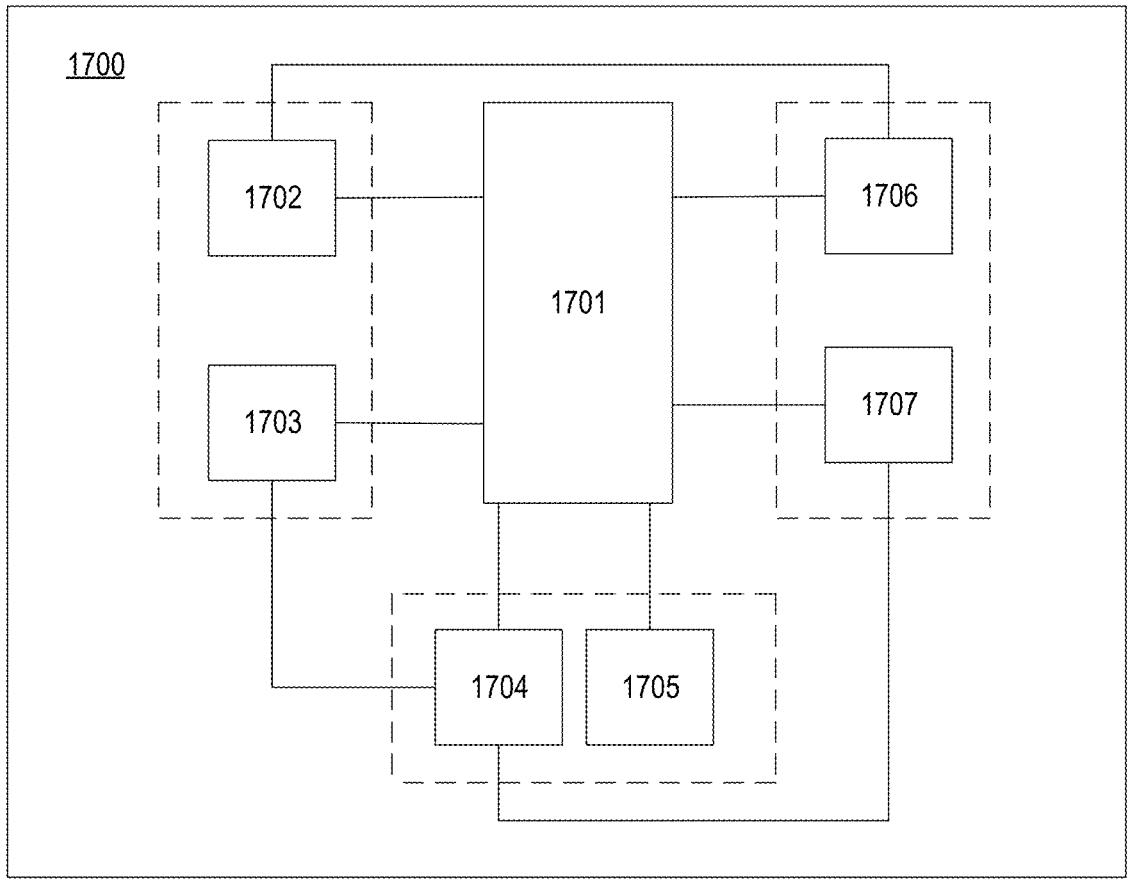
FIG. 7 is a schematic structural diagram of an NoC processing system 1700 according to an embodiment.

As shown in FIG. 7, one embodiment provides an NoC processing system 1700, where the system includes: a storage device 1701 and six computation devices (computation devices 1702 to 1707). The storage device 1701 and the six computation devices (the computation devices 1702 to 1707) are arranged on a same chip of the NoC processing system 1700. The six computation devices may be divided into three clusters: the computation device 1702 and the computation device 1703 are designated as a first computation device cluster (cluster1), the computation device 1704 and the computation device 1705 are designated as a second computation device cluster (cluster2), and the computation device 1706 and the computing device 1707 are designated as a third computation device cluster (cluster3), where cluster1, cluster2, and cluster3 are connected to each other and are all connected to the storage medium 1701. The computation devices 1702 to 1707 are all connected to the storage storage device 1701. The computation device 1703 in cluster1 is connected to the storage device 1704 in cluster2, the computation device 1704 in cluster2 is connected to the computation device 1707 in cluster3, and the computation device 1702 in cluster1 is connected to the computation device 1706 in cluster3.

Specifically, when cluster3 needs to read data, cluster2 may access the storage device 1701 and read data required by cluster3 from the storage device 1701; or cluster1 may access the storage device 1701, read data required by cluster3 from the storage device 1701, and directly send the data to cluster3. A plurality of computation devices may be divided into a plurality of clusters, and a count of computation devices in each cluster is not specifically limited. For example, one cluster may include four computation devices.

Optionally, not all of the plurality of computation devices are required to be connected to the storage device 1701, as long as at least one of the two computation device clusters is connected to the storage device 1701, which is not specifically limited herein. Optionally, each computation device in cluster1 may be connected to the second device cluster and/or cluster3, as long as at least one computation device in cluster1 is ensured to be connected to at least one computation device in cluster2 and cluster3, which is not specifically limited herein. Optionally, any computation device in cluster1 may be connected to any computation device in cluster2 and/or cluster3, which is not limited herein.

In the above-mentioned NoC processing system, by establishing a direct connection among a plurality of computation devices arranged on the same chip, the efficiency of data reading and writing may be improved.

In one embodiment, the present disclosure also provides an NoC processing system. The system includes: a storage device and a plurality of computation device clusters, where the storage device and the plurality of computation device clusters are arranged on the same chip. Each computation device cluster includes a plurality of computation devices. At least one of the plurality of computation device clusters is connected to the storage device, at least two computation device clusters are connected to each other, and a plurality of computation devices in each computation device cluster are connected to each other.

Figure 8:
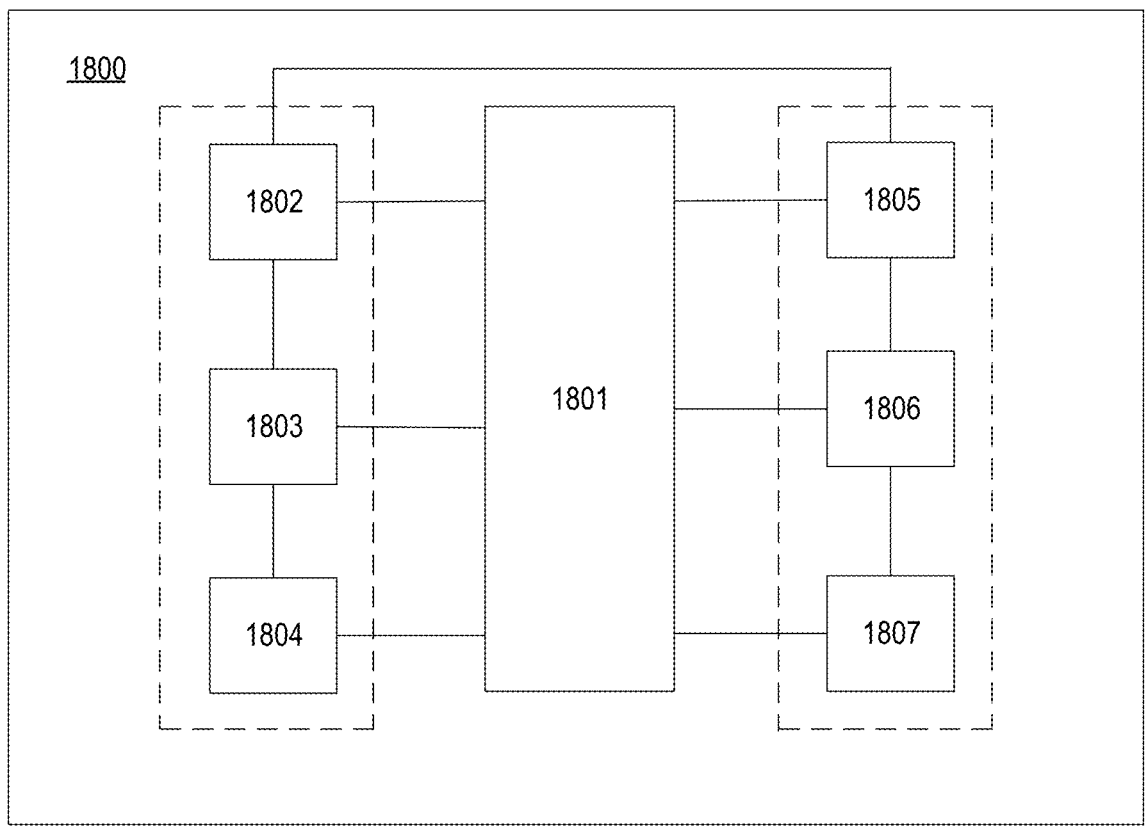
FIG. 8 is a schematic structural diagram of an NoC processing system 1800 according to an embodiment.

As shown in FIG. 8, one embodiment provides an NoC processing system 1800, where the system includes: a storage device 1801 and six computation devices (computation devices 1802 to 1807). The storage device 1801 and the six computation devices (the computation devices 1802 to 1807) are arranged on a same chip of the NoC processing system 1800. The six computation devices are divided into two clusters: the computation device 1802, the computation device 1803, and the computation device 1804 are designated as a first computation device cluster (cluster1), the computation device 1805, the computation device 1806, and the computation device 1807 are designated as a second computation device cluster (cluster2), where cluster1 and cluster2 are connected to each other and are both connected to the storage device 1801. The three computation devices in cluster1 are connected to each other, and the three computation devices in cluster2 are connected to each other, The computation devices 1802 to 1807 are all connected to the storage storage device 1801. The computation device 1802 in cluster1 is connected to the storage device 1805 in cluster2. The computation device 1803, the computation device 1802, and the computation device 1804 are connected to each other. The computation device 1806, the computation device 1805, and the computation device 1807 are connected to each other. Connection manners of a plurality of computation devices in each computation device cluster will not be further described herein. For details, please refer to connection manners of the NoC processing systems 1100 to 1400.

Specifically, when cluster2 needs to read data, cluster2 may directly access the storage device 1801; or cluster1 may access the storage device 1801, read data required by cluster2 from the storage device 1801, and send the data to cluster2; at the same time, the second computation device may perform inter-cluster data transfer. When cluster2 needs to read data, the computation device 1805, the computation device 1806, and the computation device 1807 in cluster2 may simultaneously access storage device 1801, where the computation device 1805, the computation device 1806, and the computation device 1807 respectively read part of data required by cluster2, and the data can be transferred in cluster2. A plurality of computation devices may be divided into a plurality of clusters, and a count of computation devices in each cluster is not specifically limited. For example, one cluster may include four computation devices.

Optionally, not all of the plurality of computation devices are required to be connected to the storage device 1801, as long as at least one of the two computation device clusters is connected to the storage device 1801, which is not specifically limited herein. Optionally, each computation device in cluster1 may be connected to the second device cluster, as long as at least one computation device in cluster1 is ensured to be connected to at least one computation device in cluster2, which is not specifically limited herein. Optionally, any computation device in cluster1 may be connected to any computation device in cluster2, which is not limited herein.

In the above-mentioned NoC processing system on a chip, by establishing a connection among a plurality of computation device clusters arranged on the same chip and establishing a connection among a plurality of computation devices in each computation device cluster, both intra-cluster communication and inter-cluster communication may be realized among a plurality of computation devices, which may reduce energy consumption of memory access and improve the efficiency of reading data.

In an embodiment, the present disclosure provides an NoC processing system, where the system includes a plurality of interconnected NoC processing modules. The plurality of NoC processing modules are arranged on a same chip. Each of the NoC processing modules includes at least one storage device and a plurality of computation devices. In each of the NoC processing modules, at least one computation device is connected to at least one storage device NoC processing modules, and at least two of the plurality of computation devices are connected to each other.

In an embodiment, a neural network chip is provided, where the chip includes a plurality of interconnected NoC processing modules. Each of the NoC processing modules includes: at least one storage device, a plurality of computation devices, a first interconnection device, and a second interconnection device. In each NoC processing module, at least one computation device is connected to at least one storage device through the first interconnection device, and the plurality of computation devices are connected to each other through the second interconnection device. Further, the computation device may implement a read/write operation on the storage device in the same NoC processing module through the first interconnection device, and a plurality of computation devices may also perform data transfer through the second interconnection device.

Figure 9:
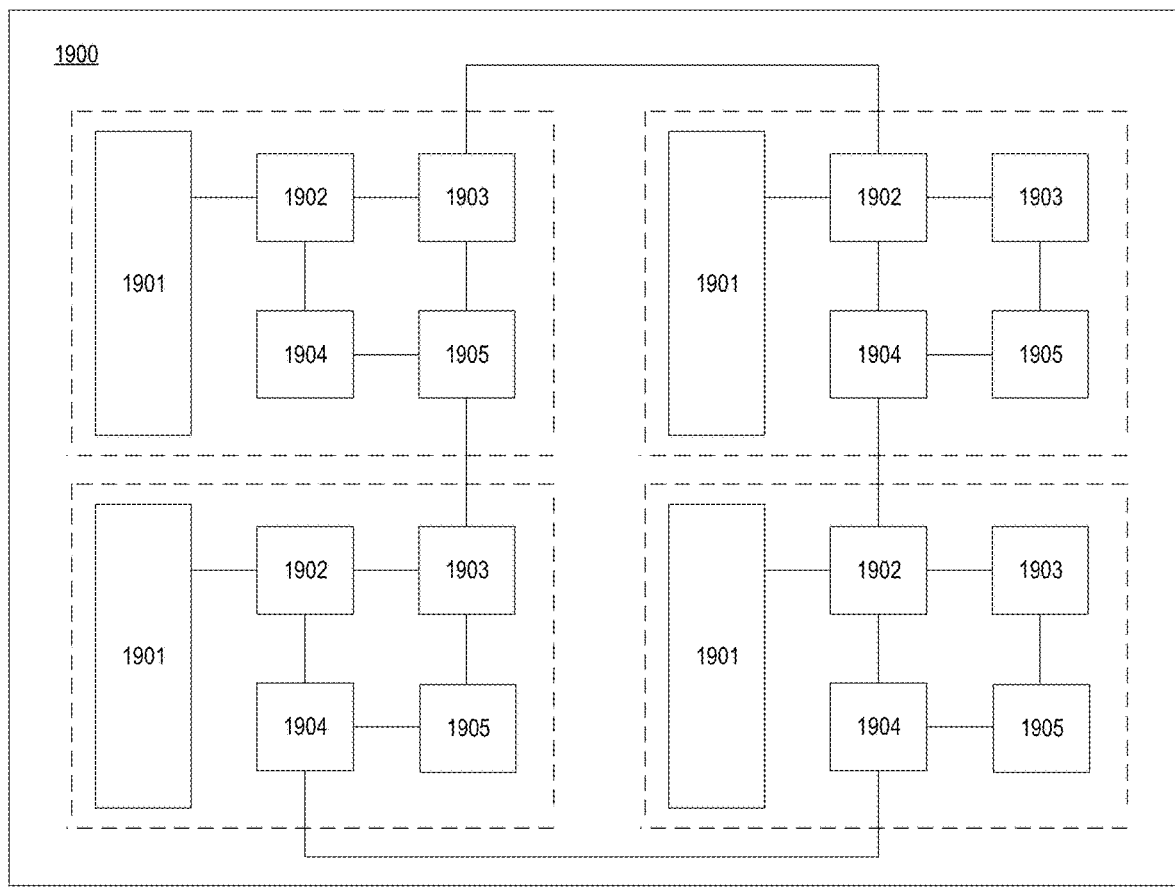
FIG. 9 is a schematic structural diagram of an NoC processing system 1900 according to an embodiment.

As shown in FIG. 9, one embodiment of the present disclosure provides an NoC processing system 1900, where the system 1900 includes four interconnected NoC processing modules. The four NoC processing modules are arranged on a same chip. Each of the NoC processing modules includes a storage device 1901 and four computation devices (computation devices 1902 to 1905). In each NoC processing module, the computation device 1902 is connected to the storage device 1901, and the four computation devices are connected to each other.

Specifically, all data to be processed by each NoC processing module is stored in the storage device inside the NoC processing module. In other words, a plurality of computation devices in each NoC processing module can only access the storage device in the same NoC processing module, and can only read and write data from the storage device in the same NoC processing module.

Optionally, there may be one or more storage devices in each NoC processing module, which is not limited herein. Preferably, each NoC processing module includes four storage devices. Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 1901, as long as at least one of the computation devices in each NoC processing module is connected to the storage device 1901, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, by establishing a connection among a plurality of NoC processing modules arranged on the same chip and establishing a connection among a plurality of computation devices in each NoC processing module, both intra-module communication and inter-module communication may be realized among a plurality of computation devices, which may reduce energy consumption of memory access and improve the efficiency of reading data; at the same time, a plurality of computation devices arranged on the same chip establish inter-module communication in a plurality of connection manners, establish a plurality of communication channels among the plurality of computation devices, and select an optimal channel for data transfer according to current network congestion, which may save energy consumption and improve data processing efficiency.

In an embodiment, the present disclosure provides an NoC processing system, where the system includes a plurality of interconnected NoC processing modules. The plurality of NoC processing modules are arranged on a same chip. Each of the NoC processing modules includes a plurality of storage devices. In each of the NoC processing modules, at least one computation device is connected to the plurality of storage devices in the NoC processing module, and at least two of the plurality of computation devices are connected to each other.

Figure 10A:
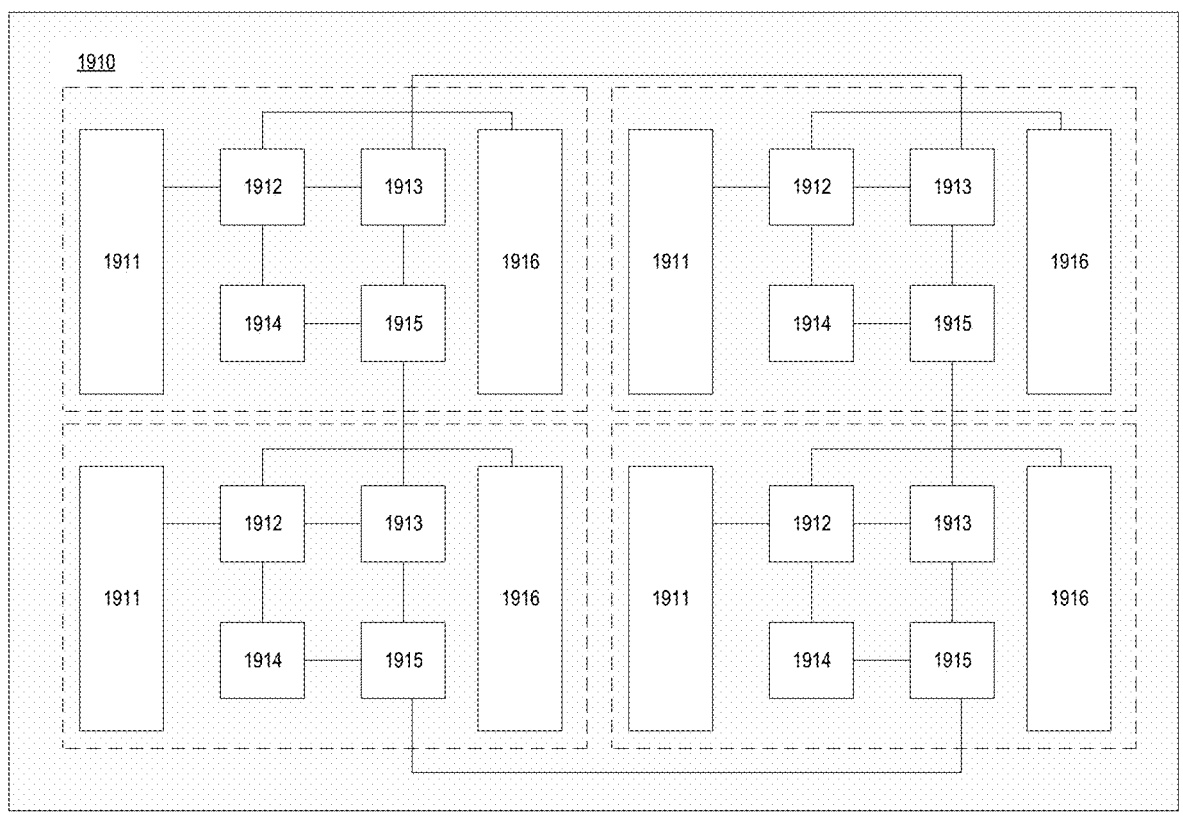
FIG. 10a is a schematic structural diagram of an NoC processing system 1910 according to an embodiment.

As shown in FIG. 10a, an embodiment of the present disclosure provides an NoC processing system 1910, where the system 1910 includes four interconnected NoC processing modules. The four NoC processing modules are arranged on a same chip. Each of the NoC processing modules includes: a storage device 1911, a storage device 1916, and four computation devices (computation devices 1912 to 1915). In each NoC processing module, the computation device 1912 is connected to the storage device 1911 and the storage device 1916 in the same NoC processing module, and the four computation devices are connected to each other.

Specifically, all data to be processed by each NoC processing module is stored in the storage device inside the NoC processing module. In other words, a plurality of computation devices in each NoC processing module can only access the storage device in a same NoC processing module, and can only read and write data from the storage device in the same NoC processing module. At least one computation device in each NoC processing module is connected to all storage devices in the same NoC processing module. In other words, the computation devices in each NoC processing module can access all the storage devices in the same NoC processing module. There may be two or more storage devices in each NoC processing module, which is not limited herein. Preferably, each NoC processing module includes four storage devices, which can simultaneously save space and perform efficient data processing.

Specifically, computation devices in each NoC processing module preferentially access an adjacent storage device. The adjacent storage device is a storage device with a shortest communication distance in a plurality of storage devices connected to the computation devices. In other words, access priority of the storage device with the shortest communication distance is higher than other storage devices.

Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 1911, as long as at least one of the computation devices in each NoC processing module is connected to the storage device 1911, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, each computation device can access all storage devices in the NoC processing module and provide a plurality of communication channels for data transfer, which may improve the efficiency of data reading and writing; each computation device in the system preferentially accesses an adjacent storage device, which may simultaneously save memory access overhead and ensure certain flexibility.

Figure 10B:
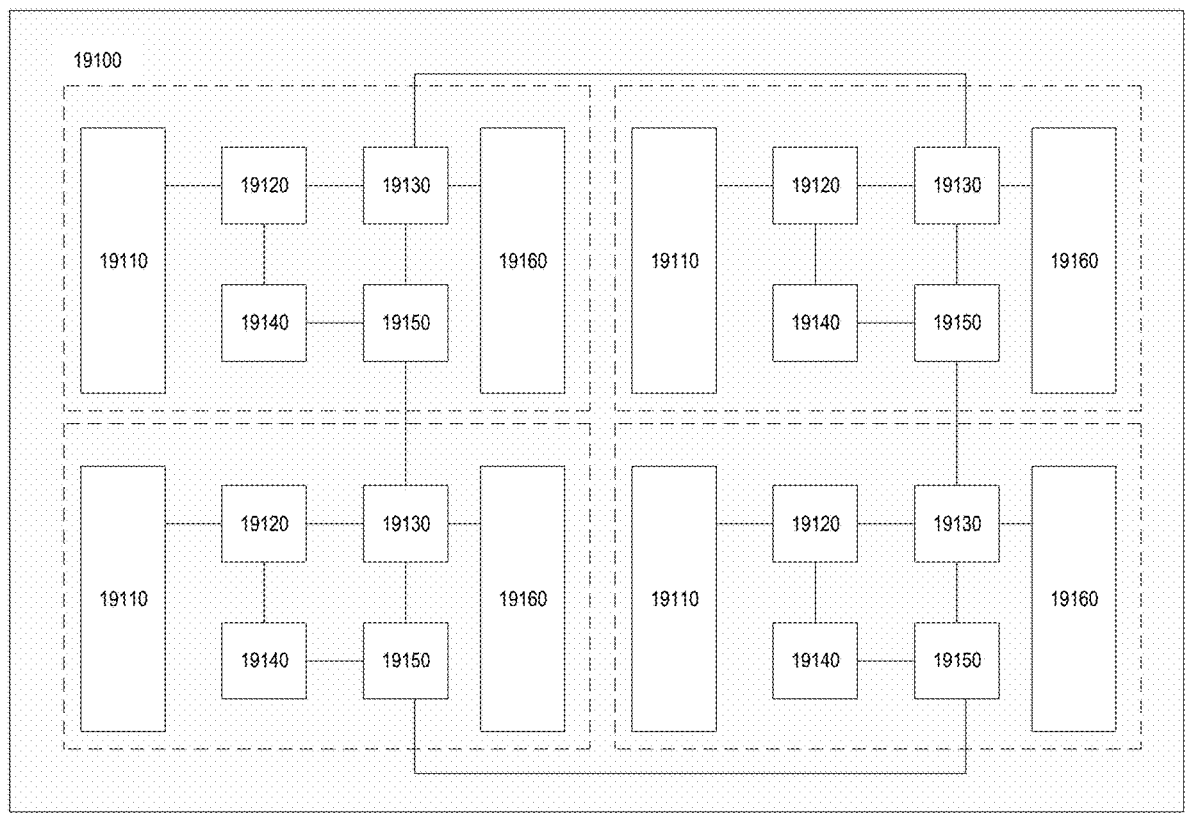
FIG. 10b is a schematic structural diagram of an NoC processing system 19100 according to an embodiment.

In an embodiment, in the NoC processing system 19100 shown in FIG. 10b, all data to be processed by each NoC processing module is stored in the storage device inside the NoC processing module. In other words, a plurality of computation devices in each NoC processing module can only access the storage device in a same NoC processing module, and can only read and write data from the storage device in the same NoC processing module. At least one computation device in each NoC processing module is connected to all storage devices in the same NoC processing module. In other words, the computation devices in each NoC processing module can access all the storage devices in the same NoC processing module. There may be two or more storage devices in each NoC processing module, which is not limited herein. Preferably, each NoC processing module includes four storage devices.

Specifically, in each NoC processing module, each computation device is connected to a storage device with a first communication distance, where the first communication distance refers to a shortest communication distance. In other words, each computation device in each NoC processing module can only access an adjacent storage device (a storage device of which the communication distance to the computation device is the shortest). For example, the computation device 19120 can only access the adjacent storage device 19110 instead of the storage device 19160; the computation device 19130 can only access the adjacent storage device 19160 instead of the storage device 19110; when data required by the computation device 19120 is stored in the storage device 19160, the computation device 19130 needs to read the data from the storage device 19160 first and then transfer the data to the computation device 19120.

Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 19110, as long as at least one of the computation device in each NoC processing module is connected to the storage device 19110, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, each computation device can access all storage devices in the NoC processing module and provide a plurality of communication channels for data transfer, which may improve the efficiency of data reading and writing; each computation device in the system can only access an adjacent storage device, which may maximally save memory access overhead.

In an embodiment, the present disclosure provides an NoC processing system. In the system, any two NoC processing modules are directly connected to each other and are arranged on a same chip. Each of the NoC processing modules includes at least one storage device and a plurality of computation devices. In each of the NoC processing modules, at least one computation device is connected to at least one storage device NoC processing modules, and at least two of the plurality of computation devices are connected to each other.

Figure 11:
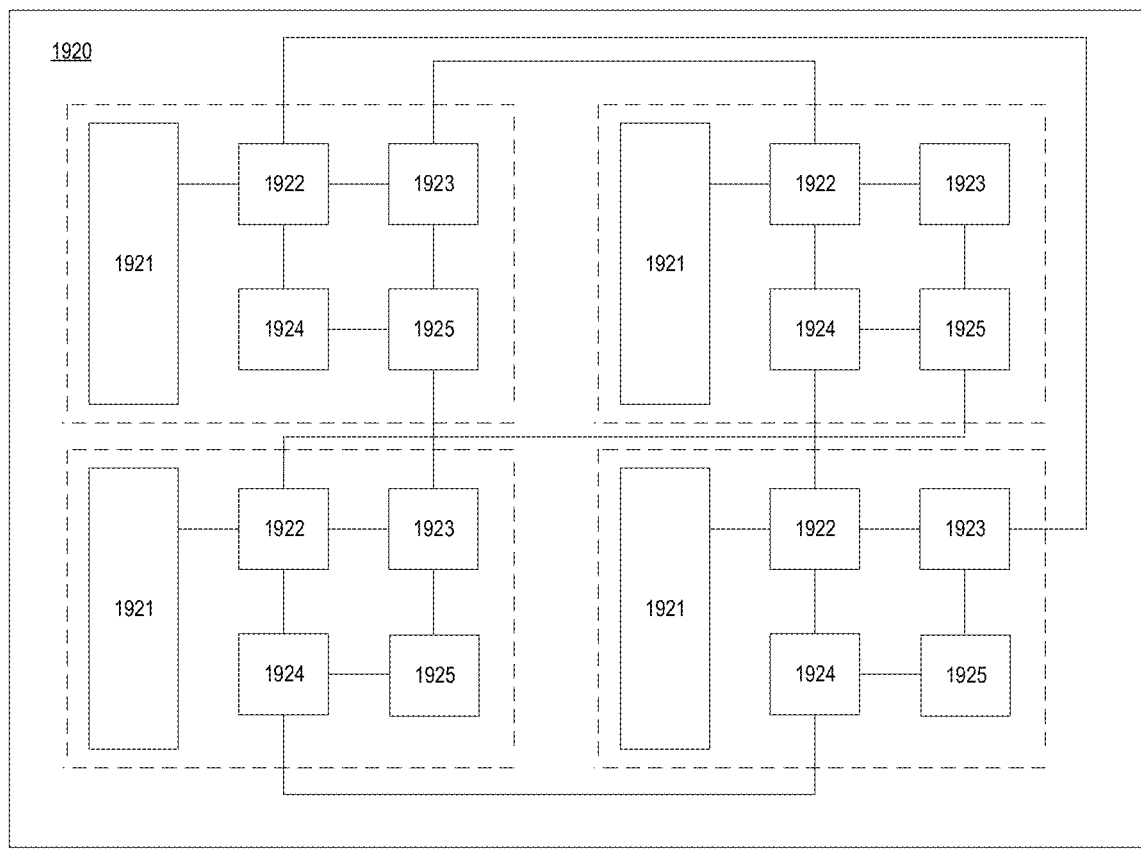
FIG. 11 is a schematic structural diagram of an NoC processing system 1920 according to an embodiment.

As shown in FIG. 11, an embodiment of the present disclosure provides an NoC processing system 1920, where the system 1920 includes four interconnected NoC processing modules. The four NoC processing modules are arranged on a same chip of the Noc processing system 1920. Any two of the four NoC processing modules are directly connected to each other. Each of the NoC processing modules includes a storage device 1921 and four computation devices (computation devices 1922 to 1925). In each NoC processing module, the computation device 1922 is connected to the storage device 1921 and the four computation devices are connected to each other.

Specifically, all data to be processed by each NoC processing module is stored in the storage device inside the NoC processing module. In other words, a plurality of computation devices in each NoC processing module can only access the storage device in a same NoC processing module, and can only read and write data from the storage device in the same NoC processing module.

Optionally, there may be one or more storage devices in each NoC processing module, which is not limited herein. Preferably, each NoC processing module includes four storage devices. Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 1921, as long as at least one of the computation devices in each NoC processing module is connected to the storage device 1921, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, by establishing a connection among a plurality of computation device modules arranged on the same chip and establishing a connection among a plurality of computation devices in each computation device module, intra-module communication may be realized among a plurality of computation devices, and direct inter-module communication may be realized between any two NoC processing modules. The system may simultaneously reduce a count of computation devices that simultaneously read the storage device interface, reduce bandwidth blockage, and improve the efficiency of data reading and writing through inter-module data transfer.

In an embodiment, the present disclosure provides an NoC processing system. In the system, any two NoC processing modules are directly connected to each other and are arranged on a same chip. Each of the NoC processing modules includes a plurality of storage devices. In each of the NoC processing modules, at least one computation device is connected to the plurality of storage devices in the NoC processing module, and at least two of the plurality of computation devices are connected to each other.

Figure 12:
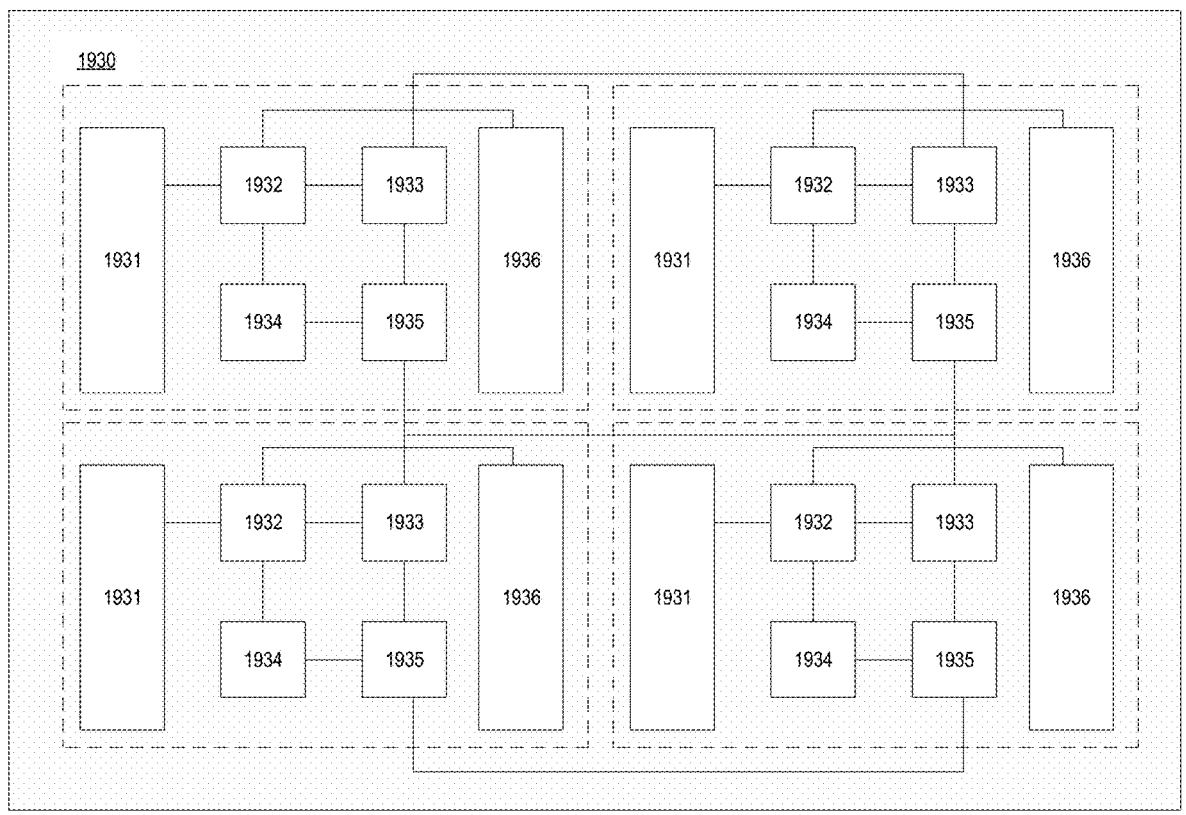
FIG. 12 is a schematic structural diagram of an NoC processing system 1930 according to an embodiment.

As shown in FIG. 12, one embodiment of the present disclosure provides an NoC processing system 1930, where the system 1930 includes four interconnected NoC processing modules. The four NoC processing modules are arranged on a same chip of the Noc processing system 1920. Any two of the four NoC processing modules are directly connected to each other. Each of the NoC processing modules includes a storage device 1931, a storage device 1936, and four computation devices (computation devices 1932 to 1935). In each NoC processing module, the computation device 1932 is connected to the storage device 1931 and the storage device 1936, and the four computation devices are connected to each other.

Specifically, all data to be processed by each NoC processing module is stored in the storage device inside the NoC processing module. In other words, a plurality of computation devices in each NoC processing module can only access the storage device in a same NoC processing module, and can only read and write data from the storage device in the same NoC processing module. Specifically, computation devices in each NoC processing module preferentially access an adjacent storage device.

Optionally, there may be two or more storage devices in each NoC processing module, which is not limited herein. Preferably, each NoC processing module includes four storage devices. Specifically, at least one computation device in each NoC processing module is connected to all storage devices in the same NoC processing module. In other words, the computation devices in each NoC processing module can access all the storage devices in the same NoC processing module.

Optionally, in each NoC processing module, the plurality of computation devices are connected to each other to form a computation device network. Connection manners of the plurality of computation devices in each NoC processing module will not be further described herein. For details, please refer to connection manners of the NoC processing systems 1100 to 1400. Optionally, not all of the plurality of computation devices in each NoC processing module are required to be connected to the storage device 1931, as long as at least one of the computation devices in each NoC processing module is connected to the storage device 1931, which is not specifically limited herein.

Optionally, each computation device in each NoC processing module may be connected to another NoC processing module, as long as at least one computation device in each NoC processing module is ensured to be connected to at least one computation device in another NoC processing module, which is not specifically limited herein. Optionally, the plurality of NoC processing modules are connected to each other through any computation device in each NoC processing module. In other words, any computation device in each NoC processing module may be connected to any computation device in another NoC processing module, which is not limited herein.

In the above NoC processing system, each computation device can access all storage devices in the NoC processing module, and direct inter-module communication may be realized between any two NoC processing modules. The system may provide a plurality of communication channels for data transfer, which may improve the efficiency of data reading and writing; each computation device in the system preferentially accesses an adjacent storage device, which may simultaneously save memory access overhead and ensure certain flexibility.

Figure 13:
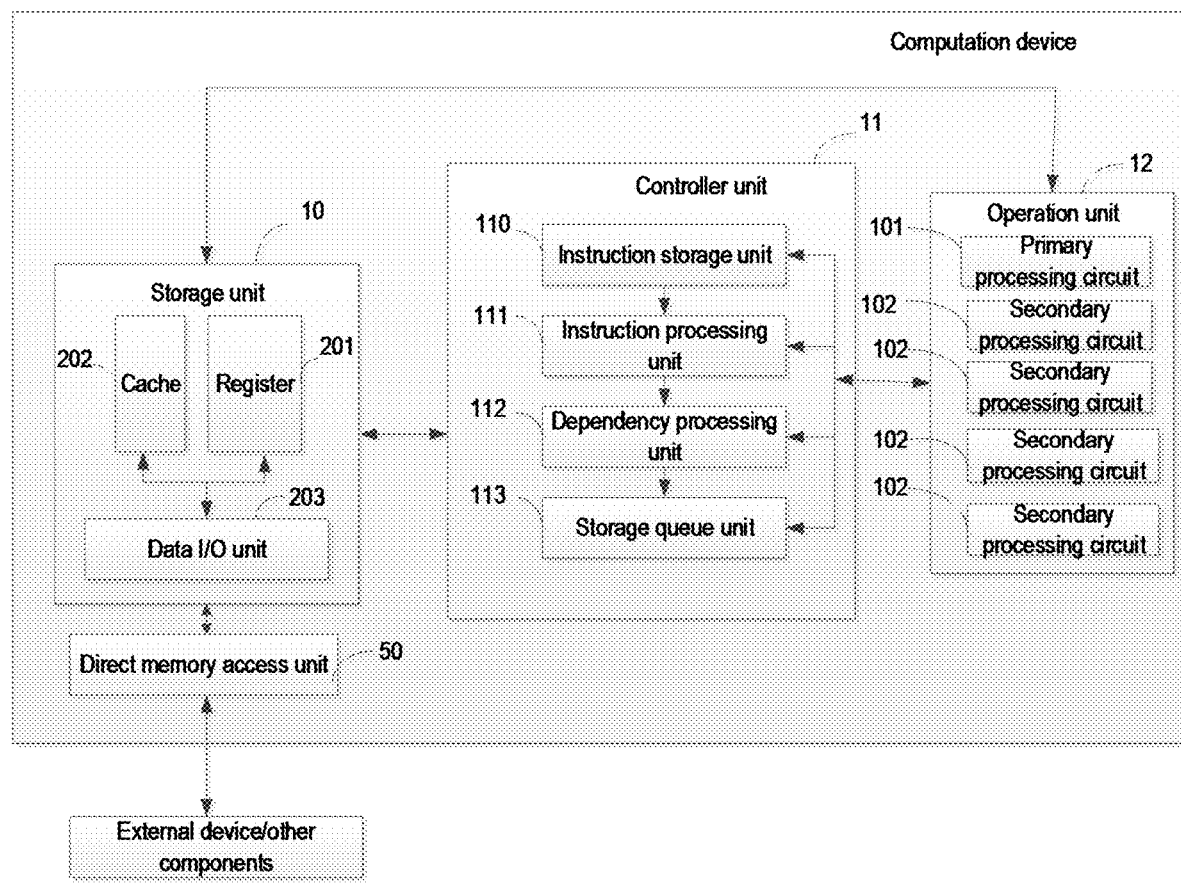
FIG. 13 is a schematic structural diagram of a computation device according to an embodiment.

In one embodiment, as shown in FIG. 13, a computation device in the NoC processing system shown in FIG. 13 may be configured to perform a machine learning computation. The computation device may include a controller unit 11 and a operation unit 12, where the controller unit 11 may be connected to the operation unit 12, and the operation unit 11 may include a primary processing circuit and a plurality of secondary processing circuits;

the controller unit 11 is configured to obtain input data and a computation instruction; optionally, input data and a computation instruction may be obtained through a data input/output unit, where the data input/output unit may specifically be one or more data I/O interfaces or I/O pins.

The above computation instruction includes, but is not limited to, a forward operation instruction, a backward training instruction, or other neural network operation instructions such as a convolution operation instruction. Specific forms of the above computation instructions is not limited herein.

Specifically, the controller unit 11 is further configured to parse the computation instruction to obtain a plurality of operation instructions, and send the plurality of computation instructions and the input data to the primary processing circuit.

The operation unit 12 includes a primary processing circuit 101 and a plurality of secondary processing circuits 102. the primary processing circuit 101 is configured to perform preorder processing on the input data, and send data and the operation instructions among the primary processing circuit and the plurality of secondary processing circuits;

the plurality of secondary processing circuits 102 are configured to perform intermediate computations in parallel according to data and computation instructions sent by the primary processing circuit to obtain a plurality of intermediate results, and send the plurality of intermediate results to the primary processing circuit; and the primary processing circuit 101 is further configured to perform postorder processing on the plurality of intermediate results to obtain a computation result of the computation instruction.

The technical solutions provided in the present disclosure sets the operation unit into a single-master-multiple-slave structure and may split data according to a computation instruction of a forward operation. In this way, a plurality of secondary processing circuits may perform operations on the parts with large computation amount in parallel, which may increase the operation speed, save operation time, and reduce power consumption.

Optionally, the above computation device may further include: a storage unit 10 and a direct memory access (DMA) unit 50. The storage unit 10 may include: one or more of a register and a cache. Specifically, the cache is configured to store the computation instruction; the register is configured to store the input data and a scalar; and the cache is a scratchpad memory. The DMA unit 50 is configured to read or store data from the storage unit 10.

Optionally, the controller unit includes: an instruction storage unit 110, an instruction processing unit 111, and a storage queue unit 113, where the instruction storage unit 110 is configured to store a computation instruction associated with the artificial neural network operation;

the instruction processing unit 111 is configured to parse the computation instruction to obtain a plurality of operation instructions; and the storage queue unit 113 is configured to store an instruction queue, where the instruction queue includes: a plurality of operation instructions and/or a computation instruction to be executed in an order of the instruction queue.

For example, in an optional embodiment, the primary processing circuit may also include a controller unit, where the controller unit may include a primary instruction processing unit configured to decode an instruction into a micro-instruction. In another optional embodiment, the secondary processing circuit may also include a controller unit, where the controller unit may include a secondary instruction processing unit configured to receive and process a micro-instruction. The above micro-instruction may be a next-level instruction of the instruction. The micro-instruction may be obtained by splitting or decoding the instruction, and may be further decoded into a control signal for various components, units, or processing circuits.

In an optional embodiment, the structure of the computation instruction is shown in Table 1.

TABLE 1

| Opcode | Register or immediate value | Register or immediate value | ... |

The ellipsis in the above table means that a plurality of registers or immediate values may be included.

In another optional embodiment, the computation instruction may include: one or more operation fields and an opcode. The computation instruction may include a neural network operation instruction. For example, in a convolution operation instruction, as shown in Table 2, each of register 0, register 1, register 2, register 3, and register 4 may be an operation field. Each of register 0, register 1, register 2, register 3, and register 4 may be a serial number of one or a plurality of registers.

TABLE 2

| Opcode | Register 0 | Register 1 | Register 2 | Register 3 | Register 4 |
|--------|------------|------------|------------|------------|------------|
| COMPUTE | Input data Starting address | Input data Length | Weight Starting address | Weight Length | Address of an activation function interpolation table |
| IO | Address of an external memory of data | Data length | Address of an internal memory of data | | |
| NOP | | | | | |
| JUMP | Target address | | | | |
| MOVE | Input address | Data size | Output address | | |

The register may be an off-chip memory, and in certain applications, may also be an on-chip memory for storing data. The data may be n-dimensional data, where n is an integer greater than or equal to 1. For instance, when n=1, the data is one-dimensional data, which is a vector; when n=2, the data is two-dimensional data, which is a matrix; and when n is equal to or greater than 3, the data is multi-dimensional tensor.

Optionally, the controller unit may further include:

the dependency processing unit 112 configured to determine whether there is an association between a first operation instruction and a zeroth operation instruction before the first operation instruction. If there is an association between the first operation instruction and the zeroth operation instruction, the dependency processing unit caches the first operation instruction in the instruction storage unit, and after the zeroth operation instruction is executed, the dependency processing unit fetches the first operation instruction from the instruction storage unit and sends the first operation instruction to the operation unit.

The determining whether there is an association between the first operation instruction and a zeroth operation instruction before the first operation instruction includes:

fetching a first storage address interval of data (such as a matrix) required in the first operation instruction according to the first operation instruction, fetching a zeroth storage address interval of a matrix required in the zeroth operation instruction according to the zeroth operation instruction; if the first storage address interval and the zeroth storage address interval have an overlapping area, determining that there is an association between the first operation instruction and the zeroth operation instruction; and if the first storage address interval and the zeroth storage address interval do not have an overlapping area, determining that there is no association between the first operation instruction and the zeroth operation instruction.

Figure 14:
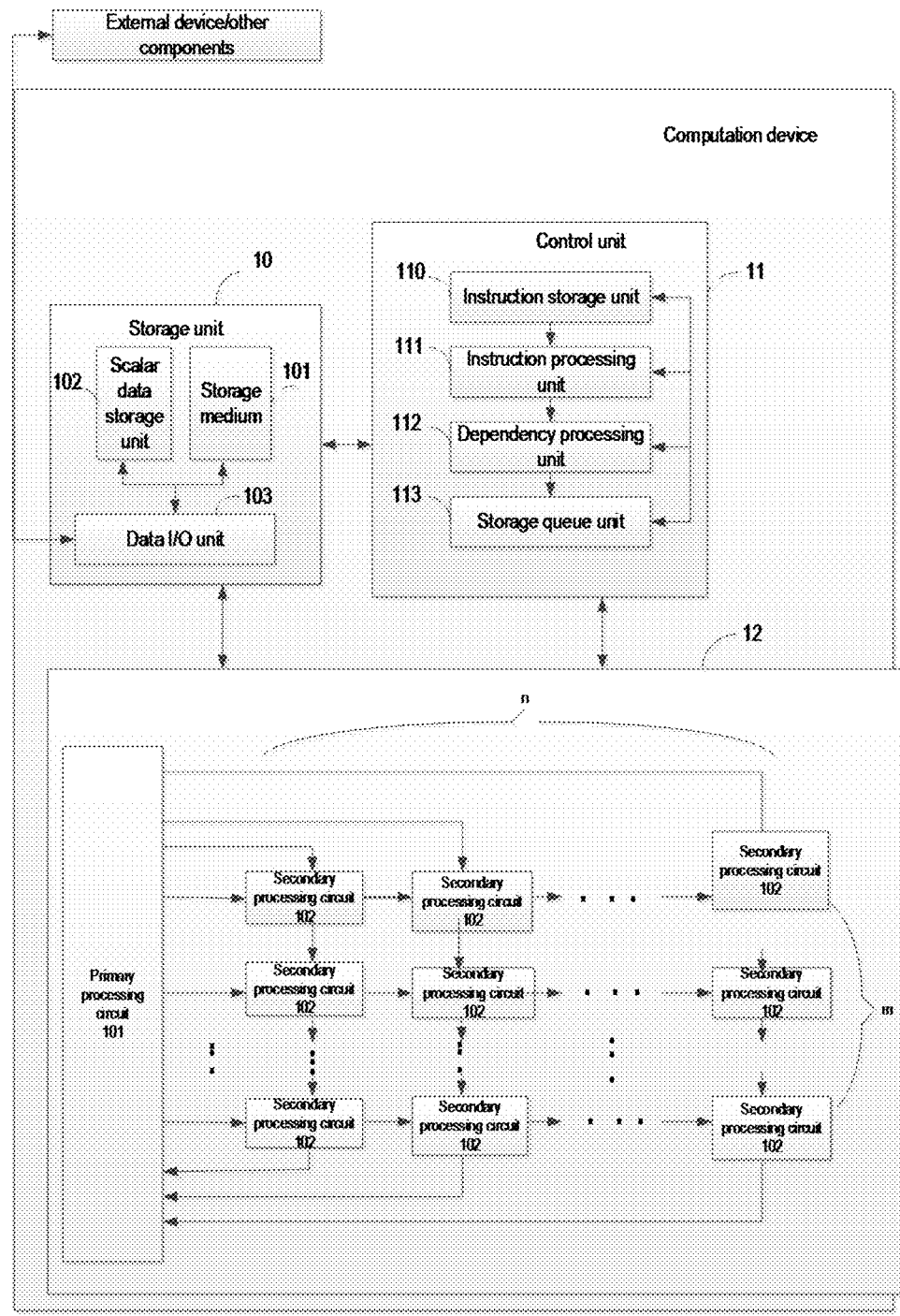
FIG. 14 is a schematic structural diagram of a computation device according to another embodiment.

In another optional example, as shown in FIG. 14, the operation unit 12 may include a primary processing circuit 101 and a plurality of secondary processing circuits 102. In an embodiment, as shown in FIG. 14, the plurality of secondary processing circuits are arranged as an array. Each of the secondary processing circuits are connected to other adjacent secondary processing circuits, and the primary processing circuit is connected to k secondary processing circuits of the plurality of secondary processing circuits, where the k secondary processing circuits may be: n secondary processing circuits in a first row, n secondary processing circuits in an $m^{th}$ row, and m secondary processing circuits in a first column. It should be noted that, as shown in FIG. 14, k secondary processing circuits only include n secondary processing circuits in the first row, n secondary processing circuits in the $m^{th}$ row, and m secondary processing circuits in the first column. In other words, the k secondary processing circuits are secondary processing circuits that are directly connected to the primary processing circuit.

The k secondary processing circuits are configured to forward data and instructions among the primary processing circuit and the plurality of secondary processing circuits.

Figure 15:
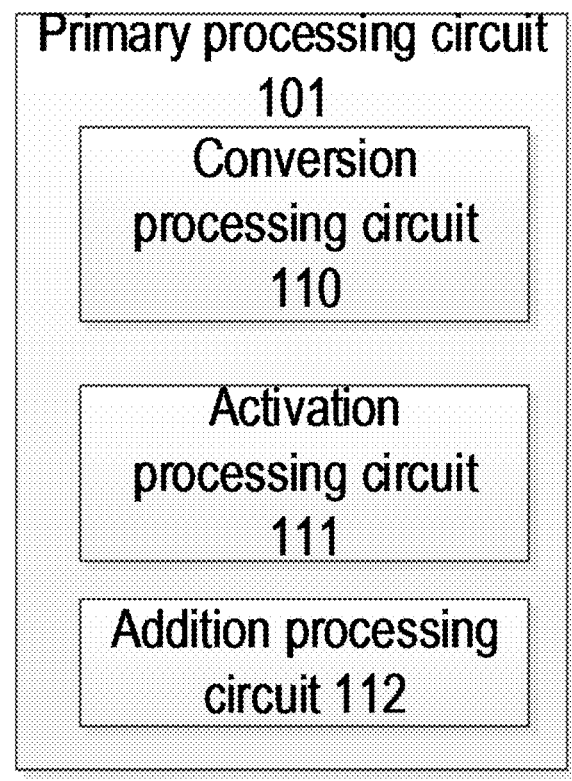
FIG. 15 is a schematic structural diagram of a primary processing circuit according to an embodiment.

Optionally, as shown in FIG. 15, the primary processing circuit may further include: one or more of a conversion processing circuit 110, an activation processing circuit 111, and an addition processing circuit 112, where
the conversion processing circuit 110 is configured to perform conversion between a first data structure and a second data structure (such as a conversion between continuous data and discrete data) on a data block or an intermediate result received by the primary processing circuit, or perform conversion between a first data type and a second data type (such as conversion between a fixed-point type and a floating-point type) on the data block or the intermediate result received by the primary processing circuit;
the activation processing circuit 111 is configured to perform an activation operation on data in the primary processing circuit; and
the addition processing circuit 112 is configured to perform an addition operation or an accumulation operation.

The primary processing circuit is configured to determine that the input neuron is broadcast data, the weight is distribution data, partition distribution data into a plurality of data blocks, and send at least one of the plurality of data blocks and at least one of the plurality of operation instructions to the secondary processing circuits;
the plurality of secondary processing circuits are configured to perform an operation on the received data block according to the operation instruction to obtain an intermediate result, and send the operation result to the secondary processing circuits; and
the primary processing circuit is configured to process the intermediate results sent by the secondary processing circuits to obtain a result of the computation instruction, and send the result of the computation instruction to the controller unit.

The secondary processing circuit includes: a multiplication processing circuit, where
the multiplication processing circuit is configured to perform a multiplication operation on a received data block to obtain a product result;
optionally, the secondary processing circuits may further include a forwarding processing circuit configured to forward the received data block or the product result.

Optionally, the secondary processing circuits may further include an accumulation processing circuit configured to perform an accumulation operation on the product result to obtain the intermediate result.

In another embodiment, the operation instruction is a computation instruction such as a matrix-mult-matrix instruction, an accumulation instruction, an activation instruction, and the like.

A specific calculation method of the computation device shown in FIG. 1 is explained below through a neural network operation instruction. For a neural network operation instruction, a formula to be actually executed may be: $s=s(\Sigma wx_i+b)$ which is to multiply a weight w by input data $x_i$, find a sum, add a bias b, and then perform an activation operation s(h) to obtain a final output result s.

Figure 16:
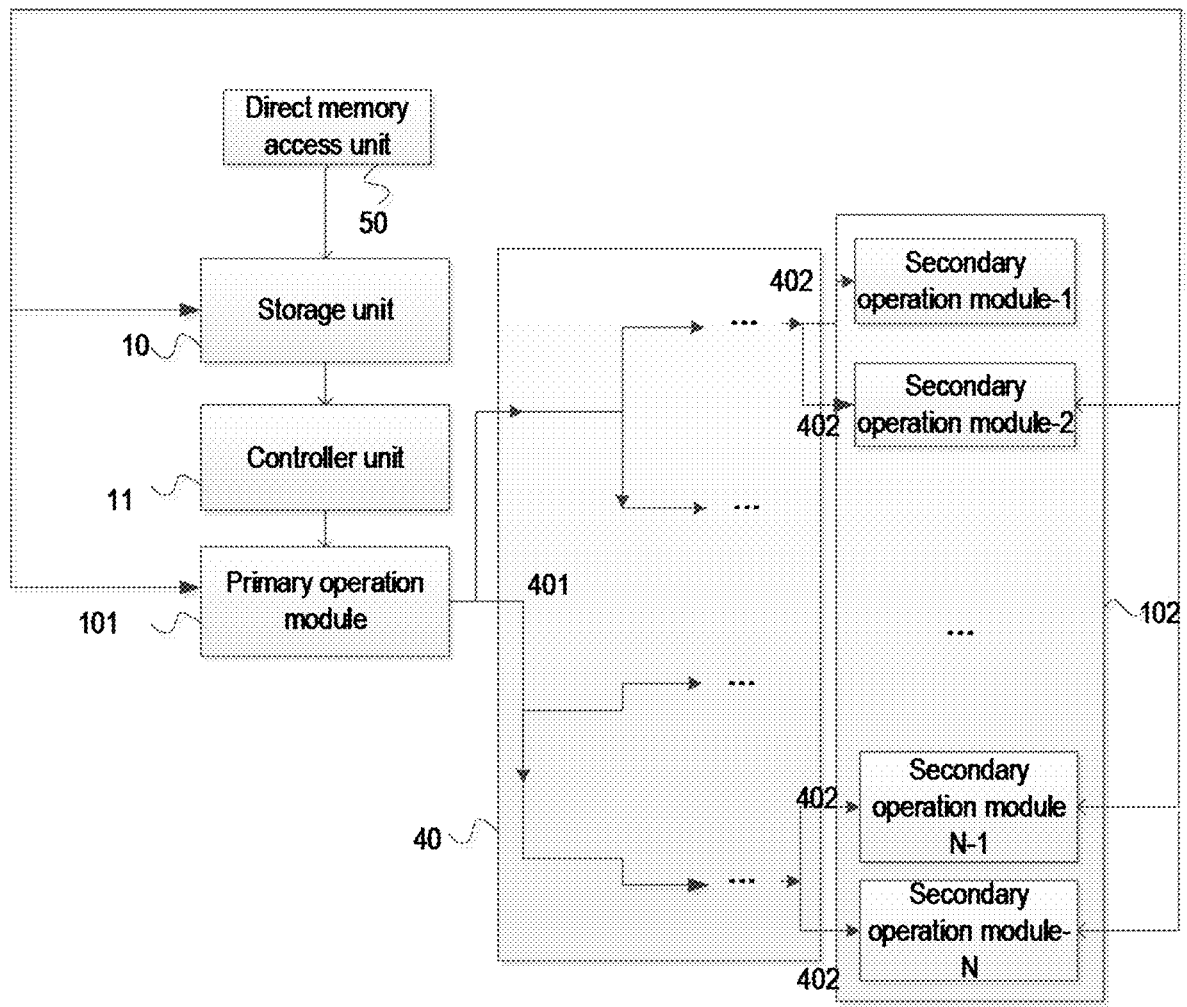
FIG. 16 is a schematic structural diagram of a computation device according to another embodiment.
Figure 17:
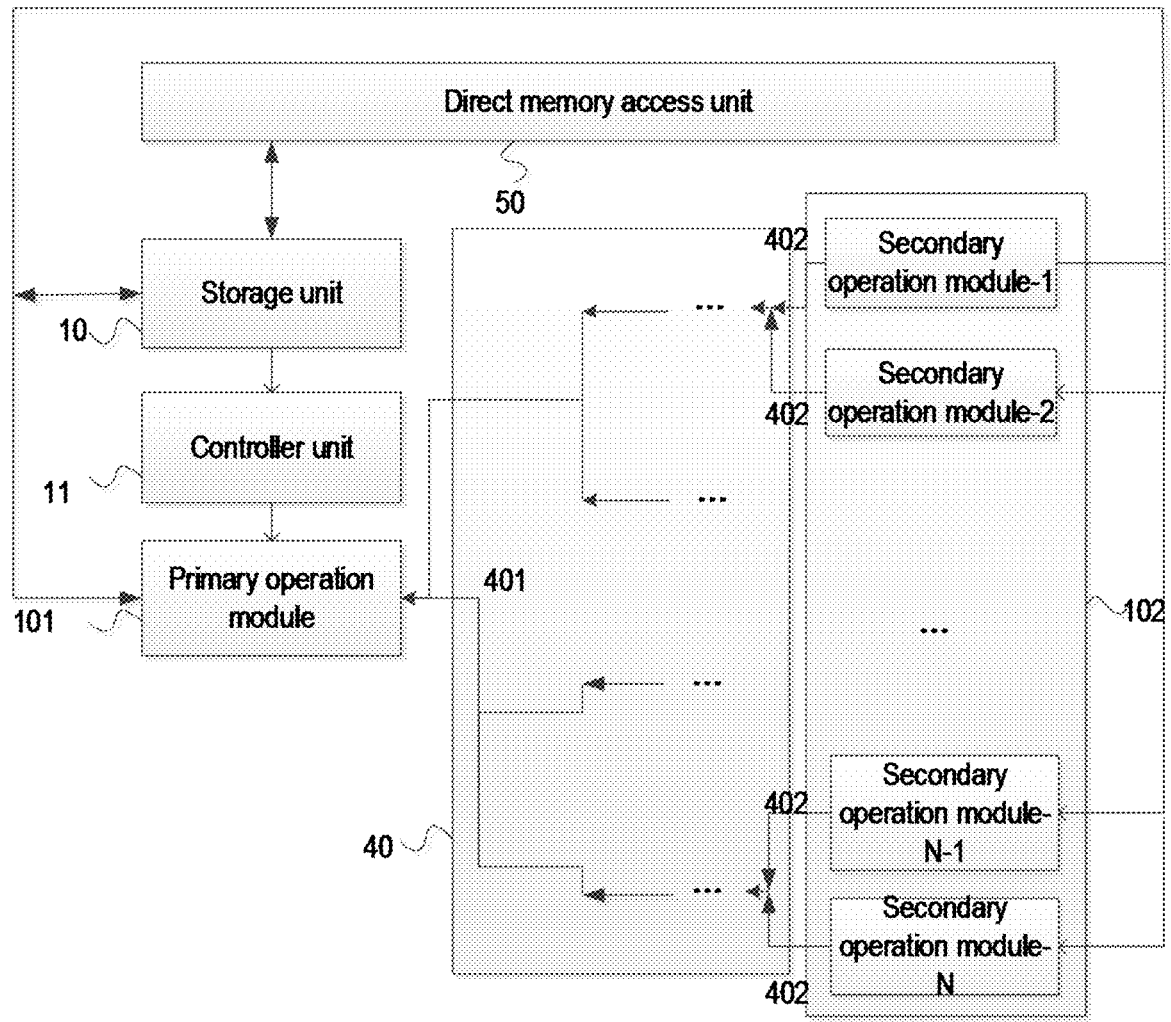
FIG. 17 is a schematic structural diagram of a computation device according to another embodiment.

In an optional embodiment, as shown in FIG. 16, the operation unit includes: a tree module 40 which includes a root port 401 and a plurality of branch ports 404, where the root port is connected to the primary processing circuit, and each of the plurality of branch ports in the tree module is respectively connected to one of the plurality of secondary processing circuits; and the above tree module has a transceiving function. For example, as shown in FIG. 16, the tree module has a transfer function; and as shown in FIG. 17, the tree module has a receiving function.

The tree module is configured to forward a data block, a weight, and an operation instruction between the primary processing circuit and the plurality of secondary processing circuits.

Optionally, the tree module is a selectable result of the computation device and may include a node of one layer. The node is a line structure with a forwarding function, and the node itself may not have a computation function. If the tree module includes a node of a $zero^{th}$ layer, the tree module is not needed.

Figure 18:
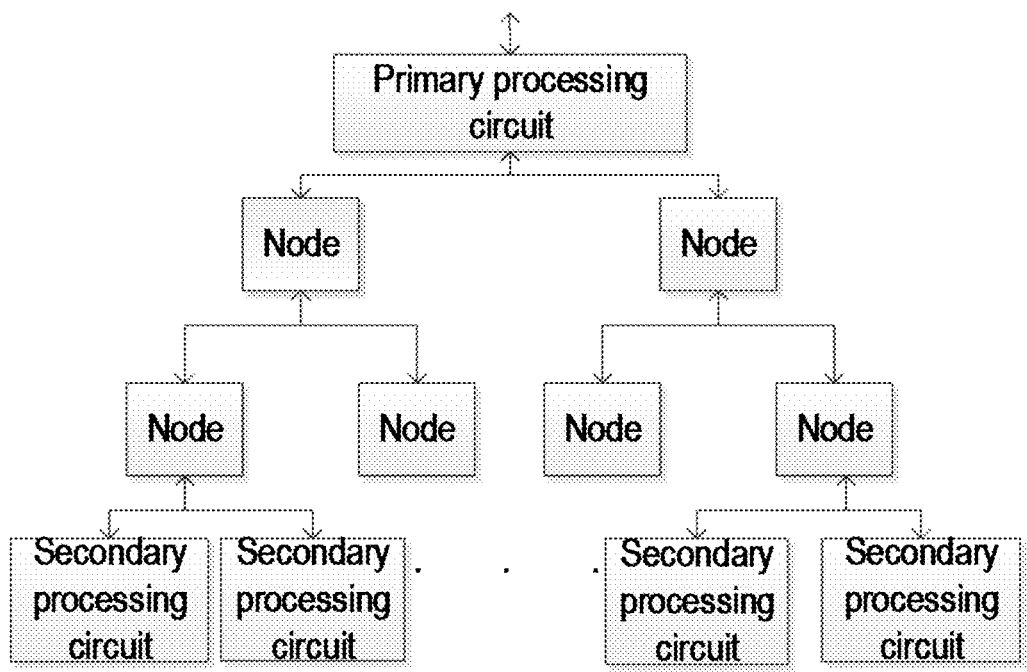
FIG. 18 is a schematic structural diagram of a tree module according to an embodiment.

Optionally, the tree module may be an n-ary tree structure such as a binary tree structure as shown in FIG. 18 or a trinary tree structure, where n may be an integer greater than or equal to 2. A specific value of n is not limited herein. A count of the above layers may also be 2. The secondary processing circuits may be connected to nodes of other layers except a penultimate layer, such as nodes of a last layer as shown in FIG. 18.

Figure 19:
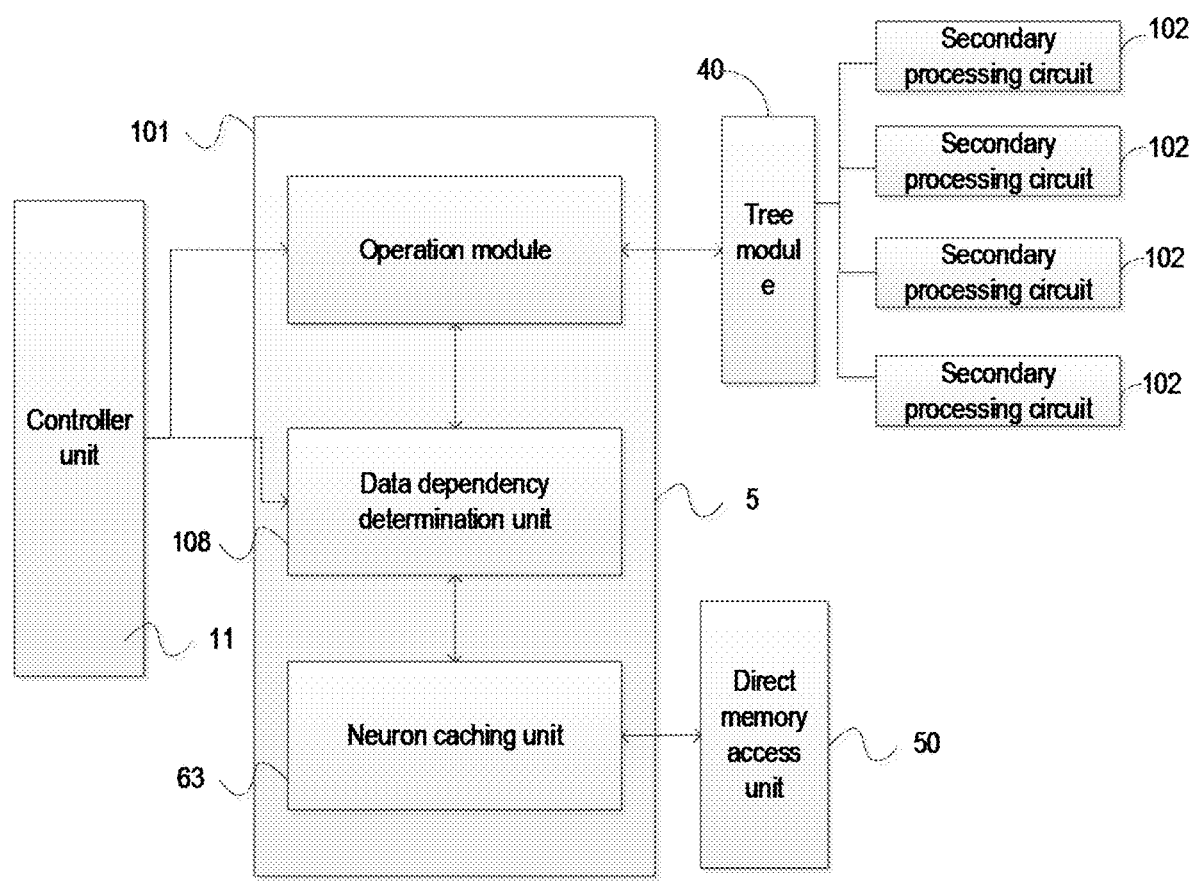
FIG. 19 is a schematic structural diagram of a computation device according to another embodiment.

Optionally, as shown in FIG. 19, the above operation unit may carry a separate cache and may include a neuron caching unit 63, where the neuron caching unit 63 caches input neuron vector data and output neuron value data of the secondary processing circuit.

Figure 20:
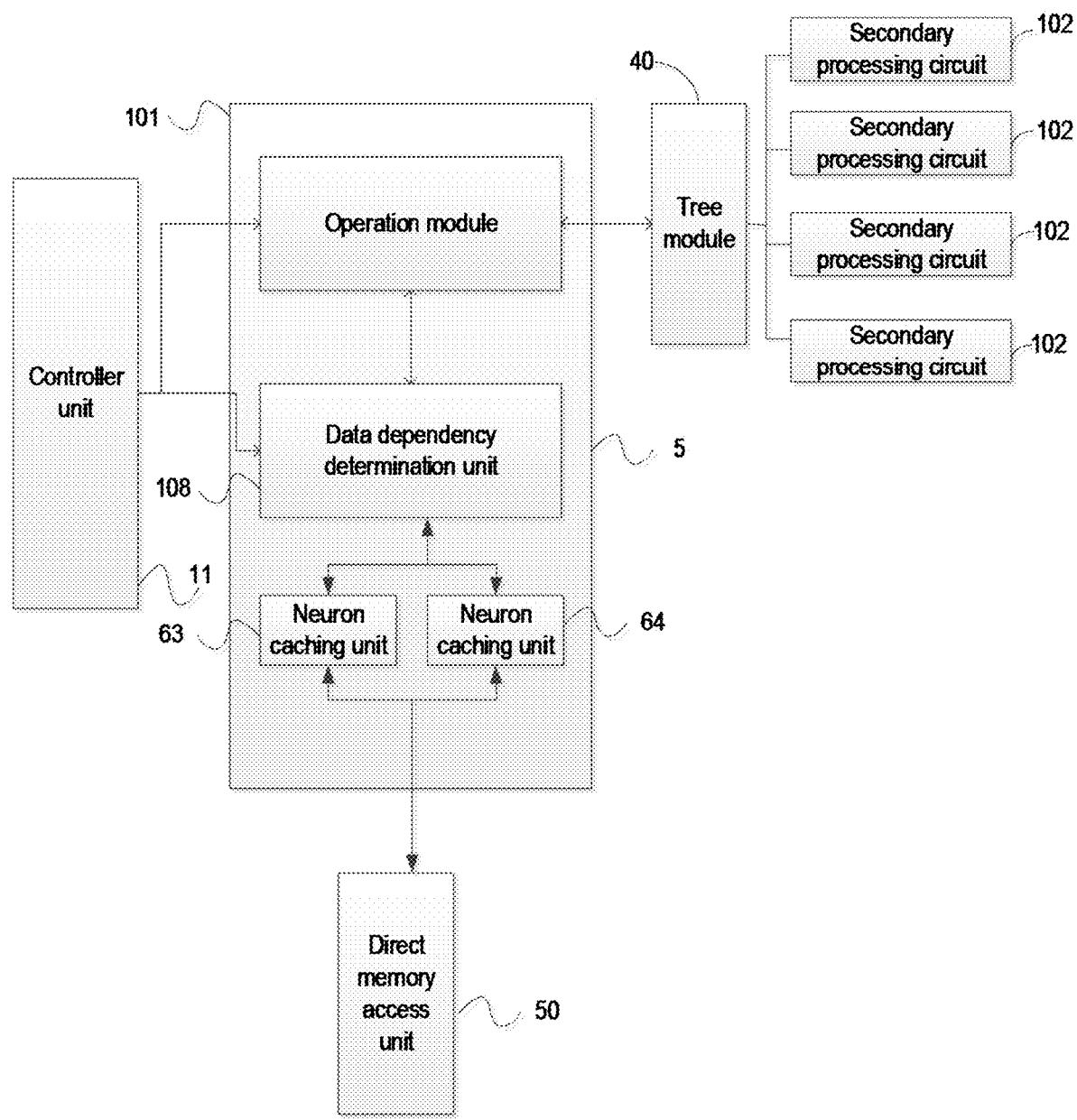
FIG. 20 is a schematic structural diagram of a computation device according to another embodiment.

As shown in FIG. 20, the operation unit may further include: a weight caching unit 64 configured to cache weight data required by the secondary processing circuit in the computation process.

Figure 21:
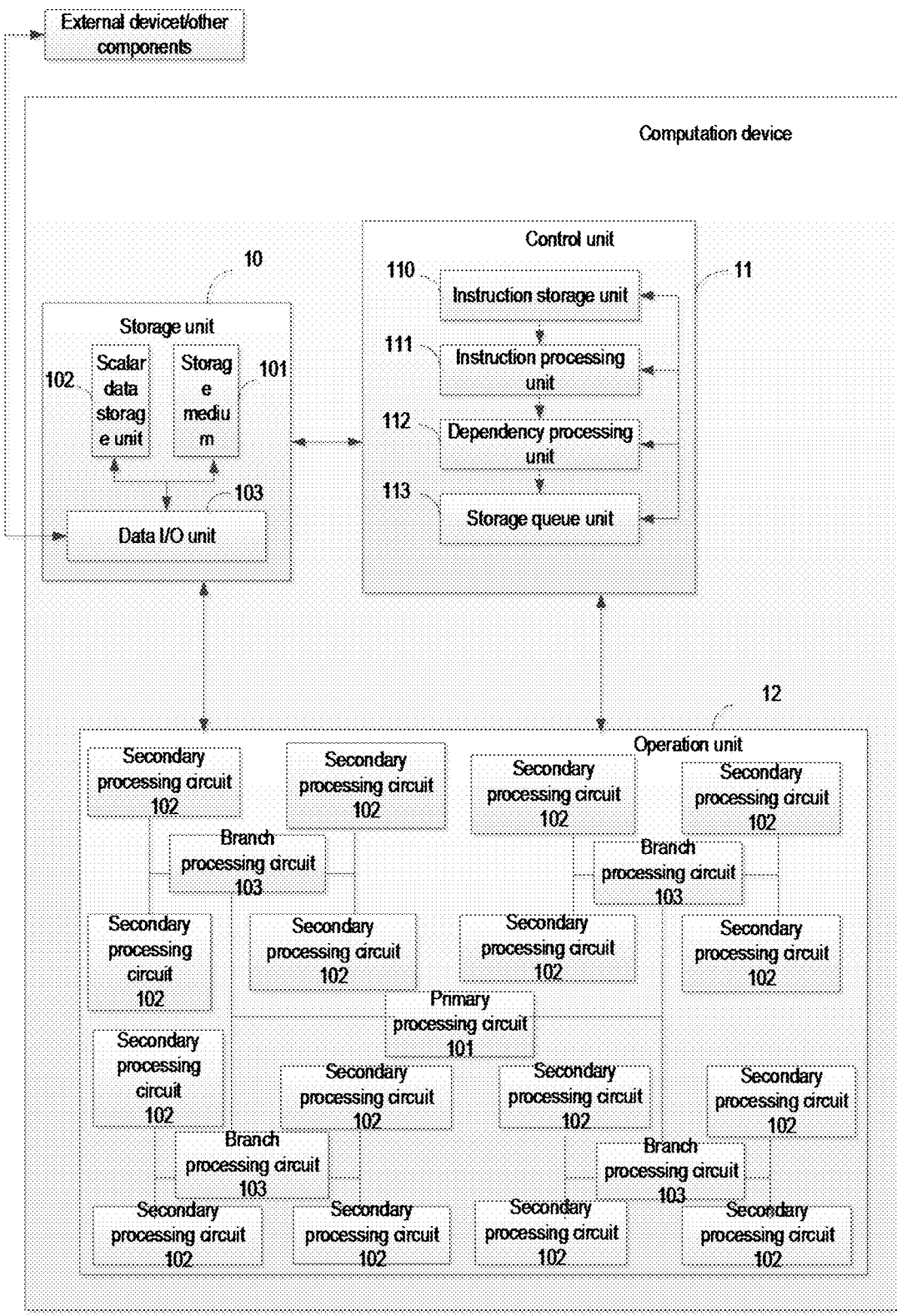
FIG. 21 is a schematic structural diagram of a computation device according to another embodiment.

In an optional embodiment, as shown in FIG. 21, the operation unit 12 may include a branch processing circuit 103; a connection structure of the branch processing circuit 103 is shown in FIG. 21, where
the primary processing circuit 101 is connected to one or more branch processing circuits 103, and the branch processing circuit 103 is connected to one ore more secondary processing circuits 102; and
the branch processing circuit 103 is configured to forward data or instructions between the primary processing circuit 101 and the secondary processing circuits 102.

The present disclosure further provides a neural network operation device which includes one or more computation devices mentioned in the present disclosure. The neural network operation device is configured to obtain data to be operated and control information from other processing devices, perform a specified neural network operation, and send an execution result to a peripheral apparatus through an I/O interface. The peripheral apparatus may include a camera, a monitor, a mouse, a keyboard, a network card, a WIFI interface, a server, and the like. When more than one of the above computation devices are included, the computation devices may be interconnected and transfer data to each other through a specific structure. For example, the computation devices may be interconnected and transfer data via a PCIE bus to support neural network operations with a larger scale. In this case, the computation devices may share the same control system, or may have separate control systems. The computation devices may share a memory, or each accelerator may have separate memories. In addition, an interconnection method of the computation devices may be any interconnection topology.

The neural network operation device has good compatibility and may be connected to various types of servers through a PCIE interface.

Figure 22:
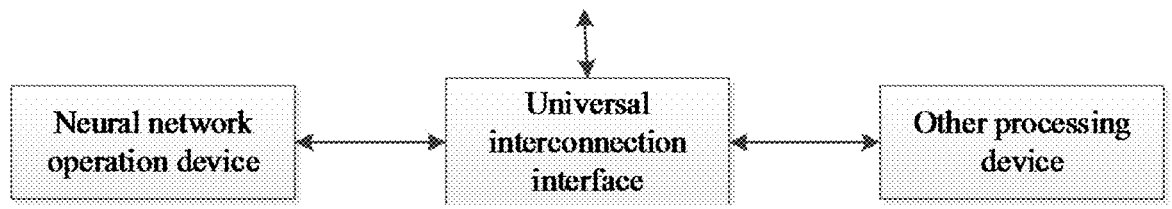
FIG. 22 is a schematic structural diagram of a combined processing device according to an embodiment.

The present disclosure also provides a combined processing device, where the device includes the neural network operation device, a universal interconnection interface, and other processing devices. The neural network operation device interacts with other processing devices to perform operations specified by users. FIG. 22 is a schematic diagram of the combined processing device.

The other processing devices include at least one or more of a general-purpose/special-purpose processors such as a central processing unit (CPU), a graphics processing unit (GPU), a neural network processor, and the like. A count of processors included in the other processing devices is not limited herein. The other processing devices may serve as an interface that connects the neural network operation device to external data and control, including data moving, and may perform the basic control such as starting and stopping the neural network operation device. The other processing devices may also cooperate with the neural network operation device to complete operation tasks.

The universal interconnection interface may be configured to transfer data and control instructions between the neural network operation device and the other processing devices. The neural network operation device may obtain required input data from the other processing devices and write the data in an on-chip storage device of the neural network operation device. The neural network operation device may obtain control instructions from the other processing device, and write the control instructions in an on-chip control cache of the neural network operation device. The neural network operation device may further read data stored in a storage module of the neural network operation device and transfer the data to the other processing devices.

Figure 23:
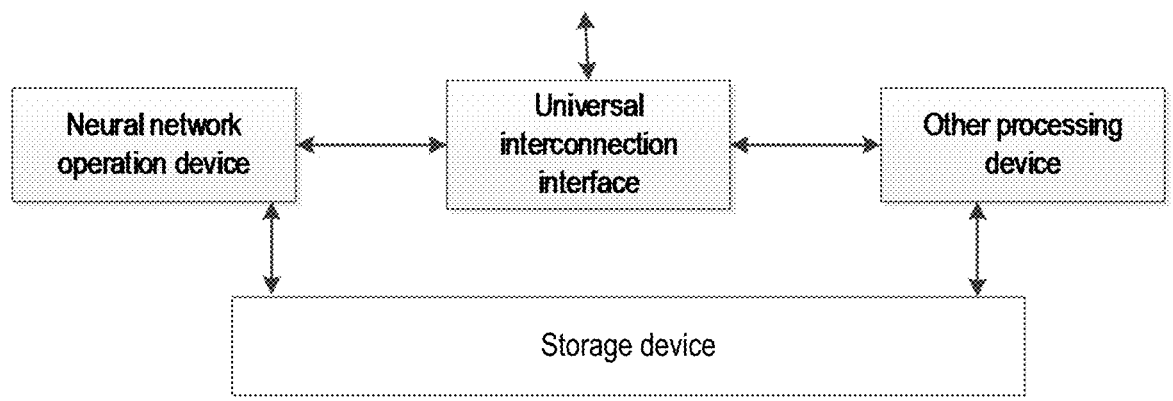
FIG. 23 is a schematic structural diagram of a combined processing device according to another embodiment.

Optionally, as shown in FIG. 23, the structure may further include a storage device, where the storage device is connected to the neural network operation device and the other processing devices respectively, and the storage device is configured to store data of the neural network computation device and the other processing devices. The storage device is configured to store data of the neural network operation device and the other processing devices, and is particularly suitable for a case where data to be operated cannot be completely stored in an internal memory of the neural network operation device or the other processing devices.

The combined processing device may be used as an SOC (System on Chip) of a device such as a mobile phone, a robot, a drone, a video surveillance device, and the like, which may effectively reduce the core area of a control part, increase the processing speed, and reduce the overall power consumption. In this case, a universal interconnection interface of the combined processing device may be connected to some components of the device. The components may include a camera, a monitor, a mouse, a keyboard, a network card, and a WIFI interface.

In some embodiments, the present disclosure provides a chip which includes the above neural network computation device or the combined processing device.

In some embodiments, the present disclosure provides a chip package structure which includes the above chip.

Figure 24:
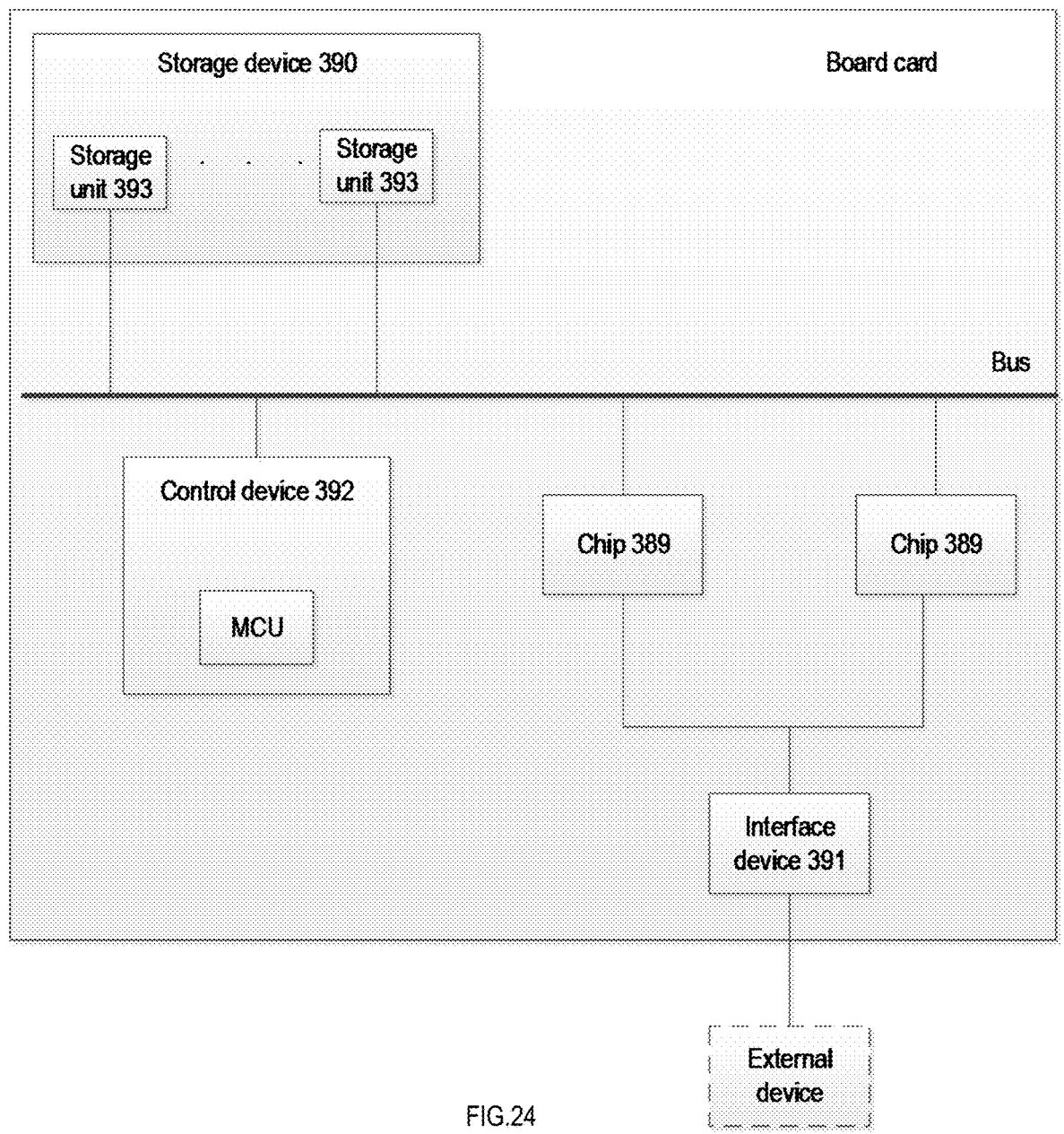
FIG. 24 is a schematic structural diagram of a board card according to an embodiment.

In some embodiments, the present disclosure provides a board card which includes the above chip package structure. FIG. 24 shows a board card which includes the above chip 389 and other supporting components, where the supporting components include and are not limited to: a storage device 390, an interface device 391, and a control device 392;

the storage device 390 is connected to the chip in the chip package structure through a bus for storing data. The storage device may include a plurality of clusters of storage units 393. Each cluster of the storage units is connected to the chip through a bus. It may be understood that each cluster of the storage units may be DDR SDRAMs (Double Data Rate Synchronous Dynamic Random Access Memory).

DDR may double the speed of SDRAM without increasing a clock frequency. DDR allows data to be read on rising and falling edges of a clock pulse. A speed of DDR is twice that of standard SDRAM. In an embodiment, the storage device may include four clusters of the storage units. Each cluster of the storage units may include a plurality of DDR4 particles (chips). In an embodiment, the chip may include four 72-bit DDR4 controllers, where 64 bits in the 72-bit DDR4 controller are used for data transfer and 8 bits are used for ECC verification. It may be understood that when DDR4-31200 particles are used in each cluster of the storage units, a theoretical bandwidth of data transfer may reach 251600 MB/s.

In an embodiment, each cluster of the storage units includes a plurality of DDR SDRAMs arranged in parallel. DDR may transfer data twice in one clock cycle. A controller for controlling the DDR is arranged in the chip to control data transfer and data storage of each storage unit.

The interface device is electrically connected to the chip in the chip package structure. The interface device is configured to implement data transfer between the chip and an external device (such as a server or a computer). For example, in an embodiment, the interface device may be a standard PCIE interface. For example, data to be processed is transferred from the server to the chip through a standard PCIE interface to realize data transfer. Optionally, when a PCIE 3.0×16 interface is used for transfer, a theoretical bandwidth may reach 116000 MB/s. In another embodiment, the interface device may also be other interfaces. A specific representation of the other interfaces is not limited herein, as long as the interface unit can realize a switching function. In addition, a computation result of the chip is still sent back to the external device (such as a server) by the interface device.

The control device is electronically connected to the chip. The control device is configured to monitor a state of the chip. Specifically, the chip and the control device may be electrically connected through an SPI interface. The control device may include a micro controller unit (MCU). For example, the chip may include a plurality of processing chips, processing cores, or processing circuits, and may drive a plurality of loads. Therefore, the chip can be in different working states such as multi-load and light-load. The control device may realize regulation and control of working states of a plurality of processing chips, processing cores and/or processing circuits in the chip.

In some embodiments, the present disclosure provides an electronic device which includes the above board card.

The electronic device may include a data processing device, a robot, a computer, a printer, a scanner, a tablet, a smart terminal, a mobile phone, a traffic recorder, a navigator, a sensor, a webcam, a server, a cloud-based server, a camera, a video camera, a projector, a watch, a headphone, a mobile storage, a wearable device, a vehicle, a household appliance, and/or a medical equipment.

The vehicle may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

Figure 25:
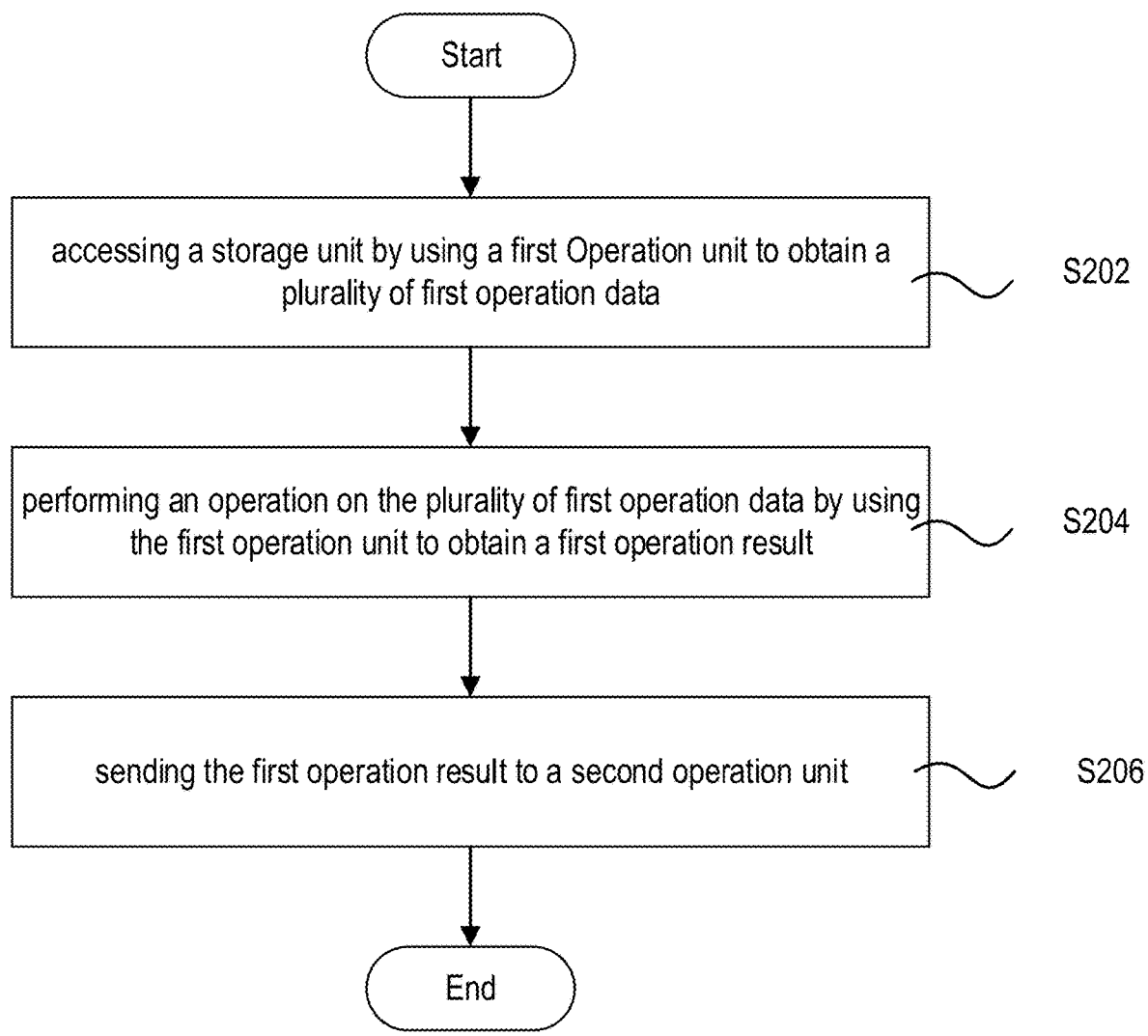
FIG. 25 is a flowchart of an NoC data processing method according to an embodiment.

In an embodiment, as shown in FIG. 25, the present disclosure provides an NoC data processing method, where the method includes:

a step 202, accessing a storage device by using a first computation device to obtain first operation data.

The first computation device includes a computation unit and a controller unit, where the computation unit includes a primary processing circuit and a plurality of secondary processing circuits. Specifically, the controller unit in the first computation device obtains the first operation data and a computation instruction from the storage device.

The method further includes a step 204, performing an operation on the first operation data by using the first computation device to obtain a first operation result;

specifically, the step includes performing an operation according to a corresponding computation instruction on the first operation data read from the storage device in the first computation device to obtain the first operation result.

The method further includes a step 206, sending the first operation result to a second computation device;

specifically, the step includes sending, by the first computation device, the first operation result to the second computation device by using the controller unit in the first computation device through a communication channel established between the first computation device and the second computation device. Optionally, the first operation result may be sent to the second computation device or the storage device.

Further, the NoC data processing method provided in this embodiment may be applied to any NoC processing system shown in FIGS. 1-5.

The above NoC data processing method may realize data transfer among a plurality of computation devices by sending the first operation result in the first computation device to the second computation device; at the same time, by multiplexing operation data, large bandwidth overhead caused by the computation device's multiple accesses to the storage device may be avoided; the method may make reasonable use of operation data and intermediate operation results, and improve the efficiency of data processing.

Figure 26:
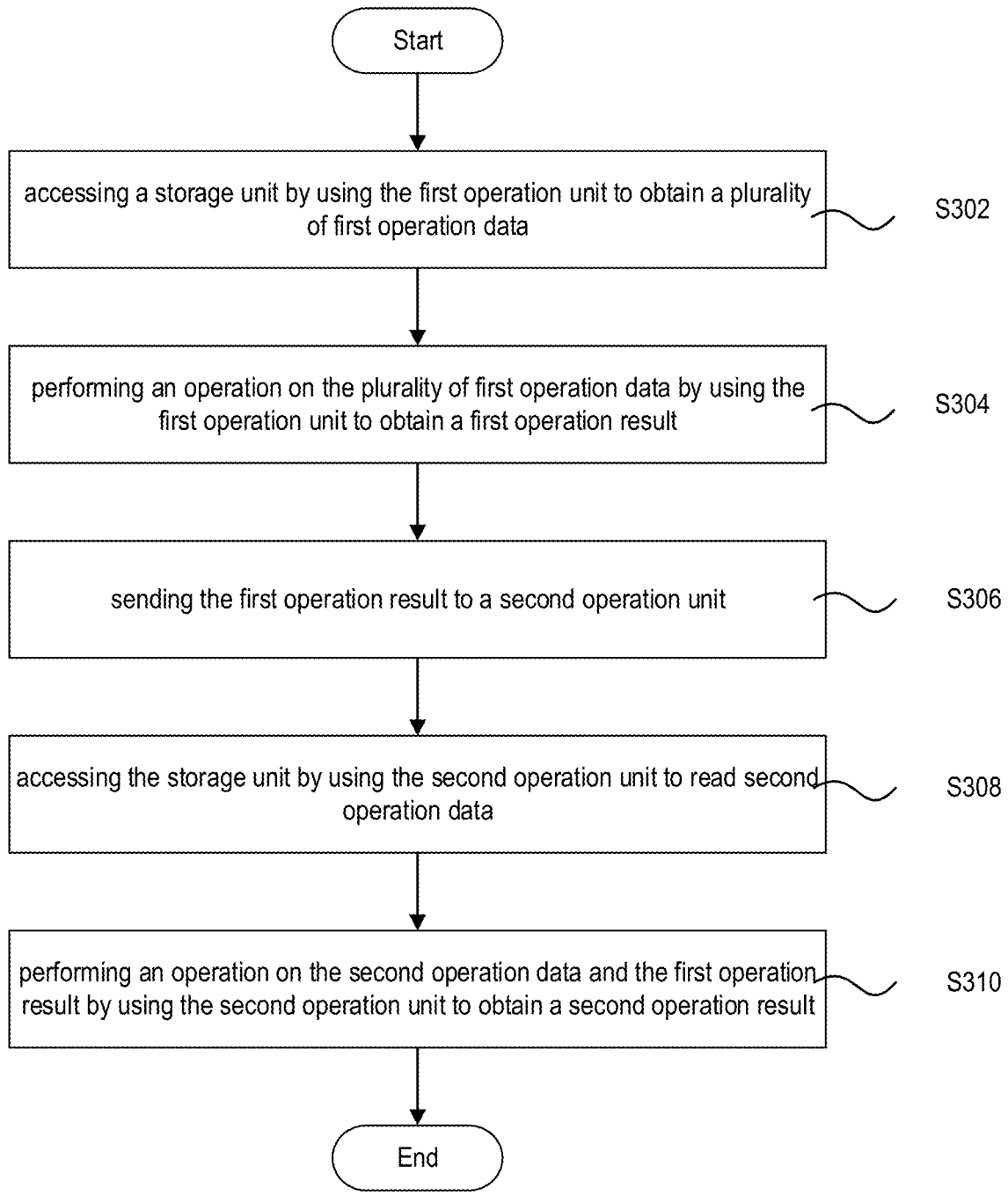
FIG. 26 is a flowchart of an NoC data processing method according to another embodiment.

In an embodiment, as shown in FIG. 26, the present disclosure provides an NoC data processing method, where the method includes:

a step 302, accessing a storage device by using a first computation device to obtain first operation data.

The first computation device includes a computation unit and a controller unit, where the computation unit includes a primary processing circuit and a plurality of secondary processing circuits. Specifically, the controller unit in the first computation device obtains first operation data and a computation instruction from the storage device.

The method further includes a step 304, performing an operation on the first operation data by using the first computation device to obtain a first operation result.

Specifically, the step includes performing an operation according to a corresponding computation instruction on the first operation data read from the storage device in the first computation device to obtain the first operation result.

The method further includes a step 306, sending the first operation result to a second computation device;

specifically, the step includes sending, by the first computation device, the first operation result to the second computation device by using the controller unit in the first computation device through a communication channel established between the first computation device and the second computation device.

The method further includes a step 308, accessing the storage device by using the second computation device to obtain second operation data.

The second computation device includes a computation unit and a controller unit, where the computation unit includes a primary processing circuit and a plurality of secondary processing circuits. Specifically, the controller unit in the second computation device obtains second operation data and a computation instruction from the storage device.

The method further includes a step 310, performing an operation on the second operation data and the first operation result by using the second computation device to obtain a second operation result;

specifically, the step includes performing an operation according to a corresponding computation instruction on the second operation data read from the storage device and the first operation result received from the first computation device in the first computation device to obtain the second operation result.

Further, the NoC data processing method provided in this embodiment may be applied to any NoC processing system shown in FIGS. 1-5.

The above NoC data processing method may realize multiplexing of operation data by sending the first operation result in the first computation device to the second computation device and the second computation device using the first operation result to perform an operation again; the method may make reasonable use of operation data and intermediate operation results, and improve the efficiency of data processing.

In an embodiment, the NoC data processing method shown in FIG. 26 is applied to the NoC processing system 1900 shown in FIG. 9, where the computation devices 1902 to 1905 are all connected to the storage device 1901 in the same NoC processing module, and any two computation devices 1902 to 1905 are directly connected to each other.

For example, in a matrix multiplication, a matrix A is $$\begin{matrix} a_{00} & a_{01} \\ a_{10} & a_{11} \end{matrix},$$

a matrix B is $$\begin{matrix} b_{00} & b_{01} \\ b_{10} & b_{11} \end{matrix},$$

then a matrix C is $$A*B = \begin{matrix} c_{00} & c_{01} \\ c_{10} & c_{11} \end{matrix},$$

where $$c_{00}=a_{00}*b_{00}+a_{01}*b_{10};$$

$$c_{01}=a_{00}*b_{01}+a_{01}*b_{11};$$

$$c_{10}=a_{10}*b_{00}+a_{11}*b_{10};\text{ and}$$

$$c_{11}=a_{10}*b_{01}+a_{11}*b_{11}.$$

First, time is divided into three time periods.

Then, in a first time period, the computation device 1902 to the computation device 1905 simultaneously access the storage device 1901 in the NoC processing module where the computation devices are located.

Specifically, the computation device 1902 reads first operation data $a_{00}$ and $b_{00}$ from the storage device 1901; the computation device 1903 reads first operation data $a_{01}$ and $b_{11}$ from the storage device 1901; the computation device 1904 reads first operation data $a_{11}$ and $b_{10}$ from the storage device 1901; and the computation device 1905 reads first operation data $a_{10}$ and $b_{01}$ from the storage device 1901.

Further, the computation device 1902 performs an operation on the read first operation data $a_{00}$ and $b_{00}$ to obtain a first operation result $a_{00}*b_{00}$; the computation device 1903 performs an operation on the read first operation data $a_{01}$ and $b_{11}$ to obtain a first operation result $a_{01}*b_{11}$; the computation device 1904 performs an operation on the read first operation data $a_{11}$ and $b_{10}$ to obtain a first operation result $a_{11}*b_{10}$; the computation device 1905 performs an operation on the read first operation data $a_{10}$ and $b_{01}$ to obtain a first operation result $a_{10}*b_{01}$.

Then, in a second time period, the computation device 1902 reads the first operation data $a_{01}$ from the computation device 1903 and reads first operation data $b_{10}$ from the computation device 1904 to obtain the second operation result $a_{00}$ through operation; the computation device 1903 reads the first operation data $a_{00}$ from the computation device 1902 and reads first operation data $b_{01}$ from the computation device 1905 to obtain the second operation result $a_{00}*b_{01}$ through operation; the computation device 1904 reads the first operation data $a_{10}$ from the computation device 1905 and reads first operation data $b_{00}$ from the computation device 1902 to obtain the second operation result $a_{10}*b_{00}$ through operation; and the computation device 1905 reads the first operation data $a_{11}$ from the computation device 1904 and reads first operation data $b_{11}$ from the computation device 1903 to obtain the second operation result $a_{11}*b_{11}$ through operation.

In a third time period, the computation device 1902 performs an operation on the first operation result $a_{00}*b_{00}$ and the second operation result $a_{01}*b_{10}$ to obtain a third operation result $c_{00}=a_{00}*b_{00}+a_{01}*b_{10}$, and sends the third operation result $c_{00}$ to the storage device 1902; the computation device 1903 performs an operation on the first operation result $a_{01}*b_{11}$ and the second operation result $a_{00}*b_{01}$ to obtain a third operation result $c_{01}=a_{00}*b_{01}\ a_{01}*b_{11}$, and sends the third operation result $c_{01}$ to the storage device 1902; the computation device 1904 performs an operation on the first operation result $a_{11}*b_{10}$ and the second operation result $a_{10}*b_{00}$ to obtain a third operation result $c_{10}=a_{10}*b_{00}+a_{11}*b_{10}$, and sends the third operation result $c_{10}$ to the storage device 1902; the computation device 1905 performs an operation on the first operation result $a_{10}*b_{01}$ and the second operation result $a_{11}*b_{11}$ to obtain a third operation result $c_{11}=a_{10}*b_{01}*b_{11}$, and sends the third operation result $c_{11}$ to the storage device 1902.

Figure 27:
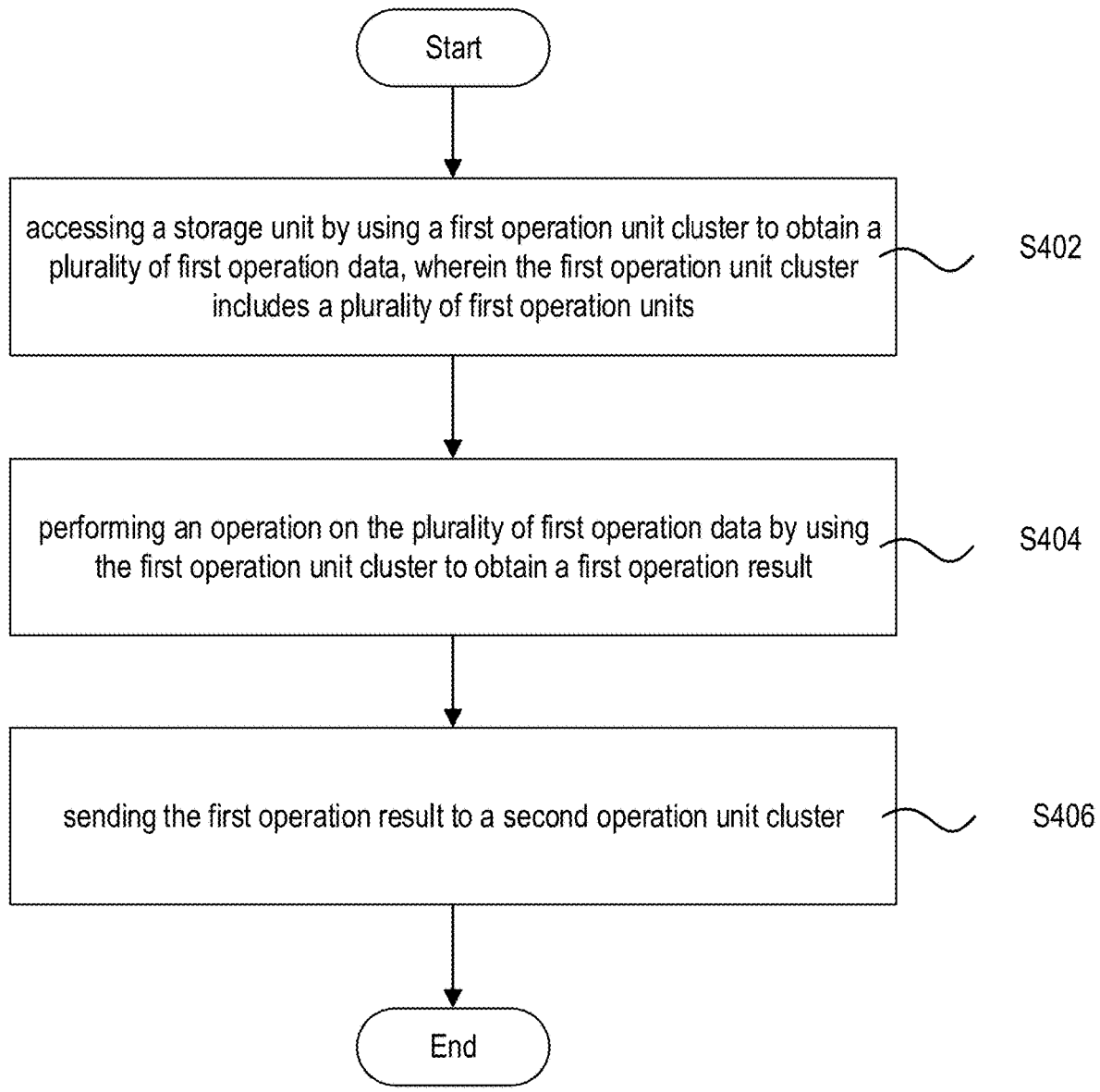
FIG. 27 is a flowchart of an NoC data processing method according to another embodiment.

In an embodiment, as shown in FIG. 27, the present disclosure provides an NoC data processing method, where the method includes:

a step 402, accessing a storage device by using a first computation device cluster to obtain first operation data, where the first operation device cluster includes a plurality of first computation devices.

Each first computation device of the first computation device cluster (cluster1) includes an operation unit and a controller unit, where the operation unit includes a primary processing circuit and a plurality of secondary processing circuits. Specifically, the controller unit in cluster1 obtains first operation data and a computation instruction from the storage device.

Optionally, a plurality of first computation devices in cluster1 simultaneously access the storage device, and each first computation device reads part of data required by cluster1 from the storage device, and the data are transferred in cluster1. Optionally, one or more first computation devices in the cluster1 may be designated to access the storage device, and remaining first computation devices may only perform intra-cluster communication.

The method further includes a step 404, performing an operation on the plurality of first operation data by using the first computation device cluster to obtain a first operation result;

specifically, the step includes: operating and forwarding the plurality of operation data among the plurality of first computation devices according to a corresponding computation instruction to obtain the first operation result.

The method further includes a step 406, sending the first operation result to a second computation device cluster;

specifically, the step includes sending, by cluster1, the first operation result to cluster2 by using the controller unit in cluster1 through a communication channel established between cluster1 and cluster2.

Optionally, the first operation result may be sent to cluster2 or the storage device. Optionally, the first operation result is sent to cluster2 through any first computation device in cluster1 which has established a communication channel with cluster2. Optionally, cluster1 may send the first operation result to any second computation device in cluster2 which has established a communication channel with cluster1.

Further, the NoC data processing method provided in this embodiment may be applied to any NoC processing system shown in FIGS. 6-8.

The above NoC data processing method may realize intra-cluster communication and inter-cluster data transfer among a plurality of computation device clusters; the method may make reasonable use of operation data and intermediate operation results, and improve the efficiency of data processing.

Figure 28:
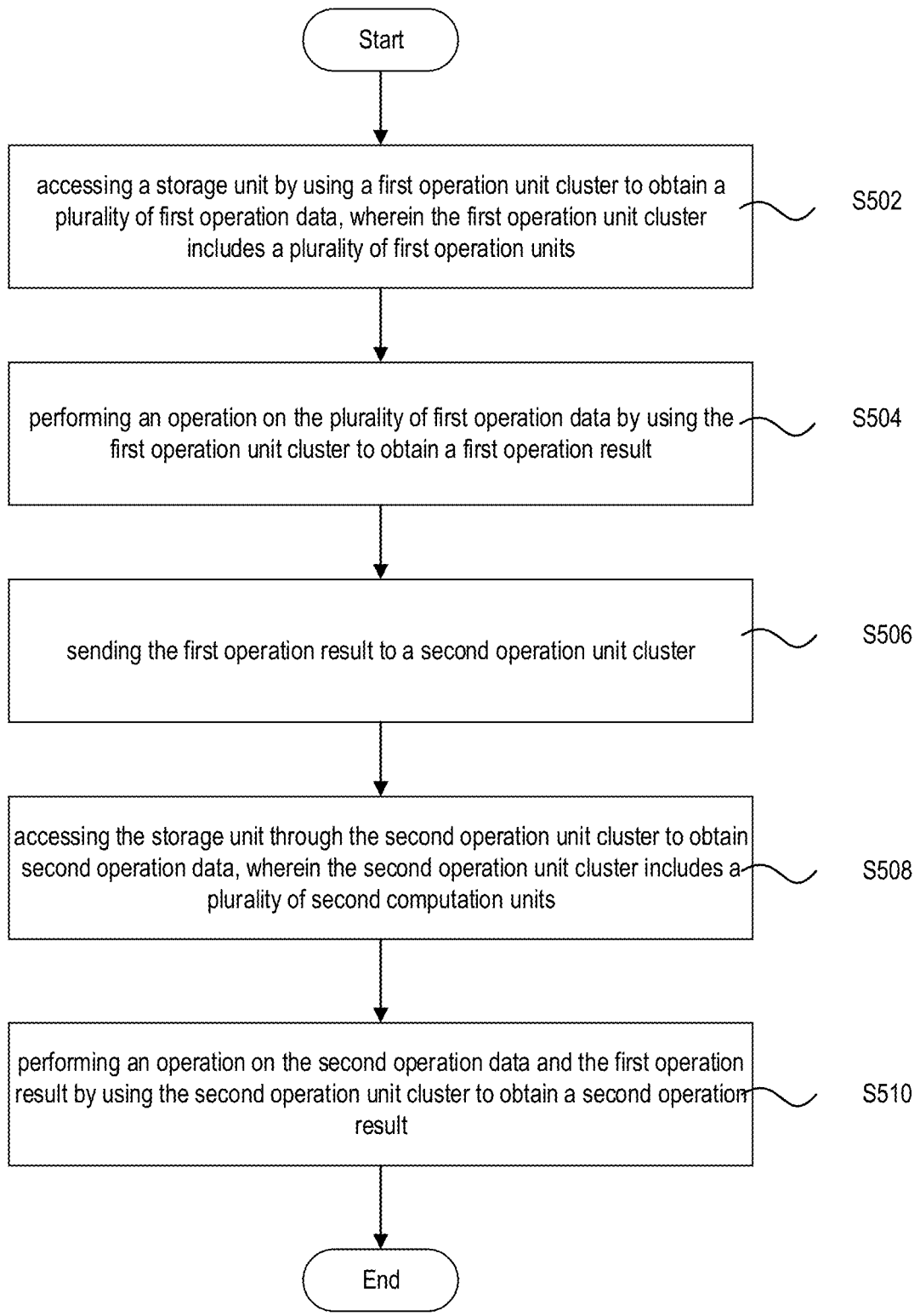
FIG. 28 is a flowchart of an NoC data processing method according to another embodiment.

In an embodiment, as shown in FIG. 28, the present disclosure provides an NoC data processing method, where the method includes:

a step 502, accessing a storage device by using a first computation device cluster to obtain first operation data, where the first operation device cluster includes a plurality of first computation devices.

Each first computation device of the first computation device cluster (cluster1) includes an operation unit and a controller unit, where the operation unit includes a primary processing circuit and a plurality of secondary processing circuits. Specifically, the controller unit in cluster1 obtains first operation data and a computation instruction from the storage device.

Optionally, a plurality of first computation devices in cluster1 simultaneously access the storage device, and each first computation device reads part of data required by cluster1 from the storage device, and the data are transferred in cluster1. Optionally, one or more first computation devices in the cluster1 may be designated to access the storage device, and remaining first computation devices may only perform intra-cluster communication.

The method further includes a step 504, performing an operation on the plurality of first operation data by using the first computation device cluster to obtain a first operation result;

specifically, the step includes: operating and forwarding the plurality of operation data among the plurality of first computation devices according to a corresponding computation instruction to obtain the first operation result.

The method further includes a step 506, sending the first operation result to a second computation device cluster;

specifically, the step includes sending, by cluster1, the first operation result to cluster2 by using the controller unit in cluster1 through a communication channel established between cluster1 and cluster2.

Optionally, the first operation result is sent to cluster2 through any first computation device in cluster1 which has established a communication channel with cluster2. Optionally, cluster1 may send the first operation result to any second computation device in cluster2 which has established a communication channel with cluster1.

The method further includes a step 508, accessing the storage device through the second computation device cluster to obtain second operation data, where the second operation device cluster includes a plurality of second computation devices.

Each first computation device in cluster2 includes a computation unit and a controller unit, where the computation unit includes a primary processing circuit and a plurality of secondary processing circuits. Specifically, the controller unit in cluster2 obtains the second operation data and a computation instruction from the storage device.

Optionally, a plurality of second computation devices in cluster2 simultaneously access the storage device, and each second computation device reads part of data required by cluster2 from the storage device, and the data are transferred in cluster2. Optionally, one or more second computation devices in cluster2 may access the storage device, and remaining second computation devices may only perform intra-cluster communication.

The method further includes a step 510, performing an operation on the second operation data and the first operation result by using the second computation device cluster to obtain a second operation result;

specifically, the step includes operating and forwarding the second operation data read from the storage device and the first operation result received from the first computation device cluster among a plurality of second computation devices according to a corresponding computation instruction to obtain the second operation result.

Further, the NoC data processing method provided in this embodiment may be applied to any NoC processing system shown in FIGS. 6-8.

The above NoC data processing method may realize multiplexing of operation data by sending the first operation result in the first computation device cluster to the second computation device and the second computation device using the first operation result to perform an operation again; the method may make reasonable use of operation data and intermediate operation results, and improve the efficiency of data processing.

Figure 29:
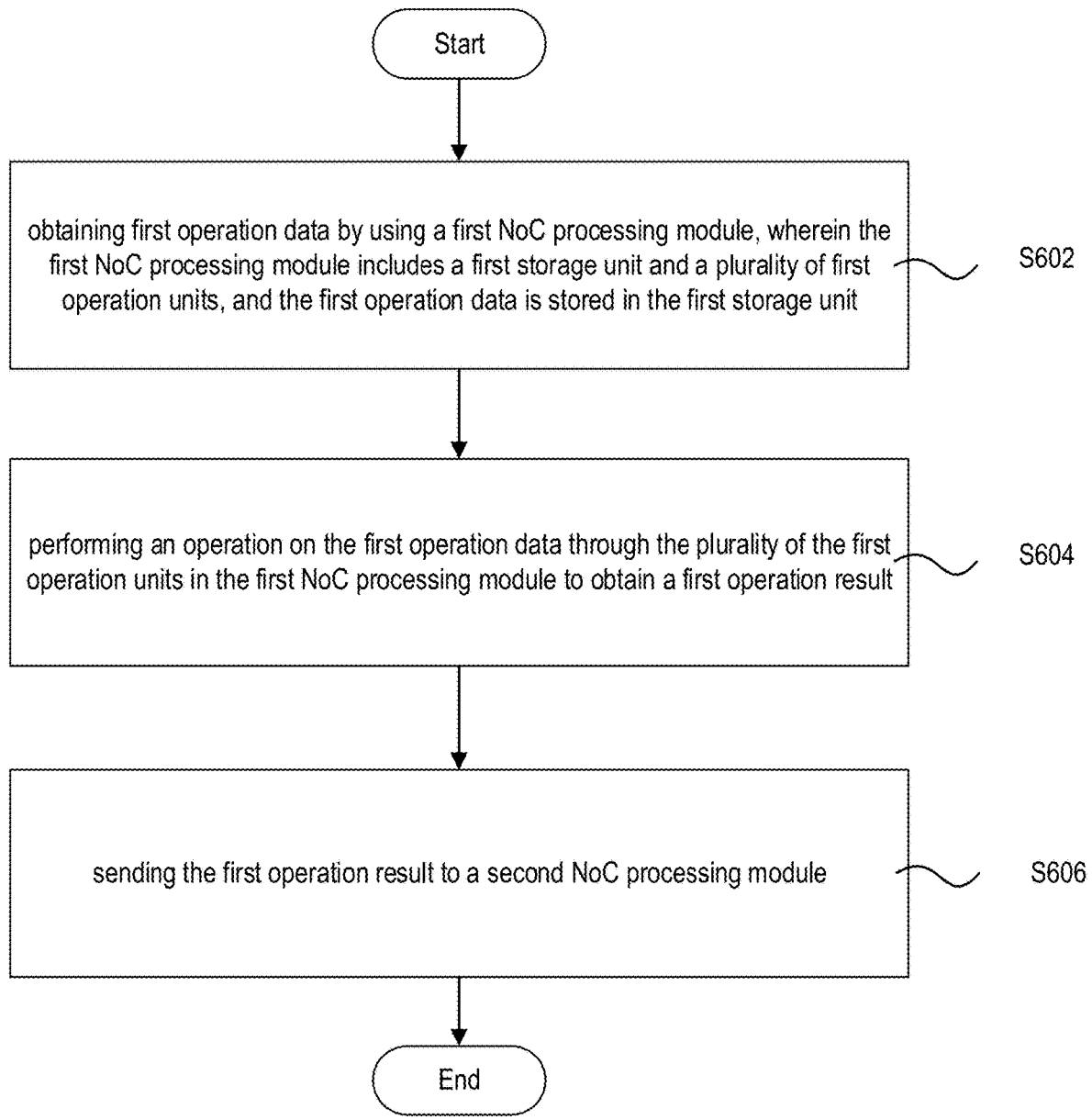
FIG. 29 is a flowchart of an NoC data processing method according to another embodiment.

In an embodiment, as shown in FIG. 29, the present disclosure provides an NoC data processing method, where the method includes:

a step 602, obtaining first operation data by using a first NoC processing module, where the first NoC processing module includes a first storage device and a plurality of first computation devices, and the first operation data is stored in the first storage device.

Each first computation device in the first NoC processing module includes an operation unit and a controller unit, where the operation unit includes a primary processing circuit and a plurality of secondary processing circuits. Specifically, the controller unit in the first NoC processing module obtains first operation data and a computation instruction from the first storage device.

Optionally, a plurality of first computation devices in the first NoC processing module simultaneously access the first storage device, and each first computation device reads part of data required by the first NoC processing module from the first storage device, and the data are transferred in the first NoC processing module.

Optionally, one or more first computation devices in the first NoC processing module may access the first storage device, and remaining first computation devices may only perform intra-cluster communication. Specifically, the operation data to be processed by the first NoC processing module is stored in the first storage device.

The method further includes a step 604, performing an operation on the first operation data through the plurality of the first operation devices in the first NoC processing module to obtain a first operation result; and specifically, the step includes: operating and forwarding the plurality of operation data among the plurality of first computation devices according to a corresponding computation instruction to obtain the first operation result.

The method further includes a step 606, sending the first operation result to a second NoC processing module;

specifically, the step includes sending, by the first NoC processing module, the first operation result to the second NoC processing module by using the controller unit in the first NoC processing module through a communication channel established between the first NoC processing module and the second NoC processing module.

Optionally, the first operation result may be sent to the second NoC processing module or the first storage device. Optionally, the first operation result is sent to second NoC processing module through any first computation device in any first NoC processing module which has established a communication channel with the second NoC processing module. Optionally, the first NoC processing module may send the first operation result to any second computation device in the second NoC processing module which has established a communication channel with the first NoC processing module.

Further, the NoC data processing method provided in this embodiment may be applied to any NoC processing system shown in FIGS. 9-12.

The above NoC data processing method may realize intra-module communication and inter-module data transfer among a plurality of NoC processing modules; the method may make reasonable use of operation data and intermediate operation results, and improve the efficiency of data processing.

Figure 30:
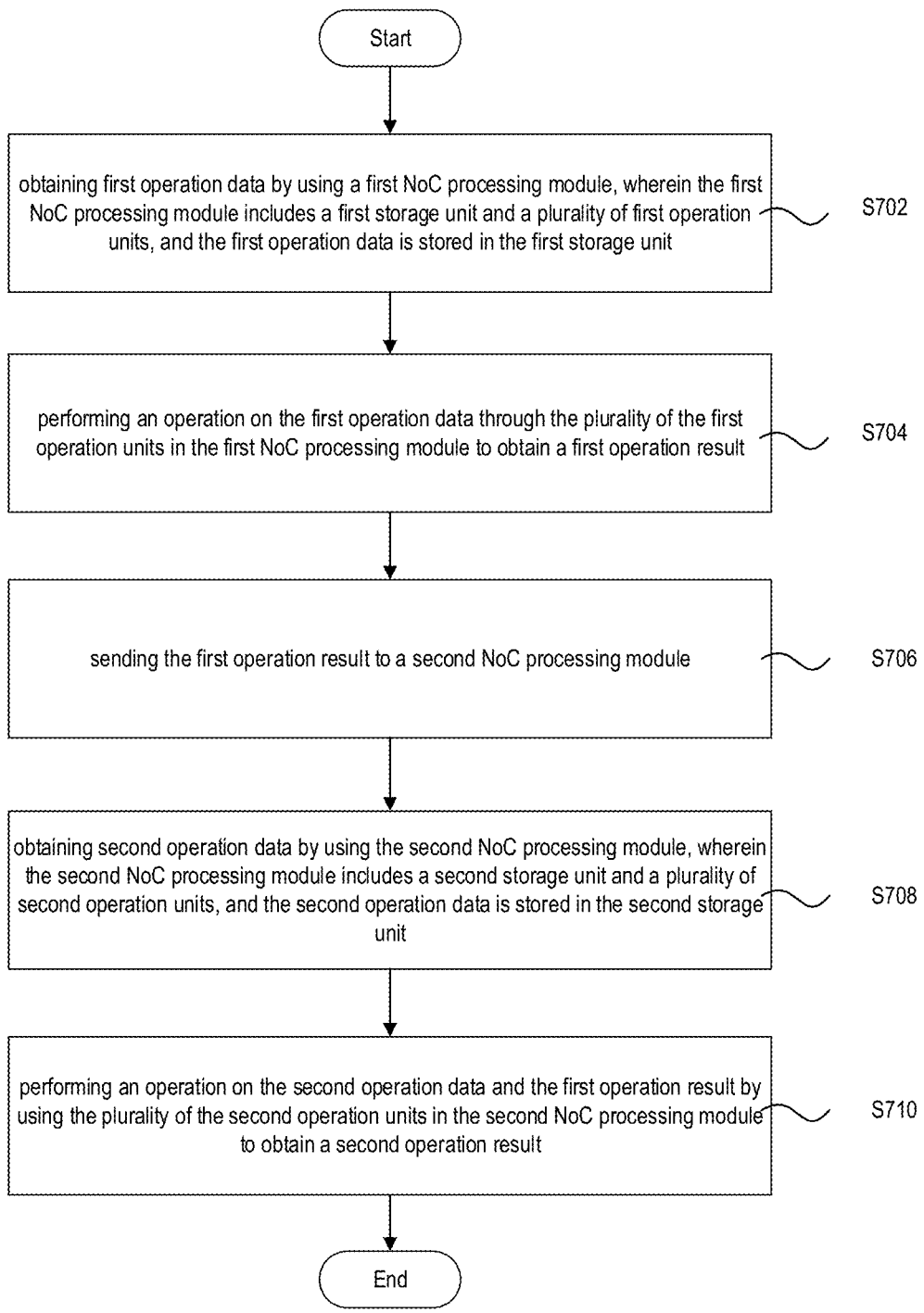
FIG. 30 is a flowchart of an NoC data processing method according to another embodiment.

In an embodiment, as shown in FIG. 30, the present disclosure provides an NoC data processing method, where the method includes:

a step 702, obtaining first operation data by using a first NoC processing module, where the first NoC processing module includes a first storage device and a plurality of first computation devices, and the first operation data is stored in the first storage device.

Each first computation device in the first NoC processing module includes an operation unit and a controller unit, where the operation unit includes a primary processing circuit and a plurality of secondary processing circuits. Specifically, the controller unit in the first NoC processing module obtains first operation data and a computation instruction from the first storage device.

Optionally, a plurality of first computation devices in the first NoC processing module simultaneously access the first storage device, and each first computation device reads part of data required by the first NoC processing module from the first storage device, and the data are transferred in the first NoC processing module.

Optionally, one or more first computation devices in the first NoC processing module may access the first storage device, and remaining first computation devices may only perform intra-cluster communication. Specifically, the operation data to be processed by the first NoC processing module is stored in the first storage device.

The method further includes a step 704, performing an operation on the first operation data through the plurality of the first operation devices in the first NoC processing module to obtain a first operation result; and specifically, the step includes: operating and forwarding the plurality of operation data among the plurality of first computation devices according to a corresponding computation instruction to obtain the first operation result.

The method further includes a step 706, sending the first operation result to a second NoC processing module;

specifically, the step includes sending, by the first NoC processing module, the first operation result to the second NoC processing module by using the controller unit in the first NoC processing module through a communication channel established between the first NoC processing module and the second NoC processing module.

Optionally, the first operation result is sent to second NoC processing module through any first computation device in any first NoC processing module which has established a communication channel with the second NoC processing module. Optionally, the first NoC processing module may send the first operation result to any second computation device in the second NoC processing module which has established a communication channel with the first NoC processing module.

The method further includes: a step 708, obtaining second operation data by using the second NoC processing module, where the second NoC processing module includes a second storage device and a plurality of second computation devices, and the second operation data is stored in the second storage device.

Each second computation device in the second NoC processing module includes an operation unit and a controller unit, where the operation unit includes a primary processing circuit and a plurality of secondary processing circuits. Specifically, the controller unit in the second NoC processing module obtains second operation data and a computation instruction from the second storage device.

Optionally, a plurality of second computation devices in the second NoC processing module simultaneously access the second storage device, and each second computation device reads part of data required by the second NoC processing module from the second storage device, and the data are transferred in the second NoC processing module.

Optionally, one or more second computation devices in the second NoC processing module may access the second storage device, and remaining second computation devices may only perform intra-cluster communication. Specifically, the operation data to be processed by the second NoC processing module is stored in the second storage device.

The method further includes a step 710, performing an operation on the second operation data and the first operation result by using the plurality of the second computation devices in the second NoC processing module to obtain a second operation result.

The step 710 specifically includes:

a step 7102, operating the second operation data and the first operation result among the plurality of the second computation devices to obtain the second operation result;

specifically, the step includes performing, by each second computation device, an operation on the second operation data and the first operation result according to a corresponding computation instruction to obtain a plurality of intermediate results, and performing an operation on the plurality of intermediate results to obtain the second operation result.

The step 7210 further includes a step 7104, storing the second operation result in the second storage device.

Further, the NoC data processing method provided in this embodiment may be applied to any NoC processing system shown in FIGS. 9-12.

The above NoC data processing method may realize multiplexing of operation data by sending the first operation result in the first NoC processing system to the second NoC processing system and the second NoC processing system using the first operation result to perform an operation again; the method may make reasonable use of operation data and intermediate operation results, and improve the efficiency of data processing.

The NoC processing method in the embodiments of the present disclosure may be used for machine learning computations, and specifically, be used for artificial neural network operations. Operation data in the NoC processing system may specifically include: input neuron data and weight data; and an operation result in the NoC processing system may specifically be: a result of the artificial neural network operation, which is output neuron data.

An operation in a neural network may be an operation of one layer of the neural network. For a multi-layer neural network, an implementation of the operation may be that, in a forward operation, after the operation of a previous layer of an artificial neural network is completed, an operation instruction of a next layer is performed by using an output neuron obtained by an operation unit as an input neuron of the next layer for operation (or some operations are performed on the output neuron before the output neuron serves as the input neuron of the next layer), and at the same time, a weight is replaced with a weight of the next layer; in a backward operation, after the back operation of a previous layer of the artificial neural network is completed, an operation instruction of a next layer is performed by using an input neuron gradient obtained by an operation unit as an output neuron gradient of the next layer for operation (or some operations are performed on the input neuron gradient before the input neuron gradient serves as the output neuron gradient of the next layer), and at the same time, a weight is replaced with a weight of the next layer.

The above machine learning computations may also include a support vector machine operation, a k-nearest neighbor (k-nn) operation, a k-means operation, a principal component analysis operation and the like. For the convenience of description, an artificial neural network operation are described below as an example to illustrate the specific solution of a machine learning operation.

For an artificial neural network operation, if the artificial neural network operation is a multi-layer operation, input neurons and output neurons of the multi-layer operation do not refer to neurons in an input layer and in an output layer of the entire neural network. For any two adjacent layers in the network, neurons in a lower layer of the network forward operation are the input neurons, and neurons in an upper layer of the network forward operation are the output neurons. For example, in a convolution neural network, if the convolution neural network has L layers, where K=1, 2, ..., L−1 for a $K^{th}$ layer and a K+$1^{th}$ layer, the $K^{th}$ layer is regarded as an input layer and neurons of the layer are the input neurons, the K+$1^{th}$ layer is regarded as an output layer and neurons of the layer are the output neurons. In other words, except a top layer, each layer may be an input layer, and a lower layer of that layer is a corresponding output layer.

In an optional embodiment, for a fully connected operation of neural network operations, a process may be: y=f (wx+b), where x is an input neuron matrix, w is a weight matrix, b is a bias scalar, f is an activation function which may be any of sigmoid, tanh, relu, and softmax function. It is assumed that there is a binary tree structure with 8 secondary processing circuits, then an implementation method may be:

obtaining, by the controller unit, the input neuron matrix x, the weight matrix w, and a fully connected operation instruction from the storage unit, and transferring the input neuron matrix x, the weight matrix w, and the fully connected operation instruction to the primary processing circuit;

determining, by the primary processing circuit, the input neuron matrix x as broadcast data, determining the weight matrix w as distribution data, partitioning the weight matrix w into 8 sub-matrices, transferring the 8 sub-matrices to the 8 secondary processing circuits through the tree module, and broadcasting the input neuron matrix x to the 8 secondary processing circuits;

multiplying and accumulating, by the secondary processing circuits, the 8 sub-matrices and the input neuron matrix x to obtain 8 intermediate results, and transferring the 8 intermediate results to the primary processing circuit; and sorting, by the primary processing circuit, the 8 intermediate results to obtain an operation result of wx, performing a bias b operation and then performing an activation operation on the operation result to obtain a final result y, sending the final result y to the controller unit; and outputting, by the controller unit, the final result y, or storing the final result y in the storage unit.

A method of performing a neural network forward operation instruction by the computation device shown in FIG. 1 may include:

fetching, by the controller unit, a neural network forward operation instruction, an operation field and at least one opcode corresponding to the neural network operation instruction from the instruction storage unit; transferring, by the controller unit, the operation field to a data access unit, and transferring the at least one opcode to the operation unit;

fetching, by the controller unit, a weight w and a bias b corresponding to the operation field from the storage unit (if b is 0, there is no need to fetch the bias b), transferring the weight w and the bias b to the primary processing circuit of the operation unit; fetching, by the controller unit, input data Xi from the storage unit, and transferring the input data Xi to the primary processing circuit;

determining, by the primary processing circuit, an operation as multiplication according to the at least one opcode, determining the input data Xi as data for broadcasting, determining the weight data as data for distribution, and partitioning the weight w into n data blocks; and determining, by the instruction processing unit of the controller unit, a multiplication instruction, a bias instruction, and an accumulation instruction according to the at least one opcode, sending the multiplication instruction, the bias instruction, and the accumulation instruction to the primary processing circuit; broadcasting, by the primary processing circuit, the multiplication instruction and the input data Xi to the plurality of secondary processing circuits, and distributing the n data blocks to the plurality of secondary processing circuits (for instance, if there are n secondary processing circuits, each secondary processing circuit receives one data block); performing, by the plurality of secondary processing circuits, multiplication on the input data Xi and the received data blocks according to the multiplication instruction to obtain intermediate results, sending the intermediate result to the primary processing circuit; accumulating, by the primary processing circuit, the intermediate results sent from the plurality of secondary processing circuits according to the accumulation instruction to obtain an accumulation result, adding the bias b to the accumulation result according to the bias instruction to obtain a final result, and sending the final result to the controller unit.

In addition, the order of addition and multiplication can be reversed.

The technical solution provided in the present disclosure may realize multiplication operations and bias operations of neural networks through an instruction (a neural network operation instruction). There is no need to store or fetch intermediate data of neural network operations. The technical solution may reduce the storing and fetching operations of intermediate data, and may have technical effects of reducing a corresponding operation step and improving outcomes of neural network operations.

With the continuous development of information technology, the demand for data access and data processing becomes higher, which leads to higher requirements for processors that process data and access data. For example, for a general-purpose processor, a multi-core processor composed of a plurality of general-purpose processor cores (such as CPU cores) has become a mainstream thanks to its powerful parallel computation capabilities.

However, with continuous development of artificial neural networks, machine learning chips with more architectures gradually come out. These machine learning chips need to access data or process data in the shared storage according to instructions during operation. When there is a large amount of data involved in data access or in the shared storage, instructions of the machine learning chips gradually become complicated, which affects the speed of reading the shared storage through instructions and thus results in low efficiency of neuron data processing.

Therefore, how to improve accelerate access speed of a machine learning chip during data access has become an urgent technical problem to be solved by current technicians.

To solve the above problem, the present disclosure provides the following technical solutions.

Figure 31:
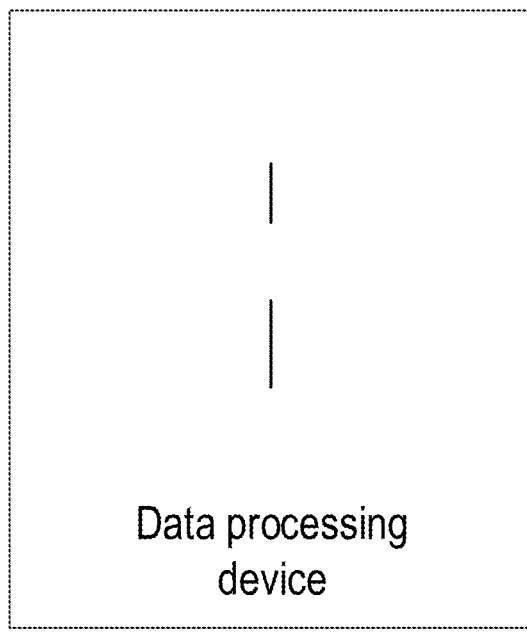
FIG. 31 is a diagram of application environment of a data processing method according to an embodiment.

The data processing method provided in the present disclosure may be applied to the hardware circuit shown in FIG. 31. The circuit includes: a machine learning device 11, a transmission circuit 12, and a shared memory 13, where the machine learning device 11 and the transmission circuit 12 are connected through an interface, and the transmission circuit 12 and the shared memory 13 are connected through an interface. The machine learning device 11, the transmission circuit 12, the shared memory 13 and the interfaces may all be implemented by a hardware circuit. For example, the machine learning device may be a device with arithmetic function formed by a plurality of machine learning units (MLU), the transmission circuit may be a broadcast bus, and the shared memory may be a non-volatile and/or volatile memory, including but not limited to a random access memory (RAM), a scratchpad memory, and the like. The form of the above hardware is not limited in the present disclosure. The transmission circuit 12 is configured to obtain input data required by the machine learning device 11 from the shared memory 13 according to a data operation signal sent by the machine learning device 11, and return the input data to the machine learning device 11. The machine learning device 11 is configured to perform a machine learning operation according to the input data to obtain output data, use the output data as new input data, and transfer the data to the shared memory 13 for data storage through the transmission circuit 12.

Figure 32:
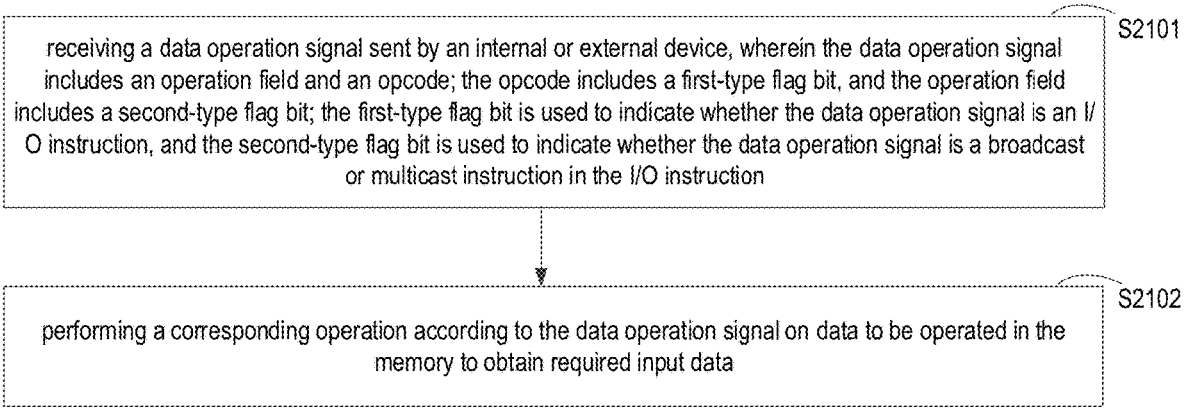
FIG. 32 is a flowchart of a data processing method according to an embodiment.

In an embodiment, FIG. 32 provides a data processing method. This embodiment describes a process of the transmission circuit determining a type of the data operation signal according to a first-type flag bit and a second-type flag bit of the data operation signal, and obtaining required data from the memory according to a corresponding operation of the determined type to improve the access speed. The method shown in FIG. 2 includes:

a step S2101, receiving a data operation signal sent by an internal or external device, where the data operation signal includes an operation field and an opcode; the opcode includes a first-type flag bit, and the operation field includes a second-type flag bit; the first-type flag bit is used to indicate whether the data operation signal is an I/O instruction, and the second-type flag bit is used to indicate whether the data operation signal is a broadcast or multicast instruction in the I/O instruction.

In this embodiment, the transmission circuit receives a data operation signal sent by an internal or external device, and the data operation signal carries the first-type flag bit and the second-type flag bit of the data operation signal, where the internal or external device may be a machine learning device connected to the transmission circuit through an interface. The machine learning device may be implemented in any form of hardware such as a device with arithmetic functions composed by a plurality of MLUs. The transmission circuit may determine whether a value of the data operation signal is an I/O instruction according to the first-type flag bit of the data operation signal carried by the data operation signal, and the second-type flag bit, and may determine whether the data operation signal is a specific type of the I/O instruction. For example, if the value of the first-type flag bit of the data operation signal is an I/O instruction, and the value of the second-type flag bit is 1, then the data operation signal is a broadcast or multicast instruction in the I/O instruction.

The method further includes a step S2102, performing a corresponding operation according to the data operation signal on data to be operated in the memory to obtain required input data.

Based on the data operation signal sent from the internal or external device to the transmission circuit in the above step S2101, the transmission circuit performs a corresponding operation on data to be operated in the memory according to a type flag bit of the data operation signal to obtain required input data such as neuron data and weight data. The neuron data and weight data are data required by an internal or external device. For example, when the internal or external device is a machine learning device, the neuron data and weight data are input data required when the machine learning device performs a machine learning operation. The above data may be data pre-stored in the memory, or may be data output by the machine learning device after the machine learning operation is executed, which is not limited herein.

The method further includes a step S2102, performing a corresponding operation according to the data operation signal on data to be operated in the memory to obtain required input data. In this embodiment, since the data operation signal carries the first-type flag bit and the second-type flag bit, the transmission circuit may determine a specific type of the data operation signal according to the first-type flag bit and the second-type flag bit of the data operation signal after receiving the data operation signal, and then perform a corresponding operation on the data to be operated in the memory. In this way, classification of the type flag bits of the data operation signal may quickly locate a corresponding operation, which may simplify the data access logic, improve the data access efficiency, and greatly improve the access speed of the machine learning chip during data access.

Several embodiments are used to introduce the opcode and the operation field, as well as relationships among the opcode, the operation field, the type flag bit of the data operation signal, information of data to be operated, and the data reception flag bit.

In an embodiment, the operation field further includes a data reception flag bit which is used to indicate a device or a processing circuit that receives the input data. Optionally, a count of data reception flag bits represents a count of devices or processing circuits that can interact with the memory. Optionally, if a value of the first-type flag bit is I/O, the data operation signal is determined to be an I/O instruction; if a value of the second-type flag bit is 1, the data operation signal is determined to be a broadcast or multicast instruction in the I/O instruction.

In this embodiment, the opcode of the data operation signal is used to indicate an operation type of the data operation signal, which includes the first-type flag bit of the data operation signal. The operation field is used to store required data information of the data operation signal during execution, which includes the second-type flag bit. For example, if the value of the first-type flag bit of the data operation signal in the opcode is I/O, then the data operation signal is an I/O instruction; if the value of the second-type flag bit of the data operation signal is 1, then the data operation signal is a broadcast or multicast instruction in the I/O instruction. It should be noted that determining the data operation signal to be a broadcast or multicast instruction in the I/O instruction if the value of the second-type flag bit in this embodiment is 1 is only an implementation. According to actual needs of the user, the data operation signal may also be determined to be a broadcast or multicast instruction in the I/O instruction if the value of the second type flag is 0 or other identifiers, which is not limited herein. The data receiving flag indicates a device or a processing circuit that can input data (such as input neuron data and weight data)

in an internal or external device. The device may be a machine learning device or an MLU, and the processing circuit may be an operation unit, or a primary processing circuit or a secondary processing circuit of the operation unit, which is not limited herein. A count of data reception flag bits represents a count of devices or processing circuits that can interact with the memory. For example, if there are 3 MLUs (machine learning units) in the data reception flag bits in the operation field are flagged as 1, then the 3 MLUs can receive data; and if one MLU is flagged as 0, then the one MLU cannot receive data. It should be noted that the MLU that receives data being flagged as 1 is just an embodiment. The user can flag the MLU that can receive data as 0 or other identifiers according to actual needs, which is not limited herein.

In this way, the transmission circuit may determine a specific type of the data operation signal according to the first-type flag bit and the second-type lag bit of the data operation signal, locate a corresponding operation, and determine a target device for sending operated data according to the data reception flag bit, which may simplify the data access logic, improve the data access efficiency, and greatly improve the access speed of the machine learning chip during data access.

Figure 33:
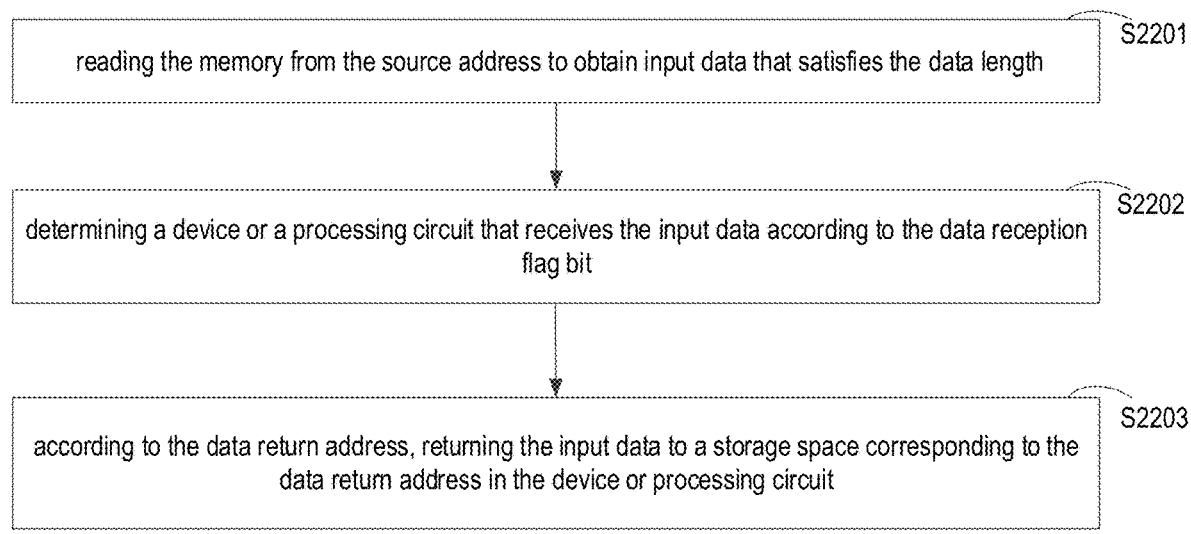
FIG. 33 is a flowchart of a data processing method according to an embodiment.

In another embodiment, the operation field further includes information of data to be operated, where the information of the data to be operated includes a source address of the data to be operated in the memory, a length of the data to be operated, and a data return address after the data is operated. As shown in FIG. 33, a data processing method is provided, and this embodiment includes a specific process of a transmission circuit reading data in the memory according to data information carried in the data operation signal and returning read data to a device or a processing circuit according to the data operation information. The above step S2102 includes:

a step S2201, reading the memory from the source address to obtain input data that satisfies the data length.

In this embodiment, since the information of the data to be operated of the data operation signal carries the source address of the data to be operated in the memory, the length of the data to be operated, and the data return address of the operated data, the transmission circuit starts to read data from the source address in the memory, and reads data that satisfies a length of data to be operated according to a preset rule, where the length of the data to be operated is set by the user according to actual situations, which is not limited herein. The above step of the transmission circuit obtaining input data and data that satisfy the data length specifically includes reading data that satisfies the data length from the memory according to the preset rule. The preset rule is set by the user according to actual situations, which is not limited herein. For example, the data may be read one by one starting from the source address until a length of the read data satisfies the data length.

The step S2101 further includes a step S2202, determining a device or a processing circuit that receives the input data according to the data reception flag bit.

Based on the input data that satisfies the data length obtained by the transmission circuit in the above step S2201, the transmission circuit determines a device or a processing circuit to which the data is returned according to the data reception flag bit in the data signal. For example, when the device is a machine learning device, the transmission circuit determines that the data is returned to one or more target machine learning units in the machine learning device according to the data reception flag bit.

The step S2101 further includes S2203, according to the data return address, returning the input data to a storage space corresponding to the data return address in the device or processing circuit.

In this step, based on the device or the processing circuit to which the data is to be returned and that is determined in the above steps, the transmission circuit returns the input data to a storage space corresponding to the data return address in the device or processing circuit according to the data return address in the information of the data to be operated in the data operation signal, where the data return address in the information of the data to be operated may be addresses in a plurality of target machine learning units in the machine learning device.

Optionally, as shown in the following Table 3 and on a basis of the above embodiments, if a value of the first-type flag bit is I/O, the data operation signal is determined to be an I/O instruction; if a value of the second-type flag bit of is 1, the data operation signal is determined to be a broadcast or multicast instruction in the I/O instruction. Correspondingly, if a value of the flag bit of the second type is 0, the data operation signal is determined not to be a broadcast or multicast instruction. The data information to be operated in the operation field includes a source address 0x110011, a destination address 0x000100, and a data length 0x0100. The data length is a length set by the user. The user may set the length to a value or a plurality of values, which is not limited herein. In the data reception flag bit in the operation field, three MLUs are flagged as 1, which means that the three MLUs may receive data; and one MLU is flagged as 0, which means that the MLU cannot receive data. Specifically, the transmission circuit reads data with a length of 0x0100 from the address 0x110011 in the shared memory according to the data operation signal, and then writes the data to the address 0x000100 of MLU3, MLU1, and MLU0 in the machine learning device.

TABLE 3

| | Operation field | | | | | | | |
|---|---|---|---|---|---|---|---|---|
| | Whether it is a | Flag whether MLU receives data | | | | Data information | | |
| Opcode | broadcast/ | | | | | Source | Target | Data |
| I/O | multicast instruction | MLU3 | MLU2 | MLU1 | MLU0 | address | address | length |
| I/O | 1 | 1 | 0 | 1 | 1 | 0x110011 | 0x000100 | 0x0100 |

In the data processing method provided in this embodiment, the transmission circuit starts reading the memory from the source address according to the data operation signal, obtains input data that satisfies the data length, determines the device or processing circuit that receives the input data according to the data reception flag bit, and then returns the input data to the storage space corresponding to the data return address in the device or processing circuit according to the data return address. In this embodiment, the transmission circuit reads data according to a reading rule indicated by data operation information in the data operation signal when obtaining input neuron data and weight data that satisfies the data length, which simplifies the data reading logic of the transmission circuit, improves the data access efficiency, and greatly improves the access speed of the machine learning chip during data access.

Optionally, in the embodiment shown in FIG. 33, the device includes at least one machine learning unit, where each machine learning unit includes a primary processing circuit and a plurality of secondary processing circuits. Data signal operations performed by the at least one machine learning unit (MLU) included in the machine learning device may share a same data receiving interface. The machine learning unit may be connected to the transmission circuit through a sending interface and a shared data receiving interface. It should be noted that both the sending interface and the shared data receiving interface may be implemented by hardware circuits, and types of the sending interface and the shared data receiving interface are not limited herein. Each machine learning unit includes a primary processing circuit and a plurality of secondary processing circuits, where the primary processing circuit is configured to distribute input data (neuron data and weight data) to the plurality of secondary processing circuits, and the plurality of secondary processing circuits are configured to perform intermediate operations in parallel according to the input data transferred by the primary processing circuit to obtain a plurality of intermediate results, and transfer the plurality of intermediate results to the primary processing circuit. In this way, the device may assign each of the above machine learning units to respectively process neurons in each machine learning unit and output corresponding output data. The above computation manner of performing a neural network computation in parallel layer by layer may realize parallel processing of neural network computation, which improves the processing efficiency.

Figure 34:
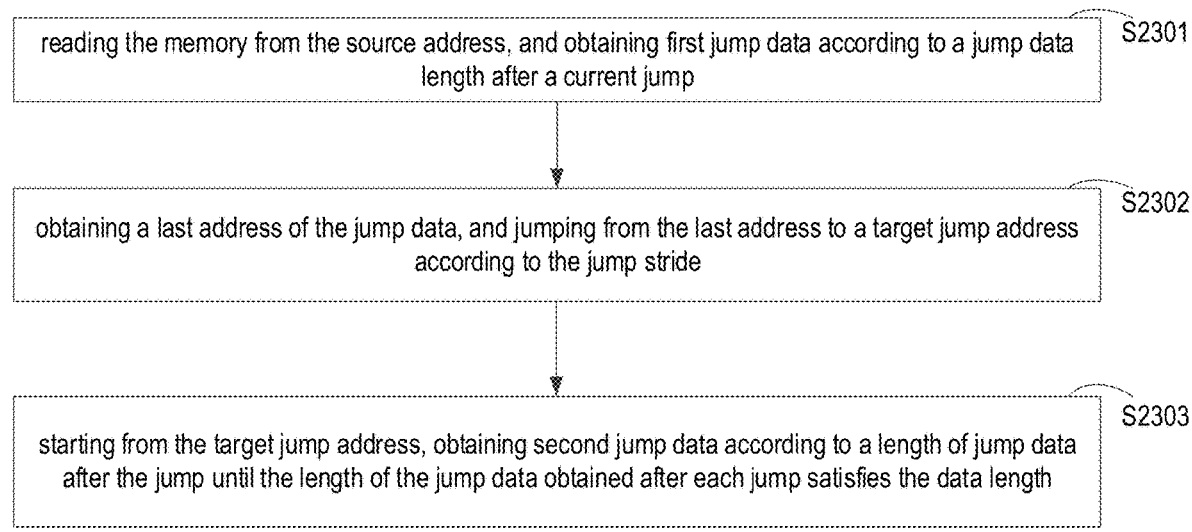
FIG. 34 is a flowchart of a data processing method according to an embodiment.

On the basis of the above embodiment, the operation field further includes a jump sub-operation-field, and the jump sub-operation-field includes a jump stride length and a jump data length operated after each jump. As shown in FIG. 34, a data processing method is provided, and this embodiment describes a specific process of a transmission circuit reading data in a memory according to a jump sub-operation field in an operation field. The above step S2201 includes:

a step S2301, reading the memory from the source address, and obtaining first jump data according to a jump data length after a current jump.

In this embodiment, the operation field of the data operation signal includes a jump sub-operation-field, where the jump sub-operation-field is used to instruct the transmission circuit to read information of the data to be operated according to the data operation signal and a rule of the sub-operation-field. Optionally, the jump sub-operation-field includes a stride operation field and/or a segment operation field, where the stride operation field is used to indicate a stride for each jump of the data operation signal, and the segment operation field is used to indicate a preset size for each segment of the data operation signal. It should be noted that for the stride operation field and the segment operation field, the length and the name in the embodiments of the present disclosure are only listed as examples, which are not limited herein. The jump sub-operation-field includes a jump stride and a jump data length operated after each jump, where the jump data length may be a preset data length. Specifically, the transmission circuit starts reading the memory from the source address in the information of the data to be operated, and after a current jump, determines data with a read jump data length to be first jump data. The first jump data refers to data obtained after the transmission circuit jumps data with a preset length when reading data, where the preset length is set by the user according to actual situations, which is not limited herein.

The above step S2201 further includes a step S2302, obtaining a last address of the jump data, and jumping from the last address to a target jump address according to the jump stride. Based on the first jump data read in the step S2301, the transmission circuit obtains a last address of the first jump data, and according to a jump stride in the jump sub-operation-field, starts jumping a length of the jump stride from the last address of the first jump data to a target jump address. It can be understood that a length between the last address of the first jump data and the target jump address is a jump stride in the jump sub-operation-field.

The above step S2201 further includes a step S2303, starting from the target jump address, obtaining second jump data according to a length of jump data after the jump until the length of the jump data obtained after each jump satisfies the data length.

In this step, during reading data, the transmission circuit starts jumping data with a preset length from the target jump address determined in the above step S2302, and determines data obtained after the jump as second jump data. If the length between an address of the second jump data and the source address where the jump starts satisfies a length of data required by the machine learning device, it is indicated that the reading the data required by the machine learning device is completed. If the length between an address of the second jump data and the source address where the jump starts does not satisfy a length of data required by the machine learning device, the transmission circuit continues to jump from the last address of the second jump data according to a jump order in the above steps S2301 to S2303 to read the data until the length between the address of the second jump data and the source address where the jump starts satisfies the length of the data required by the machine learning device, it is indicated that the reading the data required by the machine learning device is completed).

For example, as shown in Table 4 below, a process of the transmission circuit reading data in this embodiment is as follows: if the operation field further includes a stride operation field, which is a jump sub-operation-field, the transmission circuit starts reading data in the shared memory from a source address 0x110011 in the data information in an order of reading data with a preset length (the preset length is less than a data length 0x0100 in the data information shown in the table below), jumping to an address of data with a stride length (0x0008), and then reading data with a preset length. The data is read in the above order until a total length of the data read is a data length 0x0100 in the data information shown in Table 4 below, then it is indicated that the data reading is completed. If the operation field further includes a segment operation field, which is a jump sub-operation-field, the transmission circuit starts reading data in the shared memory from a source address 0x110011 in the data information in an order of reading data with a preset length (the preset length is less than a data length 0x0100 in the data information shown in the table below), jumping to an address of data with a stride length (0x0008), and then reading data with a preset length. The data is read in the above order until a total length of the data read reaches a data length 0x0100 in the data information shown in Table 3 below, then it is indicated that the data reading is completed. It should be noted that if the jump sub-operation-field only includes the segment operation field without stride operation field, the transmission circuit starts reading data with a segment length (0x0010) from the source address 0x110011 when reading data until a total length of the data read reaches a data length 0x0100 in the data information shown in Table 4 below, then it is indicated that the data reading is completed.

TABLE 4

| | Operation field | | | | | | | |
|---|---|---|---|---|---|---|---|---|
| | Flag whether MLU receives data | | | | Data information | | | Data jump information |
| Opcode | MLU3 | MLU2 | MLU1 | MLU0 | Source address | Target address | Data length | Stride | Segment |
| CAST | 1 | 0 | 1 | 1 | 0x110011 | 0x000100 | 0x0100 | 0x0008 | 0x0010 |

In the data processing method provided in this embodiment, the transmission circuit starts reading the shared memory from the source address, obtains the first jump data according to the jump data length obtained after the current jump, starts jumping from the last address of the first jump data to the target jump address according to the jump stride, and then starting from the target jump address, obtains the second jump data according to the jump data length obtained after the jump until the jump data length obtained after each jump satisfies the data length. In this way, when the operation field includes the jump sub-operation-field, the transmission circuit reads data according to the jump rule of the sub-operation-field, which simplifies the data reading logic of the transmission circuit, improves the data access efficiency, and greatly improves the access speed of the machine learning chip during data access.

Figure 35:
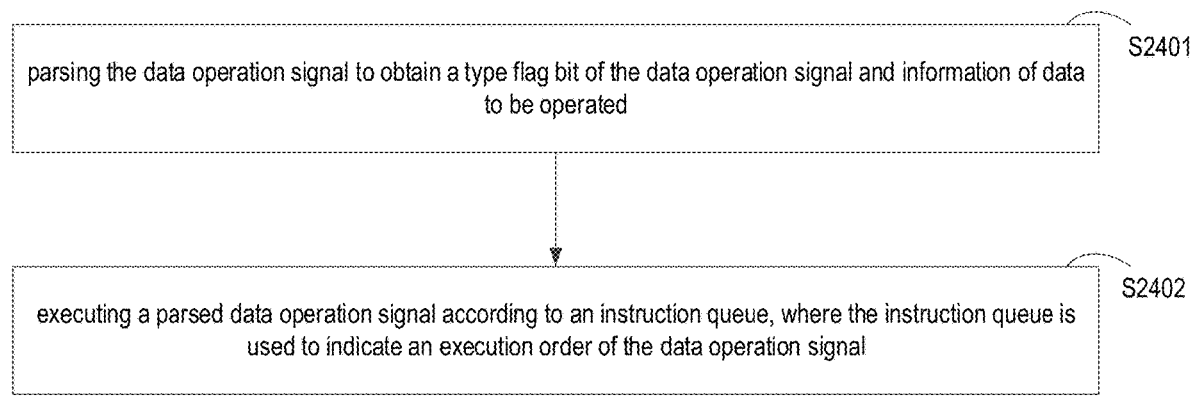
FIG. 35 is a flowchart of a data processing method according to an embodiment.

When the transmission circuit performs an operation according to a received data operation signal, the received data operation signal is an encoding instruction and needs to be first decoded and parsed. Therefore, an embodiment of the present disclosure provides a data processing method. As shown in FIG. 35, the method of the transmission circuit in the data processing device receiving a data operation signal sent by the machine learning device in the data processing device includes:

a step S2401, parsing the data operation signal to obtain a type flag bit of the data operation signal and information of data to be operated.

It should be noted that there are generally a large number of data operation signals in the process of data processing. When the transmission circuit processes one of the data operation signals, other data operation signals need to be stored. Specifically, the transmission circuit parsing the data operation signal includes parsing data information carried in the data operation signal and the type flag bit of the data operation signal. The data operation information may include a length of data to be operated, a target address, an original address, and the like, which is not limited herein.

The method further includes a step S2402, executing a parsed data operation signal according to an instruction queue, where the instruction queue is used to indicate an execution order of the data operation signal.

It should be understood that the data operation signal needs to be executed in order. In the above step S401, the transmission circuit parses the data operation signal to obtain data operation information and a type flag bit, and then the transmission circuit executes the parsed data operation signal according to an instruction queue.

In the data processing method provided in this embodiment, a transmission circuit parses a data operation signal to obtain a type flag bit of the data operation signal and information of data to be operated, and then the transmission circuit executes the parsed data operation signal according to an instruction queue. In this way, before executing the data operation signal, the transmission circuit parses the data operation signal first and then perform the execution in order, which greatly improves the speed of the transmission circuit performing an execution according to the data operation signal.

Figure 36:
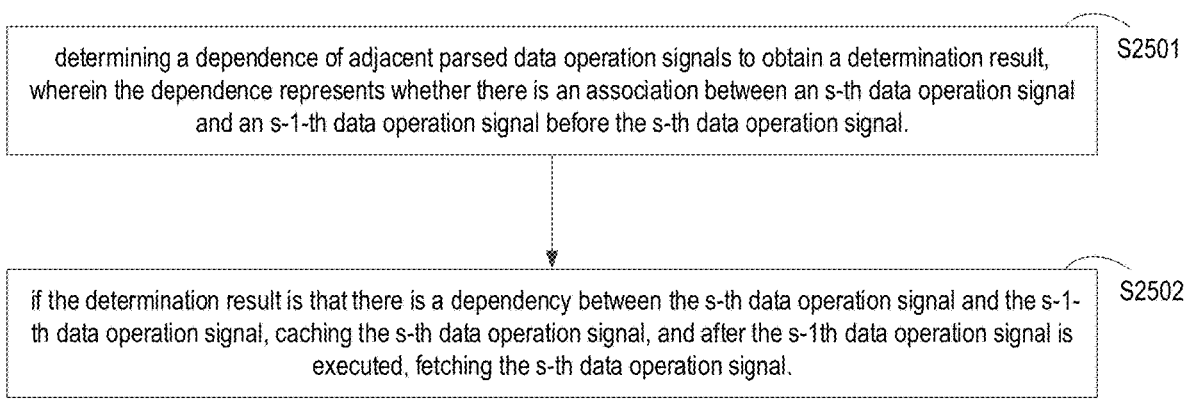
FIG. 36 is a flowchart of a data processing method according to an embodiment.

Since the transmission circuit needs to execute the data operation signals that are related to each other when executing the data operation signals in the sequence of the queue, the embodiment of the present application provides another embodiment, as shown in FIG. 36, in the transmission circuit, before executing the parsed data operation signal according to the instruction queue, the method further includes:

a step S2501, determining a dependency of adjacent parsed data operation signals to obtain a determination result, where the dependency represents whether there is an association between an $s^{th}$ data operation signal and an $s-1^{th}$ data operation signal before the $s^{th}$ data operation signal.

The transmission circuit needs to determine a dependency of adjacent parsed data operation signals, and determine whether there is an association between the two adjacent data operation signals to be processed according to a determination result, where the $s^{th}$ data operation signal represents any signal in the data operation signals instead of a specific signal. The $s-1^{th}$ data operation signal represents a previous signal of the $s^{th}$ data operation signal.

Optionally, an implementation of the transmission circuit determining a dependency of the adjacent parsed data operation signals includes: fetching a first storage address interval of data required in the $s^{th}$ data operation signal according to the $s^{th}$ data operation signal, fetching a zeroth storage address interval of data required in the $s-1^{th}$ data operation signal according to the $s-1^{th}$ data operation signal, respectively; if the first storage address interval and the zeroth storage address interval have an overlapping area, determining that there is an association between the 5th data operation signal and the $s-1^{th}$ data operation signal; and if the first storage address interval and the zeroth storage address interval do not have an overlapping area, determining that there is no association between the $s^{th}$ data operation signal and the $s-1^{th}$ data operation signal. Optionally, the transmission circuit determines a dependency of the adjacent parsed data operation signals according to a relationship between the first storage address interval of data required in the 5th data operation signal and the zeroth storage address interval of the $s-1^{th}$ data operation signal; the determination manner may be: if the first storage address interval and the zeroth storage address interval do not have an overlapping area, determining that there is no dependency between the 5th data operation signal and the $s-1^{th}$ data operation signal, and if the first storage address interval and the zeroth storage address interval have an overlapping area, determining that there is a dependency between the $s^{th}$ data operation signal and the $s-1^{th}$ data operation signal.

The method further includes a step S2502, if the determination result is that there is a dependency between the $s^{th}$ data operation signal and the $s-1^{th}$ data operation signal, caching the $s^{th}$ data operation signal, and after the $s-1^{th}$ data operation signal is executed, fetching the $s^{th}$ data operation signal.

Based on the dependency of two adjacent data operation signals determined by the transmission circuit in the above steps, the data operation signals are executed in order; if the determination result is that there is a dependency between the $s^{th}$ data operation signal and the $s-1^{th}$ data operation signal, the transmission circuit first caches the $s^{th}$ data operation signal, and after the $s-1^{th}$ data operation signal is executed, fetches the $s^{th}$ data operation signal.

In the data processing method provided in this embodiment, the transmission circuit ensures continuity of the data operation signals by determining an association between two adjacent data operation signals. In this way, orderly preparations in the early stage ensure subsequent operations to be executed smoothly according to the data operation signal, which improves the data access efficiency and greatly improve the access speed of the machine learning chip during data access.

Since a format of data read by the transmission circuit according to the data operation signal is not a format required by the machine learning device, the transmission circuit needs to perform certain processing on the read data before transferring the data to the machine learning device. Optionally, the operation field further includes a function flag bit which is used to indicate operations performed on the read data. The operation field of the data operation signal includes a function flag bit, which indicates that the transmission circuit needs to process the read data according to the function flag. There may be one or a plurality of function flag bits included in the operation field, which is not limited in this embodiment. For example, the function flag bit is an adding decompression flag bit, then if the flag bit is 1, the transmission circuit needs to decompress the read data and transfer the data to a designated MLU in the machine learning device. For another example, the function flag bit is an encryption flag bit, then if the encryption flag bit is 1, the transmission circuit needs to decompress the read data and then transfer the data to a designated MLU in the machine learning device. In this embodiment, the transmission circuit may first perform corresponding processing on the read data according to the function flag bit in the operation field of the data operation signal, and then transfer the data to the machine learning device, so that the machine learning device may immediately identify and perform an operation on the received data, which may improve data processing efficiency and thus greatly improving the access speed of the machine learning chip during data access.

An embodiment of the present disclosure provides a data processing device, where the device includes a processor and a memory. The memory stores a computer program, and the processor implements the following steps when executing the computer program:

receiving a data operation signal sent by an internal or external device, where the data operation signal includes a type flag bit which is used to indicate a broadcast or multicast instruction of the data operation signal; and performing a corresponding operation according to the data operation signal on data to be operated in the memory to obtain required input data.

The implementation principles and technical effects of the data processing device provided in this embodiment are similar to those of the foregoing embodiments of the data processing method, which will not be further described herein.

Figure 37:
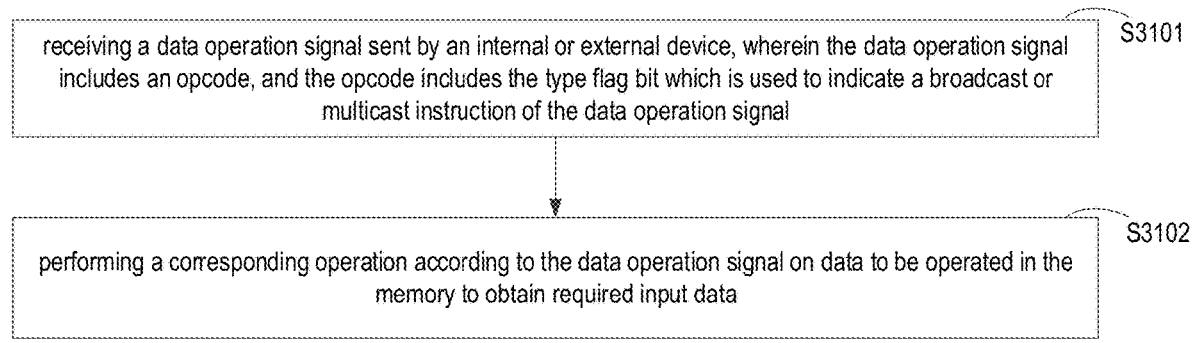
FIG. 37 is a flowchart of a data processing method according to an embodiment.

In an embodiment, FIG. 37 provides a data processing method. This embodiment describes a process of the transmission circuit determining a type of the data operation signal according to a type flag bit of the data operation signal, and obtaining required data from the memory according to a corresponding operation of the determined type to improve the access speed. The method shown in FIG. 37 includes:

a step S3101, receiving a data operation signal sent by an internal or external device, where the data operation signal includes an opcode, and the opcode includes the type flag bit which is used to indicate a broadcast or multicast instruction of the data operation signal.

In this embodiment, the transmission circuit receives a data operation signal sent by an internal or external device, and an opcode of the data operation signal is used to indicate an operation type of the data operation signal and includes a type flag bit of the data operation signal. The internal or external device may be a machine learning device connected to the transmission circuit through an interface. The machine learning device may be implemented in any form of hardware such as a device with arithmetic functions composed by a plurality of MLUs. The transmission circuit may determine a type of the data operation signal according to a type flag bit of the data operation signal carried by the data operation signal. For example, if a value of the type flag bit of the data operation signal is 1, the data operation signal is determined to be a broadcast or multicast instruction.

The method further includes a step S3102, performing a corresponding operation according to the data operation signal on data to be operated in the memory to obtain required input data.

Based on the data operation signal sent from the internal or external device to the transmission circuit in the above step S3101, the transmission circuit performs a corresponding operation on data to be operated in the memory according to a type flag bit of the data operation signal to obtain required input data such as neuron data and weight data. The neuron data and the weight data are data required by the internal or external device. For example, when the internal or external device is a machine learning device, the neuron data and the weight data are data to be input by the machine learning device when the device performs a machine learning operation. The above data may be data pre-stored in the memory, or may be data output by the machine learning device after the machine learning operation is executed, which is not limited herein.

In the data processing method provided in the embodiment, the transmission circuit performs a corresponding operation on data to be operated in the memory according to a data operation signal which carries a type flag bit of the data operation signal and is sent by the internal or external device to obtain required input data. In this embodiment, since the data operation signal carries a type flag bit of the data operation signal, the transmission circuit may determine a specific type of the data operation signal according to the type flag bit of the data operation signal after receiving the data operation signal, and then perform a corresponding operation on the data to be operated in the memory. In this way, classification of the type flag bits of the data operation signal may quickly locate a corresponding operation, which may simplify the data access logic, improve the data access efficiency, and greatly improve the access speed of the machine learning chip during data access.

Several embodiments are used to introduce the opcode and the operation field, as well as relationships among the opcode, the operation field, the type flag bit of the data operation signal, information of data to be operated and the data reception flag bit.

In an embodiment, the data operation signal further includes an operation field, where the operation field further includes a data reception flag bit which is used to indicate a device or a processing circuit that receives the input data. Optionally, a count of data reception flag bits represents a count of devices or processing circuits that can interact with the memory. Optionally, if a value of the type flag bit is CAST, the data operation signal is determined to be a broadcast or multicast instruction.

In this embodiment, an opcode of a data operation signal is used to indicate an operation type of the data operation signal, and includes a type flag bit of the data operation signal. For example, if the type flag bit of the data operation signal in the opcode is CAST, it is indicated that the data operation signal is a broadcast or multicast instruction. The operation field is used to store data information required during the execution of the data operation signal, and may include a data reception flag bit. The data reception flag bit indicates a device or a processing circuit that can receive input data in an internal or external device. The device may be a machine learning device or an MLU, and the processing circuit may be an operation unit, or a primary processing circuit or a secondary processing circuit of the operation unit, which is not limited herein. A count of data reception flag bits represents a count of devices or processing circuits that can interact with the memory. For example, if there are 3 MLUs (machine learning units) in the data reception flag bits in the operation field are flagged as 1, then the 3 MLUs can receive data; and if one MLU is flagged as 0, then the one MLU cannot receive data. It should be noted that flagging the MLU that can receive data as 1 is just an embodiment. The user can flag the MLU that can receive data as 0 or other identifiers according to actual needs, which is not limited herein.

In this way, the transmission circuit may determine a specific type of the data operation signal according to a type lag bit of the data operation signal, locate a corresponding operation, and determine a target device for sending operated data according to the data reception flag bit, which may simplify the data access logic, improve the data access efficiency, and greatly improve the access speed of the machine learning chip during data access.

For example, as shown in Table 5 below and on the basis of the above embodiments, an example of the embodiment may be: if the type flag bit of the data operation signal in the opcode is CAST, it is indicated that the data operation signal is a broadcast or multicast instruction; information of data to be operated in the operation field includes a source address 0x110011, a destination address 0x000100, and a data length 0x0100. The data length is a length set by the user. The user may set the length to a value or a plurality of values, and a specific value and a count of the set length are not limited herein. In the data reception flag bit in the operation field, three MLUs are flagged as 1, which means that the three MLUs can receive data; and one MLU is flagged as 0, which means that the MLU cannot receive data. Specifically, the transmission circuit reads data with a length of 0x0100 from the address 0x110011 in the shared memory according to the data operation signal, and then writes the data to the address 0x000100 of MLU3, MLU1, and MLU0 in the machine learning device.

TABLE 5

| | Operation field | | | | | | |
|---|---|---|---|---|---|---|---|
| | Flag whether MLU receives data | | | | Data information | | |
| Opcode CAST | MLU 3 | MLU 2 | MLU 1 | MLU 0 | Source address | Target address | Data length |
| CAST | 1 | 0 | 1 | 1 | 0x110011 | 0x000100 | 0x0100 |

In the data processing method provided in this embodiment, the transmission circuit starts reading the memory from the source address according to the data operation signal, obtains input data that satisfies the data length, determines the device or processing circuit that receives the input data according to the data reception flag bit, and then returns the input data to the storage space corresponding to the data return address in the device or processing circuit according to the data return address. In this embodiment, the transmission circuit reads data according to a reading rule indicated by data operation information in the data operation signal when obtaining input input data that satisfies the data length, which simplifies the data reading logic of the transmission circuit, improves the data access efficiency, and greatly improves the access speed of the machine learning chip during data access.

In an embodiment, as shown in FIG. 31, a data processing device provided in an embodiment of the present application may be part or all of the data processing device shown in FIG. 31, which may be implemented by software, hardware, or a combination of software and hardware. The data processing device 10 is configured to perform machine learning data processing. The data processing device 10 includes: a machine learning device 11, a transmission circuit 12, and a shared memory 13. The machine learning device 11 is connected to the transmission circuit 12, and the transmission circuit 12 is connected to a shared memory 13; the transmission circuit 12 is configured to obtain input data required by the machine learning device 11 from the shared memory 13 according to the data operation signal sent by the machine learning device 11, and return the input data to the machine learning device 11; and the data operation signal carries a type flag bit of a data operation signal and information of data to be operated. Optionally, the machine learning device 11 is configured to perform a machine learning operation according to the input data to obtain output neuron data, use the output neuron data as new input neuron data, and transfer the new input data to the shared memory 13 through the transmission circuit 12 for data storage.

It should be noted that the above machine learning device, the transmission circuit, and the shared memory may all be implemented by hardware circuits. For example, the machine learning device may be a device with arithmetic function formed by a plurality of machine learning units (MLU), the transmission circuit may be a broadcast bus, and the shared memory may be a non-volatile and/or volatile memory, including but not limited to a random access memory (RAM), a scratchpad memory, and the like. The above machine learning device, the transmission circuit, and the shared memory perform data transfer among each other through an interface. For example, the machine learning device may send data operation signals through the interface, or may send or receive data through the interface. Correspondingly, the interface may be either a sending interface or a receiving interface. In other words, when the interface is a sending interface, the machine learning device may send data operation signals or data to the transmission circuit; when the interface is a receiving interface, the machine learning device may receive data operation signals or data sent by the transmission circuit. The interface may be various types of interfaces, where the various types of interfaces may all be implemented by means of hardware circuits. Specific hardware forms of the various types of interfaces are not limited in the embodiment, as long as data signal interaction among a machine learning device, a transmission circuit, and a shared memory can be implemented through the interface. The input data is data that the machine learning device needs to input when performing a machine learning operation, and, for example, may be input neuron data and weight data. The above data may be data pre-stored in the shared memory, or may be data output by the machine learning device after the machine learning operation is executed. Optionally, the machine learning device may be directly connected to the shared memory through a plurality of data I/O interfaces or I/O pins to obtain the above data. Optionally, the machine learning device may also be connected to the transmission circuit through a plurality of data I/O interfaces or I/O pins, and then be connected to the shared memory through the transmission circuit to obtain the above data.

The data operation signal may indicate that the transmission circuit performs a read or write operation on the data in the shared memory. When the data operation signal sent by the machine learning device is a read operation, the transmission circuit may find data in a corresponding address from the shared memory, read the data, and then return the data to the machine learning device that sends the data operation signal; when the data operation signal sent by the machine learning device is a write operation, the transmission circuit may write the write data output by the machine learning device into the shared memory. An data operation signal carries a type flag bit of the data operation signal and information of data to be operated, where the type flag bit of the data operation signal indicates a type of the data operation signal. For example, if the type flag bit of the data operation signal is CAST, it is indicated that the data operation signal is a broadcast or multicast instruction. The information of the data to be operated indicates data required by the transmission circuit when the transmission circuit performs a corresponding operation according to the data operation signal. A specific form of the type flag bit of the data operation signal and specific data information in the information of the data to be operated are not limited herein and cmay be determined according to actual situations.

It should be noted that the data processing device provided in the present disclosure is applied to a machine learning operation, where the machine learning operation includes a neural network operation, a k-means operation, a support vector machine operation, and the like. For example, an operation performed by a machine learning device in a neural network may be an operation of one layer of the neural network. For a multi-layer neural network, an implementation of the operation may be that, in a forward operation, after the operation of a previous layer of an artificial neural network is completed, an operation instruction of a next layer is performed by using an output neuron obtained by an operation unit as an input neuron of the next layer for operation (or some operations are performed on the output neuron before the output neuron serves as the input neuron of the next layer), and at the same time, a weight is replaced with a weight of the next layer; in a backward operation, after the back operation of a previous layer of the artificial neural network is completed, an operation instruction of a next layer is performed by using an input neuron gradient obtained by an operation unit as an output neuron gradient of the next layer (or as output neuron data) for operation (or some operations are performed on the input neuron gradient before the input neuron gradient serves as the output neuron gradient of the next layer), and at the same time, a weight is replaced with a weight of the next layer. Optionally, the neural network in the embodiment of the present disclosure may not only be an artificial neural network, but also a spiking neural network, which is not limited in this embodiment. The machine learning device provided in this embodiment may perform a machine learning operation according to input data. For example, in a machine learning operation, for a multi-layer neural network, a machine learning device may compute neuron data output by each layer of neural network, and perform an operation set including a series of machine learning operations such as a product operation, a sum operation, and a function operation on a plurality of input data corresponding to an input of each layer of neural network. The machine learning device obtains output neuron data of a current layer through the machine learning operation. The output neuron data may be used as input neuron data of a next layer of neural network for another machine learning operation, before which the output neuron data of the current layer may be written into the shared memory through the transmission circuit for storage, so that the machine learning device may read the data at any time for the machine learning operation.

Specifically, in actual applications, the transmission circuit is configured to obtain input data required by the machine learning device from the shared memory according to a data operation signal sent by the machine learning device, and return the input data to the machine learning device; then the machine learning device is configured to perform a machine learning operation according to the input data to obtain output data, use the output data as new input data, and transfer the data to the shared memory for data storage through the transmission circuit. In this embodiment, since the data operation signal carries a type flag bit of the data operation signal and the information of the data to be operated, the transmission circuit may determine a specific type of the data operation signal according to the type flag bit of the data operation signal after receiving the data operation signal, and then perform an operation according to the information of the data to be operated carried in the data operation signal. In this way, classification of the type flag bits of the data operation signal may quickly locate a corresponding operation, which may simplify the data access logic, improve the data access efficiency, and greatly improve the access speed of the machine learning chip during data access.

Figure 38:
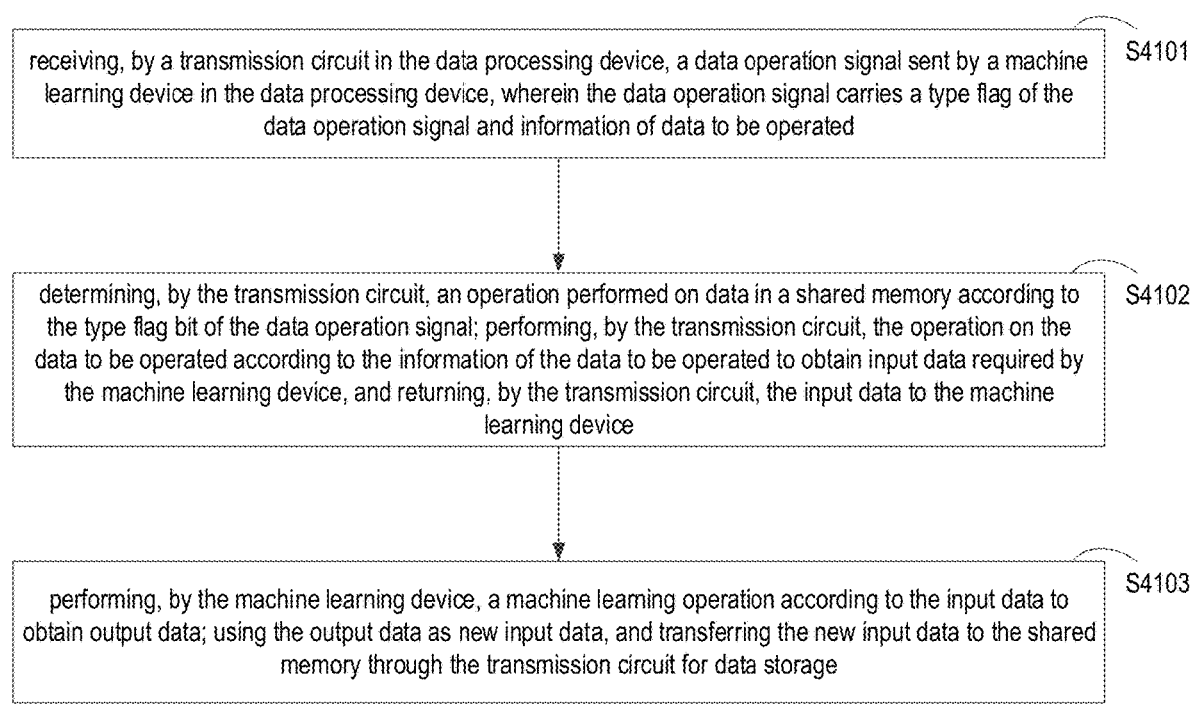
FIG. 38 is a flowchart of a data processing method according to an embodiment.

In an embodiment, as shown in FIG. 38, in a data processing device provided in the present disclosure, the machine learning device 11 includes at least one machine learning unit 14, and the data operation signal further includes a data reception flag bit used to indicate a target machine learning unit that receives the input data.

Data signal operations performed by the at least one machine learning unit (MLU) included in the machine learning device may share a same data receiving interface. The machine learning unit may be connected to the transmission circuit through a sending interface and a shared data receiving interface. It should be noted that both the sending interface and the shared data receiving interface may be implemented by hardware circuits, and types of the sending interface and the shared data receiving interface are not limited herein. The data operation signal further includes a data reception flag bit which is used to indicate a target machine learning unit that receives input data. A flagging manner of the data reception flag bit may be, for example, flagging a target machine learning unit that can receive input data as 1, and correspondingly, flagging the target machine learning unit that cannot receive input data as 0. It should be understood that it is only one manner to flag a target machine learning unit that can receive data as 1. In practical applications, the target machine learning unit that can receive data may also be flagged as 0 and the target machine learning unit that cannot receive data may be flagged as 1. A specific flagging manner of the data reception flag bit is not limited herein.

In this embodiment, according to the flagging of the data reception flag bit carried in the data operation signal, the target machine learning unit that can receive the input data in the machine learning device may be determined. In this way, when receiving data, each machine learning unit in the machine learning device is determined according to the data reception flag bit in the data operation signal, which may simplify the memory access logic in the data access process, improve the data access efficiency, and greatly improve the access speed of the machine learning chip during data access.

Several embodiments are used to respectively introduce relationships among the type flag bit of the data operation signal, information of data to be operated, and the data reception flag bit.

In an embodiment, a value of a type flag bit of the data operation signal includes CAST, which indicates that the data operation signal is a broadcast or multicast instruction. Optionally, the information of data to be operated includes a source address of the data to be operated in the shared memory, a length of the data to be operated, and a data return address after the data is operated.

In this embodiment, a type flag bit of a data operation signal is used to indicate an operation type of the data operation signal. For example, as shown in Table 6 below, if the type flag bit of the data operation signal is CAST, it is indicated that the data operation signal is a broadcast or multicast instruction; information of data to be operated includes a source address 0x110011, a destination address 0x000100, and a data length 0x0100. The data length is a length set by the user. The user may set the length to a value or a plurality of values, and a specific value and a count of the set length are not limited herein. In the data reception flag bit, three MLUs are flagged as 1, which means that the three MLUs can receive data; and one MLU is flagged as 0, which means that the MLU cannot receive data. Specifically, the transmission circuit reads data with a length of 0x0100 from the address 0x110011 in the shared memory according to the data operation signal, and then writes the data to the address 0x000100 of MLU3, MLU1, and MLU0 in the machine learning device.

TABLE 6

| | Operation information | | | | | | |
|---|---|---|---|---|---|---|---|
| | Flag whether MLU receives data | | | | Data information | | |
| Type flag bit CAST | MLU 3 | MLU 2 | MLU 1 | MLU 0 | Source address | Target address | Data length |
| CAST | 1 | 0 | 1 | 1 | 0x110011 | 0x000100 | 0x0100 |

In another embodiment, the type flag bit of the data operation signal includes a first-type flag bit and a second-type flag bit. Optionally, if a value of the first-type flag bit includes I/O, the data operation signal is determined to be an I/O instruction; and the second-type flag bit is used to indicate the data operation signal is a broadcast or multicast instruction in the I/O instruction. In this embodiment, the data operation signal includes two types of data flag bits, where the first-type data flag bit indicates a type of the data operation signal, the second-type data flag bit is set in operation information of the data operation signal and indicates a specific sub-type of the data operation signal. The data reception flag bit is the same as in the above embodiment and indicates a target machine learning unit that can receive input data. Optionally, as shown in the following Table 7, if a value of the first-type data flag bit is I/O, the data operation signal is determined to be an I/O instruction; if a value of the second-type data flag bit is 1, the data operation signal is determined to be a broadcast or multicast instruction in the I/O instruction. Correspondingly, if a value of the second-type data flag bit is 0, the data operation signal is determined not to be a broadcast or multicast instruction. The information of data to be operated includes a source address 0x110011, a destination address 0x000100, and a data length 0x0100. The data length is a length set by the user. The user may set the length to a value or a plurality of values, which is not limited herein. In the data reception flag bit, three MLUs are flagged as 1, which means that the three MLUs can receive data; and one MLU is flagged as 0, which means that the MLU cannot receive data. Specifically, the transmission circuit reads data with a length of 0x0100 from the address 0x110011 in the shared memory according to the data operation signal, and then writes the data to the address 0x000100 of MLU3, MLU1, and MLU0 in the machine learning device.

TABLE 7

| | Operation information | | | | | | | |
|---|---|---|---|---|---|---|---|---|
| Type flag bit | Whether it is a broadcast/ multicast instruction | Flag whether MLU receives data | | | | Data information | | |
| | | MLU3 | MLU2 | MLU1 | MLU0 | Source address | Target address | Data length |
| I/O | 1 | 1 | 0 | 1 | 1 | 0x110011 | 0x000100 | 0x0100 |

In another embodiment, on the basis of the above Table 1 or Table 2, the data operation signal further includes jump information, where the jump information includes a jump stride and a data length operated after each jump. Optionally, the jump information includes stride jump information and/or segment jump information.

In this embodiment, the jump information included in the data operation signal is used to instruct the transmission circuit to read the information of data to be operated according to the data operation signal and a rule of the jump information. A specific reading method includes: reading, by the transmission circuit, data in the shared memory from a source address in the information of data to be operated, determining read data with a jump data length as first jump data after a current jump, then obtaining a last address of the first jump data, and according to a jump stride in the jump information, starting jumping data with a length of the jump stride from the last address of the first jump data to a target jump address. It can be understood that a length between the last address of the first jump data and the target jump address is a jump stride in the jump information. Then the transmission circuit starts jumping data with a preset length from the target jump address and determines data obtained after the jump as second jump data. If the length between an address of the second jump data and the source address where the jump starts satisfies a length of data required by the machine learning device, it is indicated that reading the data required by the machine learning device is completed. If the length between an address of the second jump data and the source address where the jump starts does not satisfy a length of data required by the machine learning device, the transmission circuit continues to jump from the last address of the second jump data according to the jump order to read the data until the length between the address of the second jump data and the source address where the jump starts satisfies the length of the data required by the machine learning device, it is indicated that the reading the data required by the machine learning device is completed.

Generally, the data processing device provided in the embodiment needs to parse a data operation signal before performing read/write processing on the data operation signal. Optionally, the transmission circuit includes: an instruction storage unit configured to store the data operation signal, an instruction processing unit configured to parse the data operation signal to obtain a type flag bit of the data operation signal and information of data to be operated, a storage queue unit configured to store an instruction queue, where the instruction queue includes a plurality of the data operation signals to be executed in an order of the instruction queue. Generally, a large amount of data operation signals are involved in the process of data processing. When one of the data operation signals is processed, the others need to be stored in the instruction storage unit. The instruction processing unit is configured to, in a process of parsing the data operation signal, parse data information carried in the data operation signal. In addition, since a process of the data operation signal valuing, decoding, and transmission is completed in a pipeline form, all the data operation signals need to complete the above process in order, and the instruction queue is stored by the storage queue unit.

In addition, since the instruction processing unit processes data operation signals in the queue one by one, it is necessary to ensure that a currently processed data operation signal is associated to a next data operation signal. Optionally, the transmission circuit further includes: a dependency processing unit configured to determine whether there is an association between an $s^{th}$ data operation signal and an $s-1^{th}$ data operation signal before the $s^{th}$ data operation signal. If there is an association relationship between the $s^{th}$ data operation signal and the $s-1^{th}$ data operation signal, the dependency processing unit is configured to cache the $s^{th}$ data operation signal in the instruction storage unit, and after the $s-1^{th}$ data operation signal is executed, fetch the $s^{th}$ data operation signal from the instruction storage unit and transfer the data to the instruction processing unit. The determining whether there is a association between the $s^{th}$ data operation signals and the $s-1^{th}$ data operation signal includes: fetching a first storage address interval of data required in the $s^{th}$ data operation signal according to the $s^{th}$ data operation signal, fetching a zeroth storage address interval of data required in the $s-1^{th}$ data operation signal according to the $s-1^{th}$ data operation signal, respectively; if the first storage address interval and the zeroth storage address interval have an overlapping area, it is determined that there is an association between the $s^{th}$ data operation signal and the $s-1^{th}$ data operation signal; and if the first storage address interval and the zeroth storage address interval do not have an overlapping area, it is determined that there is no association between the $s^{th}$ data operation signal and the $s-1^{th}$ data operation signal.

In this embodiment, before the data operation device performs an operation according to the data processing signal, the device stores unused data processing signals in order, and parses and decodes the unused data operation signals in turn during use. During the parsing and decoding process, the device ensures continuity of the data operation signal by determining an association between two adjacent data operation signals. In this way, orderly preparations in the early stage ensure subsequent operations to be executed smoothly according to the data operation signal, which improves the data access efficiency and greatly improve the access speed of the machine learning chip during data access.

An embodiment of the present disclosure provides a data processing method, where the method may be applied to the hardware circuit shown in FIG. 31. The circuit includes: a machine learning device 11, a transmission circuit 12, and a shared memory 13, where the machine learning device 11 is connected to the transmission circuit 12 through an interface, the transmission circuit 12 is connected to the shared memory 13 through an interface. The interfaces may be implemented by hardware circuits. Specific hardware forms of the interface are not limited herein. The transmission circuit 12 is configured to obtain input data required by the machine learning device 11 from the shared memory 13 according to a data operation signal sent by the machine learning device 11, and return the input data to the machine learning device 11. The machine learning device 11 is configured to perform a machine learning operation according to the input data to obtain output neuron data, use the output neuron data as new input neuron data, and transfer the data to the shared memory 13 for data storage through the transmission circuit 12.

In order to make the purposes, technical schemes, and technical effects of the present disclosure clearer, the present disclosure will be described hereinafter with reference to the accompanied drawings and embodiments. It should be understood that the embodiments described here are merely used for explaining the present disclosure, rather than limiting the present disclosure. The data processing method provided in the embodiment of the present disclosure aims to solve a technical problem of how to improve access speed of a machine learning chip in data access when there is a large amount of data involved in data access or shared storage. The technical solutions of the present disclosure and how the technical solutions solve the above technical problems will be described in detail hereinafter with reference to the embodiments and the accompanied drawings. The following specific embodiments may be combined with each other, and identical or similar concepts or processes may not be further described in some embodiments. It should be noted that an executive body of the data processing method provided in the present disclosure is a transmission circuit and may also be a data processing device, where the device may be implemented by software, hardware, or a combination of software and hardware to be part or all of a data analysis terminal.

In an embodiment, FIG. 38 provides a data processing method. This embodiment describes a process of the transmission circuit determining a type of the data operation signal according to a type flag bit of the data operation signal to locate a corresponding operation, and obtaining data required by the machine learning device from the shared memory according to the corresponding operation to improve the access speed. The method shown in FIG. 38 includes:

a step S4101, receiving, by a transmission circuit in the data processing device, a data operation signal sent by a machine learning device in the data processing device, where the data operation signal carries a type flag of the data operation signal and information of data to be operated.

The machine learning device may be a device with arithmetic function formed by a plurality of MLUs. The transmission circuit may be a broadcast bus, and the shared memory may be a non-volatile and/or volatile memory, including but not limited to a random access memory (RAM), a scratchpad memory, and the like. In this embodiment, a transmission circuit in the data processing device receives a data operation signal sent by a machine learning device in the data processing device, where the data operation signal carries a type flag of the data operation signal and information of data to be operated. The data operation signal may be transmitted between the transmission circuit and the machine learning device through an interface. The transmission circuit may determine a type of the data operation signal and data information required in the operation according to a type flag bit of the data operation signal and data information to be operated carried by the data operation signal.

The method further includes a step S4102, determining, by the transmission circuit, an operation performed on data in a shared memory according to the type flag bit of the data operation signal; performing, by the transmission circuit, the operation on the data to be operated according to the information of the data to be operated to obtain input data required by the machine learning device, and returning, by the transmission circuit, the input data to the machine learning device.

Based on the data operation signal sent from the machine learning device to the transmission circuit in the step S410, the transmission circuit determines an operation to be performed on data in a shared memory according to the type flag bit of the data operation signal, determines data in the shared memory (data to be operated) on which the operation needs to be performed according to the information of the data to be operated to obtain input data required by the machine learning device, and returns the input data to the machine learning device. The input data is data that the machine learning device needs to input when performing a machine learning operation. The above data may be data pre-stored in the shared memory, or may be data output by the machine learning device after the machine learning operation is executed.

The method further includes a step S4103, performing, by the machine learning device, a machine learning operation according to the input data to obtain output data; using the output data as new input data, and transferring the new input data to the shared memory through the transmission circuit for data storage.

In the step, the machine learning device performs a machine learning operation according to the input data sent by the transmission circuit in the step S4102 to obtain output data, uses the output data as new input data, and transfers the new input data to the shared memory through the transmission circuit for data storage. For example, if a machine learning device performs a neural network operation, the neural network operation may be an operation of one layer of the neural network. For a multi-layer neural network, an implementation of the operation may be that, in a forward operation, after the operation of a previous layer of an artificial neural network is completed, an operation instruction of a next layer is performed by using an output neuron obtained by an operation unit as an input neuron of the next layer for operation (or some operations are performed on the output neuron before the output neuron serves as the input neuron of the next layer), and at the same time, a weight is replaced with a weight of the next layer; in a backward operation, after the back operation of a previous layer of the artificial neural network is completed, an operation instruction of a next layer is performed by using an input neuron gradient obtained by an operation unit as an output neuron gradient of the next layer (or as output neuron data) for operation (or some operations are performed on the input neuron gradient before the input neuron gradient serves as the output neuron gradient of the next layer), and at the same time, a weight is replaced with a weight of the next layer. Optionally, the neural network in the embodiment of the present disclosure may not only be an artificial neural network, but also a spiking neural network, which is not limited in this embodiment. The machine learning device provided in this embodiment may perform a machine learning operation according to input data. For example, in a machine learning operation, for a multi-layer neural network, a machine learning device may compute neuron data output by each layer of neural network, and perform an operation set including a series of machine learning operations such as a product operation, a sum operation, and a function operation on a plurality of input data corresponding to an input of each layer of neural network. The machine learning device obtains output neuron data of a current layer through the machine learning operation. The output neuron data may be used as input neuron data of a next layer of neural network for another machine learning operation, before which the output neuron data of the current layer may be written into the shared memory through the transmission circuit for storage, so that the machine learning device may read the data at any time for the machine learning operation.

In a data processing method provided in an embodiment, a transmission circuit is configured to obtain input data required by a machine learning device interface from a shared memory according to a data operation signal which carries a type flag bit of the data operation signal and information of data to be operated and is sent by the machine learning device through a sending interface, and return the input data to the machine learning device through a receiving interface. Then the machine learning device is configured to perform a machine learning operation according to the input data to obtain output data, use the output data as new input data, and transfer the data to the shared memory for data storage through the transmission circuit. In this embodiment, since the data operation signal carries a type flag bit of the data operation signal and the information of the data to be operated, the transmission circuit may determine a specific type of the data operation signal according to the type flag bit of the data operation signal after receiving the data operation signal, and then perform a corresponding operation according to the information of the data to be operated carried in the data operation signal. In this way, classification of the type flag bits of the data operation signal may quickly locate a corresponding operation, which may simplify the data access logic, improve the data access efficiency, and greatly improve the access speed of the machine learning chip during data access.

In an embodiment, the machine learning device includes at least one machine learning unit, and the data operation signal further includes a data reception flag bit. The returning the input data to the machine learning device includes: determining, by the transmission circuit, a target machine learning unit that receives the input data according to a value of the data reception flag bit, and sending the input data to the target machine learning unit.

In this embodiment, data signal operations performed by the at least one machine learning unit (MLU) included in the machine learning device may share a same data receiving interface. The MLU may transfer signals or data to the transmission circuit through a sending interface and a shared data receiving interface. It should be noted that both the sending interface and the shared data receiving interface may be implemented by hardware circuits, and types of the sending interface and the shared data receiving interface are not limited herein. The data operation signal further includes a data reception flag bit which is used to indicate a target machine learning unit that receives input data. A flagging manner of the data reception flag bit may be, for example, flagging a target machine learning unit that can receive input data as 1. It should be understood that it is only one manner to flag a target machine learning unit that can receive data as 1. In practical applications, the target machine learning unit that can receive data may also be flagged as 0, and a specific flagging manner of the data reception flag bit is not limited herein. Specifically, the transmission circuit determines a target MLU that receives input data according to the value of the data reception flag bit, and sends the input data to the MLU. In this embodiment, according to the flagging of the data reception flag bit carried in the data operation signal, the transmission circuit may determine the target machine learning unit that can receive the input data in the machine learning device. In this way, when receiving data, each machine learning unit in the machine learning device is determined according to the data reception flag bit in the data operation signal, which may simplify the memory access logic in the data access process, improve the data access efficiency, and greatly improve the access speed of the machine learning chip during data access.

Optionally, if a value of the type flag bit of the data operation signal is CAST, the transmission circuit determines the data operation signal to be a broadcast or multicast instruction. Optionally, the type flag bit of the data operation signal is used to indicate an operation type of the data operation signal, and if the type flag bit of the data operation signal is CAST, it is indicated that the data operation signal is a broadcast or multicast instruction. It should be understood that the CAST used herein to represent a broadcast or multicast instruction is only an embodiment. According to actual conditions, the user can redefine the data type flag bit, which is not limited in this embodiment.

Optionally, the type flag bit of the data operation signal may include a first-type flag bit and a second-type flag bit, where the first-type flag bit is used to indicate whether the data operation signal is an I/O instruction, and the second-type flag bit is used to indicate whether the data operation signal is a broadcast or multicast instruction in the I/O instruction. Therefore, if a value of the first-type flag bit is I/O, the transmission circuit determines the data operation signal to be an I/O instruction; if a value of the second-type flag bit is 1, the transmission circuit determines the data operation signal to be a broadcast or multicast instruction in the I/O instruction.

Optionally, the data operation signal includes two types of data flag bits, where the first-type data flag bit indicates a type of the data operation signal, the second-type data flag bit is set in operation information of the data operation signal and indicates a specific sub-type of the data operation signal. Specifically, if a value of the first-type flag bit in the data operation signal is I/O, the transmission circuit determines the data operation signal to be an input/output instruction; and if a value of the second-type flag bit in the data operation signal is 1, the transmission circuit determines the data operation signal to be a broadcast or multicast instruction in the input/output instruction.

Figure 39:
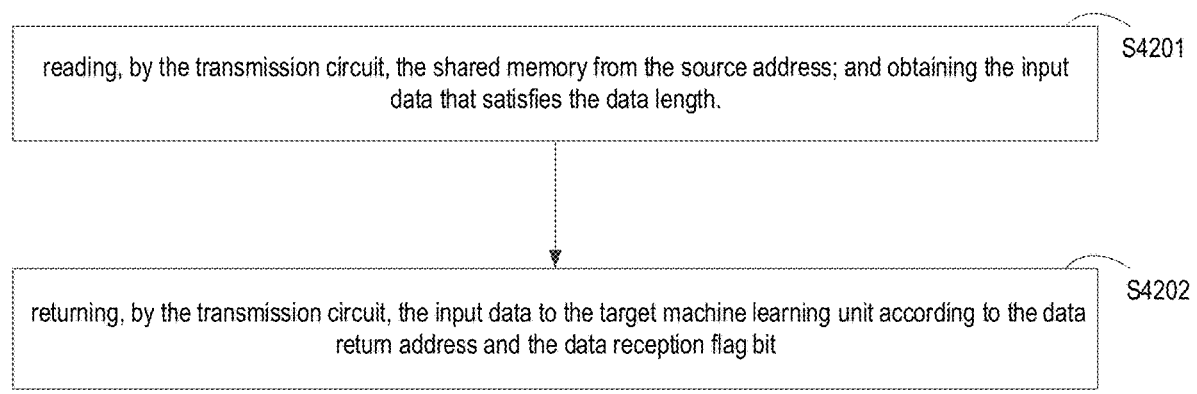
FIG. 39 is a flowchart of a data processing method according to an embodiment.

In an embodiment, as shown in FIG. 39, a data processing method is provided, and this embodiment includes a specific process of a transmission circuit reading data in the shared memory according to data information carried in the data operation signal and returning read data to a target machine learning unit according to the data operation information. As shown in FIG. 39, if the information of data to be operated includes a source address of the data to be operated in the shared memory, a length of the data to be operated, and a data return address after the data is operated, the step S4103 includes:

a step S4201, reading, by the transmission circuit, the shared memory from the source address, and obtaining the input data that satisfies the data length.

In this embodiment, since the information of the data to be operated of the data operation signal carries the source address of the data to be operated in the memory, the length of the data to be operated, and the data return address of the operated data, the transmission circuit starts to read data from the source address in the shared memory, and reads data that satisfies a length of data to be operated according to a preset rule, where the length of the data to be operated is set by the user according to actual situations, which is not limited herein. The above step of the transmission circuit obtaining input neuron data and data that satisfy the data length specifically includes reading data that satisfies the data length from the shared memory according to a preset rule. The preset rule is set by the user according to actual situations, which is not limited herein. For example, the data may be read one by one starting from the source address until a length of the read data satisfies the data length.

The method further includes a step S4202, returning, by the transmission circuit, the input data to the target machine learning unit according to the data return address and the data reception flag bit.

In this step, the transmission circuit returns the obtained input data that satisfies the data length to a data return address in the information of data to be operated, where the data return address in the information of data to be operated may be addresses in a plurality of target machine learning units in the machine learning device. The transmission circuit determines the data to be returned to the target machine learning unit in the machine learning device according to the data reception flag bit carried in the data operation signal.

In the data processing method provided in this embodiment, the transmission circuit starts reading the memory from the source address, obtains input data that satisfies the data length, returns the input data to the target machine learning unit according to the data return address and the data reception flag bit. In this embodiment, the transmission circuit obtaining input data that satisfies the data length specifically includes reading data according to a reading rule instructed by data operation information in the data operation signal, which simplifies the data reading logic of the transmission circuit, improves the data access efficiency, and greatly improves the access speed of the machine learning chip during data access.

Figure 40:
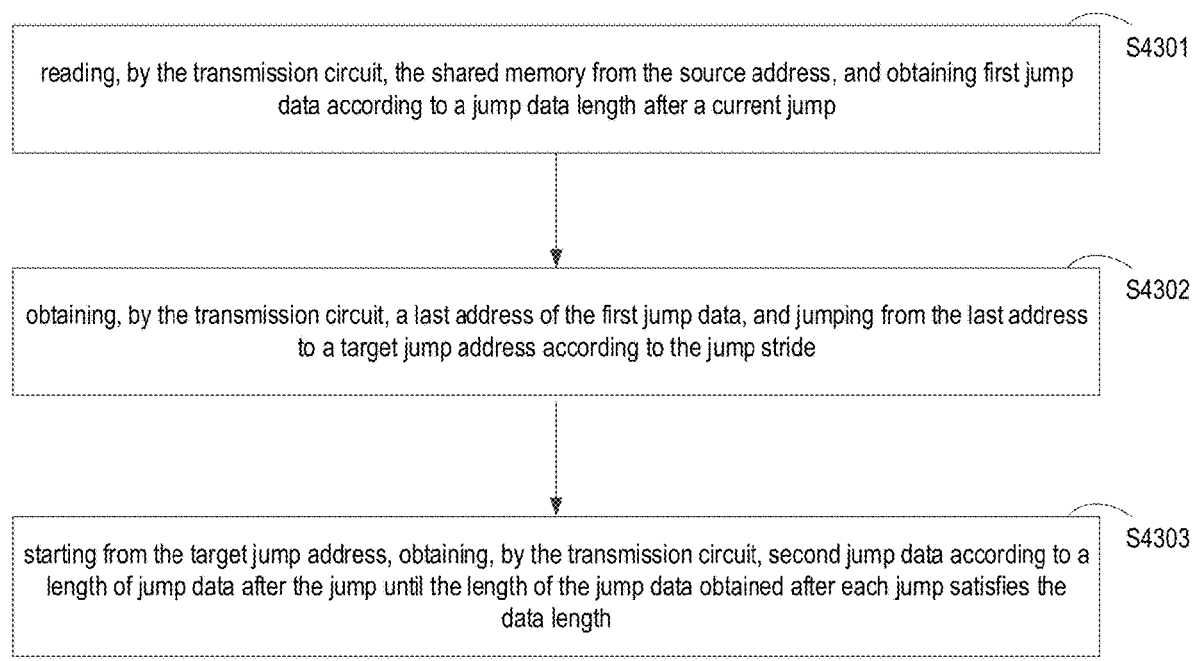
FIG. 40 is a flowchart of a data processing method according to an embodiment.

In an embodiment, FIG. 40 provides a data processing method. On the basis of any of the above embodiments, the operation information in the embodiment further includes jump information, where the jump information includes a jump stride and a data length operated after each jump. The embodiment includes a process of a transmission circuit reading data in the shared memory according to the jump information in the operation information. As shown in FIG. 40, the step S4201 includes:

a step S4301, reading, by the transmission circuit, the shared memory from the source address, and obtaining first jump data according to a jump data length after a current jump.

In this embodiment, the operation information of the data operation signal includes jump information, where the jump information is used to instruct the transmission circuit to read information of the data to be operated according to the data operation signal and a rule of the jump information. The jump information includes a jump stride and a jump data length operated after each jump, where the jump data length may be a preset data length. Optionally, the jump information includes stride information and/or segment information, where the stride information is used to indicate a stride for each jump of the data operation signal, and the segment information is used to indicate a preset size for each segment of the data operation signal.

Specifically, the transmission circuit starts reading the shared memory from the source address in the information of the data to be operated, and after a current jump, determines data with a read jump data length to be first jump data. The first jump data refers to data obtained after the transmission circuit jumps data with a preset length when reading data, where the preset length is set by the user according to actual situations, which is not limited herein.

The above step S4201 further includes a step S4302, obtaining, by the transmission circuit, a last address of the first jump data, and jumping from the last address to a target jump address according to the jump stride.

Based on the first jump data read in the step S4301, the transmission circuit obtains a last address of the first jump data, and according to a jump stride in the jump information, starts jumping a length of the jump stride from the last address of the first jump data to a target jump address. It can be understood that a length between the last address of the first jump data and the target jump address is a jump stride in the jump information.

The above step S4201 further includes a step S4303, starting from the target jump address, obtaining, by the transmission circuit, second jump data according to a length of jump data after the jump until the length of the jump data obtained after each jump satisfies the data length.

In this step, during reading data, the transmission circuit starts jumping data with a preset length from the target jump address determined in the above step S4302, and determines data obtained after the jump as second jump data. If the length between an address of the second jump data and the source address where the jump starts satisfies a length of data required by the machine learning device, it is indicated that reading the data required by the machine learning device is completed. If the length between an address of the second jump data and the source address where the jump starts does not satisfy a length of data required by the machine learning device, the transmission circuit continues to jump from the last address of the second jump data according to a jump order in the above steps S4301 to S4303 to read the data until the length between the address of the second jump data and the source address where the jump starts satisfies the length of the data required by the machine learning device, it is indicated that the reading the data required by the machine learning device is completed.

The implementation principles and technical effects of the data processing method provided in this embodiment are similar to those of the foregoing embodiments of the data processing device, which will not be further described herein. In the data processing method provided in this embodiment, the transmission circuit starts reading the shared memory from the source address, obtains the first jump data according to the jump data length obtained after the current jump, starts jumping from the last address of the first jump data to the target jump address according to the jump stride, and then starting from the target jump address, obtains the second jump data according to the jump data length obtained after the jump until the jump data length obtained after each jump satisfies the data length. In this way, when the operation field includes the jump information, the transmission circuit reads data according to the jump rule of the information, which simplifies the data reading logic of the transmission circuit, improves the data access efficiency, and greatly improves the access speed of the machine learning chip during data access.

Figure 41:
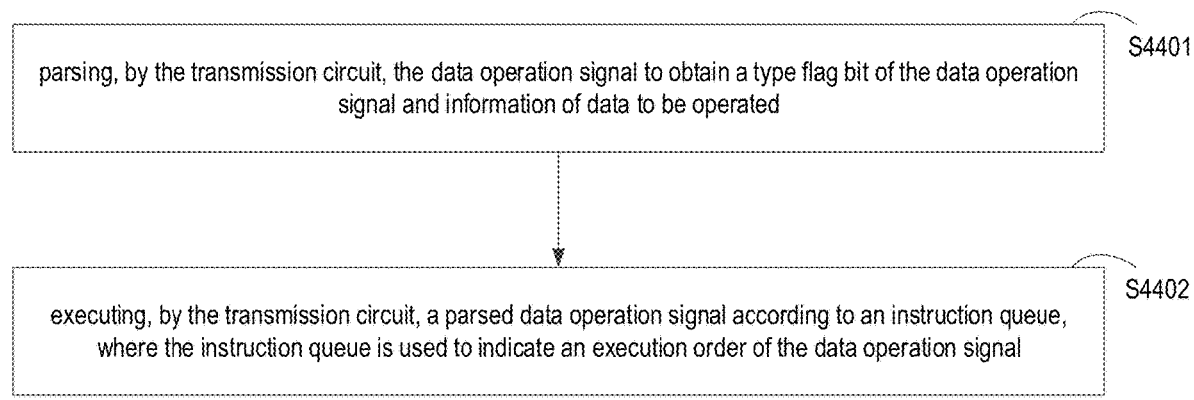
FIG. 41 is a flowchart of a data processing method according to an embodiment.

When the transmission circuit performs an operation according to a received data operation signal, the received data operation signal is an encoding instruction and needs to be first decoded and parsed. Therefore, an embodiment of the present disclosure provides a data processing method. As shown in FIG. 41, the method of the transmission circuit in the data processing device receiving a data operation signal sent by the machine learning device in the data processing device includes:

a step S4401, parsing, by the transmission circuit, the data operation signal to obtain a type flag bit of the data operation signal and information of data to be operated.

It should be noted that there are generally a large number of data operation signals in the process of data processing. When the transmission circuit processes one of the data operation signals, other data operation signals need to be stored. Specifically, the transmission circuit parsing the data operation signal includes parsing data information carried in the data operation signal and the type flag bit of the data operation signal. The data operation information may include a length of data to be operated, a target address, an original address, and the like, which is not limited herein.

The method further includes a step S4402, executing, by the transmission circuit, a parsed data operation signal according to an instruction queue, where the instruction queue is used to indicate an execution order of the data operation signal.

It should be understood that the data operation signal needs to be executed in order. In the above step S4401, the transmission circuit parses the data operation signal to obtain data operation information and a type flag bit, and then the transmission circuit executes the parsed data operation signal according to an instruction queue.

In the data processing method provided in this embodiment, a transmission circuit parses a data operation signal to obtain a type flag bit of the data operation signal and information of data to be operated, and then the transmission circuit executes the parsed data operation signal according to an instruction queue. In this way, before executing the data operation signal, the transmission circuit parses the data operation signal first and then perform the execution in order, which greatly improves the speed of the transmission circuit performing an execution according to the data operation signal.

Since the transmission circuit needs to execute the data operation signals that are related to each other when executing the data operation signals in the sequence in the queue, the embodiment of the present application provides another embodiment, as shown in FIG. 42, in the transmission circuit Before executing the parsed data operation signal according to the instruction queue, the method further includes:

a step S4501, determining, by the transmission circuit, a dependency of adjacent parsed data operation signals to obtain a determination result, where the dependency represents whether there is an association between an $s^{th}$ data operation signal and an $s-1^{th}$ data operation signal before the $s^{th}$ data operation signal.

The transmission circuit needs to determine a dependency of adjacent parsed data operation signals, and determine whether there is an association between the two adjacent data operation signals to be processed according to a determination result, where the $s^{th}$ data operation signal represents any signal in the data operation signals instead of a specific signal. The $s-1^{th}$ data operation signal represents a previous signal of the $s^{th}$ data operation signal.

Optionally, an implementation of the transmission circuit determining a dependency of the adjacent parsed data operation signals includes: fetching, by the transmission circuit, a first storage address interval of data required in the $s^{th}$ data operation signal according to the $s^{th}$ data operation signal, fetching a zeroth storage address interval of data required in the $s-1^{th}$ data operation signal according to the $s-1^{th}$ data operation signal, respectively; if the first storage address interval and the zeroth storage address interval have an overlapping area, it is determined by the transmission circuit that there is an association between the $s^{th}$ data operation signal and the $s-1^{th}$ data operation signal; and if the first storage address interval and the zeroth storage address interval do not have an overlapping area, it is determined by the transmission circuit that there is no association between the $s^{th}$ data operation signal and the $s-1^{th}$ data operation signal. Optionally, the transmission circuit determines a dependency of the adjacent parsed data operation signals according to a relationship between the first storage address interval of data required in the $s^{th}$ data operation signal and the zeroth storage address interval of the $s-1^{th}$ data operation signal; the determination manner may be: if the first storage address interval and the zeroth storage address interval do not have an overlapping area, it is determined that there is no dependency between the $s^{th}$ data operation signal and the $s-1^{th}$ data operation signal, and if the first storage address interval and the zeroth storage address interval have an overlapping area, it is determined that there is a dependency between the $s^{th}$ data operation signal and the $s-1^{th}$ data operation signal.

The method further includes a step S4502, if the determination result is that there is a dependency between the $s^{th}$ data operation signal and the $s-1^{th}$ data operation signal, caching, by the transmission circuit, the $s^{th}$ data operation signal, and after the $s-1^{th}$ data operation signal is executed, fetching the $s^{th}$ data operation signal.

Based on the dependency of two adjacent data operation signals determined by the transmission circuit in the above steps, the data operation signals are executed in order; if the determination result is that there is a dependency between the $s^{th}$ data operation signal and the $s-1^{th}$ data operation signal, the transmission circuit first caches the $s^{th}$ data operation signal, and after the $s-1^{th}$ data operation signal is executed, fetches the $s^{th}$ data operation signal.

In the data processing method provided in this embodiment, the transmission circuit ensures continuity of the data operation signal by determining an association between two adjacent data operation signals. In this way, orderly preparations in the early stage ensure subsequent operations to be executed smoothly according to the data operation signal, which improves the data access efficiency and greatly improve the access speed of the machine learning chip during data access.

With the continuous development of information technology, the demand for data access and data processing becomes higher, which leads to higher requirements for processors that process data and access data. For example, for a general-purpose processor, a multi-core processor composed of a plurality of general-purpose processor cores (such as CPU cores) has become a mainstream due to powerful parallel computation capabilities.

However, with continuous development of machine learning algorithms, machine learning chips with more architectures gradually come out. These machine learning chips usually need to access or process data in the shared storage in a plurality of forms such as unicast reading or broadcasting, thus a plurality of corresponding transmission interfaces are arranged, which may lead to a large area of machine learning chips.

Therefore, how to simplify a transmission interface of a machine learning chip to reduce an area of the machine learning chip has become an urgent technical problem to be solved by current technicians.

To solve the above problem, the present disclosure provides the following technical solutions.

Figure 43:
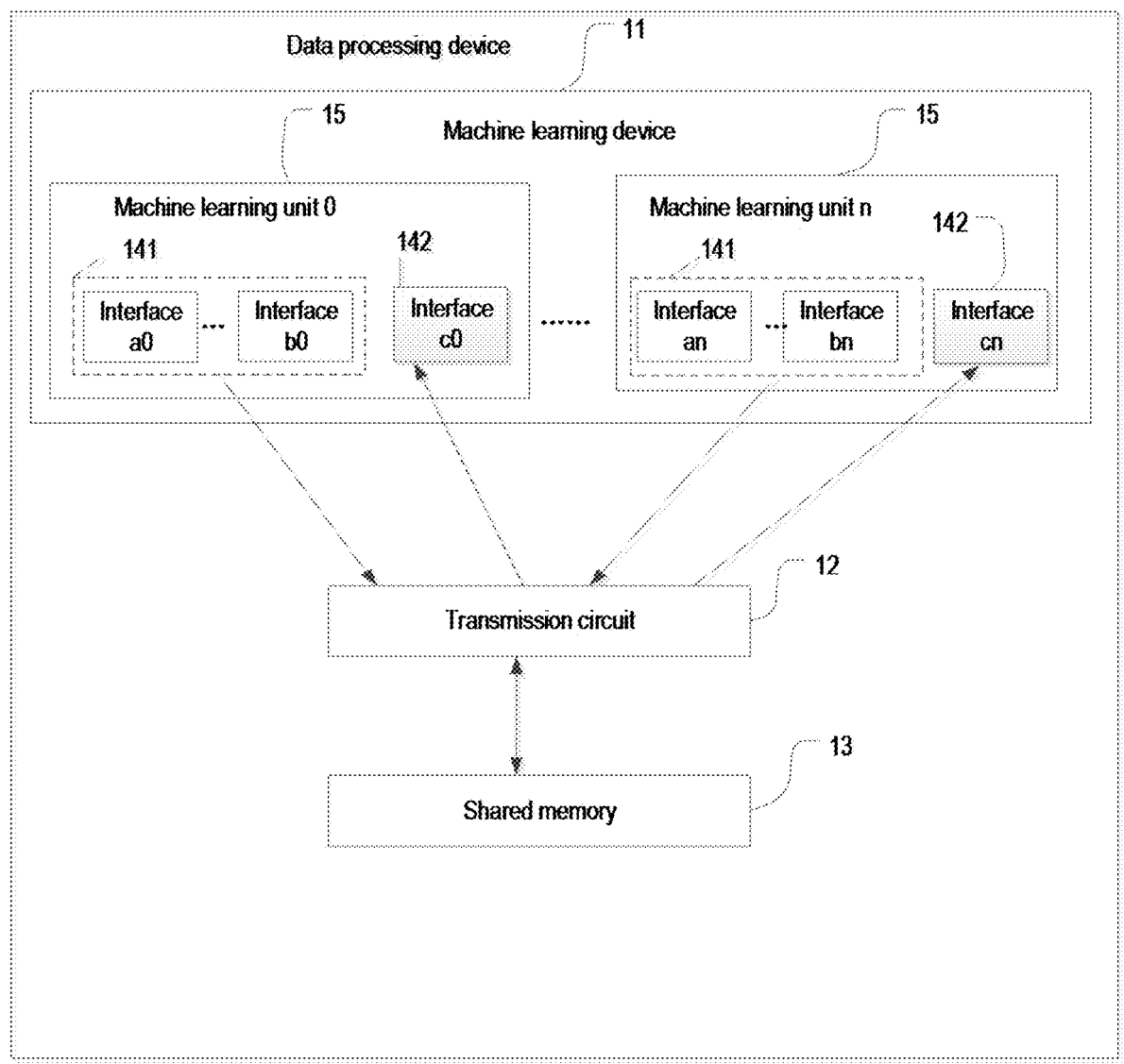
FIG. 43 is a schematic structural diagram of a data processing device according to an embodiment.

A data processing device provided in an embodiment of the present disclosure may be implemented by software, hardware, or a combination of software and hardware, and may be part or all of the data processing device shown in FIG. 43. The data processing device may include a machine learning device 11, a transmission circuit 12, and a shared memory 13. The machine learning device 11 includes at least one machine learning unit 15, where a unicast read operation and a broadcast operation performed by the machine learning unit 15 share a same data receiving interface 142, the machine learning unit is connected to the transmission circuit 12 through a sending interface 141 and a shared data receiving interface 142, and the transmission circuit 12 is connected to the shared memory 13. The transmission circuit 12 is configured to obtain input data required by the machine learning device from the shared memory 13 according to the data operation signal sent by the machine learning device 11 through the sending interface 141, and return the input data to the machine learning device 11 through the shared data receiving interface 142. It should be noted that the above machine learning unit 15 may include a first transmission interface 14 (not shown in the figure), and the first transmission interface may include the sending interface 141 and the shared data receiving interface 142.

Optionally, the machine learning device 11 is configured to perform a machine learning operation according to the input data to obtain output data. Optionally, the machine learning device 11 is further configured to transfer the output data to the shared memory 13 through the transmission circuit 12 for data storage. Specifically, when the machine learning device 11 is configured to perform a neural network operation, the device 11 may perform an artificial neural network operation according to input neuron data and weight data to obtain output neuron data, use the output neuron data as new input neuron data, and transfer the new input neuron data to the shared memory 13 through the transmission circuit 12 for data storage.

It should be noted that the above machine learning unit, the transmission circuit, the shared memory, and various types of interfaces may all be implemented by hardware circuits. For example, the transmission circuit may be a broadcast bus, the shared memory may be a non-volatile and/or volatile memory, including but not limited to a random access memory (RAM), a scratchpad memory, and the like, and the various types of interfaces may correspond to one or more data I/O interfaces or I/O pins.

The data processing device provided in the present disclosure may be applied to a machine learning operation, where the machine learning operation includes a neural network operation, a k-means operation, a support vector machine operation, and the like. When the above machine learning device performs a neural network computation, optionally, the above input data may include input neuron data and/or weight data, where the input neuron data and the weight data are data to be input by the machine learning device during execution of an artificial neural network operation. The above output data may include output neuron data, where the output neuron data is an intermediate result or a final result output by the machine learning device during execution of an artificial neural network operation. It should be understood that, since the weight data and the neuron data can be multiplexed, the input data in the computation process may not include both the input neuron data and the weight data but only the input neuron data or the weight data.

For example, in a neural network operation (unless specified otherwise, this embodiment is described by using only neural network operations as examples), the data processing device provided in the present disclosure may perform a one-layer neural network operation or a multi-layer neural network operation. For a multi-layer neural network, an implementation of the operation may be that, in a forward operation, after the operation of a previous layer of an artificial neural network is completed, an operation instruction of a next layer is performed by using an output neuron obtained by an operation unit as an input neuron of the next layer for operation (or some operations are performed on the output neuron before the output neuron serves as the input neuron of the next layer), and at the same time, a weight is replaced with a weight of the next layer; in a backward operation, after the back operation of a previous layer of the artificial neural network is completed, an operation instruction of a next layer is performed by using an input neuron gradient obtained by an operation unit as an output neuron gradient of the next layer (or as output neuron data) for operation (or some operations are performed on the input neuron gradient before the input neuron gradient serves as the output neuron gradient of the next layer), and at the same time, a weight is replaced with a weight of the next layer.

Referring to FIG. 1, in an implementation, the above machine learning device 11 may include a plurality of machine learning units 15. For a multi-layer neural network operation, an operation of a certain layer of neural network in a forward operation is described below as an example. In an embodiment, the above machine learning device may perform a computation in parallel on output neuron data of all neurons in the layer of the neural network through a plurality of machine learning units (MLU). For example, if the machine learning device includes 4 machine learning units and the layer of neural network has 100 neurons, 25 neurons may be assigned to each machine learning unit for processing by setting a corresponding operation instruction; in this process, each machine learning unit may obtain input neuron data and weight data corresponding to the 25 assigned neurons of the layer from the shared memory through the transmission circuit, perform an operation to obtain output neuron data of the 25 assigned neurons of the layer, and then transfer the output neuron data of the 25 assigned neurons of the layer to the shared memory through the transmission circuit for storage. It can be understood that each of the above machine learning units may process a plurality of assigned neuron data of the layer by parallel computations. The above computation manner of performing a neural network computation in parallel layer by layer may realize parallel processing of neural network computation, which improves the processing efficiency.

In another embodiment, the above machine learning device may perform a computation on output neuron data of all neurons in each layer of the neural network respectively in a certain order through a plurality of machine learning units. In this process, a previous machine learning unit can transfer the output neuron data of all neurons of this layer to the shared memory through the transmission circuit for storage, so that a next machine learning unit can fetch and use the output neuron data of all neurons of the layer as input neuron data of the next layer for computation. It may be understood that the above application is suitable for a scenario where a neural network computation amount of each layer is not large, such as a computation of a neural network with a small amount of neurons of each layer.

Figure 44:
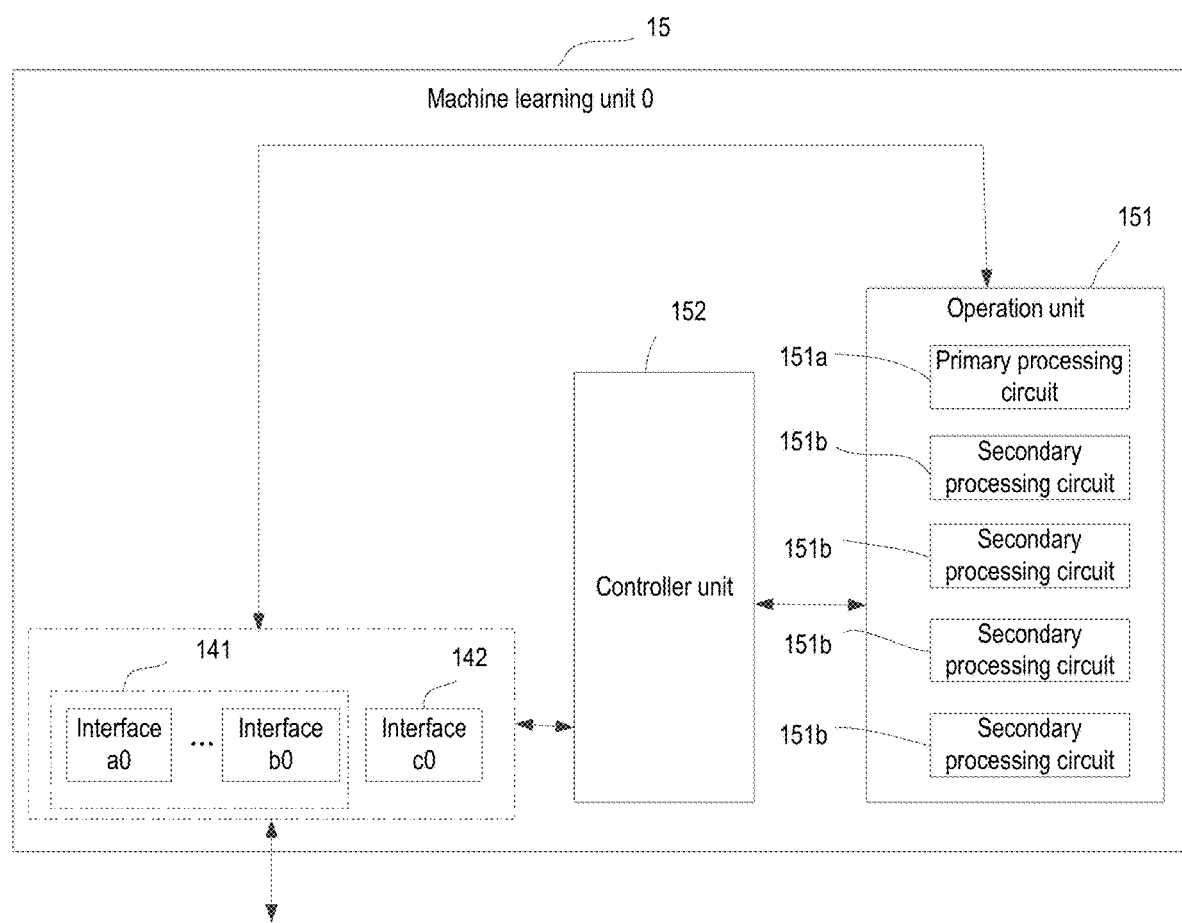
FIG. 44 is a schematic structural diagram of a machine learning unit according to an embodiment.

Referring to FIG. 44, the machine learning unit will be specifically described below by using a machine learning unit 0 in FIG. 43 as an example. In an embodiment, the machine learning unit 15 may include: a sending interface 141, a shared data receiving interface 142, at least one operation unit 151, and a controller unit connected to the operation unit 151. The operation unit 151 includes a primary processing circuit 151a and a plurality of secondary processing circuits 151b, and the operation unit 151 is connected to the transmission interface 12 through the sending interface 141 and the shared data receiving interface 142.

The controller unit 152 is configured to send the data operation signal and the output neuron data to the transmission circuit 12 through the sending interface 141, receive the input neuron data and the weight data obtained by the transmission circuit 12 from the shared memory 13 through the shared data receiving interface 142, and send the input neuron data and the weight data to the primary processing circuit 151a and/or the secondary processing circuits 151b.

The primary processing circuit 151*b* is configured to distribute the input neuron data and/or the weight data to the plurality of secondary processing circuits 151*b*; the plurality of secondary processing circuits 151*b* are configured to perform intermediate operations in parallel according to neuron data and weight data to obtain a plurality of intermediate results, and send the plurality of intermediate results to the primary processing circuit 151*a*; and the primary processing circuit 151*a* is further configured to perform subsequent processing on the plurality of intermediate results to obtain a computation result. The subsequent processing may include an activation operation. Specifically, the controller unit 152 may obtain a computation instruction, parse the computation instruction to obtain a plurality of operation instructions, and send the plurality of operation instructions to the primary processing circuit. It may be understood that, in this embodiment, when the machine learning unit includes a plurality of operation units, each operation unit may share the above sending interface and the above shared data receiving interface.

For example, in an optional embodiment, the primary processing circuit may further include a controller unit, where the controller unit may include a primary instruction processing unit configured to decode an operation instruction into a micro-instruction. In another optional embodiment, the secondary processing circuit may also include a controller unit, where the controller unit may include a secondary instruction processing unit configured to receive and process a micro-instruction. The above micro-instruction may be a next-level instruction of the instruction. The micro-instruction may be obtained by splitting or decoding the instruction, and may be further decoded into a control signal for various components, units, or processing circuits. For example, a product micro-instruction is a next-level instruction of a convolution instruction.

A neural network operation process of the machine learning unit will be described in detail below by using a structure of the above machine learning unit as an example. The process includes the following steps S5101-S5106:

- the step S5101, pre-storing an IO instruction in a starting address of an instruction storage unit of the controller unit;
- the step S5102, reading, by the controller unit, the IO instruction from the starting address of the instruction storage unit, obtaining a neural network operation instruction corresponding to the machine learning unit from an off-chip memory through an off-chip interface according to a control signal obtained from decoding the IO instruction, or obtaining a neural network computation instruction corresponding to the machine learning unit from a shared memory through the transmission circuit, and storing an obtained computation instruction in the instruction storage unit;
- the step S5103, reading, by the controller unit, a next IO instruction from the instruction storage unit, and according to a control signal obtained from decoding by the IO instruction, reading all data blocks (such as assigned input neuron data and weight data of neurons of the layer, an interpolation table for a quick activation function operation, a constant table for configuring parameters of the operation device, bias data, etc.) required by the operation unit from the shared memory through the transmission circuit; the data operation signal includes a source address of the above data blocks in the shared memory;
- the step S5104, reading, by the controller unit, a next CONFIG (configuration) instruction from the instruction storage unit, and according to a control signal obtained from decoding by the CONFIG instruction, configuring various constants required by the computation of the neural network layer, such as configuring, by the operation unit, a value of an internal register of the operation unit according to a constant required by the activation function;
- the step S5105, reading, by the controller unit, a next COMPUTE (computation) instruction from the instruction storage unit, and according to a control signal (operation instruction) obtained from decoding by the COMPUTE instruction, sending, by the operation unit, assigned input neuron data, weight data, and operation instruction of the neurons of the layer to the primary processing circuit, determining, by the primary processing circuit, the assigned input neuron data of the neurons of the layer to be broadcast data and determining the weight data to be distribution data, distributing one piece of distributed data into a plurality of data blocks, sending at least one of the data blocks, broadcast data, and at least one of a plurality of operation instructions to the secondary processing circuits, obtaining, by the secondary processing circuits, an intermediate result from a multiplication processing circuit, an accumulation processing circuit, etc., and obtaining, by the primary processing circuit, assigned neuron data output by the neurons of this layer according to the intermediate result and the activation processing circuit; and
- the step S5106, reading, by the controller unit, a next IO instruction from the instruction storage unit, and according to the data operation signal obtained from decoding by the IO instruction, transferring the output neuron data to the shared memory for storage through the transmission circuit to obtain input neuron data of part of neurons of the next layer; and the above data operation signal includes a destination address of the above output neuron data in the shared memory.

The step S5105 is described below with examples. For example, in a fully connected operation of neural network operations, a neural network operation process may be: $y=f(wx+b)$, where x is an input neuron matrix, w is a weight matrix, b is a bias scalar, f is an activation function which may be any of sigmoid, tanh, relu, and softmax function. For example, if there is a binary tree relationship (a tree-type relationship) between the primary processing circuit and the secondary processing circuits, and the operation unit has a primary processing circuit and 8 secondary processing circuits, then an implementation method of the above step S5105 may be: obtaining, by the controller unit, an input neuron matrix x, a weight matrix w, and a fully connected operation instruction from the shared memory, and sending the input neuron matrix x, the weight matrix w, and the fully connected operation instruction to the primary processing circuit; determining, by the primary processing circuit, the input neuron matrix x and the weight matrix w to be broadcast data and distribution data respectively, splitting, by the primary processing circuit, the weight matrix w into 8 sub-matrices, distributing the 8 sub-matrices to the 8 secondary processing circuits through the tree module, and broadcasting the input neuron matrix x to the 8 secondary processing circuits; performing, by the secondary processing circuits, multiplication and accumulation operations on the 8 sub-matrices and the input neuron matrix x in parallel to obtain 8 intermediate results, and sending the 8 intermediate results to the primary processing circuit; and sorting, by the primary processing circuit, the 8 intermediate results to obtain an operation result of wx, and performing an operation of offset b and then an activation operation on the operation result to obtain a final result y.

It can be understood that since each of the above machine learning units can perform a computation in parallel on each assigned neuron of a certain layer, the shared memory can store the output neuron data of all neurons of each layer and the input neuron data required by all the neurons of the next layer, while the weight data may be multiplexed, or weight data of a new neural network layer may be obtained from the shared memory.

It should be noted that each machine learning unit may include one or a plurality of operation units, and the structure of each operation unit may be identical or different. The structure of each operation unit is embodied in a relationship between the primary processing circuit and the respective secondary processing circuits, including but not limited to a tree-type relationship, an H-type relationship, and a systolic array-type relationship. The technical solutions provided in the present disclosure sets the operation unit into a single-master-multiple-slave structure and may split data according to a computation instruction of a forward operation. In this way, a plurality of secondary processing circuits may perform operations on the parts with large computation amount in parallel, which may increase the operation speed, save operation time, and reduce power consumption.

The data processing device shown in FIG. 43 in this embodiment is further described below. A unicast read operation is a read operation in a unicast mode, and a corresponding data operation signal may be: a unicast read instruction, and a unicast read request. A data operation signal corresponding to a broadcast operation may be: a broadcast instruction, a multicast instruction, a broadcast request, and a multicast request. For example, a unicast read instruction is a read instruction in a unicast mode, which may be a read instruction sent by a certain machine learning unit to read input neuron data and weight data in the source address of the shared memory; the input neuron data and the weight data need to be returned to the above machine learning unit, where the input neuron data and the weight data are required by the assigned neuron during a process of the machine learning unit performing a computation on assigned neurons of a certain layer according to a computation instruction. Similarly, a unicast read request is a read request in the unicast mode. A broadcast instruction is a read instruction sent by a machine learning unit to read input neuron data and weight data in the source address of the shared memory. The input neuron data and the weight data are returned to all the machine learning units in the above machine learning device, where the input neuron data may be input neuron data required by all neurons of a certain layer (all output neuron data of a previous layer) and the weight data may be multiplexed weight data such as a convolution kernel. A difference between a multicast instruction and a broadcast instruction is that data return objects of the multicast instruction are a plurality of machine learning units corresponding to a flag field in the multicast instruction instead of all machine learning units in the above machine learning device. In addition, generally a difference between an instruction and a request is that an instruction has relatively large execution overhead, but includes more information, while a request has relatively small execution overhead, but includes less information.

Generally, a machine learning unit needs at least two corresponding data interfaces when receiving data returned by a unicast read operation and a broadcast operation, where the two interfaces are used to receive unicast read data returned by the transmission circuit for a unicast read data operation signal, and receive broadcast and/or multicast data returned by the transmission circuit for a broadcast and/or multicast data operation signal, respectively. In this embodiment, as shown in FIG. 1, a machine learning unit 0 only has one receiving interface which may be a shared data receiving interface such as an interface c0. The interface is used to receive unicast read data returned by the transmission circuit for a unicast read data operation signal, and receive broadcast and/or multicast data returned by the transmission circuit for a broadcast and/or multicast data operation signal.

It can be understood that, if there is a cache, the transmission circuit may temporarily store required input neuron data and weight data fetched from the shared memory in the cache, then determine a request source of the data, which, in other words, is a data return object (machine learning unit) corresponding to a data operation signal associated with the data, and send the data to the shared data receiving interface; during the unicast read operation, the above shared data receiving interface is a shared data receiving interface of a machine learning unit corresponding to the data return object; during the broadcast operation, the shared data receiving interface includes a plurality of shared data receiving interfaces of a plurality of machine learning units corresponding to the data return object.

Therefore, in the data processing device shown in this embodiment, at least one machine learning unit shares one data receiving interface in the machine learning unit when performing a unicast read operation and a broadcast operation, which may further save the count of returned data interfaces in the machine learning unit, save hardware resources, and reduce hardware area and power consumption.

Figure 45:
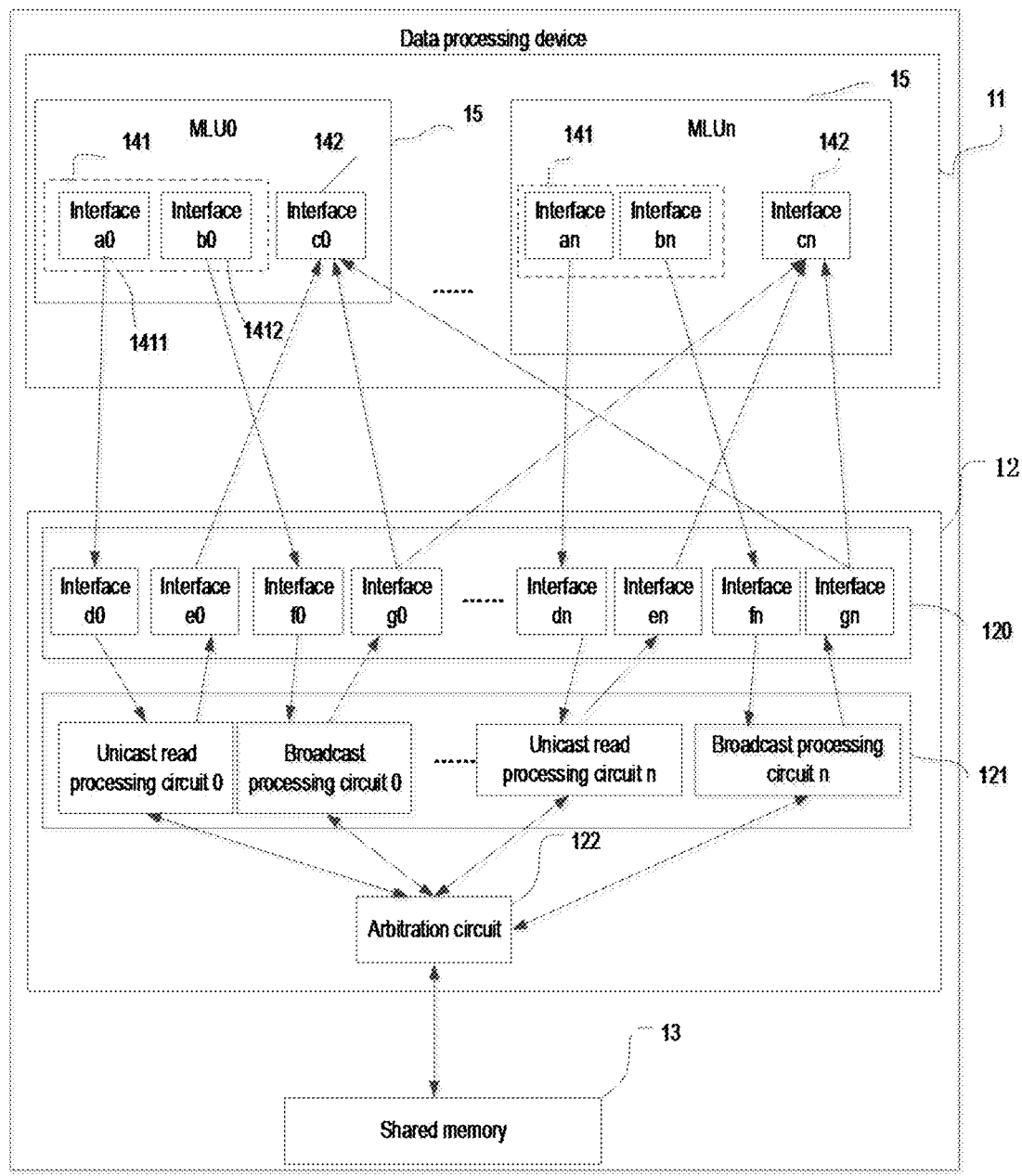
FIG. 45 is a schematic structural diagram of a data processing device according to an embodiment.

The sending interface of the machine learning unit is described in detail below. Referring to FIG. 45, on the basis of FIG. 43, the sending interface 141 includes: a unicast read signal sending interface 1411 and a broadcast signal sending interface 1412; the machine learning unit 15 implements a unicast read operation through a connection between the unicast read signal sending interface 1411 and the transmission circuit 12 as well as a connection between the shared data receiving interface 142 and the transmission circuit 12, and implements a broadcast operation through a connection between the broadcast signal sending interface and the transmission circuit 12 as well as a connection between the shared data receiving interface 142 and the transmission circuit 12. For an MLU0, a unicast read signal transmission interface corresponds to an interface a0, a broadcast signal transmission interface corresponds to an interface b0, and a shared data receiving interface corresponds to an interface c0. The interface a0 may be used to send a unicast read data operation signal to the transmission circuit, the interface b0 may be used to send a broadcast and/or multicast data operation signal to the transmission circuit, and the interface c0 may be used to receive unicast read data returned by the transmission circuit for the unicast read data operation signal, and receive broadcast and/or multicast data returned by the transmission circuit for the broadcast and/or multicast data operation signal. Therefore, in this embodiment, different types of data operations may be sent through the unicast read signal sending interface and the broadcast signal sending interface, which simplifies the processing logic.

In an embodiment, corresponding to the above unicast read operation and broadcast operation, as shown in FIG. 45, the transmission circuit 12 in the above data processing device may include: a second transmission interface 120, a read/write processing circuit 121 connected to the second transmission interface 120, and an arbitration circuit 122 connected to the read/write processing circuit 121; the read/write processing circuit 121 is configured to receive a data operation signal sent by the at least one machine learning unit 15 through the transmission interface 141 and the second transmission interface 120, send the data operation signal to the arbitration circuit 122, and return the data obtained by the arbitration circuit 122 from the shared memory 13 to the machine learning unit corresponding to the data operation signal through the second transmission interface 120 and the shared data receiving interface 142; and the arbitration circuit 122 is configured to arbitrate the data operation signal received from the read/write processing circuit 121 according to a preset arbitration rule, and operate the data in the shared memory 13 according to the data operation signal that has been successfully arbitrated.

Specifically, the read/write processing circuit 121 may process a unicast read signal, a broadcast signal, and/or a multicast signal. In an embodiment, the read/write processing circuit 121 may include: a unicast read processing circuit configured to process a unicast read signal, a broadcast signal, and/or a multicast signal. When the unicast read processing circuit processes the broadcast signal and/or the multicast signal, the processing circuit may receive the broadcast and/or multicast signal sent by at least one machine learning unit through the broadcast signal sending interface and the second transmission interface, send the broadcast and/or multicast signal to the arbitration circuit, and transfer data obtained by the arbitration circuit from the shared memory to a plurality of machine learning units corresponding to the broadcast and/or multicast signal through the second transmission interface and the shared data receiving interface in a preset order. The preset order is an order of returning data to the plurality of machine learning units, which can be arranged according to priorities of the plurality of machine learning units, serial numbers of the plurality of machine learning units, and the like.

Optionally, the read/write processing circuit 121 may include: a unicast read processing circuit and a broadcast processing circuit, where the unicast read processing circuit is configured to process a unicast read signal, and the broadcast processing circuit is configured to process a broadcast signal and/or a multicast signal.

The unicast read processing circuit may be configured to receive a unicast read signal sent by at least one machine learning unit through the unicast read signal sending interface and the second transmission interface, send the unicast read signal to the arbitration circuit, and transfer data obtained by the arbitration circuit from the shared memory to a machine learning unit corresponding to the unicast read signal through the second transmission interface and the shared data receiving interface; the broadcast read processing circuit may be configured to receive a broadcast and/or multicast signal signal sent by at least one machine learning unit through the broadcast signal sending interface and the second transmission interface, send the broadcast and/or multicast signal to the arbitration circuit, and transfer data obtained by the arbitration circuit from the shared memory to a plurality of machine learning units corresponding to the broadcast and/or multicast signal through the second transmission interface and the shared data receiving interface.

The preset arbitration rule may be used to allow the arbitration circuit to determine priorities of a plurality of data operation signals according to a certain rule, so that the arbitration circuit may determine an object to be operated according to the priority of each data operation signal, which is to select a data operation signal with a high priority to be a data operation signal that has been successfully arbitrated; for example, a priority of a data operation signal with a large transmission rate may be set to a high priority, while a priority of a data operation signal with a small transmission rate may be set to a low priority; for another example, the above preset arbitration rule may be a round-robin scheduling arbitration rule, a maximum carrier-to interference scheduling rule, a proportional fairness rule, and the like. In addition, the arbitration circuit may also use whether a data path (interface to interface) between the machine learning unit and the read/write processing circuit is idle as an auxiliary arbitration rule, in other words, a data path corresponding to a data operation signal that has been successful arbitrated is idle.

Specifically, the unicast read processing circuit may be connected to a plurality of machine learning units through the second transmission interface to perform unicast read operations of the plurality of machine learning units. The unicast read processing circuit may cache a plurality of unicast read instructions in the unicast read instruction cache queue of the unicast read processing circuit, parse the unicast read instructions to obtain corresponding unicast read instructions, and cache the corresponding unicast read instructions in the unicast read request cache queue of the unicast read processing circuit to be arbitrated by the arbitration circuit. A unicast read request can be directly cached in the unicast read request cache queue without a parsing operation. Similarly, the broadcast processing circuit may also be connected to a plurality of machine learning units through the second transmission interface, and may include a broadcast and/or multicast instruction cache queue and a broadcast and/or multicast request cache queue, which will not be further described herein. In an optional embodiment, the read/write processing circuit may include a unicast read processing circuit and a broadcast processing circuit.

Therefore, in this embodiment, the unicast read processing circuit can be used to process the unicast read operation, the broadcast processing circuit can be used to process the broadcast operation, and different types of data operations can be performed through different processing circuits, which simplify the processing logic.

In an embodiment, as shown in FIG. 45, on the basis of the data processing device in FIG. 43, the second transmission interface may be divided into interfaces that process different types of data operations. Specifically, the second transmission interface may include: at least one cluster of unicast read signal receiving interfaces and unicast read data sending interfaces that are connected to the unicast read processing circuit, and at least one cluster of broadcast signal receiving interfaces and broadcast data sending interfaces that are connected to the broadcast processing circuit, where the unicast read signal receiving interfaces are connected to the unicast read signal sending interfaces of the machine learning unit, the broadcast signal receiving interfaces are connected to the broadcast signal sending interfaces of the machine learning unit, and the unicast read data sending interfaces and the broadcast data sending interfaces in the transmission circuit are respectively connected to the shared data receiving interface of the machine learning unit. In this embodiment, different types of data operations may be implemented respectively through each interface in the second transmission interface, which simplifies the processing logic.

In an embodiment, as shown in FIG. 45, the read/write processing circuit may be divided into a plurality of processing circuit clusters, where one machine learning unit corresponds to one processing circuit cluster, and the processing circuit cluster at least includes a unicast read processing circuit and a broadcast processing circuit. For example, MLU0 corresponds to a unicast read processing circuit 0 and a broadcast processing circuit 0, and MLUn corresponds to a unicast read processing circuit n and a broadcast processing circuit n. Similarly, the second transmission interface includes a group of interfaces connected to a processing circuit cluster and a machine learning unit respectively, where the interfaces are respectively used to realize a one-to-one connection between the machine learning unit and the unicast read processing circuit as well as a one-to-one connection between the machine learning unit and the broadcast processing circuit.

For example, for MLU0 and a unicast read processing circuit 0, an interface d0 in the second transmission interface is used as a unicast read signal receiving interface to be connected to a unicast read signal sending interface a0 and a unicast read processing circuit 0 of MLU0, respectively, and may be used to receive a unicast read signal sent from MLU0 and send the signal to the unicast read processing circuit 0 for processing; an interface e0 in the second transmission interface is used as a unicast read data transmission interface to be connected to a shared data receiving interface c0 and a unicast read processing circuit of MLU0, respectively, and may be used to receive input neuron data and weight data corresponding to the unicast read signal sent by the unicast read processing circuit 0 and transfer the above data to the interface c0 in MLU0. For MLU0 and a broadcast processing circuit 0, an interface f0 in the second transmission interface is used as a broadcast signal receiving interface to be connected to a broadcast signal sending interface b0 and a broadcast processing circuit 0 of MLU0, respectively, and may be used to receive a broadcast and/or multicast signal sent from MLU0 and send the signal to the unicast read processing circuit 0 for processing; an interface g0 in the second transmission interface is used as a broadcast data sending interface to be connected to a shared data receiving interface ci and the broadcast processing circuit 0 of a plurality of MLUs, respectively, and may be used to receive input neuron data and weight data corresponding to the broadcast and/or multicast signal sent by the broadcast processing circuit 0 and transfer the above data to the shared data receiving interface ci in the plurality of MLUs.

Therefore, in this embodiment, the one-to-one connection between the machine learning unit and the unicast read processing circuit as well as the one-to-one connection between the machine learning unit and the broadcast processing circuit may achieve targeted one-to-one data operation processing, which may reduce the complexity of the access logic of data operations, reduce conflicts, and improve the processing efficiency.

Figure 46:
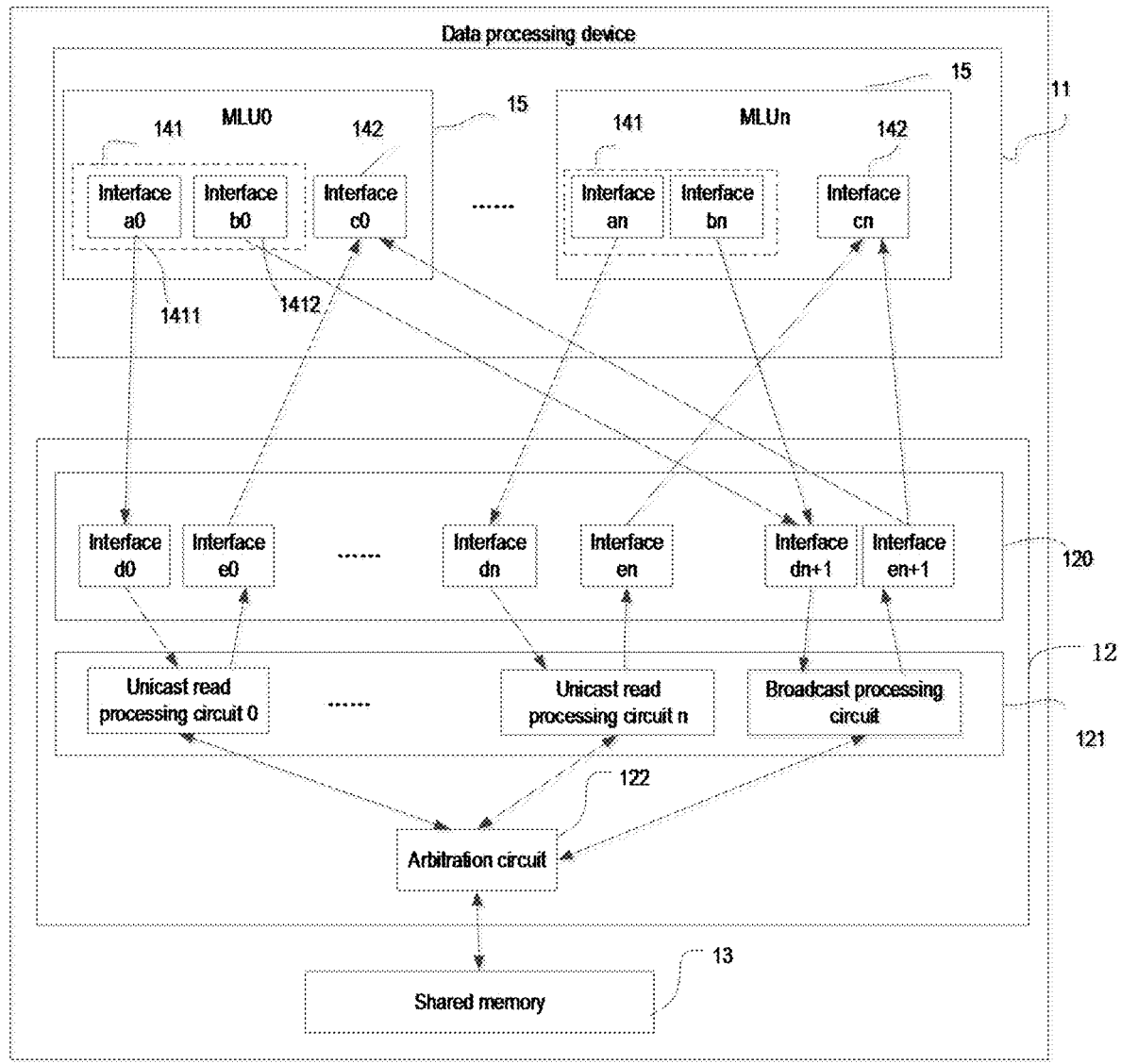
FIG. 46 is a schematic structural diagram of a data processing device according to an embodiment.

As shown in FIG. 46, in an optional embodiment, a count of interfaces in the transmission circuit is reduced on the basis of the data processing device in FIG. 3. Specifically, the read/write processing circuit 121 may include: a broadcast processing circuit and a plurality of unicast read processing circuits, where the plurality of unicast read processing circuits and the plurality of machine learning units are connected one to one, and the broadcast processing circuit and the plurality of machine learning units are connected one-to-many. For example, MLU0 corresponds to a unicast read processing circuit 0 and the broadcast processing circuit, and MLUn corresponds to a unicast read processing circuit and the broadcast processing circuit. Similarly, the second transmission interface includes a group of interfaces connected to a unicast read processing circuit cluster and a machine learning unit respectively, where the interfaces are used to realize a one-to-one connection between the machine learning unit and the unicast read processing circuit; the second transmission interface further includes a group of interfaces connected to a broadcast processing circuit and a plurality of machine learning units respectively, where the interfaces are used to realize a many-to-one connection between the machine learning units and the broadcast processing circuit. Specifically, the second transmission interface may include: a group of broadcast interfaces connected to the broadcast processing circuit, where the above broadcast interfaces may include: a broadcast signal receiving interface and a broadcast data sending interface; and the plurality of machine learning units are connected to the broadcast processing circuit through the set of broadcast interfaces.

For example, for a plurality of MLUs and the broadcast processing circuit, an interface dn+1 in the second transmission interface may be used as a broadcast signal receiving interface to receive broadcast and/or multicast signals sent from the plurality of MLUs and send the signals to the broadcast processing circuit for processing; an interface en+1 in the second transmission interface may be used as a broadcast data sending interface to receive input neuron data and weight data corresponding to the broadcast and/or multicast signal sent by the broadcast processing circuit and transfer the above data to shared data receiving interfaces in the plurality of MLUs.

It can be seen that a plurality of machine learning units may share a same broadcast processing circuit and a same group of broadcast signal receiving interfaces and broadcast data receiving interfaces. Therefore, the data processing device in this embodiment not only reduces the count of returned data interfaces in the machine learning unit, but further reduces the count of interfaces in the transmission circuit, saves hardware resources, and reduces hardware area and power consumption.

Figure 47:
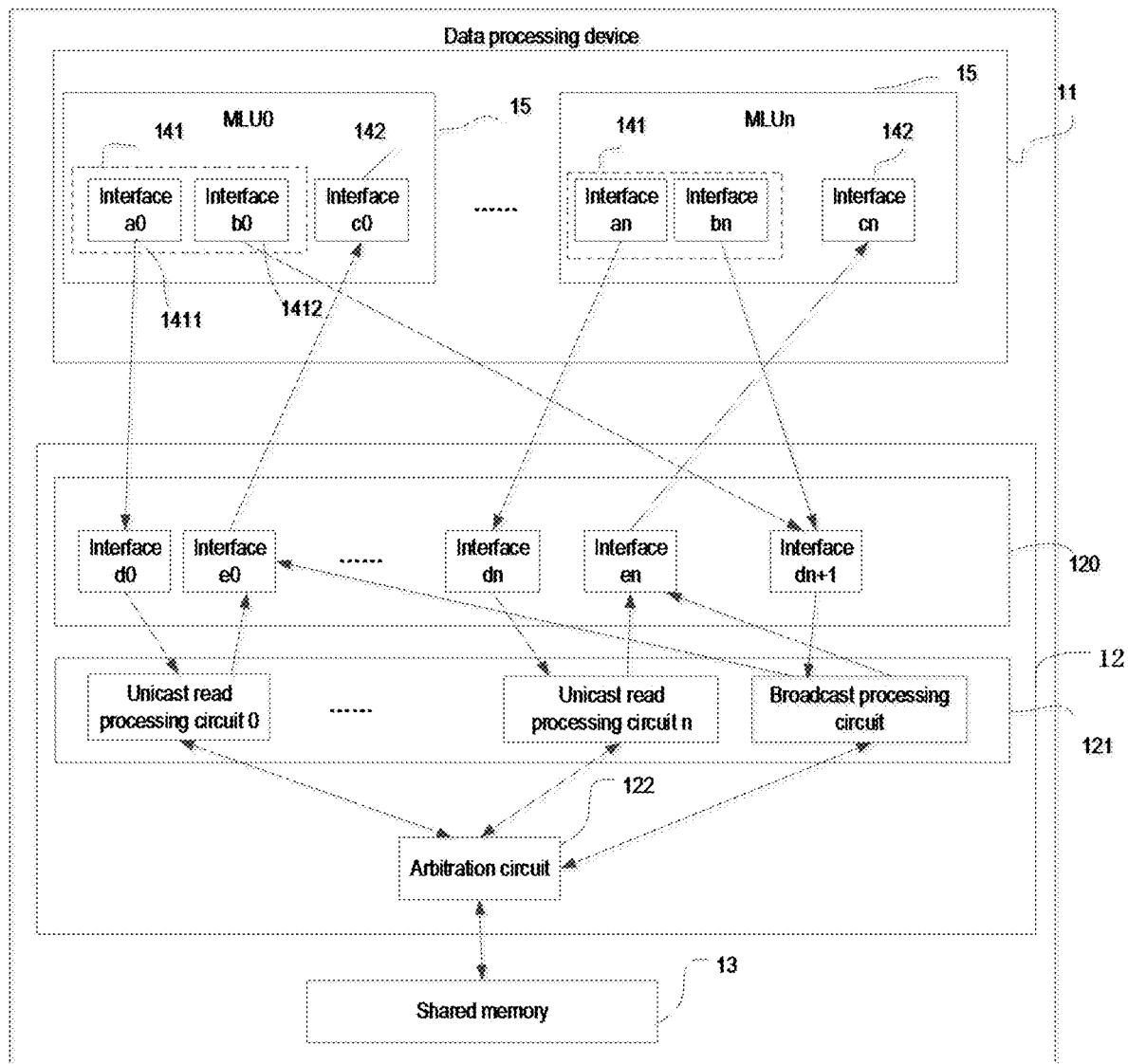
FIG. 47 is a schematic structural diagram of a data processing device according to an embodiment.

As shown in FIG. 47, in an optional embodiment, the count of interfaces in the transmission circuit is further reduced on the basis of FIG. 46. Specifically, the second transmission interface 120 may include: at least one cluster of unicast read signal receiving interfaces and unicast read data sending interfaces that are connected to the unicast read processing circuit, and at least one cluster of broadcast signal receiving interfaces and broadcast data sending interfaces that are connected to the broadcast processing circuit, where the unicast read signal receiving interfaces are connected to the unicast read signal sending interfaces of the machine learning unit, the broadcast signal receiving interfaces are connected to the broadcast signal sending interfaces of the machine learning unit, and the unicast read data sending interfaces and the broadcast data sending interfaces in the transmission circuit are respectively connected to the shared data receiving interface of the machine learning unit.

For example, for a unicast read processing circuit 0, the second transmission interface includes a cluster of unicast read signal receiving interfaces d0 and shared data sending interfaces e0 connected to the unicast read processing circuit 0 in a one-to-one manner, the unicast read signal receiving interface d0 is connected to the unicast read signal sending interface a0 in MLU0, and the shared data sending interface e0 is connected to the shared data receiving interface c0 in MLU0; for a unicast reading processing circuit n, the second transmission interface includes a group of unicast read signal receiving interfaces dn and shared data sending interfaces en connected to the unicast reading processing circuit n in a one-to one manner, the unicast read signal receiving interface dn is connected to the unicast read signal sending interface an in MLUn, and the shared data sending interface en is connected to the shared data receiving interface cn in MLUn; the second transmission interface may further include a broadcast signal receiving interface dn+1 connected to the broadcast processing circuit, where the broadcast signal receiving interface dn+1 is connected to the broadcast signal sending interface of each MLU (for MLUi, the broadcast signal sending interface is an interface bi) respectively; in addition, it should be noted that each shared data sending interface ei in the transmission circuit is connected to the broadcast processing circuit, and may receive input neuron data and weight data corresponding to a broadcast and/or multicast signal sent by the broadcast processing circuit and transfer the above data to the shared data receiving interfaces ci in the plurality of MLUs. It can be seen that, in the transmission circuit, each unicast read processing circuit i shares the same shared data sending interface ei with the broadcast processing circuit, and a data path composed of the shared data receiving interface ci in MLUi and the shared data sending interface ei in the transmission circuit may implement transfer of unicast read data and broadcast and/or multicast data between MLUi and the transmission circuit.

It can be seen that a plurality of unicast read processing circuits respectively share a same data sending interface with the broadcast processing circuit. Therefore, the data processing device in this embodiment further reduces the count of interfaces in the transmission circuit, saves hardware resources, and reduces hardware area and power consumption.

With the continuous development of information technology, the demand for data access and data processing becomes higher, which leads to higher requirements for processors that process data and access data. For example, for a general-purpose processor, a multi-core processor composed of a plurality of general-purpose processor cores (such as CPU cores) has become a mainstream due to powerful parallel computation capabilities.

However, with continuous development of machine learning algorithms, machine learning chips with more architectures gradually come out. These machine learning chips usually need to access or process data in the shared storage in a plurality of forms such as unicast reading, unicast writing, or broadcasting, thus a plurality of corresponding transmission interfaces are arranged, which may lead to a large area of machine learning chips.

Therefore, how to simplify a transmission interface of a machine learning chip to reduce an area of the machine learning chip has become an urgent technical problem to be solved by current technicians.

To solve the above problem, the present disclosure provides the following technical solutions.

Figure 48:
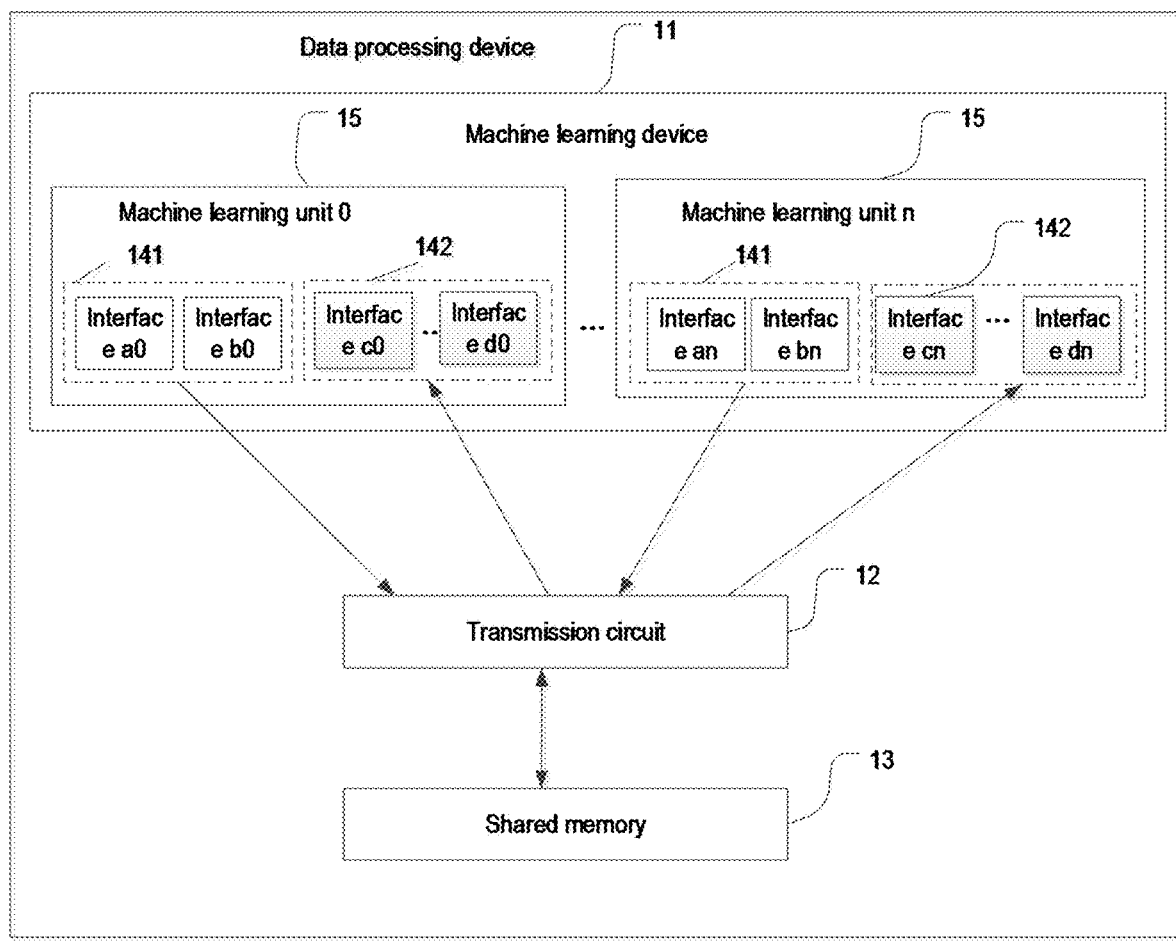
FIG. 48 is a schematic structural diagram of a data processing device according to an embodiment.
Figure 49:
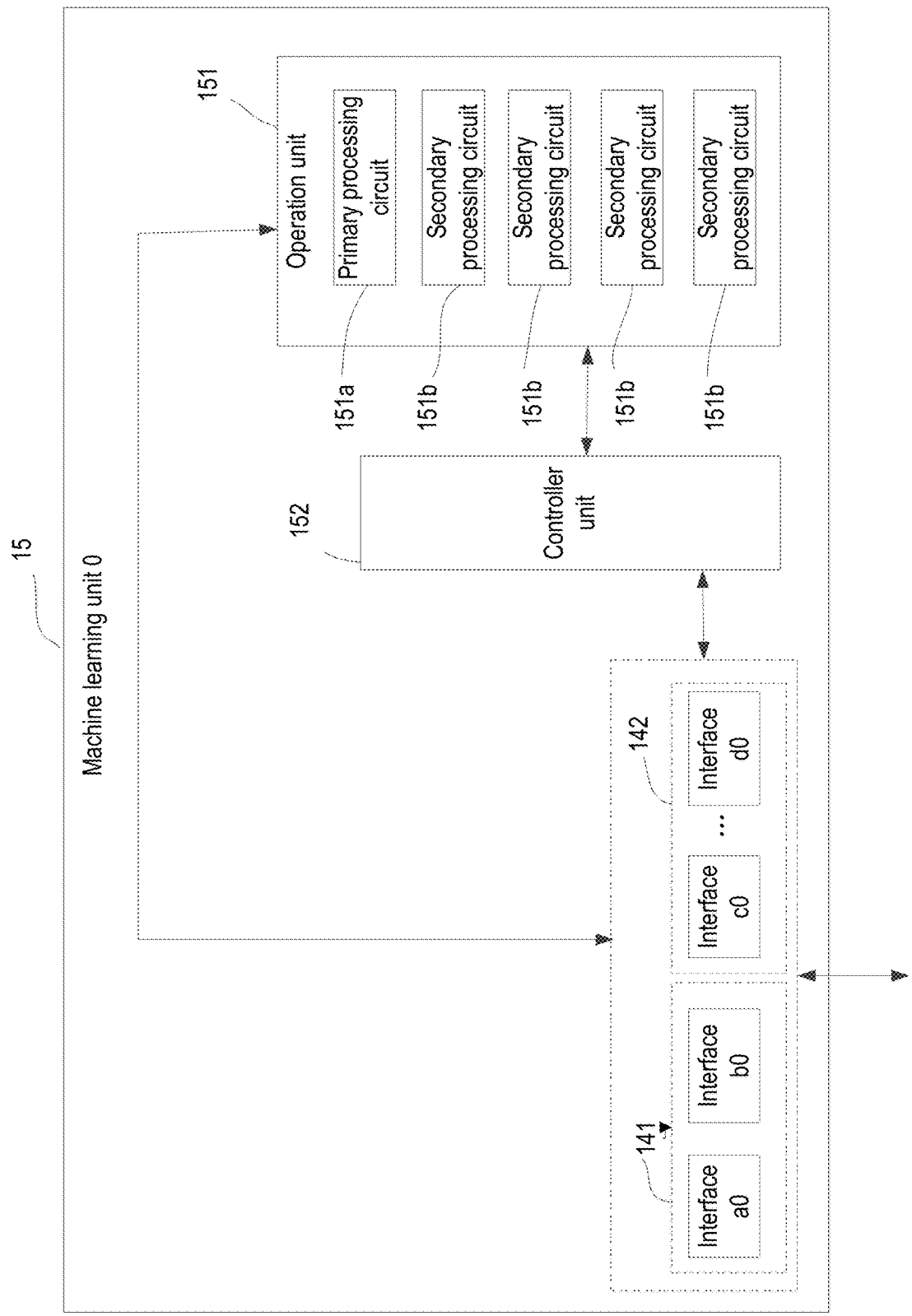
FIG. 49 is a schematic structural diagram of a machine learning unit according to an embodiment.

Referring to FIG. 49, the machine learning unit will be specifically described below by using a machine learning unit 0 in FIG. 48 as an example. In an embodiment, the machine learning unit 15 may include: at least one sending interface 141, at least one receiving interface 142, at least one operation unit 151, and a controller unit connected to the operation unit 151. The operation unit 151 may include a primary processing circuit 151$a$ and a plurality of secondary processing circuits 151$b$, and the operation unit 151 is connected to the transmission interface 12 through the at least one sending interface 141 and the at least one receiving interface 142.

The controller unit 152 is configured to send the data operation signal and the output neuron data to the transmission circuit 12 through the at least one sending interface 141, receive the input neuron data and the weight data obtained by the transmission circuit 12 from the shared memory 13 through the at least one receiving interface 142, and send the input neuron data and the weight data to the primary processing circuit 151$a$ and/or the secondary processing circuits 151$b$.

The primary processing circuit 151$b$ is configured to distribute the input neuron data and/or the weight data to the plurality of secondary processing circuits 151$b$; the plurality of secondary processing circuits 151$b$ are configured to perform intermediate operations in parallel according to neuron data and weight data to obtain a plurality of intermediate results, and send the plurality of intermediate results to the primary processing circuit 151$a$; and the primary processing circuit 151$a$ is further configured to perform subsequent processing on the plurality of intermediate results to obtain a computation result. The subsequent processing may include an activation operation. Specifically, the controller unit 152 may obtain a computation instruction, parse the computation instruction to obtain a plurality of operation instructions, and send the plurality of operation instructions to the primary processing circuit.

It may be understood that, in this embodiment, when the machine learning unit includes a plurality of operation units, the respective operation units may share the at least one sending interface and the at least one receiving interface.

For example, in an optional embodiment, the primary processing circuit may further include a controller unit, where the controller unit may include a primary instruction processing unit configured to decode an operation instruction into a micro-instruction. In another optional embodiment, the secondary processing circuit may also include a controller unit, where the controller unit may include a secondary instruction processing unit configured to receive and process a micro-instruction. The above micro-instruction may be a next-level instruction of the instruction. The micro-instruction may be obtained by splitting or decoding the instruction, and may be further decoded into a control signal for various components, units, or processing circuits. For example, a product micro-instruction is a next level instruction of a convolution instruction.

A neural network operation process of the machine learning unit will be described in detail below by using a structure of the above machine learning unit as an example. The process includes the following steps S6101-S6106:

the step S6101, pre-storing an IO instruction in a starting address of an instruction storage unit of the controller unit;

the step S6102, reading, by the controller unit, the IO instruction from the starting address of the instruction storage unit, obtaining a neural network operation instruction corresponding to the machine learning unit from an off-chip memory through an off-chip interface according to a control signal obtained from decoding the IO instruction, or obtaining a neural network computation instruction corresponding to the machine learning unit from a shared memory through the transmission circuit, and storing an obtained computation instruction in the instruction storage unit;

the step S6103, reading, by the controller unit, a next IO instruction from the instruction storage unit, and according to a control signal obtained from decoding by the IO instruction, reading all data blocks (such as assigned input neuron data and weight data of neurons of the layer, an interpolation table for a quick activation function operation, a constant table for configuring parameters of the operation device, bias data, etc.) required by the operation unit from the shared memory through the transmission circuit; the data operation signal includes a source address of the above data blocks in the shared memory;

the step S6104, reading, by the controller unit, a next CONFIG (configuration) instruction from the instruction storage unit, and according to a control signal obtained from decoding by the CONFIG instruction, configuring various constants required by the computation of the neural network layer, such as configuring, by the operation unit, a value of an internal register of the operation unit according to a constant required by the activation function;

the step S6105, reading, by the controller unit, a next COMPUTE (computation) instruction from the instruction storage unit, and according to a control signal (operation instruction) obtained from decoding by the COMPUTE instruction, sending, by the operation unit, assigned input neuron data, weight data, and operation instruction of the neurons of the layer to the primary processing circuit, determining, by the primary processing circuit, the assigned input neuron data of the neurons of the layer to be broadcast data and determining the weight data to be distribution data, distributing one piece of distributed data into a plurality of data blocks, sending at least one of the data blocks, broadcast data, and at least one of a plurality of operation instructions to the secondary processing circuits, obtaining, by the secondary processing circuits, an intermediate result from a multiplication processing circuit, an accumulation processing circuit, etc., and obtaining, by the primary processing circuit, assigned neuron data output by the neurons of this layer according to the intermediate result and the activation processing circuit; and the step S6106, reading, by the controller unit, a next IO instruction from the instruction storage unit, and according to the data operation signal obtained from decoding by the IO instruction, transferring the output neuron data to the shared memory for storage through the transmission circuit to obtain input neuron data of part of neurons of the next layer; and the above data operation signal includes a destination address of the above output neuron data in the shared memory.

The step S6105 is described below with examples. For example, in a fully connected operation of neural network operations, a neural network operation process may be: $y=f(wx+b)$, where x is an input neuron matrix, w is a weight matrix, b is a bias scalar, f is an activation function which may be any of sigmoid, tanh, relu, and softmax function. For example, if there is a binary tree relationship (a tree-type relationship) between the primary processing circuit and the secondary processing circuits, and the operation unit has a primary processing circuit and 8 secondary processing circuits, then an implementation method of the above step S6105 may be: obtaining, by the controller unit, an input neuron matrix x, a weight matrix w, and a fully connected operation instruction from the shared memory, and sending the input neuron matrix x, the weight matrix w, and the fully connected operation instruction to the primary processing circuit; determining, by the primary processing circuit, the input neuron matrix x and the weight matrix w to be broadcast data and distribution data respectively, splitting, by the primary processing circuit, the weight matrix w into 8 sub-matrices, distributing the 8 sub-matrices to the 8 secondary processing circuits through the tree module, and broadcasting the input neuron matrix x to the 8 secondary processing circuits; performing, by the secondary processing circuits, multiplication and accumulation operations on the 8 sub-matrices and the input neuron matrix x in parallel to obtain 8 intermediate results, and sending the 8 intermediate results to the primary processing circuit; and sorting, by the primary processing circuit, the 8 intermediate results to obtain an operation result of wx, and performing an operation of offset b and then an activation operation on the operation result to obtain a final result y.

It can be understood that since each of the above machine learning units can perform a computation in parallel on each assigned neuron of a certain layer, the shared memory can store the output neuron data of all neurons of each layer and the input neuron data required by all the neurons of the next layer, while the weight data may be multiplexed, or weight data of a new neural network layer may be obtained from the shared memory.

It should be noted that each machine learning unit may include one or a plurality of operation units, and the structure of each operation unit may be identical or different. The structure of each operation unit is embodied in a relationship between the primary processing circuit and each secondary processing circuit, including but not limited to a tree-type relationship, an H-type relationship, and a systolic array-type relationship. The technical solutions provided in the present disclosure sets the operation unit into a single-master-multiple-slave structure and may split data according to a computation instruction of a forward operation. In this way, a plurality of secondary processing circuits may perform operations on the parts with large computation amount in parallel, which may increase the operation speed, save operation time, and reduce power consumption.

The data processing device shown in FIG. 48 in this embodiment is further described below. A data operation signal corresponding to a unicast read operation may be: a unicast read instruction and a unicast read request. A data operation signal corresponding to a unicast write operation may be: a unicast write instruction and a unicast write request. A data operation signal corresponding to a broadcast operation may be: a broadcast instruction, a multicast instruction, a broadcast request, and a multicast request. For example, a unicast read instruction is a read instruction sent by a certain machine learning unit to read input neuron data and weight data in the source address of the shared memory; the input neuron data and the weight data need to be returned to the above machine learning unit, where the input neuron data and the weight data are input neuron data and weight data required by the assigned neuron during a process of the machine learning unit performing a computation on assigned neurons of a certain layer according to a computation instruction. A unicast write instruction is a write instruction sent by a certain machine learning unit to write output neuron data obtained from a neural network computation into a destination address of the shared memory. It should be understood that output neuron data of a previous layer of the neural network may be used as input neuron data required by a next layer of the neural network, thus writing the data into the shared memory may help each machine learning unit to obtain required input neuron data from the shared memory. A broadcast instruction is a read instruction sent by a machine learning unit to read input neuron data and weight data in the source address of the shared memory. The input neuron data and the weight data are returned to all the machine learning units in the above machine learning device, where the input neuron data may be input neuron data required by all neurons of a certain layer (all output neuron data of a previous layer) and the weight data may be multiplexed weight data such as a convolution kernel. A difference between a multicast instruction and a broadcast instruction is that data return objects of the multicast instruction are a plurality of machine learning units corresponding to a flag field in the multicast instruction instead of all machine learning units in the above machine learning device. In addition, generally a difference between an instruction and a request is that an instruction has relatively large execution overhead, but include more information, while a request has relatively small execution overhead, but include less information.

Generally, when a machine learning unit sends a unicast read signal, a unicast write signal, and a broadcast and/or multicast signal, at least 3 corresponding data operation signal transmission interfaces are required, where the interfaces are respectively used to send the unicast read signal to the transmission circuit, send the unicast write signal to the transmission circuit, and send the broadcast and/or multicast signal to the transmission circuit. In this embodiment, at least one machine learning unit shares one sending interface in the machine learning unit when performing at least two of a unicast read operation, a unicast write operation, and a broadcast operation. As shown in FIG. 48, at least one sending interface 141 in the machine learning unit 0 may include two data operation signal sending interfaces: an interface a0 and an interface b0. In an implementation, the interface a0 may be a unicast read signal sending interface, and the interface b0 may be a signal sending interface shared by a unicast write signal and a broadcast and/or multicast signal; in an implementation, the interface a0 may be a unicast write signal sending interface, and the interface b0 may be a signal sending interface shared by a unicast read signal and a broadcast and/or multicast signal; in one implementation, the interface a0 may be a broadcast and/or multicast signal sending interface, and the interface b0 may be a signal sending interface shared by a unicast read signal and a unicast write signal In addition, in an optional solution, at least one machine learning unit may share a transmission interface in the machine learning unit when performing a unicast read operation, a unicast write operation, and a broadcast operation. In other words, the transmission interface may send a unicast read signal, a unicast write signal, a broadcast and/or multicast signal.

Therefore, in the data processing device shown in this embodiment, at least one machine learning unit shares one sending interface in the machine learning unit when performing at least two data operations among a unicast read operation, a unicast write operation, and a broadcast operation, which may effectively reduce the count of data operation signal transmission interfaces in the machine learning unit, save hardware resources, and reduce hardware area and power consumption.

In an optional embodiment, corresponding to the above unicast read operation, the unicast write operation, and the broadcast operation, as shown in FIG. 3 and on the basis of FIG. 48, the transmission circuit 12 in the above data processing device may include: a second transmission interface 120, a read/write processing circuit 121 connected to the second transmission interface 120, and an arbitration circuit 122 connected to the read/write processing circuit 121; the read/write processing circuit 121 is configured to receive a data operation signal sent by the at least one machine learning unit 15 through the at least one transmission interface 141 and the second transmission interface 120, send the data operation signal to the arbitration circuit 122, and return the data obtained by the arbitration circuit 122 from the shared memory 13 to the machine learning unit corresponding to the data operation signal through the second transmission interface 120 and the at least one receiving interface 142; and the arbitration circuit 122 is configured to arbitrate the data operation signal received from the read/write processing circuit 121 according to a preset arbitration rule, and operate the data in the shared memory 13 according to the data operation signal that has been successfully arbitrated.

Specifically, the read/write processing circuit 121 may process a unicast read signal, a unicast write signal, a broadcast signal, and/or a multicast signal. In an embodiment, the read/write processing circuit 121 may include: a unicast read processing circuit and a unicast write processing circuit, where the unicast read processing circuit is configured to process a unicast read signal, a broadcast signal, and/or a multicast signal. For example, if the unicast write operation and the broadcast operation performed by the machine learning unit share one sending interface in the machine learning unit, the at least one sending interface includes a unicast read signal sending interface and a shared signal sending interface. When the unicast read processing circuit processes the broadcast signal and/or the multicast signal, the processing circuit may receive the broadcast and/or multicast signal sent by at least one machine learning unit through the shared signal sending interface and the second transmission interface, send the broadcast and/or multicast signal to the arbitration circuit, and transfer data obtained by the arbitration circuit from the shared memory to a plurality of machine learning units corresponding to the broadcast and/or multicast signal through the second transmission interface and the at least one receiving interface in a preset order. The preset order is an order of returning data to the plurality of machine learning units, which can be arranged according to priorities of the plurality of machine learning units, serial numbers of the plurality of machine learning units, and the like.

Optionally, the read/write processing circuit 121 may include: a unicast read processing circuit, a unicast write processing circuit, and a broadcast processing circuit, where the unicast read processing circuit is configured to process a unicast read signal, the unicast write processing circuit is configured to process a unicast write signal, and the broadcast processing circuit is configured to process a broadcast signal and/or a multicast signal.

For example, the unicast write operation and the broadcast operation performed by the machine learning unit share one sending interface in the machine learning unit; the unicast read processing circuit may be configured to receive a unicast read signal sent by at least one machine learning unit through the unicast read signal sending interface and the second transmission interface, send the unicast read signal to the arbitration circuit, and transfer data obtained by the arbitration circuit from the shared memory to a machine learning unit corresponding to the unicast read signal through the second transmission interface and the at least one receiving interface; the unicast write processing circuit may be configured to receive a unicast write signal sent by at least one machine learning unit through the shared signal sending interface and the second transmission interface, send the unicast write signal to the arbitration circuit, and write unicast write data corresponding to the unicast write signal to the shared memory; the broadcast read processing circuit may be configured to receive a broadcast and/or multicast signal signal sent by at least one machine learning unit through the shared signal sending interface and the second transmission interface, send the broadcast and/or multicast signal to the arbitration circuit, and transfer data obtained by the arbitration circuit from the shared memory to a plurality of machine learning units corresponding to the broadcast and/or multicast signal through the second transmission interface and the at least one receiving interface. It should be noted that generally the unicast write signal may include unicast write data, or the unicast write data may be transferred through a same data path after the unicast write signal is sent.

The preset arbitration rule may be used to allow the arbitration circuit to determine priorities of a plurality of data operation signals according to a certain rule, so that the arbitration circuit may determine an object to be operated according to the priority of each data operation signal, which is to select a data operation signal with a high priority to be a data operation signal that has been successfully arbitrated; for example, a priority of a data operation signal with a large transmission rate may be set to a high priority, while a priority of a data operation signals with a small transmission rate may be set to a low priority; for example, the above preset arbitration rule may be a round-robin scheduling arbitration rule, a maximum carrier-to interference scheduling rule, a proportional fairness rule, and the like. In addition, the arbitration circuit may also use whether a data path (interface to interface) between the machine learning unit and the read/write processing circuit is idle as an auxiliary arbitration rule, in other words, a data path corresponding to a data operation signal that has been successful arbitrated is idle.

Specifically, the unicast read processing circuit may be connected to a plurality of machine learning units through the second transmission interface to perform unicast read operations of the plurality of machine learning units. The unicast read processing circuit may cache a plurality of unicast read instructions in the unicast read instruction cache queue of the unicast read processing circuit, parse the unicast read instructions to obtain corresponding unicast read instructions, and cache the corresponding unicast read instructions in the unicast read request cache queue of the unicast read processing circuit to be arbitrated by the arbitration circuit. A unicast read request can be directly cached in the unicast read request cache queue without a parsing operation. Similarly, the broadcast processing circuit may also be connected to a plurality of machine learning units through the second transmission interface, and may include a broadcast and/or multicast instruction cache queue and a broadcast and/or multicast request cache queue; similarly, the unicast write processing circuit may be connected to a plurality of machine learning units through the second transmission interface, and may include a unicast write instruction cache queue and a unicast write request cache queue which will not be further described herein. In an optional embodiment, the read/write processing circuit may include a unicast read processing circuit, a unicast write processing circuit, and a broadcast processing circuit.

Therefore, in this embodiment, the unicast read processing circuit can be used to process the unicast read operation, the unicast write processing circuit can be used to process the unicast write operation the broadcast processing circuit can be used to process the broadcast operation, and different types of data operations can be performed through different processing circuits, which simplify the processing logic.

Figure 50:
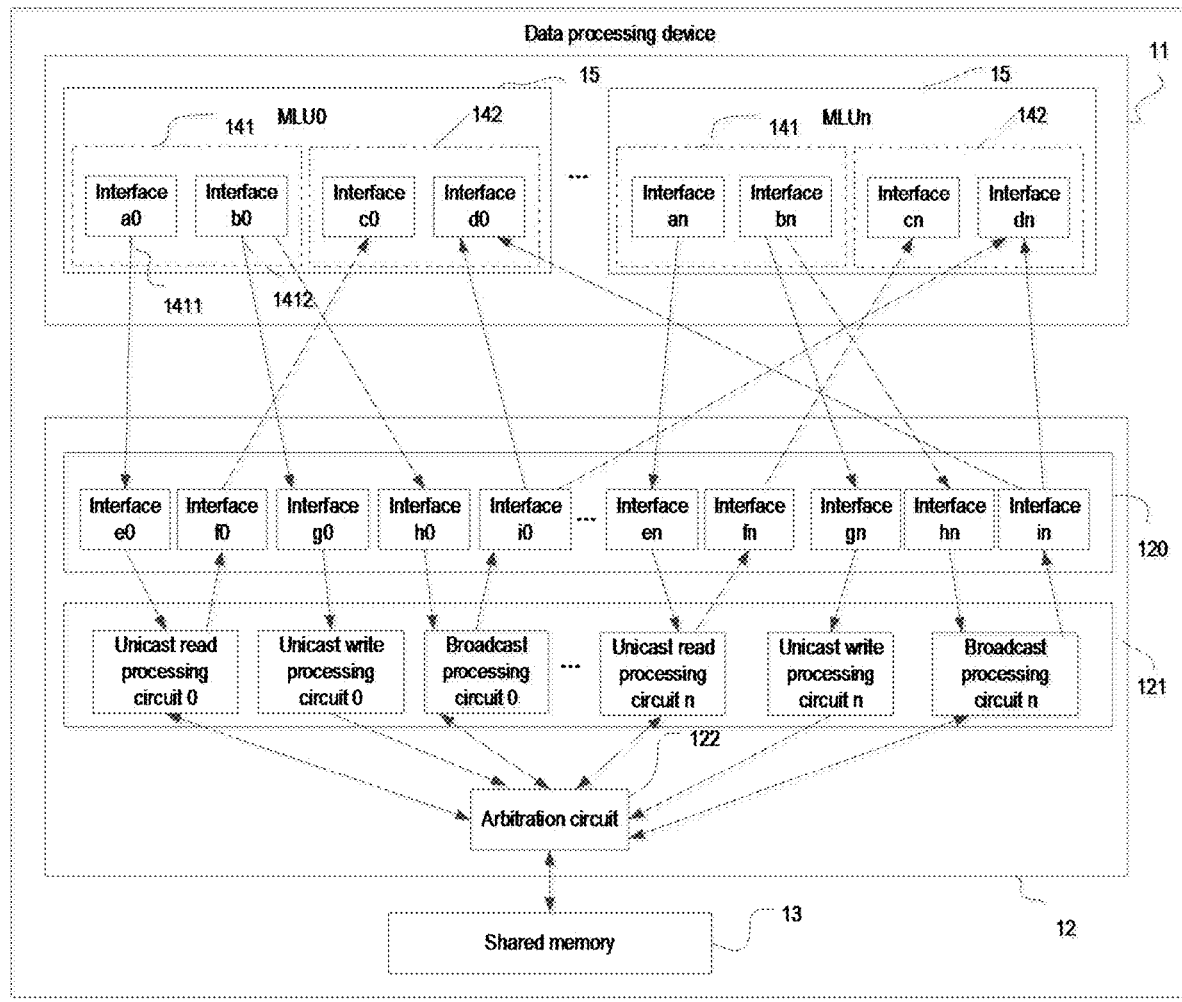
FIG. 50 is a schematic structural diagram of a data processing device according to an embodiment.

Optionally, as shown in FIG. 50, at least one machine learning unit may share a transmission interface in the machine learning unit when performing a unicast write operation and a broadcast operation. In other words, the at least one transmission interface 141 may include a shared signal transmission interface shared by a unicast write operation and a broadcast operation, and a unicast read signal transmission interface. For example, for MLU0, an interface a0 is a unicast read signal transmission interface, and an interface b0 is a shared signal transmission interface which can transfer a unicast write signal, a broadcast and/or multicast signal; an interface c0 is a unicast read data receiving interface, and an interface d0 is a broadcast and/or multicast data receiving interface. For the convenience of description, the following embodiments are described by using a same example in which at least one machine learning unit shares one transmission interface in the machine learning unit when performing a unicast write operation and a broadcast operation; the following embodiments may also be applied to other solutions in which a signal sending interface is shared.

In an optional embodiment, as shown in FIG. 50, the read/write processing circuit is divided into a plurality of processing circuit clusters, where one machine learning unit corresponds to one processing circuit cluster, and the processing circuit cluster includes a unicast read processing circuit, a unicast write processing circuit, and a broadcast processing circuit. For example, MLU0 corresponds to a unicast read processing circuit 0, a unicast write processing circuit 0, and a broadcast processing circuit 0, and MLUn corresponds to a unicast read processing circuit n, a unicast write processing circuit n, and a broadcast processing circuit n. Similarly, the second transmission interface includes a group of interfaces connected to a processing circuit cluster and a machine learning unit respectively, where the interfaces are respectively used to realize a one-to-one connection between the machine learning unit and the unicast read processing circuit, a one-to-one connection between the machine learning unit and the unicast write processing circuit, and a one-to-one connection between the machine learning unit and the broadcast processing circuit.

Specifically, as shown in FIG. 50, the second transmission interface 120 may include a plurality of interface clusters, where each of the processing circuit clusters corresponds to one interface cluster. The interface cluster includes: a unicast read signal receiving interface and a unicast read data sending interface that are connected to the unicast read processing circuit, a unicast read signal receiving interface connected to the unicast write processing circuit, and a broadcast signal receiving interface and a broadcast data sending interface connected to the broadcasting processing circuit.

For example, for MLU0, an interface cluster corresponding to a processing circuit cluster includes an interface e0, an interface f0, an interface g0, an interface h0, and an interface i0. For MLU0 and a unicast read processing circuit 0, an interface e0 in the second transmission interface is used as a unicast read signal receiving interface to be connected to a unicast read signal sending interface a0 and a unicast read processing circuit 0 of MLU0, respectively, and may be used to receive a unicast read signal sent from MLU0 and send the signal to the unicast read processing circuit 0 for processing; an interface f0 in the second transmission interface is used as a unicast read data transmission interface to be connected to a shared data receiving interface c0 and a unicast read processing circuit of MLU0, respectively, and may be used to receive input neuron data and weight data corresponding to the unicast read signal sent by the unicast read processing circuit 0 and transfer the above data to the interface c0 in MLU0. For MLU0 and a unicast write processing circuit 0, an interface g0 in the second transmission interface is used as a unicast write signal receiving interface to be connected to a shared signal sending interface b0 and a shared write processing circuit 0 of MLU0, respectively, and may be used to receive a unicast write signal sent from MLU0 and send the signal to the unicast write processing circuit 0 for processing. For MLU0 and a broadcast processing circuit 0, an interface h0 in the second transmission interface is used as a broadcast signal receiving interface to be connected to a shared signal sending interface b0 and a broadcast processing circuit 0 of MLU0, respectively, and may be used to receive a broadcast and/or multicast signal sent from MLU0 and send the signal to the broadcast processing circuit 0 for processing; an interface i0 in the second transmission interface is used as a broadcast data sending interface to be connected to shared data receiving interfaces di and the broadcast processing circuits 0 of a plurality of MLUs, respectively, and may be used to receive input neuron data and weight data corresponding to the broadcast and/or multicast signal sent by the broadcast processing circuit 0 and transfer the above data to the broadcast data receiving interfaces di in the plurality of MLUs.

Therefore, in this embodiment, the one-to-one connection between the machine learning unit and the unicast read processing circuit, the one-to-one connection between the machine learning unit and the unicast write processing circuit, and the one-to-one connection between the machine learning unit and the broadcast processing circuit may achieve targeted one-to-one data operation processing, which may reduce the complexity of the access logic of data operations, reduce conflicts, and improve the processing efficiency.

Figure 51:
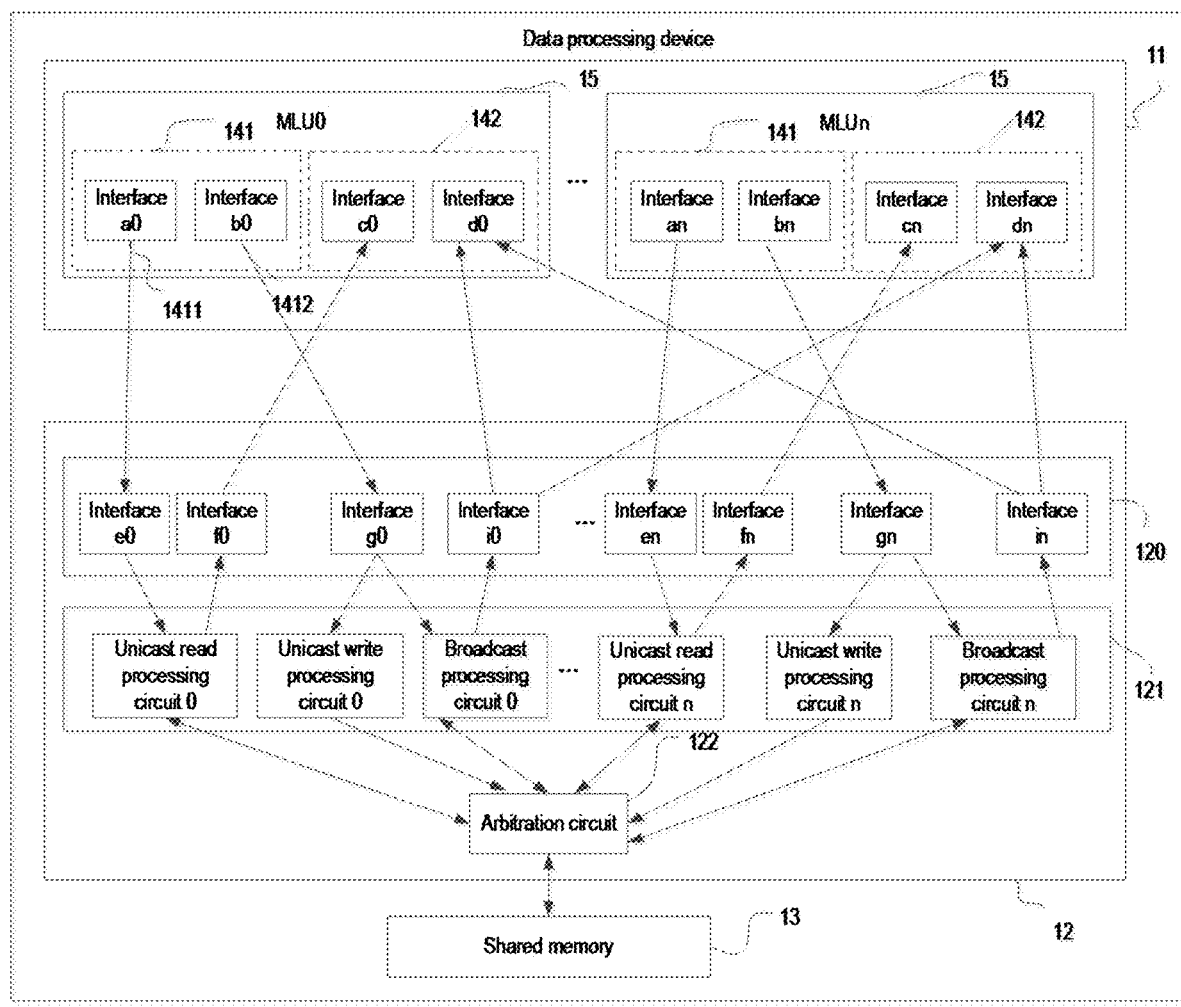
FIG. 51 is a schematic structural diagram of a data processing device according to an embodiment.

In an embodiment, as shown in FIG. 51 and on the basis of FIG. 50, a count of interfaces in the transmission circuit is reduced. The unicast write processing circuit and the broadcast processing circuit in one processing circuit cluster share a same shared signal receiving interface in the corresponding interface cluster, and the shared signal receiving interface corresponding to the processing circuit cluster is connected to the shared signal sending interface of the machine learning unit corresponding to the processing circuit cluster, and the unicast read signal receiving interface in the processing circuit cluster is connected to the unicast read signal sending interface of the machine learning unit corresponding to the processing circuit cluster. As shown in FIG. 4, for the processing circuit cluster corresponding to MLU0, the unicast write processing circuit and the broadcast processing circuit share one shared signal receiving interface g0; the shared signal receiving interface g0 is connected to the shared signal sending interface b0 in MLU0, and is used to receive a unicast write signal and a broadcast and/or multicast signal sent by the shared signal sending interface b0, and send the unicast write signal and the broadcast and/or multicast signal to the unicast write processing circuit 0 and the broadcast processing circuit 0 for processing. It can be seen that, in the transmission circuit, the unicast write processing circuit i and the broadcast processing circuit i share the shared data receiving interface gi, and a data path composed of the shared data receiving interface bi in MLUi and the shared data sending interface ei in the transmission circuit may implement transfer of unicast write data and broadcast and/or multicast data between MLUi and the transmission circuit.

The unicast write processing circuit and the broadcast processing circuit in one processing circuit cluster share a signal receiving interface. Therefore, the data processing device in this embodiment effectively reduces the count of data operation signal transmission interfaces in the machine learning unit, which may further reduce the count of interfaces in the transmission circuit, save hardware resources, and reduce hardware area and power consumption.

In an embodiment, the shared signal receiving interface corresponding to the processing circuit cluster, which is respectively connected to the unicast write processing circuit and the broadcast processing circuit in the processing circuit cluster, is configured to receive a data operation signal sent by the shared signal sending interface of the machine learning unit, divide the data operation signal into two identical data operation signals, and send the two data operation signals to the unicast write processing circuit and the broadcast processing circuit respectively. As shown in FIG. 51, for example, the shared signal receiving interface g0 may divide data operation signals (unicast read signals, broadcast and/or multicast signals) into two identical paths of data operation signals and send the two paths of signals to the unicast write processing circuit 0 and the broadcast processing circuit 0 respectively for processing. For example, the shared signal receiving interface may be respectively connected to the unicast write processing circuit 0 and the broadcast processing circuit 0 through a hardware circuit, and may divide a path of data operation signal into two identical paths of data operation signals. It should be understood that the data operation signal may be high or low level signal.

It should be understood that each processing circuit may parse a data operation signal to determine a type of the data operation signal. For example, if the signal is a unicast write signal, it is processed by the unicast write processing circuit rather than the broadcast processing circuit; if the signal is a broadcast and/or multicast signal, it is processed by the broadcast processing circuit rather than the unicast write processing circuit. Specifically, each processing circuit may determine the type of an operation signal according to an opcode of the data operation signal. For example, "write" means that the data operation signal is a unicast write signal, and "cast" means that the data operation signal is a broadcast and/or multicast signal. The processing circuit may also determine the type of an operation signal according to a count of machine learning units (data return objects) flagged in a flag field. For example, is there is 0 return object, the data operation signal is a unicast write signal; if there is 1 return object, the data operation signal is a unicast read signal; if there are a plurality of (less than n+1) return objects, the data operation signal is a multicast signal; and if there are n+1 return objects, the data operation signal is a broadcast signal.

Figure 52:
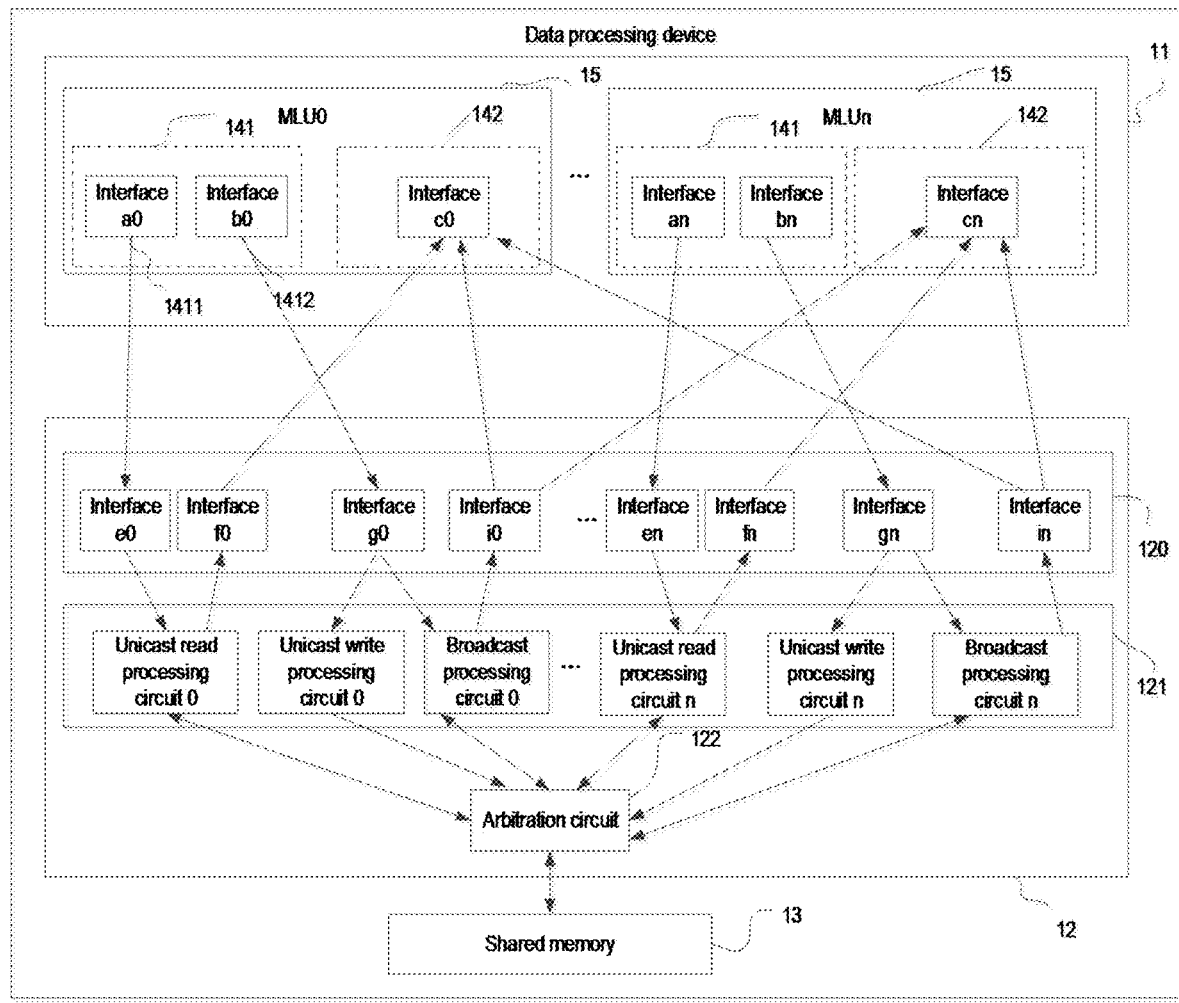
FIG. 52 is a schematic structural diagram of a data processing device according to an embodiment.

In an optional solution, as shown in FIG. 52, the count of interfaces in the machine learning unit is further reduced based on FIG. 51. The machine learning units share one data receiving interface in the machine learning unit when performing the unicast read operations and the broadcast operations, in other words, the unicast read processing circuit and the broadcast processing circuit in the processing circuit cluster share one shared data receiving interface in the machine learning unit. Compared with FIG. 51, for example, in MLU0, at least one receiving interface 142 includes an interface c0 rather than the above interfaces c0 and d0. The interface c0 in FIG. 52 may be connected to the interface f0 in the processing circuit to receive unicast read data returned by the unicast read processing circuit 0, and may also be connected to a plurality of interfaces ii in the processing circuit to receive broadcast and/or multicast data returned by a plurality of broadcast processing circuits i.

Therefore, in the data processing device shown in this embodiment, at least one machine learning unit shares one data receiving interface in the machine learning unit when performing a unicast read operation and a broadcast operation, which may further reduce the count of returned data interfaces in the machine learning unit, save hardware resources, and reduce hardware area and power consumption.

Figure 53:
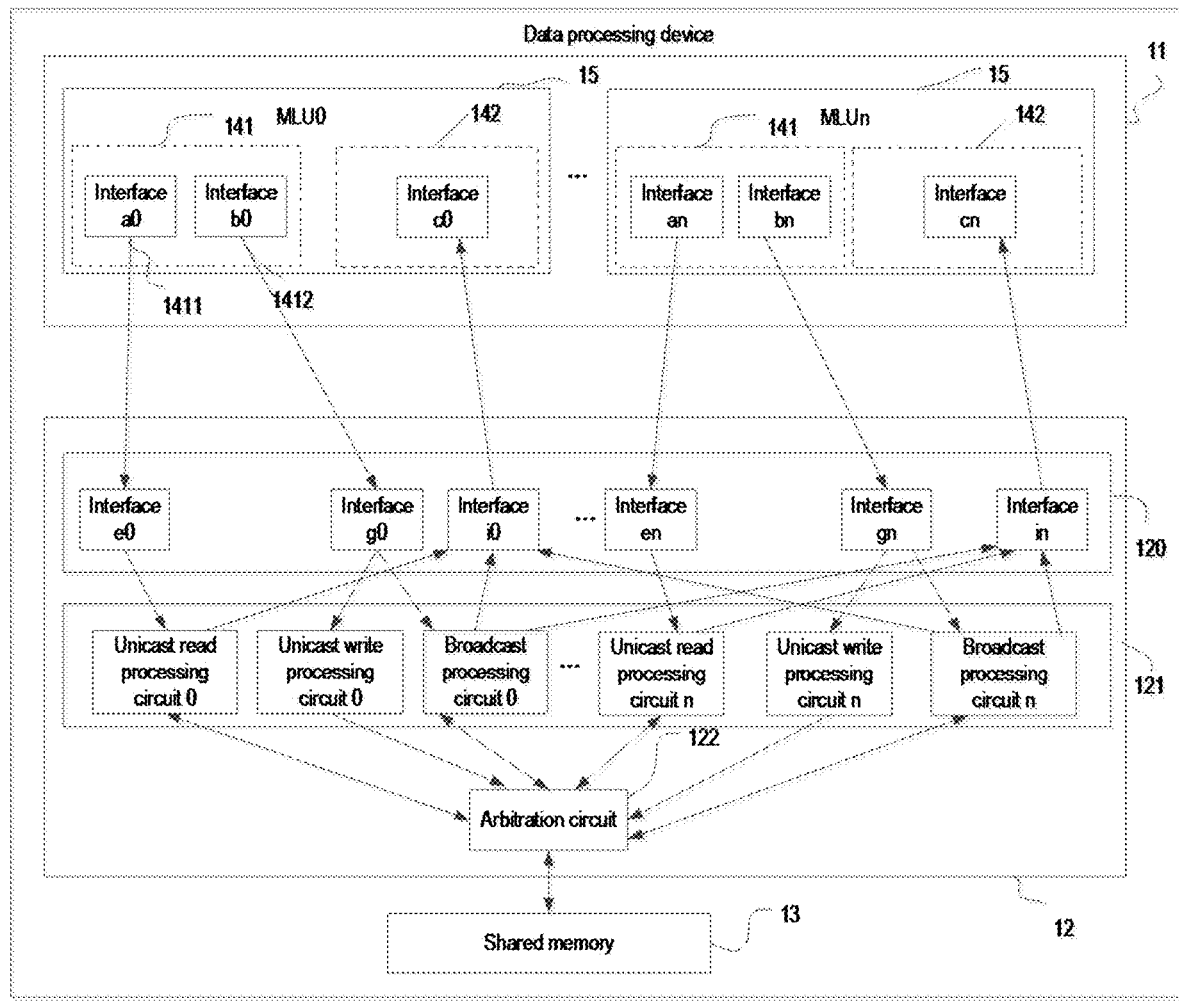
FIG. 53 is a schematic structural diagram of a data processing device according to an embodiment.

Further, as shown in FIG. 53 and on the basis of FIG. 52, the count of interfaces in the transmission circuit is further reduced. The unicast read processing circuit and the broadcast processing circuit in the one processing circuit cluster share one shared data transmission interface in the corresponding interface cluster, and the shared data transmission interface corresponding to the processing circuit cluster is connected to the shared data receiving interface of the machine learning unit corresponding to the processing circuit cluster. Compared with FIG. 52, in a processing circuit corresponding to MLU0, the unicast read processing circuit and the broadcast processing circuit share one shared data sending interface i0. The interface i0 in FIG. 53 may be connected to the unicast read processing circuit 0 in the processing circuit to receive unicast read data returned by the unicast read processing circuit 0, and may also be connected to a plurality of broadcast processing circuits i in the processing circuit to receive broadcast and/or multicast data returned by the plurality of broadcast processing circuits i.

Therefore, in the data processing device shown in this embodiment, a unicast read operation and a broadcast operation share one shared data sending interface in the machine learning unit, which may further reduce the count of returned data interfaces in the machine learning unit, save hardware resources, and reduce hardware area and power consumption.

Figure 54:
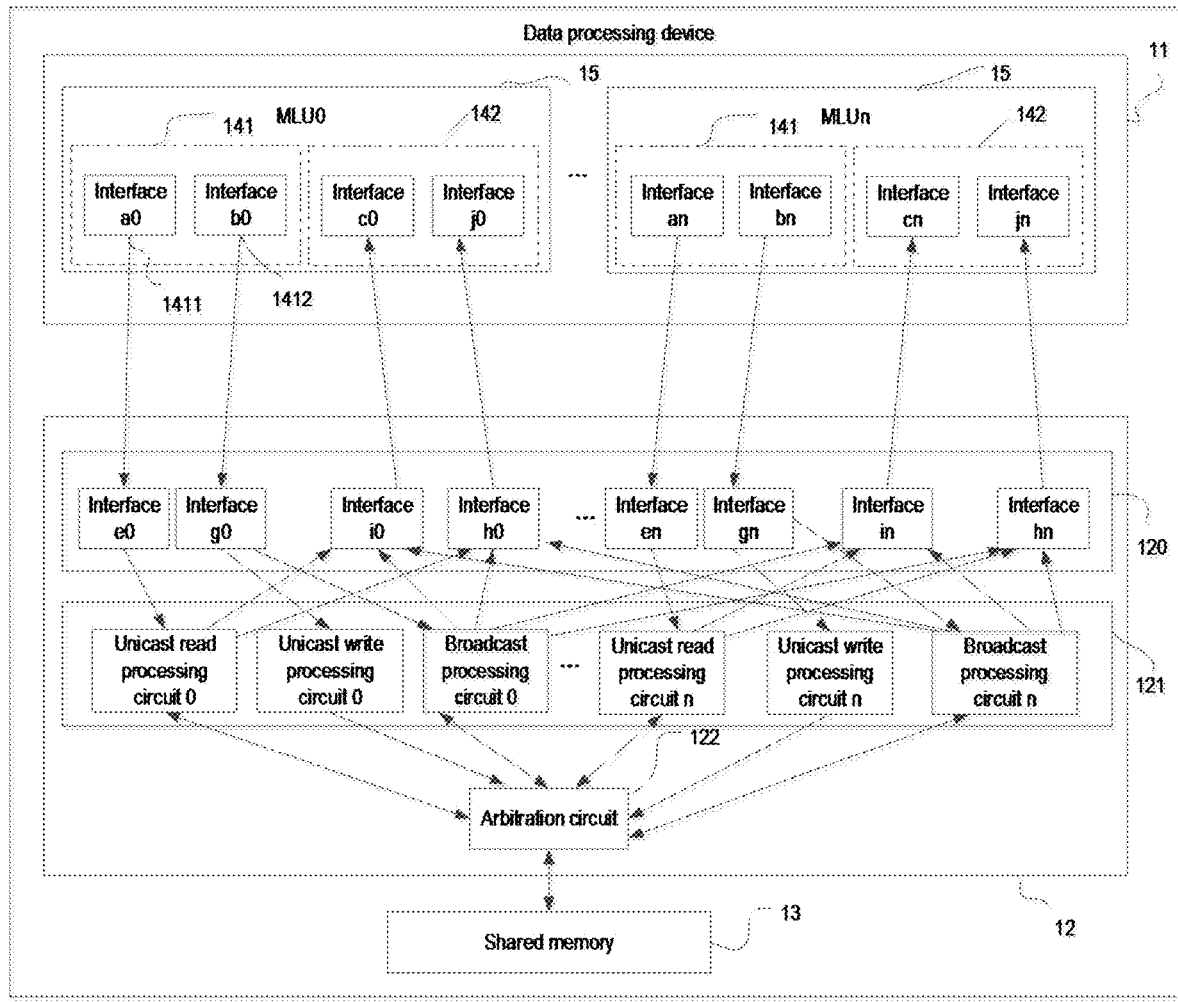
FIG. 54 is a schematic structural diagram of a data processing device according to an embodiment.

In an optional solution, referring to FIG. 54 and on the basis of FIG. 53, a machine learning unit may include at least one operation unit that does not share a data return interface, so at least one sending interface of the machine learning unit may further include at least one independent data receiving interface, where the independent data receiving interface is connected to an operation unit in the machine learning unit, and the second transmission interface may further include an independent data sending interface connected to the independent data receiving interface, where the operation unit is connected to a processing circuit cluster corresponding to the machine learning unit through the independent data receiving interface and the independent data sending interface. For example, referring to FIG. 54, MLU0 includes a plurality of operation units, where at least one of the operation units is connected to an interface j0 and other operation units are respectively connected to an interface c0. In other words, the interface c0 is a shared data receiving interface shared by the other operation units, and the interface j0 is an independent data receiving interface. Correspondingly, the second transmission interface 120 further includes an independent data sending interface h0 connected to the interface j0. In FIG. 54, the independent data sending interface h0 may be connected to a unicast read processing circuit 0 and a plurality of broadcast processing circuits i to receive unicast read data and broadcast and/or multicast data, and send the above data to the operation unit that does not share a data return interface through the independent data receiving interface j0.

Figure 55:
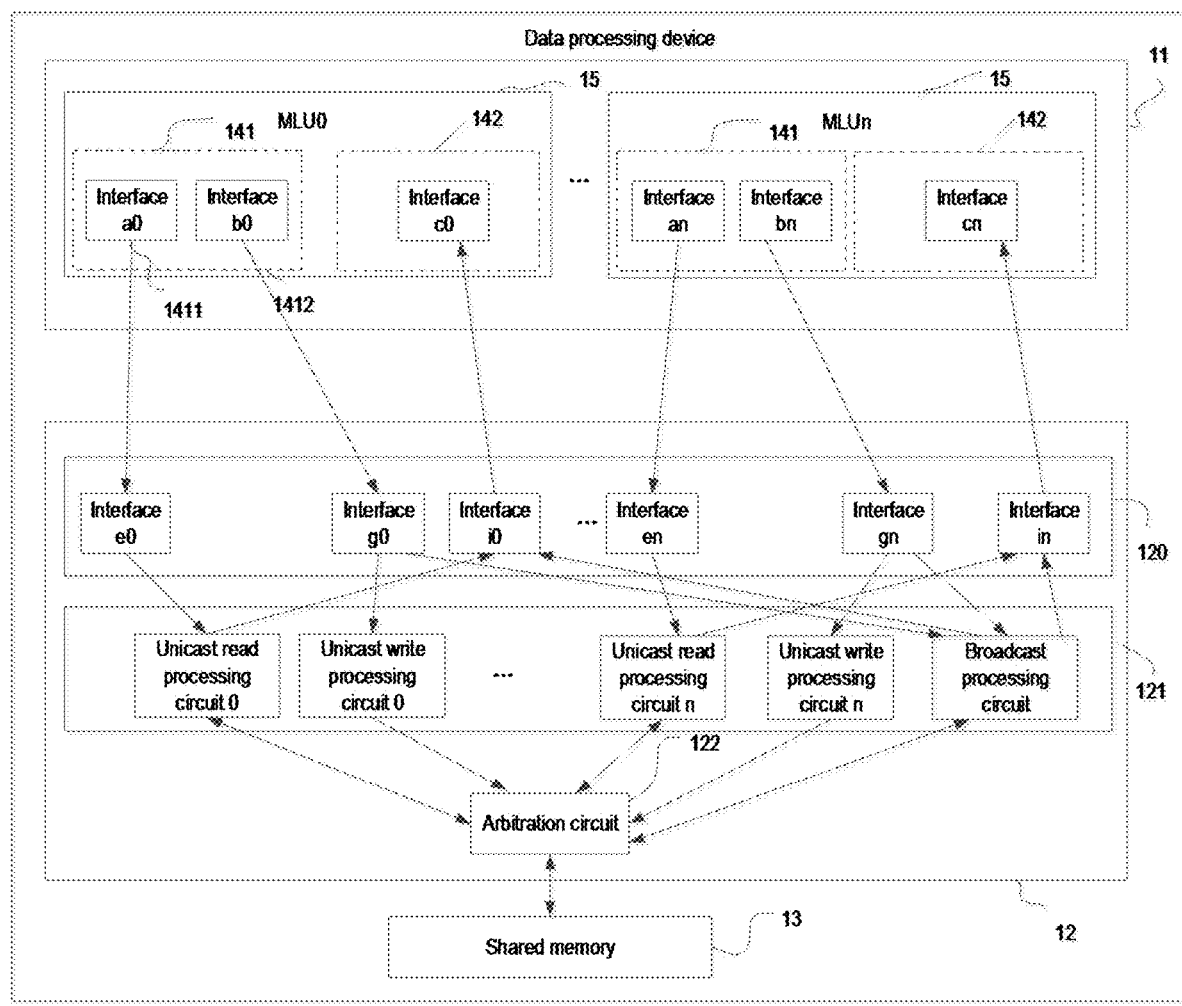
FIG. 55 is a schematic structural diagram of a data processing device according to an embodiment.

In an optional solution, referring to FIG. 55 and on the basis of FIG. 53, each machine learning unit may share one broadcast processing circuit in the processing circuit. The shared broadcast processing circuit may be connected to each shared signal receiving interface gi and each shared data sending interface ii. Therefore, in the data processing device shown in this embodiment, each machine learning unit may share one broadcast processing circuit in the processing circuit, which may reduce the count of broadcast processing circuits, simplify the transmission circuit, and reduce hardware area and power consumption.

With the continuous development of information technology, the demand for data access and data processing becomes higher, which leads to higher requirements for processors that process data and access data. For example, for a general-purpose processor, a multi-core processor composed of a plurality of general-purpose processor cores (such as CPU cores) has become a mainstream due to powerful parallel computation capabilities.

However, with continuous development of machine learning algorithms, machine learning chips with more architectures gradually come out. However, when these machine learning chips access or process data in the shared storage, the data access logic may be extremely complex, which further leads to inefficient data processing during machine learning.

Therefore, how to simplify logic of a machine learning chip on data access has become an urgent technical problem to be solved by current technicians.

To solve the above problem, the present disclosure provides the following technical solutions.

Figure 56:
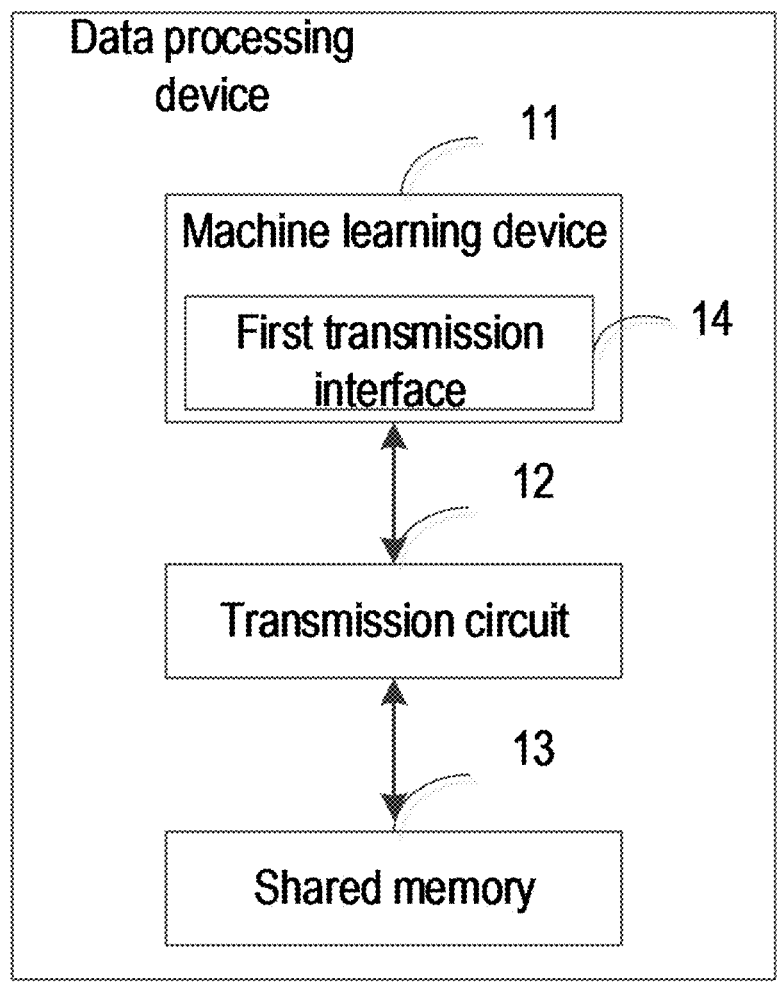
FIG. 56 is a schematic structural diagram of a data processing device according to an embodiment.

First, a data processing device used in the present disclosure will be introduced. As shown in FIG. 56, a data processing device provided. The data processing device may be implemented by software, hardware, or a combination of software and hardware. The data processing device is configured to process machine learning data. As shown in FIG. 56, the data processing device includes a machine learning device 11, a transmission circuit 12, and a shared memory 13. The machine learning device 11 is connected to the transmission circuit 12 through a first transmission interface 14, and the transmission circuit 12 is connected to the shared memory 13.

The transmission circuit 12 is configured to obtain input data required by the machine learning device from the shared memory 13 according to a data operation signal sent by the machine learning device, and return the input data to the machine learning device 11, where the data operation signal represents an operation mode for data in the shared memory.

Optionally, the machine learning device 11 is configured to perform a machine learning operation according to the input data to obtain output data. Optionally, the machine learning device 11 is further configured to transfer the output data to the shared memory 13 through the transmission circuit 12 for data storage. Specifically, when the machine learning device 11 is configured to perform a neural network operation, the device 11 may perform an artificial neural network operation according to input neuron data and weight data to obtain output neuron data, use the output neuron data as new input neuron data, and transfer the new input neuron data to the shared memory 13 through the transmission circuit 12 for data storage. It should be noted that the above machine learning device 11, the transmission circuit 12, the shared memory 13, and the first transmission circuit 14 may all be implemented by hardware circuits. For example, the transmission circuit 12 may be a broadcast bus, the shared memory 13 may be a non-volatile and/or volatile memory, including but not limited to a random access memory (RAM), a scratchpad memory, and the like, and the first transmission interface may correspond to one or more data I/O (in/out) interfaces or I/O pins.

Optionally, the machine learning device 11 may include one or more first transmission interfaces 14. The first transmission interface 14 may be a sending interface or a receiving interface. When the first transmission interface 14 is a sending interface, the machine learning device 11 may send a data operation signal or data to the transmission circuit 12 connected to the sending interface; when the first transmission interface 14 is a receiving interface, the machine learning device 11 may receive data returned by the transmission circuit 12.

The data operation signal indicates that an operation performed on data in the shared memory 13. In an optional embodiment, the data operation signal may indicate performing a read or write operation on the data in the shared memory 13. Correspondingly, when the data operation signal sent by the machine learning device 11 is a read operation, the transmission circuit 12 may find data in a corresponding address from the shared memory 13, read the data, and then return the data to the at least one machine learning device 11; when the data operation signal sent by the machine learning device 11 is a write operation, the transmission circuit 12 may write the write data output by the machine learning device 11 into the shared memory 13.

The input data is data that the machine learning device 11 needs to input when performing a machine learning operation. The above data may be original data pre-stored in the shared memory 13, or may be data obtained from writing an intermediate result or a final result output by the machine learning device 11 when performing a machine learning operation into the shared memory 13.

Optionally, the above input data may include input neuron data and/or weight data, where the input neuron data and the weight data are data to be input by the machine learning device 11 during execution of an artificial neural network operation. The above output data may include output neuron data, where the output neuron data is an intermediate result or a final result output by the machine learning device 11 during execution of an artificial neural network operation.

It should be noted that the data processing device used in the present disclosure may be at least one of the following structural forms: the machine learning device 11 may be connected to a transmission circuit 12 through a plurality of first transmission interfaces 14, and then be connected to a shared memory 13 through the transmission circuit 12 to obtain the above data; optionally, the machine learning device 11 may also be connected to a plurality of transmission circuits 12 through a plurality of first transmission interfaces 14, and then be connected to a shared memory 13 through the transmission circuits 12 to obtain the above data; optionally, the machine learning device 11 may also be connected to a transmission circuit 12 through a plurality of first transmission interfaces 14, and then be connected to a plurality of shared memories 13 through the transmission circuit 12 to obtain the above data.

Optionally, when the machine learning device 11 performs an artificial neural network operation, for a multi-layer neural network operation (a forward operation or a backward operation), the machine learning device 11 may compute neuron data output by each layer of neural network, and specifically, may perform an operation set including a series of artificial neural network operations such as a product operation, a sum operation, a convolution operation, and an activation operation on a plurality of input neuron data corresponding to an input of each layer of neural network to obtain an operation result. After the machine learning device 11 obtains output neuron data of a current layer through the artificial neural network operation, the output neuron data may be used as input neuron data of a next layer of neural network for another artificial neural network operation, before which the output neuron data of the current layer may be written into the shared memory 13 through the transmission circuit 12 for storage, so that the machine learning device 11 may read the data at any time for an artificial neural network operation of the next layer.

The data processing device for performing machine learning operations provided in the above embodiment includes: a machine learning device, a transmission circuit connected through the first transmission interface on the machine learning device, and a shared memory connected to the transmission circuit. The transmission circuit is configured to obtain input data required by the machine learning device from the shared memory according to a data operation signal sent by the machine learning device, and return the input data to the machine learning device; in the above data operation process, since there is a large amount of data sharing during execution of the machine learning operation, a corresponding transmission circuit is arranged in the data processing device used in the present disclosure to allow the machine learning device to read and write data from the shared memory. In a direct data access process of a traditional CPU to a memory, blockage and deadlock may be caused by the complex parallel data access logic when CPU performs a parallel operation, while the data processing device used in the present disclosure may simplify the data access logic of a machine learning device to a shared memory, which improve the data access efficiency and further improve the machine learning operation speed of a machine learning device.

Figure 56A:
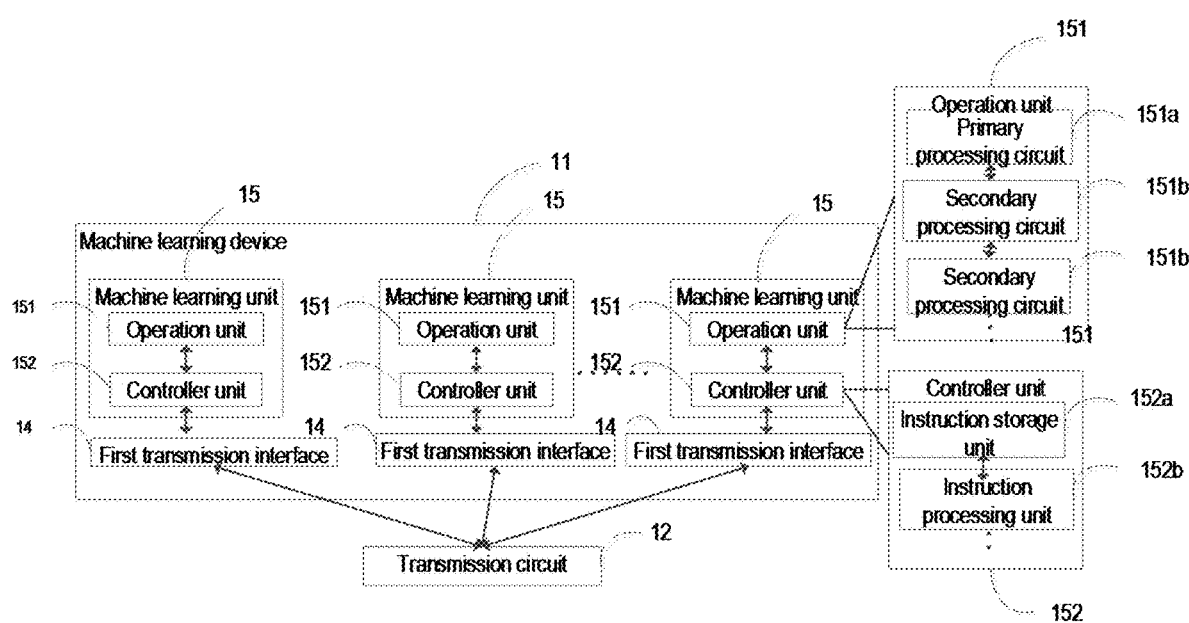
FIG. 56A is a schematic structural diagram of a machine learning device according to an embodiment.

FIG. 56A is a schematic structural diagram of a machine learning device according to an embodiment of the present disclosure. On the basis of the above embodiments and referring to FIG. 56A, the machine learning device 11 includes at least one machine learning unit 15. The machine learning unit 15 includes: at least one operation unit 151, and a controller unit 152 connected to the operation unit 151; the operation unit 151 includes a primary processing circuit 151a and a plurality of secondary processing circuits 151b, where the operation unit 151 is connected to the transmission circuit 12 through a first transmission interface 12.

The above controller unit 152 is configured to send a data operation signal and output data to the transmission circuit 12 through a sending interface in the first transmission interface 14, receive input data obtained by the transmission circuit 12 from the shared memory 13 through a receiving interface in the first transmission interface 14, and send the input data to the primary processing circuit 151a and/or the secondary processing circuits 151b; the primary processing circuit 151a is configured to distribute the input data to a plurality of secondary processing circuits 151b; the plurality of processing circuits 151b are configured to perform an intermediate operation in parallel according to data transferred by the primary processing circuit 151a to obtain a plurality of intermediate results, and send the plurality of intermediate results to the primary processing circuit 151a; and the primary processing circuit 151a is further configured to perform subsequent processing on the plurality of intermediate results to obtain a computation result.

Optionally, the machine learning device 11 may also include a machine learning unit 15. This machine learning device 11 is suitable for a situation where a small number of neurons are included in a neural network structure involved when the machine learning device 11 performs an artificial neural network operation, and may use only one machine learning unit 15 to complete an entire neural network operation. The specific operation process includes: the machine learning unit 15 may perform an artificial neural network operation according to input neuron data and weight data corresponding to each layer of neurons in the neural network to obtain output neuron data corresponding to each layer of neurons, and use the output neuron data as new input neuron data for a neural network operation of a next layer until the entire neural network operation is completed and the final operation result is obtained. In the process, the machine learning device 11 may transfer output neuron data obtained by the machine learning unit 15 in an operation of each layer, or the final operation result is sent to the shared memory 13 through the transmission circuit 12 for data storage.

Optionally, the machine learning device 11 may also include a plurality of machine learning units 15. This machine learning device 11 is suitable for a situation where a large number of neurons are included in a neural network structure involved when the machine learning device 11 performs an artificial neural network operation. For example, for the operation of a multi-layer neural network, in a neural network operation of the forward operation of a certain layer, when there are a large number of neurons in this layer, in an optional computation manner, the above machine learning device 11 may use a plurality of machine learning units 15 to perform a computation in parallel on output neuron data of part of neurons in a layer of neural network, respectively. For example, a machine learning device 11 includes 4 machine learning units 15, and a layer of neural network has 100 neurons, then the machine learning device 11 may allocate each machine learning unit 15 to process 25 neurons, and output corresponding output neuron data. The above computation manner of performing a neural network computation in parallel layer by layer may realize parallel processing of neural network computation, which improves the processing efficiency.

Optionally, in the above machine learning unit 15, the controller unit 152 may include an instruction storage unit 152a and an instruction processing unit 152b. Optionally, the controller unit 152 may include a plurality of instruction storage units 152a and a plurality of instruction processing units 152b.

The instruction storage unit 152a is configured to store all operation instructions involved in a machine learning operation performed by the machine learning unit 15 and corresponding data read/write operation instructions when a read/write data operation is required. The instruction processing unit 152b is configured to process all the instructions in the instruction storage unit 152a. Specifically, the instruction processing unit 152b sends an operation instruction in the instruction storage unit 152a to the operation unit 151 to allow the operation unit 151 to perform a corresponding operation operation according to the operation instruction, parses a data read/write operation instruction in the instruction storage unit 152a to obtain a data operation signal, and sends the data operation signal to the first transmission interface 14 to allow the first transmission interface 14 to read/write data from the shared memory 13 through the data operation signal.

Optionally, in the above machine learning unit 15, the controller unit 151 may include a primary processing circuit 151a and a secondary processing circuit 151b. Optionally, the operation unit 151 may include a primary processing circuit 151a and a plurality of secondary processing circuits 151b. This structural design is suitable for application scenarios where a large amount of data needs to be processed, especially for scenarios where a large number of parallel operations are involved in the machine learning operation process. Therefore, the operation structure provided in the present disclosure may increase the operation speed, save operation time, and thus reducing power consumption.

It should be noted that each secondary processing circuit 151b in the above structure may directly perform a parallel operation according to the input data sent by the primary processing circuit 151a. Optionally, each secondary processing circuit 151b may directly perform a parallel operation according to the input data sent by the controller unit 152.

Based on the situation where each operation unit 151 has a primary processing circuit 151a and a plurality of secondary processing circuits 151b, the primary processing circuit 151a and the plurality of secondary processing circuits 151b in each operation unit 151 may have identical or different structures. The structure of the primary processing circuit 151a and the secondary processing circuits 151b may include at least one of an H-type, a systolic array type, and a tree structure.

The machine learning device in the above embodiment includes at least one machine learning unit, where each machine learning unit includes: at least one operation unit, and a controller unit connected to the operation unit; at the same time, the operation unit includes a primary processing circuit and a plurality of secondary processing circuits, where the operation unit is connected to the transmission circuit through the first transmission interface. The controller unit in the above machine learning device is configured to send a data operation signal and output data to the transmission circuit through a sending interface in the first transmission interface, receive input data obtained by the transmission circuit from the shared memory through the receiving interface in the first transmission interface, and send the input data to the primary processing circuit and/or the secondary processing circuits. The above machine learning device includes a primary processing circuit and a plurality of secondary processing circuits. The primary processing circuit may simultaneously distribute obtained data to the plurality of secondary processing circuits to allow the plurality of secondary processing circuits to perform a parallel operation, and return intermediate operation results to the primary processing circuit for operations to complete a machine learning operation. Compared with the traditional processors used for machine learning operations in which there is only one method for a processing circuit to operate data, the machine learning device provided in the present disclosure processes and operates data faster.

Figure 57:
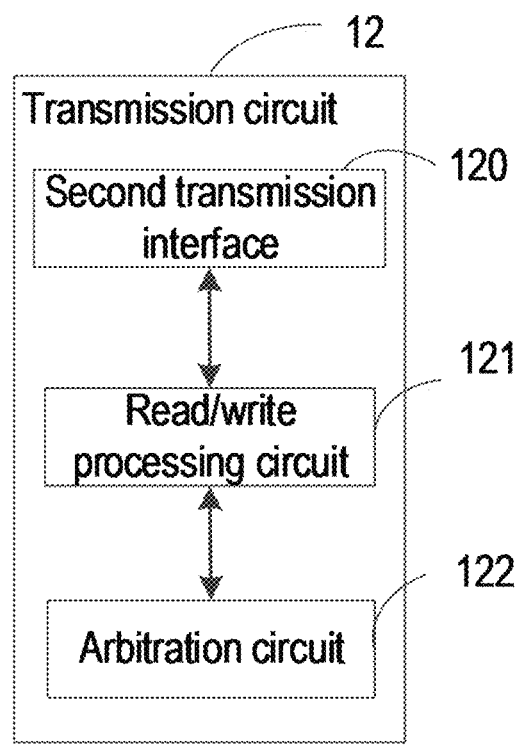
FIG. 57 is a schematic structural diagram of a transmission circuit according to an embodiment.

FIG. 57 is a schematic structural diagram of a transmission circuit according to an embodiment. Referring to FIG. 57, the transmission circuit 12 includes: a second transmission interface 120, at least one read/write processing circuit 121 connected to the second transmission interface 120, and an arbitration circuit 122 connected to the read/write processing circuit 121; the at least one machine learning unit 15 is connected to the transmission circuit 12 through a connection between the first transmission interface 14 and the second transmission interface 120.

The read/write processing circuit 121 is configured to receive the data operation signal sent by the at least one machine learning unit 15 through the first transmission interface 14 and the second transmission interface 120, transmit the data operation signal to the arbitration circuit 122, and transfer the data read from the shared memory 13 to the at least one machine learning unit 15 through the second transmission interface 120; and the arbitration circuit 122 is configured to arbitrate the data operation signal received from the read/write processing circuit 121 according to a preset arbitration rule, and perform an operation on data in the shared memory 13 according to the data operation signal that has been successfully arbitrated.

Optionally, the transmission interface 12 may include a plurality of second transmission interfaces 120, where the second transmission interface 120 may be a sending interface or a receiving interface. When the second transmission interface 120 is a sending interface, the transmission circuit 12 may send data to a machine learning unit 15 connected to the sending interface; when the second transmission interface 120 is a receiving interface, the transmission circuit 12 may receive a data operation signal and/or data sent from the machine learning unit 15 to the receiving interface. Optionally, the sending interface of the second transmission interface 120 is connected to the receiving interface in the first transmission interface 14, and the receiving interface of the second transmission interface 120 is connected to the sending interface in the first transmission interface 14.

Figure 57A:
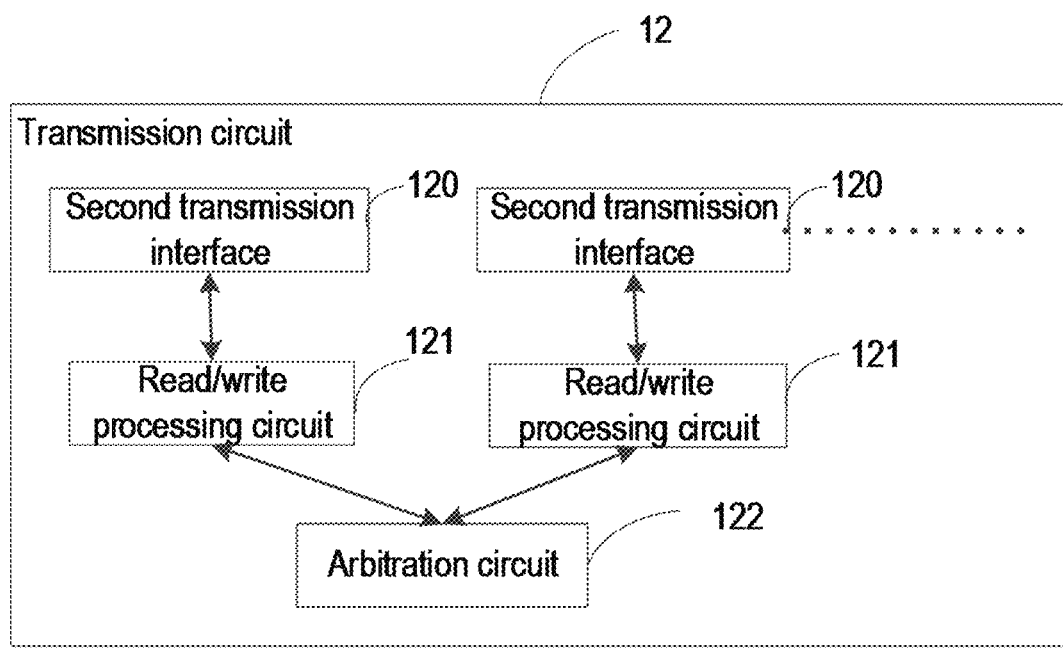
FIG. 57A is a schematic structural diagram of a transmission circuit according to an embodiment.
Figure 57B:
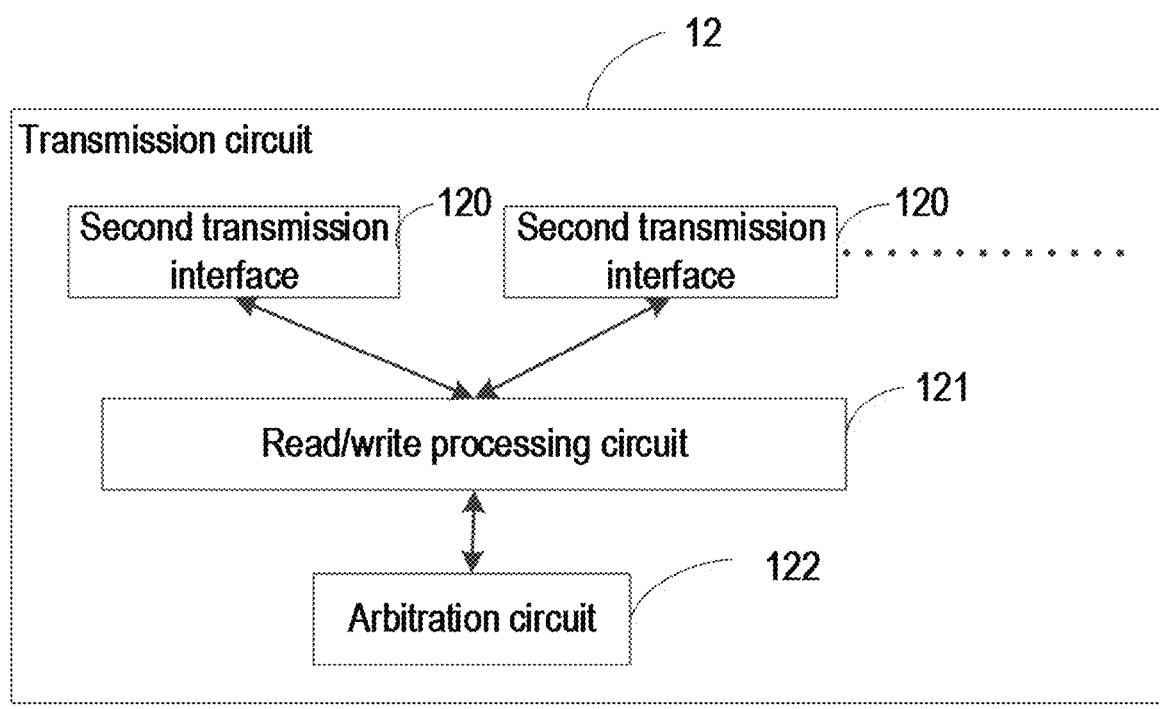
FIG. 57B is a schematic structural diagram of a transmission circuit according to an embodiment.

Optionally, referring to FIG. 57A, the transmission circuit 12 may include a plurality of read/write processing circuits 121, and input ends of the plurality of read/write processing circuits 121 may be connected with the plurality of second transmission interfaces 120 in a one-to-one correspondence. Optionally, referring to FIG. 2B, the transmission circuit 12 may only include one read/write processing circuit 121, and the input end of the read/write processing circuit 121 may be connected with the plurality of second transmission interfaces 120 in a one-to-many correspondence. In other words, one read/write processing circuits 121 is correspondingly connected to the plurality of second transmission interfaces 120.

Optionally, when the plurality of read/write processing circuits 121 are connected to a plurality of second transmission interfaces 120 in a one-to-one correspondence, each read/write processing circuit 121 may transfer data to one or more machine learning units 15 through a second transmission interface connected to the same read/write processing circuit 120; when the above one read/write processing circuit 121 is connected to a plurality of second transmission interfaces 120 in a one-to-many correspondence, the read/write processing circuit 121 may transfer data to a plurality of machine learning units 15 through a plurality of second transmission interfaces 120 connected to the same read/write processing circuit, or transfer data to one machine learning unit 15 through one of the second transmission interfaces 120.

Optionally, the structure of the above transmission circuit 12 may include an arbitration circuit 122, and the input end of the arbitration circuit 122 may be connected to a plurality of read/write processing circuits 121. An output end of the arbitration circuit 122 is connected to the shared memory 13, or may be connected to other storage devices or control devices.

It can be seen from the above embodiment that the transmission circuit 12 used in the present disclosure may include a plurality of read/write processing circuits 121. Correspondingly, types of the plurality of read/write processing circuits 121 may be identical or different. In the following embodiments, modes of data transfer will be specifically described according to types of the read/write processing circuits 121 and types of data signals received by the read/write processing circuits 121.

Specifically, the read/write processing circuit 121 includes at least one of the following processing circuits: a unicast read processing circuit, a unicast write processing circuit, and a broadcast processing circuit; the data operation signal includes at least one of the following: a unicast read request, a unicast write request, a unicast read instruction, a unicast write instruction, a multicast instruction, and a broadcast instruction, where A unicast-type processing circuit is configured to process a unicast-type signal. For example, the unicast read processing circuit in the above embodiment may process a corresponding unicast read request or a unicast read instruction, and the unicast write processing circuit may process a corresponding unicast read request or a unicast read instruction. Correspondingly, a multicast-type processing circuit is configured to process a multicast-type or broadcast-type signal. For example, the broadcast-type processing circuit in the above embodiment is configured to process a multicast-type or broadcast-type signal.

It should be noted that if the data operation signal is an instruction-type signal, which is the unicast read instruction, the unicast write instruction, the multicast instruction, or the broadcast instruction in this embodiment, the read/write processing circuit 121 is specifically configured to parse the instruction-type signal to generate a request-type signal and send the request-type signal to the arbitration circuit 122; if the data operation signal is a request-type signal, which is the unicast read request or the unicast read request in this embodiment, the read/write processing circuit 121 is configured to perform a temporary storage operation on the request-type signal and send the request-type signal to the arbitration circuit 122.

Optionally, if the data operation signal is a multicast instruction and the multicast instruction carries identifiers of a plurality of target machine learning units that need to receive data, when the read/write processing circuit 121 in the transmission circuit 12 receives a multicast instruction, the read/write processing circuit 121 may identify a plurality of target machine learning units according to the identifiers carried in the multicast instruction, and finally send data to be returned to a plurality of identified target machine learning units.

Optionally, if the data operation signal is a broadcast instruction, the broadcast instruction may not carry any identifier of target machine learning units that receive the data; however, when the read/write processing circuit 121 receives a broadcast instruction, the read/write processing circuit 121 may transfer data obtained by the arbitration circuit 122 from the shared memory 13 to all the machine learning units 15 included in the machine learning device 11.

Optionally, the preset arbitration rule is used to enable the arbitration circuit 122 to determine priorities of a plurality of data operation signals according to a certain rule, so that the arbitration circuit 122 may determine data operation signals that have been successfully arbitrated according to the priority of each data operation signal. For example, if a transmission rate of a data operation signal sent by a 1 #read/write processing circuit 121 is higher than a transmission rate of a data operation signal sent by a 2 #read/write processing circuit 121, the arbitration circuit 122 may set a priority of the data operation signal with a higher transmission rate to a high priority and set a priority of the data operation signal with a low transmission rate to a low priority, then the arbitration circuit 122 may select a data operation signal with high priority according to the above priority to obtain data from the shared memory 13 according to the data operation signal.

In the above embodiment, the transmission circuit includes: a second transmission interface, at least one read/write processing circuit connected to the second transmission interface, an arbitration circuit connected to the read/write processing circuit. The read/write processing circuit 121 is configured to receive a data operation signal transmitted by at least one machine learning unit through the first transmission interface and the second transmission interface, transmit the data operation signal to the arbitration circuit, and transfer data read from the shared memory to the at least one machine learning unit through the second transmission interface; and the arbitration circuit is configured to arbitrate the data operation signal received from the at least one read/write processing circuit according to a preset arbitration rule, and perform an operation on data in the shared memory according to the data operation signal that has been successfully arbitrated. In the above transmission circuit, a plurality of read/write processing circuits are connected to the machine learning device through a plurality of second transmission interfaces, and the arbitration circuit performs arbitration, which realizes effective data transfer and avoids data conflict and blockage caused by the machine learning device simultaneously sending a plurality of data operations; in addition, the transmission circuit in this embodiment may process various types of instructions or requests, which greatly improves the application range of the data processing device.

Figure 58:
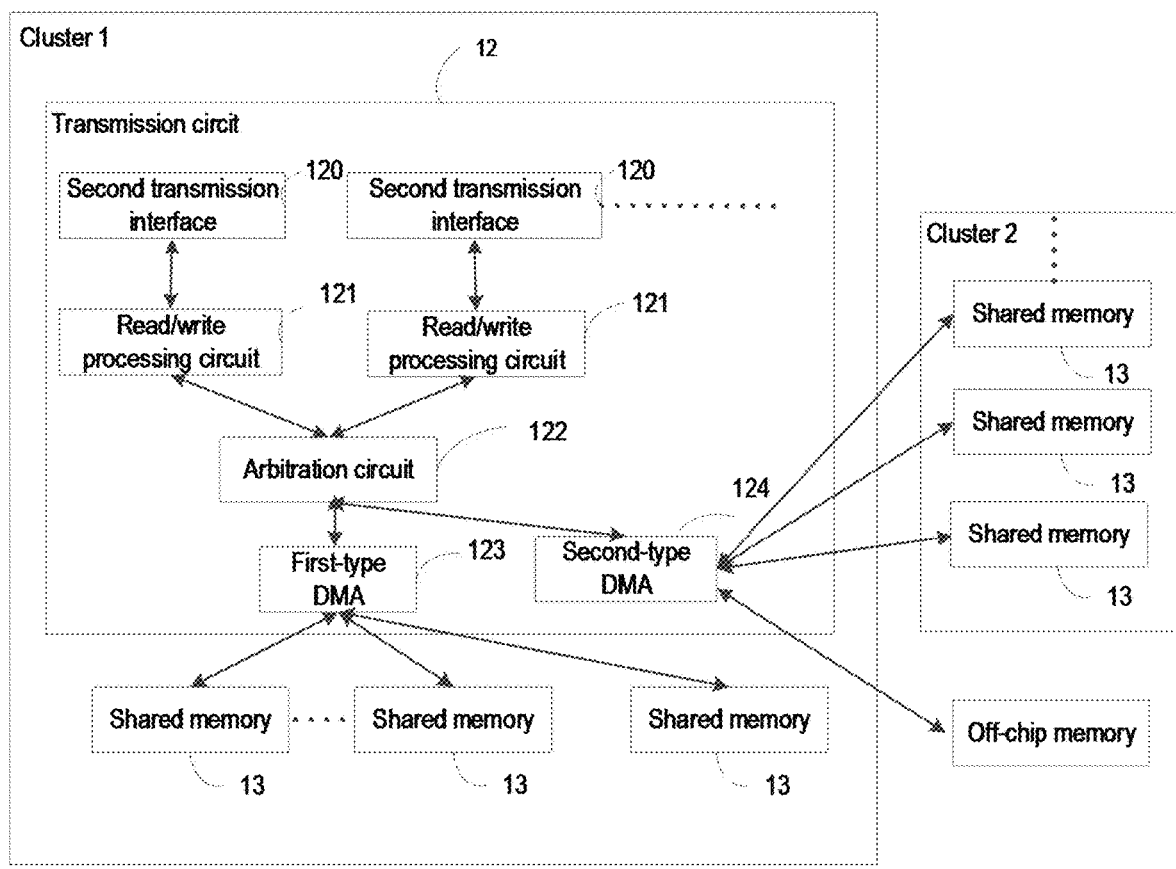
FIG. 58 is a schematic structural diagram of a transmission circuit in a cluster according to an embodiment.

In an embodiment, the data processing device in the above embodiment may be divided into at least one cluster, and each cluster includes a plurality of machine learning units 15, a transmission circuit 12, and at least one shared memory 13; in an application scenario where a plurality of clusters exist, referring to FIG. 58, the transmission circuit 12 further includes: a first type of direct memory access controller DMA123 connected to an arbitration circuit in a same cluster and a shared memory 13 in the same cluster, and/or, a second type of DMA124 connected to the arbitration circuit in a same cluster and shared memories 13 in other clusters.

The first type of DMA123 is configured to control data interaction between the arbitration circuit 122 in the cluster and the shared memory 13 in the cluster; the second type of DMA is configured to control data interaction between the arbitration circuit 122 in the cluster and shared memories 13 in other clusters, and control data interaction between the arbitration circuit 122 in the cluster and an off-chip memory.

Optionally, functions of the first type of DMA123 and the second type of DMA124 are mainly to control the arbitration circuit 122 to be connected to at least one shared memory 13, and to quickly read or write data from the at least one connected shared memory 13.

Figure 59:
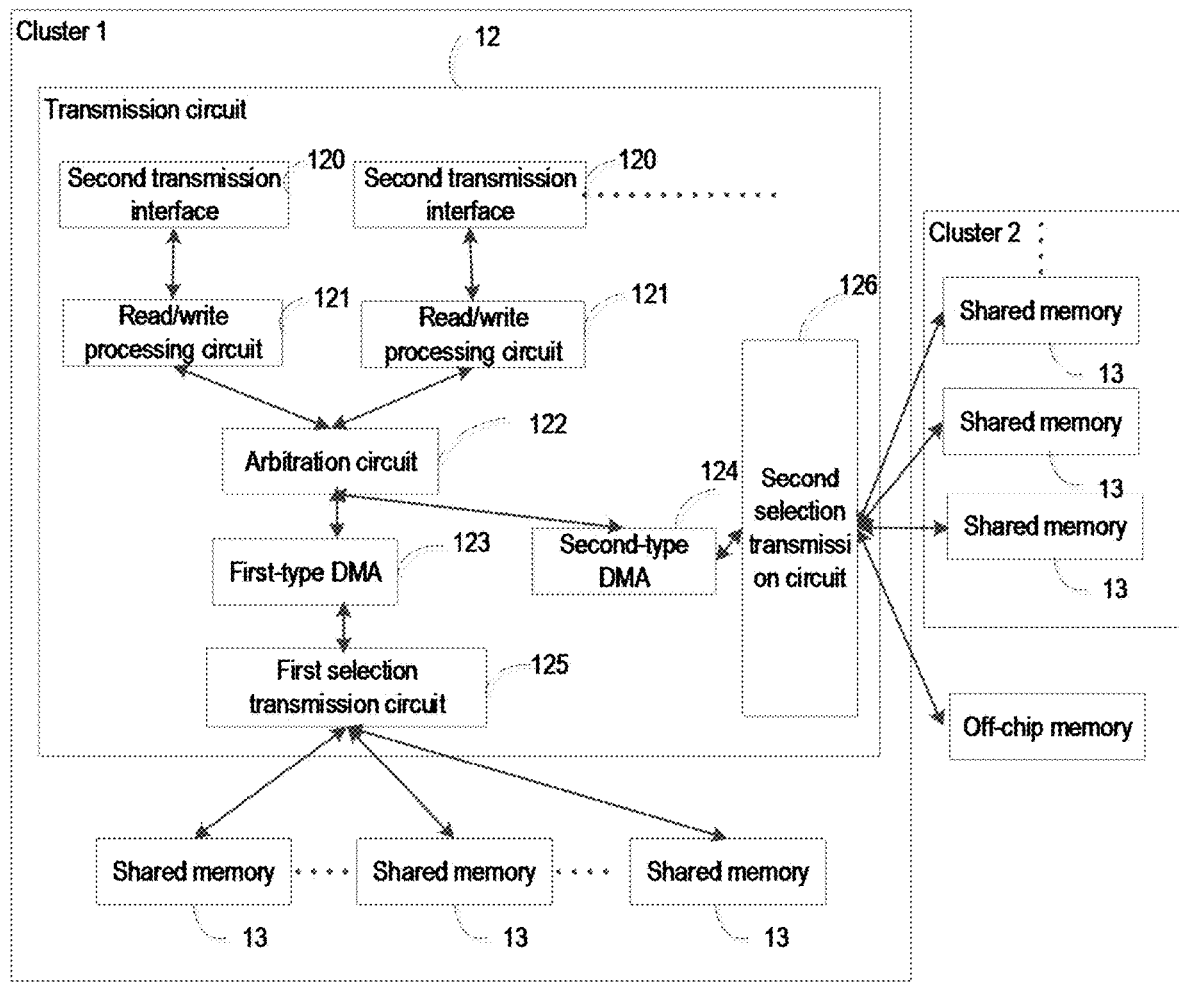
FIG. 59 is a schematic structural diagram of another transmission circuit in a cluster according to an embodiment.

When there is the first type of DMA123 or the second type of DMA124 in the transmission circuit, referring to FIG. 59, the transmission circuit 12 used in the present disclosure may further include: a first selection transmission circuit 125 connected to the first type of DMA123 and a second selection transmission circuit 126 connected to the second type of DMA. The first selection transmission circuit 125 is configured to be selectively connected to the shared memory 13 in a same cluster, and the second selection transmission circuit 126 is configured to be selectively connected to the shared memories 13 in a same cluster and other clusters, and the off-chip memory.

Optionally, the first selection transmission circuit 125 and the second selection transmission circuit 126 may be circuits of types such as crossbar switches, toggle switches, etc., and may control whether the circuits are connected or not by setting an on-off current or an on-off signal, which is not limited in the present disclosure.

Figure 60:
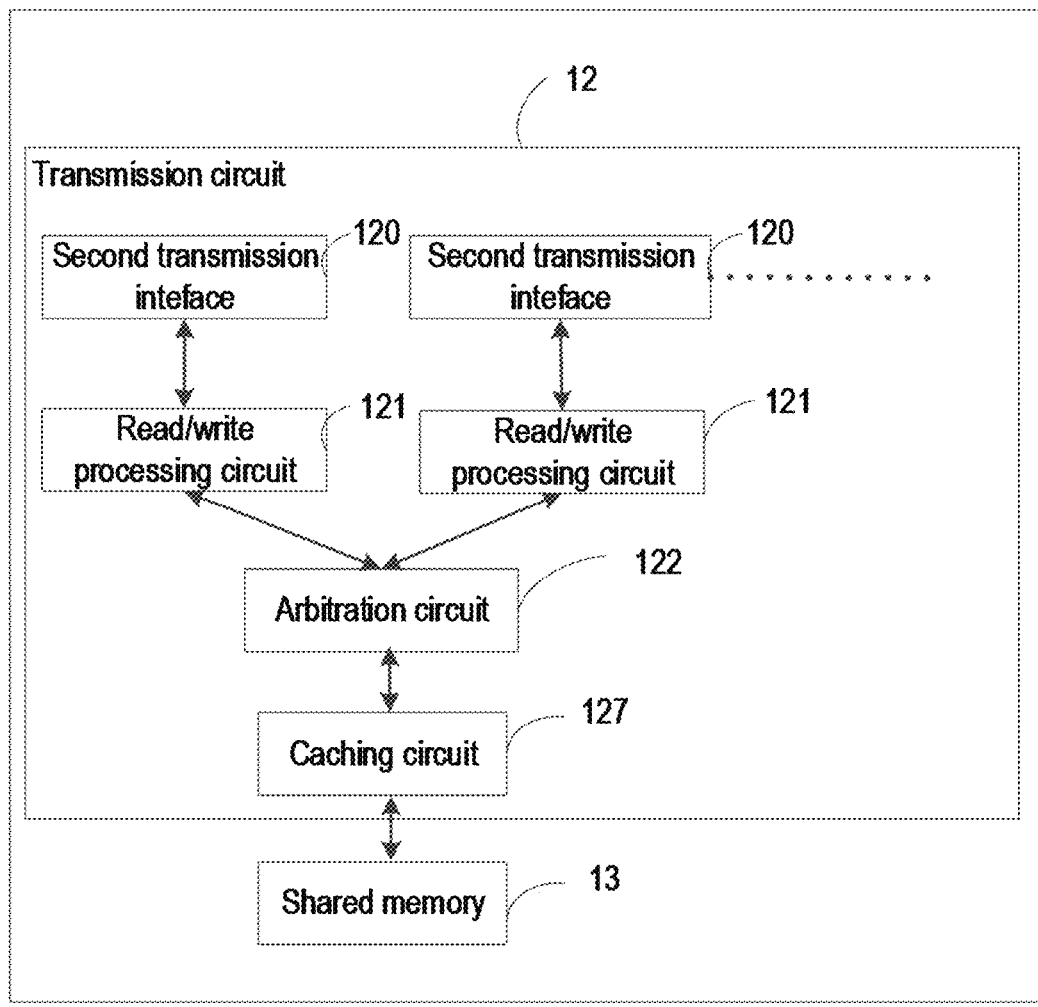
FIG. 60 is a schematic structural diagram of another transmission circuit according to an embodiment.

Optionally, referring to FIG. 60, when the transmission circuit 12 writes data to the shared memory 13, or the shared memory 13 returns the read data to the transmission circuit 12, the transmission circuit 12 may first temporarily store data to be written or the data to be returned for processing. Therefore, under such use requirements, the transmission circuit 12 used in the present disclosure may further include: a cache circuit 127 connected to the arbitration circuit 122 and the shared memory 13. The cache circuit is configured to temporarily store data obtained from the shared memory 13 by the arbitration circuit 122 and data written to the shared memory 13 by the arbitration circuit 122.

Optionally, the cache circuit 127 is configured to provide a buffer for data exchange. The cache circuit may be a random access memory (RAM), which is a prior art and will not be further described herein.

For the data processing device used in the present disclosure, data transmission bandwidths between circuits can be different. Optionally, the transmission bandwidth between the transmission circuit 12 and the shared memory 13 is greater than the transmission bandwidth between the transmission circuit 12 and the machine learning unit 15.

For example, if a machine learning device 11 includes N (N is an integer greater than or equal to 1) machine learning units 15, a transmission circuit 12, and a shared memory 13, and a bandwidth between the transmission circuit 12 and each machine learning unit 15 is M, a bandwidth between a broadcast processing circuit in the transmission circuit 12 and the shared memory 13 can be set to M*N. An advantage of this design is to avoid conflicts in extreme situations. For example, when a plurality of machine learning units 15 simultaneously send broadcast instructions to the transmission circuit 12, and the arbitration circuit 122 in the transmission circuit 12 sends the instructions to the shared memory 13 in order, conflicts may be avoided because of the sufficient bandwidth. In addition, after the arbitration circuit 122 in the transmission circuit 12 selects a broadcast instruction with a higher priority for processing according to the preset arbitration rule, the arbitration circuit 122 can proceed to process another broadcast instruction while waiting for the shared memory 13 to return data. The design accelerates data processing and effectively utilizes the data transmission bandwidth. It should be noted that, in the design of an actual circuit, the bandwidth between the transmission circuit 12 and the shared memory 13 can be twice, 4 times, 6 times, etc., the bandwidth between the transmission circuit 12 and each machine learning unit 15, as long as the bandwidth is greater than the bandwidth between the transmission circuit 12 and each machine learning unit 15, which is not limited herein.

With continuous development of artificial neural networks, machine learning chips with more architectures gradually come out. Due to the large amount of data required by the machine learning chips and high speed requirements of the machine learning chips for data processing, when the machine learning chips access or process data in the memory, in the process of data access or operation, the bandwidth of data transmission is usually increased by increasing the amount of hardware, thereby accelerating data processing to meet the high speed requirements of the machine learning chips for data processing.

However, when the machine learning chip performs data access or operation, high hardware overhead and hardware redundancy may be caused by using the above method.

To solve the above problem, the present disclosure provides the following technical solutions.

Figure 61:
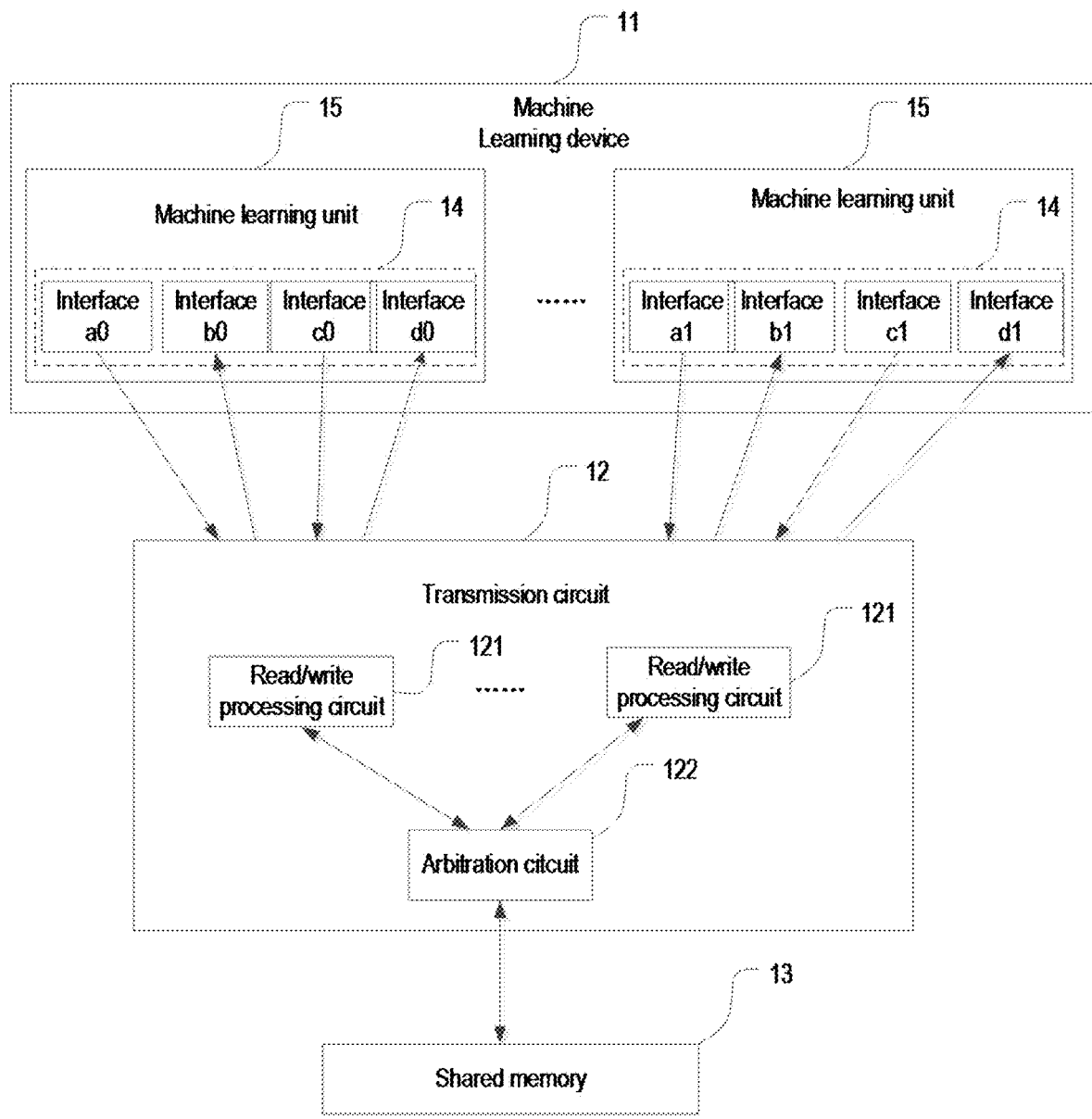
FIG. 61 is a schematic structural diagram of a data processing device according to an embodiment.

A data processing device provided in an embodiment of the present disclosure may be implemented by software, hardware, or a combination of software and hardware, and may be part or all of the data processing device shown in FIG. 61. The data processing device is configured to process machine learning data and may include a machine learning device 11, a transmission circuit 12, and a shared memory 13. The transmission circuit 12 includes a plurality of read/write processing circuits 121 and an arbitration circuit 122, where the arbitration circuit 122 is configured to arbitrate data operation signals sent by the plurality of machine learning units 15 and obtain input data required by the machine learning device 11 from the shared memory 13 according to the data operation signals that have been successfully arbitrated; the read/write processing circuit 121 is configured to determine a target machine learning unit or a target operation unit from the plurality of machine learning units according to address information carried by the successfully arbitrated data operation signals or types of the data operation signals, and return the input data to the target machine learning unit or the target operation unit. The machine learning device 11 includes a plurality of machine learning units 15, where each of the machine learning units 15 includes at least one operation unit 151, the plurality of machine learning units are connected to the transmission circuit 12 through a first transmission interface 14, and the transmission circuit 12 is connected to the shared memory 13.

Optionally, the machine learning device 11 is configured to perform a machine learning operation according to the input data to obtain output data. Optionally, the machine learning device 11 is further configured to transfer the output data to the shared memory 13 through the transmission circuit 12 for data storage. Specifically, when the machine learning device 11 is configured to perform a neural network operation, the device 11 may perform an artificial neural network operation according to input neuron data and weight data to obtain output neuron data, use the output neuron data as new input neuron data, and transfer the new input neuron data to the shared memory 13 through the transmission circuit 12 for data storage.

It should be noted that the above machine learning unit, the transmission circuit, the shared memory, and various types of interfaces may all be implemented by hardware circuits. For example, the transmission circuit may be a broadcast bus, the shared memory may be a non-volatile and/or volatile memory, including but not limited to a random access memory (RAM), a scratchpad memory, and the like, and the various types of interfaces may correspond to one or more data I/O interfaces or I/O pins.

Referring to FIG. 61, in an implementation, the above machine learning device 11 may include a plurality of machine learning units 15. For a multi-layer neural network operation, an operation of a certain layer of neural network in a forward operation is described below as an example. In an embodiment, the above machine learning device may perform a computation in parallel on output neuron data of all neurons in the layer of the neural network through a plurality of machine learning units (MLU). For example, if the machine learning device includes 4 machine learning units and the layer of neural network has 100 neurons, 25 neurons may be assigned to each machine learning unit for processing by setting a corresponding operation instruction; in this process, each machine learning unit may obtain input neuron data and weight data corresponding to the 25 assigned neurons of the layer from the shared memory through the transmission circuit, perform an operation to obtain output neuron data of the 25 assigned neurons of the layer, and then transfer the output neuron data of the 25 assigned neurons of the layer to the shared memory through the transmission circuit for storage. It can be understood that each of the above machine learning units may process a plurality of assigned neuron data of the layer by parallel computations. The above computation manner of performing a neural network computation in parallel layer by layer may realize parallel processing of neural network computation, which improves the processing efficiency.

When a plurality of machine learning units 15 simultaneously send data operation signals to the transmission circuit 12 through the first transmission interface 14, the units may send data operation signals to the read/write processing circuit 121 through the first transmission interface 14. The read/write processing circuit 121 may be one or more read/write processing circuits. When the read/write processing circuit 121 includes a plurality of read/write processing circuits, one machine learning unit 15 may correspond to one or a plurality of read/write processing circuits. The read/write processing circuit 121 is configured to send the data operation signals to the arbitration circuit 122, and the arbitration circuit 122 is configured to arbitrate the plurality of data operation signals, and obtain input neuron data and weight data required by the machine learning units corresponding to the data operation signals from the shared memory 13 according to the data operation signals that have been successfully arbitrated. The read/write processing circuit 121 may be configured to determine a target machine learning unit or a target operation unit according to address information carried by the data operation signals that have been successfully arbitrated or types of the data operation signals, and return input neuron data and weight data to the target machine learning unit or the target operation unit.

For example, when the machine learning device includes 4 machine learning units, namely a machine learning unit 0, a machine learning unit 1, a machine learning unit 2, and a machine learning unit 3, the 4 machine learning units correspond to 4 read/write processing circuits, namely a read/write processing circuit 0, a read/write processing circuit 1, a read/write processing circuit 2, and a read/write processing circuit 3. The machine learning unit 0, the machine learning unit 1, the machine learning unit 2, and the machine learning unit 3 respectively send data operation signals to the reading/writing processing circuit 0, the reading/writing processing circuit 1, the reading/writing processing circuit 2, and the reading/writing processing circuit 3 through the first transmission interface 14, which may specifically include: sending a data operation signal 0 to the read/write processing circuit 0, sending a data operation signal 1 to the read/write processing circuit 1, sending a data operation signal 2 to the read/write processing circuit 2, and sending a data operation signal 3 to the read/write processing circuit 3. The read/write processing circuit 0, the read/write processing circuit 1, the read/write processing circuit 2, and the read/write processing circuit 3 respectively send the data operation signal 0, the data operation signal 1, the data operation signal 2, and the data operation signal 3 to the arbitration circuit 122 for arbitration. The arbitration circuit 122 performs arbitration on the plurality of data operation signals, determines the data operation signal 2 to be a data operation signal that has been successfully arbitrated, and obtains input neuron data and weight data from the shared memory 13 according to the data operation signal 2; the read/write processing circuit 2 determines a target machine learning unit to be a machine learning unit 1 and a machine learning unit 2 according to address information carried in the data operation signal 2, where the address information includes addresses of the machine learning unit 1 and the machine learning unit 2, and then the read/write processing circuit 2 returns the input neuron data and the weight data obtained according to the data operation signal 2 to the machine learning unit 1 and the machine learning unit 2.

In another embodiment, the above machine learning device may perform a computation on output neuron data of all neurons in each layer of the neural network respectively in a certain order through a plurality of machine learning units. In this process, a previous machine learning unit can transfer the output neuron data of all neurons of this layer to the shared memory through the transmission circuit for storage, so that a next machine learning unit can fetch and use the output neuron data of all neurons of the layer as input neuron data of the next layer for computation. It may be understood that the above application is suitable for a scenario where a neural network computation amount of each layer is not large, such as a computation of a neural network with a small amount of neurons of each layer.

Figure 62:
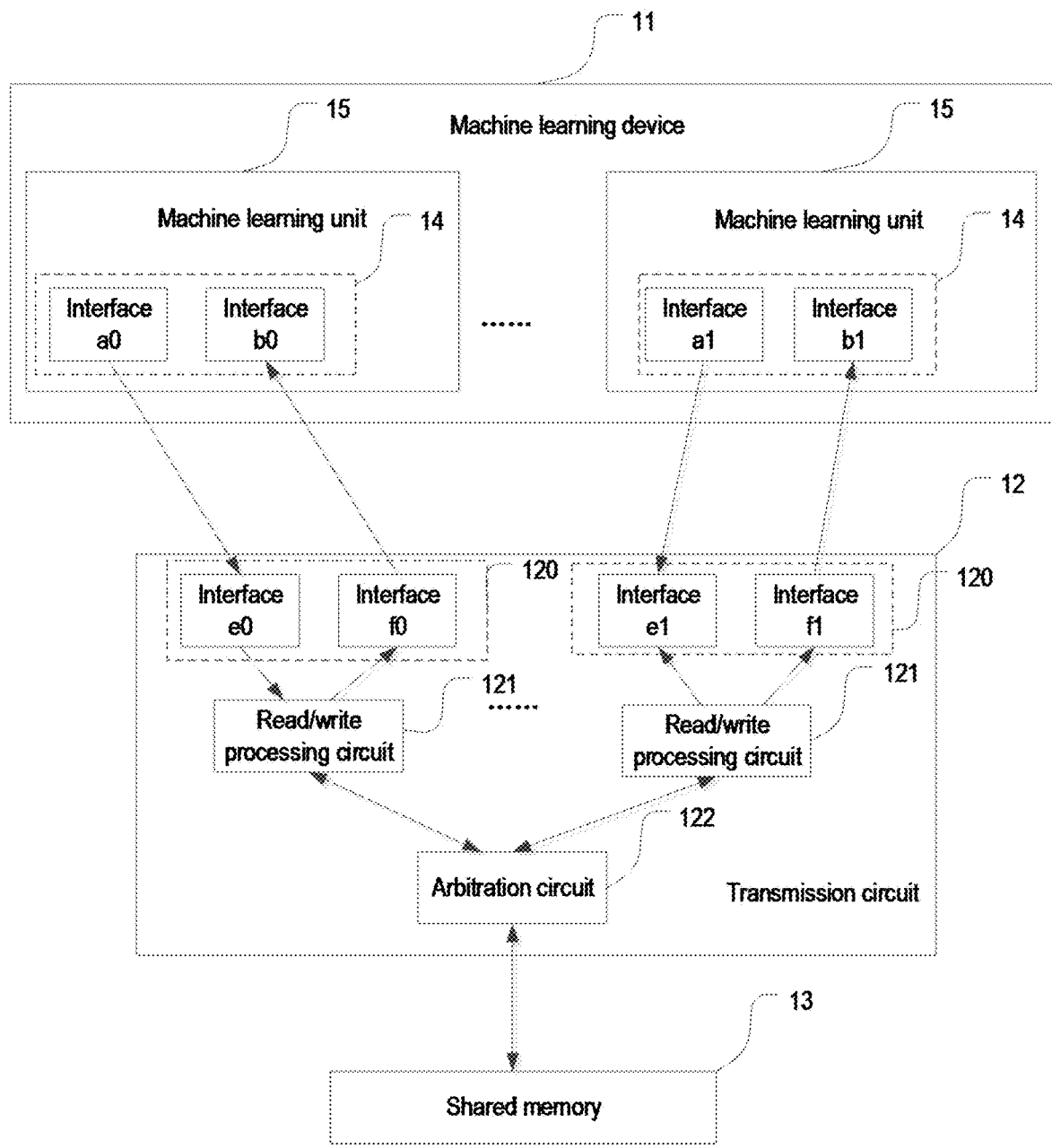
FIG. 62 is a schematic structural diagram of a machine learning unit according to an embodiment.

Referring to FIG. 62, the machine learning unit 15 will be specifically described below. In an embodiment, the machine learning unit 15 may include: at least one operation unit 151, and a controller unit 152 connected to the operation unit 151; the operation unit 151 may include a primary processing circuit 151a and a plurality of secondary processing circuits 151b, where the operation unit 151 is connected to the transmission circuit 12 through a first transmission interface 14.

The controller unit 152 is configured to send a data operation signal and output neuron data to the transmission circuit 12 through the first transmission interface 14, receive input neuron data and weight data obtained by the transmission circuit 12 from the shared memory 13 through the first transmission interface 14, and transfer the input neuron data and the weight data to the primary processing circuit 151a and/or the secondary processing circuits 151b.

The primary processing circuit 151a is configured to distribute the input neuron data and the weight data to the plurality of secondary processing circuits 151b; the plurality of secondary processing circuits 151b are configured to perform intermediate operations in parallel according to neuron data and weight data to obtain a plurality of intermediate results, and send the plurality of intermediate results to the primary processing circuit 151a; and the primary processing circuit 151a is further configured to perform subsequent processing on the plurality of intermediate results to obtain a computation result, where the subsequent processing includes an activation operation. Specifically, the controller unit 152 may obtain a computation instruction, parse the computation instruction to obtain a plurality of operation instructions, and send the plurality of operation instructions to the primary processing circuit.

It may be understood that, in this embodiment, the machine learning unit includes a plurality of operation units, and each operation unit may send or receive data through the first transmission interface.

For example, in an optional embodiment, the primary processing circuit may further include a controller unit, where the controller unit may include a primary instruction processing unit configured to decode an operation instruction into a micro-instruction. In another optional embodiment, the secondary processing circuit may also include a controller unit, where the controller unit may include a secondary instruction processing unit configured to receive and process a micro-instruction. The above micro-instruction may be a next-level instruction of the instruction. The micro-instruction may be obtained by splitting or decoding the instruction, and may be further decoded into a control signal for various components, units, or processing circuits. For example, a product micro-instruction is a next level instruction of a convolution instruction.

The data processing device configured to process machine learning data provided in the present disclosure includes a machine learning device, a transmission circuit, and a shared memory. The transmission circuit includes a plurality of read/write processing circuits and an arbitration circuit, the machine learning device includes a plurality of machine learning units, where each of the machine learning units includes at least one operation unit, the plurality of machine learning units are connected to the transmission circuit through a first transmission interface, the transmission circuit is connected to the shared memory. In this embodiment, the data processing device performs arbitration on the data operation signals sent by a plurality of machine learning units through the arbitration circuit, and obtains input neuron data and weight data required by the machine learning device from the shared memory according to the arbitration result. In this way, when the data processing device performs a data operation, the plurality of machine learning units may perform the data operation on the shared memory through a transmission circuit, and performs arbitration on the plurality of data operation signals through the arbitration circuit, which reduces hardware overhead and avoid blockage of a plurality of data operation signals.

In an embodiment, as shown in FIG. 61, the read/write processing circuit includes at least one of the following processing circuits: a unicast read processing circuit, and a broadcast processing circuit; the data operation signal includes at least one of the following: a unicast read request, a unicast write request, a multicast instruction, and a broadcast instruction, where a unicast-type processing circuit is configured to process a unicast-type signal, and a broadcast-type processing circuit is configured to process a multicast-type or broadcast-type signal.

For example, a unicast read instruction is a read instruction sent by a certain machine learning unit to read input neuron data and weight data in the source address of the shared memory, and input neuron data and weight data may be returned to the machine learning unit through the unicast read instruction, where the input neuron data and the weight data are required by the assigned neuron during a process of the machine learning unit performing a computation on assigned neurons of a certain layer according to a computation instruction. A broadcast instruction is a read instruction sent by a machine learning unit to read input neuron data and weight data in the source address of the shared memory, and the input neuron data and the weight data may be returned to all the machine learning units in the above machine learning device through the broadcast instruction, where the input neuron data may be required by all neurons of a certain layer (all output neuron data of a previous layer) and the weight data may be multiplexed weight data such as a convolution kernel. A difference between a multicast instruction and a broadcast instruction is that data return objects of the multicast instruction are a plurality of machine learning units corresponding to a flag field in the multicast instruction instead of all machine learning units in the above machine learning device. In addition, generally a difference between an instruction and a request is that an instruction has relatively large execution overhead, but include more information, while a request has relatively small execution overhead, but include less information.

In this embodiment, the data processing device performs arbitration on the data operation signals sent by a plurality of machine learning units through the arbitration circuit, and obtains input neuron data and weight data required by the machine learning device from the shared memory according to the arbitration result. In this way, when the data processing device performs a data operation, the plurality of machine learning units may perform the data operation on the shared memory through a transmission circuit, which reduces hardware overhead and avoid hardware redundancy. A specific process of how an arbitration module determines priorities of data operation signals sent by a plurality of read/write processing circuits will be described in detail through the following embodiments.

In an embodiment, the arbitration circuit 122 is specifically configured to determine priorities of data operation signals sent by the plurality of read/write processing circuits 121, and use a data operation signal with a highest priority as a data operation signal that has been successfully arbitrated.

The arbitration circuit 122 may determine priorities of a plurality of data operation signals according to a preset rule, so that the arbitration circuit 122 may determine objects to be operated (data operation signals that have been successfully arbitrated) according to the priority of each data operation signal. The arbitration circuit may perform arbitration according to the time when each data operation signal is sent or according to transmission rate information carried in each data operation signal. For example, if the time when the read/write processing circuit 1 sends the data operation signal is T and the time when the read/write processing circuit 2 sends the data operation signal is T+1, the time when the data operation signal is sent is used as a basis for arbitration to obtain data operation signals with high priorities (data operation signals which have been successfully arbitrated) sent by the read/write processing circuit 1. The arbitration circuit 122 obtains data from the shared memory 13 according to the arbitration result and the successfully arbitrated data operation signals sent by the read/write processing circuit 1.

The data processing device in this embodiment determines priorities of data operation signals sent by the plurality of read/write processing circuits through the arbitrated circuit, and uses a data operation signal with a highest priority as a data operation signal that has been successfully arbitrated. When the arbitration circuit simultaneously receive a plurality of data operation signals, the arbitration circuit determines a data operation signal that can be executed, which avoids data blockage caused by simultaneously executing a plurality of data operation signals. In this way, a plurality of machine learning units can perform a data operation on the shared memory, which reduces hardware overhead and avoids hardware redundancy.

In an embodiment, the arbitration circuit 122 is specifically configured to, when priorities of the data operation signals sent by the plurality of read/write processing circuits 121 are identical, determine a data operation signal that has been successfully arbitrated according to the types of the plurality of data operation signals and a preset execution condition.

On the basis of the above embodiment, when priorities of the data operation signals sent by the plurality of read/write processing circuits 121 are identical, the arbitration circuit 122 may determine a data operation signal that has been successfully arbitrated according to the types of the plurality of data operation signals and a preset execution condition.

The preset execution condition may be determining an arbitration result by detecting whether a data transfer channel corresponding to the data operation signal is idle; if the data transfer channel is idle, the data operation signal corresponding to the data transfer channel is arbitrated to be a data operation signal that has been successfully arbitrated. The condition may also be determining an arbitration result according to the sending time information carried in the data operation signal. For example, if the arbitration circuit 122 receives 4 data operation signals including a data operation signal 0, a data operation signal 1 (a unicast read instruction), a data operation signal 2 (a broadcast instruction), and a data operation signal 3, where priorities of the data operation signal 1 and data operation signal 2 are identical, then the machine learning unit 1 is determined to be a target machine learning unit according to address information carried in the data operation signal 1, and the machine learning unit 0, the machine learning unit 1, machine learning unit 2, and the machine learning unit 3 are determined to be target machine learning units according to the type of the data operation signal 2. At this time, data channels of the machine learning unit 0, the machine learning unit 1, and the machine learning unit 2 are idle, while the data channel of the machine learning unit 3 is busy, then the arbitration circuit 122 determines the data operation signal that has been successfully arbitrated to be the data operation signal 1 according to the conditions where the data operation signal 1 is a unicast read instruction, the data operation signal 2 is a broadcast instruction, and the data channel of the machine learning unit 3 is busy.

Optionally, if the data operation signal is a unicast-type signal, the execution condition includes: a channel of a machine learning unit that sends the unicast-type signal is idle, or a channel of an operation unit in the machine learning unit that sends the unicast-type signal is idle.

Optionally, if the data operation signal is a multicast-type signal, the execution condition includes: a channel of a machine learning unit that sends the multicast-type signal is idle, and a channel of a target machine learning unit specified by the multicast-type signal is idle; or, a channel of an operation unit in the machine learning unit that sends the multicast-type signal is idle, and a channel of a target operation unit specified by the multicast-type signal is idle.

Optionally, if the data operation signal is a broadcast-type signal, the execution condition includes: a channel of a machine learning unit that sends the broadcast-type signal is idle, and channels of other remaining machine learning units are idle; or, a channel of an operation unit in the machine learning unit that sends the broadcast-type signal is idle, and channels of operation units in other remaining machine learning units are idle.

In the data processing device shown in this embodiment, when priorities of the data operation signals sent by the plurality of read/write processing circuits are identical, the arbitration circuit may determine a data operation signal that has been successfully arbitrated according to the types of the plurality of data operation signals and a preset execution condition. In this embodiment, when the priorities of the data operation signals re identical, data operation signals that have been successfully arbitrated may be determined according to the types of the data operation signals and a preset execution condition, which further avoids data blockage caused by simultaneously executing a plurality of data operation signals. In this way, a plurality of machine learning units can perform a data operation on the shared memory, which reduces hardware overhead and avoids hardware redundancy.

Figure 63:
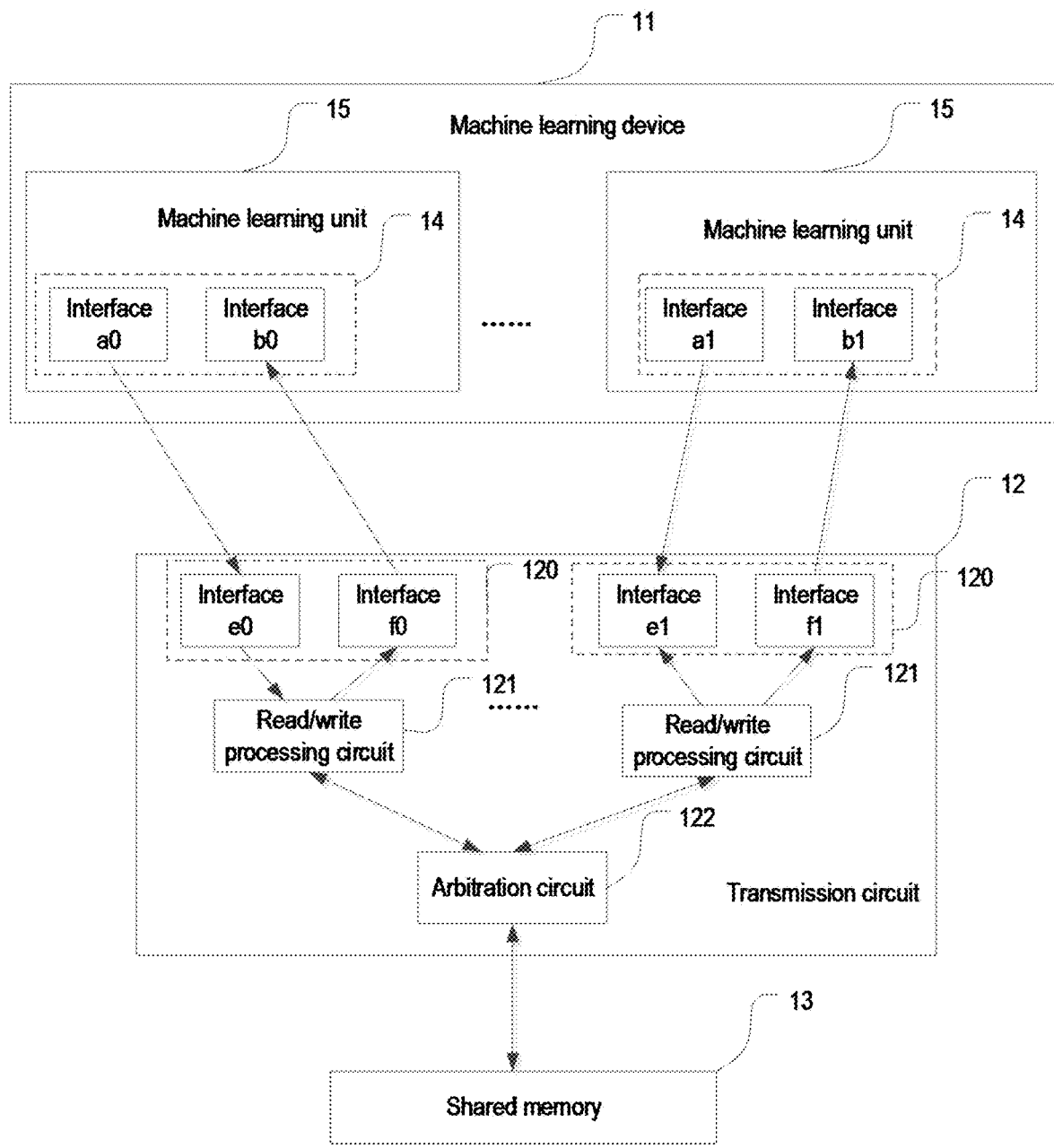
FIG. 63 is a schematic structural diagram of a data processing device according to an embodiment.

In an embodiment, as shown in FIG. 63, the transmission circuit 12 further includes a second transmission interface 120, each interface in the second transmission interface 120 is connected to each interface in the first transmission interface 14 in a one-to-one correspondence, and one machine learning unit 15 is correspondingly connected to one read/write processing circuit 121.

The first transmission interface 14 may send a data operation signal to a corresponding read/write processing circuit 121 through the second transmission interface 120, and the transmission circuit 12 may return input neuron data and weight data required by the machine learning device through the second transmission interface 120 to the first transmission interface 14, and then return the above data to a target machine learning unit or a target operation unit through the first transmission interface 14. The first transmission interface 14 and the second transmission interface 120 may include one or more interfaces. For example, if the first transmission interface 14 includes a transmission interface 141 and a data receiving interface 142, the second transmission interface 120 includes a second reception interface 1201 and a second return interface 1202 corresponding to a sending interface 141 and a return interface 142.

Figure 64:
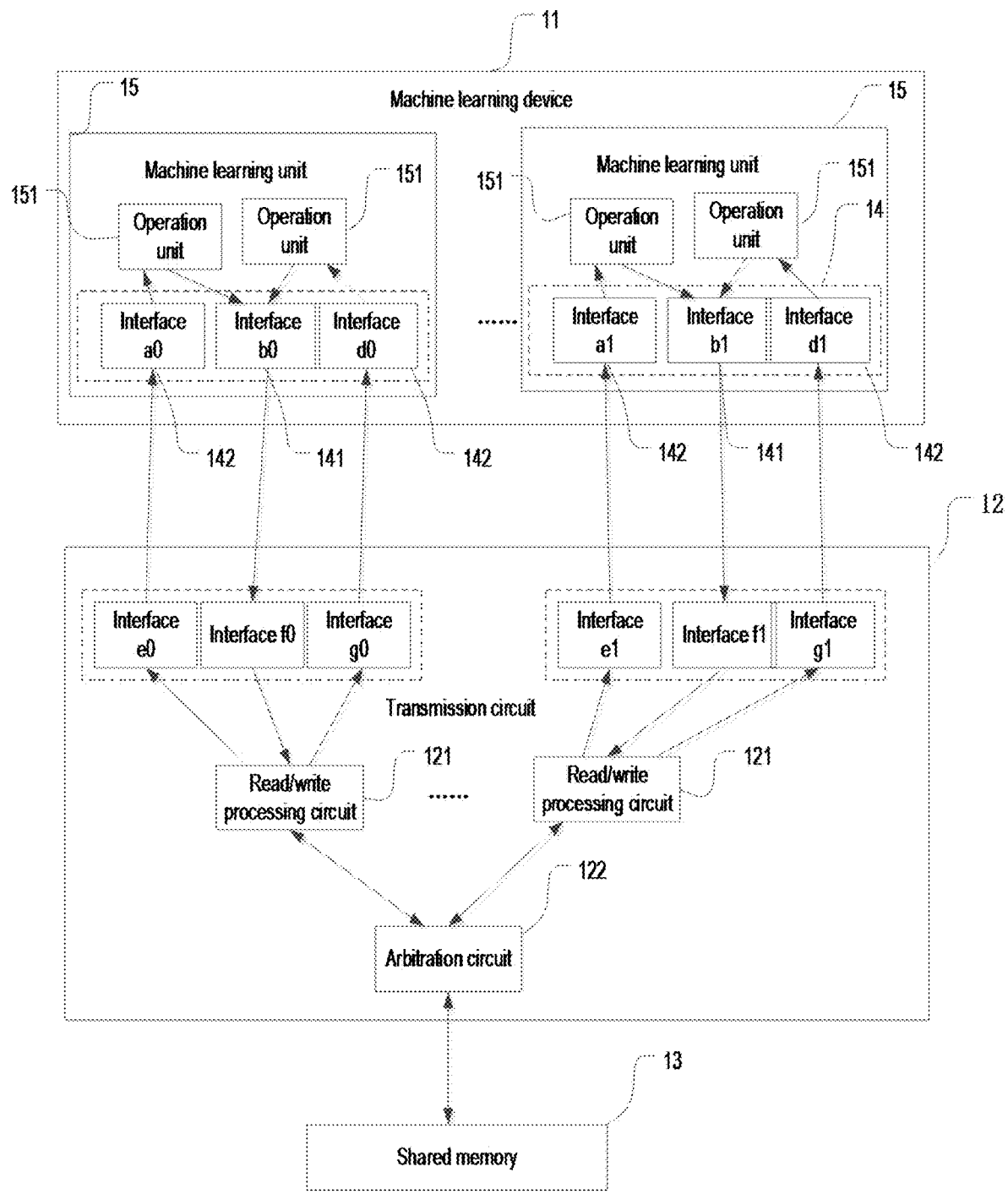
FIG. 64 is a schematic structural diagram of a data processing device according to an embodiment.

Optionally, as shown in FIG. 64, a plurality of operation units in one machine learning unit 15 share a same sending interface 141 in the first transmission interface 14, and each operation unit corresponds to one data receiving interface 142.

When one machine learning unit 15 includes a plurality of operation units 151, the plurality of operation units 151 may share one sending interface 141 of the first transmission interface 14, and the plurality of operation units 151 in one machine learning unit 15 sends a data operation signal to the transmission circuit 12 through a shared sending interface 141, and the transmission circuit 12 returns obtained input neuron data and weight data to a target operation unit through the data receiving interface 142 corresponding to the target operation unit 151.

Therefore, in the data processing device shown in this embodiment, a plurality of operation units in one machine learning unit shares one sending interface in the first transmission interface, and each operation unit corresponds to one data receiving interface, which may further reduce the count of sending interfaces of data operation signals in the machine learning unit, save hardware resources, and reduce hardware area and power consumption.

Figure 65:
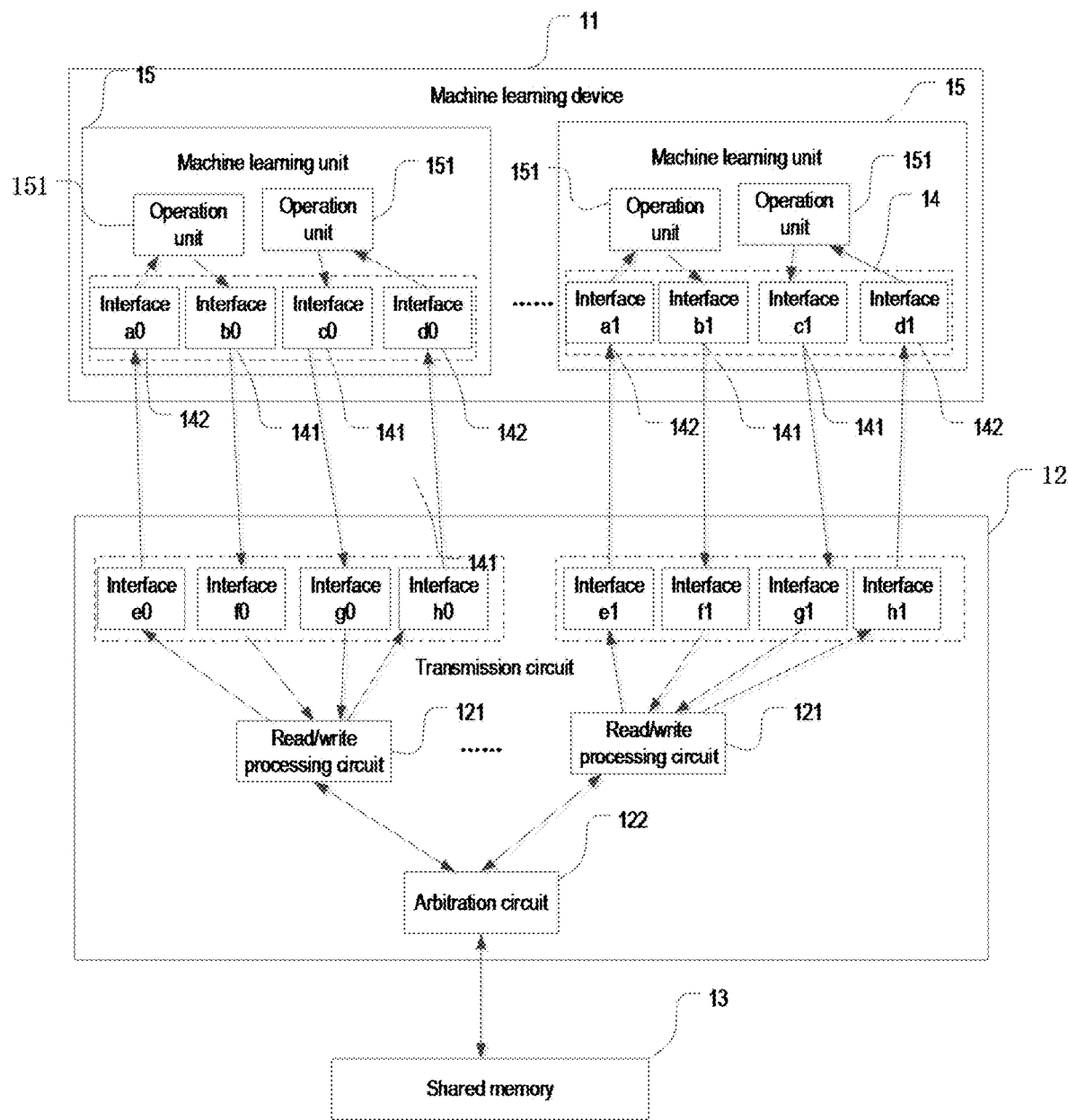
FIG. 65 is a schematic structural diagram of a data processing device according to an embodiment.

In an embodiment, as shown in FIG. 65, the plurality of operation units 151 in one machine learning unit 15 respectively correspond to one sending interface 141 and one data receiving interface 142 in the first transmission interface.

As shown in FIG. 65, an operation unit 151 may correspond to a sending interface 141 and a data reception interface 142. The operation unit 151 sends a data operation signal to the transmission circuit 12 through a corresponding sending interface 141, and the transmission circuit 12 returns obtained input neuron data and weight data to a target operation unit 151 through a corresponding data receiving interface 142. For example, an operation unit 1 corresponds to a sending interface 1 and a data receiving interface 1, and an operation unit 2 corresponds to a sending interface 2 and a data receiving interface 2; the operation unit 1 sends a data operation signal to the transmission circuit 12 through the sending interface 1, and the transmission circuit 12 determines target operation units to be the operation unit 1 and the operation unit 2 according to the data operation signal, then the transmission circuit returns obtained input neuron data and weight data to the operation unit 1 and the operation unit 2 through a data receiving interface 1 and a data receiving interface 2.

Therefore, in the data processing device shown in this embodiment, each of a plurality of operation units in one machine learning unit respectively corresponds to one sending interface and one data receiving interface in the first transmission interface. The one-to-one correspondence of the plurality of operation units, the sending interfaces and the data receiving interfaces in the first transmission interface may effectively simply the control logic in the process of data transfer.

Figure 66:
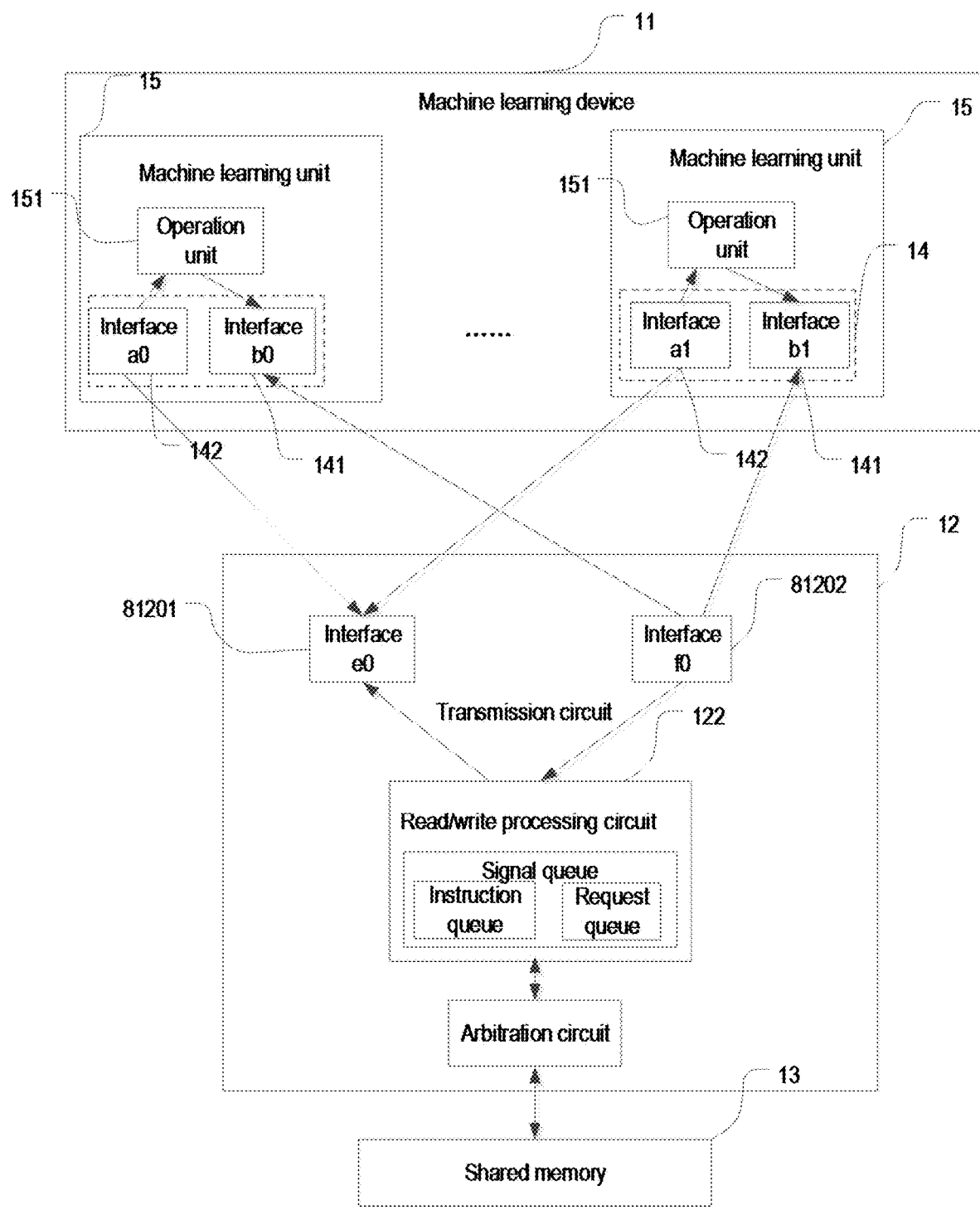
FIG. 66 is a schematic structural diagram of a data processing device according to an embodiment.

In an embodiment, as shown in FIG. 66, a plurality of machine learning units 15 share a signal receiving interface 81201 and a data return interface 81202 in the second transmission interface 120.

The plurality of machine learning units 15 share a signal receiving interface 81201 and a data return interface 81202 in the second transmission interface 120. For example, if the read/write processing circuit 121 is a broadcast read processing circuit, a plurality of machine learning units send data operation signals to the broadcast read processing circuit through the signal receiving interface 81201, and the broadcast read processing circuit obtains input neuron data and weight data according to the data operation signals, and return the input neuron data and weight data to a target machine learning unit through the data return interface 81202 according to address information in the data operation signals.

The data processing device in this embodiment, the plurality of machine learning units share a signal receiving interface and a data return interface in the second transmission interface. In this embodiment, the data processing device shares a signal receiving interface and a data return interface in the second transmission interface, which further reduces hardware overhead and avoid hardware redundancy.

In an embodiment, as shown in FIG. 66, the read/write processing circuit 121 further includes a signal queue configured to store data operation signals sent by each machine learning unit 15; the read/write processing circuit 121 is further configured to determine whether there is remaining space in the signal queue when receiving the data operation signals received; if there is remaining space 121, the read/write processing circuit is configured to cache the data operation signals in the signal queue; otherwise the read/write processing circuit is configured to block the data operation signals.

The signal queue may be configured to store data operation signals sent by each machine learning unit 15, and the queue may be arranged outside or inside the read/write processing circuit 121. When the read/write processing circuit 121 receives a data operation signal, the circuit may obtain a storage space of the signal queue by sending a memory query instruction to the signal queue. If the storage space of the signal queue can store the data operation signal, the data operation signal is cached to the signal queue; if the storage space of the signal queue cannot store the data operation signal, the data operation signal is blocked.

The data processing device shown in this embodiment, the read/write processing circuit further includes a signal queue configured to store data operation signals sent by each machine learning unit; the read/write processing circuit is further configured to determine whether there is remaining space in the signal queue when receiving the data operation signals received; if there is remaining space, the read/write processing circuit is configured to cache the data operation signals in the signal queue; otherwise the read/write processing circuit is configured to block the data operation signals. In this embodiment, when the read/write processing circuit receives a plurality of data operation signals, the circuit may cache the data operation signals to the signal queue or block the data operation signals, so that the data operation signals can be sent to the arbitration circuit one by one for processing, which avoids blockage of data operations signals, In this way, a plurality of machine learning units can perform a data operation on the shared memory through one transmission circuit, which reduces hardware overhead and avoids hardware redundancy.

Optionally, if the read/write processing circuit 121 is a broadcast processing circuit, the signal queue includes an instruction queue and a request queue. The instruction queue is configured to cache instruction-type signals received by the broadcast processing circuit; and the request queue is used to cache request-type signals obtained after parsing the instruction-type signals.

If the read/write processing circuit 121 is a broadcast processing circuit, the signal queue may include an instruction queue and a request queue. The circuit may store received instruction-type signals sent by each machine learning unit 15 in the instruction queue, and parse instruction-type signals through the broadcast processing circuit to obtain request-type signals and store obtained request-type signals in the request queue. The instruction queue is configured to cache instruction-type signals received by the broadcast processing circuit; and the request queue is used to cache request-type signals obtained after parsing the instruction-type signals.

Regarding he data processing device shown in this embodiment, when the read/write processing circuit is a broadcast processing circuit, the signal queue includes an instruction queue and a request queue. The instruction queue is configured to cache instruction-type signals received by the broadcast processing circuit; and the request queue is used to cache request-type signals obtained after parsing the instruction-type signals. In this embodiment, by respectively storing instruction-type signals and request-type signals in the instruction queue and the request queue, the instruction-type signals and the request-type signals can be sent to the arbitration circuit one by one for processing, which avoids blockage of data operations signals, In this way, a plurality of machine learning units can perform a data operation on the shared memory through one transmission circuit, which reduces hardware overhead and avoids hardware redundancy.

It should be understood that identical or similar parts in the above embodiments may be referred to each other, and for contents not described in detail in some embodiments, please refer to the identical or similar contents in other embodiments.

It should be noted that in the descriptions of the present disclosure, the terms "first", "second", etc., are only used for descriptive purposes, and should not be understood as indicating or implying relative importance. In addition, in the description of the present disclosure, unless otherwise specified, the word "plurality" means "at least two".

It should be understood that any process or method description in the flowchart or described in other ways herein represents one or more modules, segments, or parts of codes of executable instructions configured to implement specific logical functions or steps of the process. In addition, the scope of optional implementations of the present disclosure includes additional implementations, and the functions can be implemented in an order not shown or discussed in the present disclosure, or in a substantially simultaneous manner, or in a reverse order according to the functions involved, which should be understood by those skilled in the art to which the embodiments of this present disclosure belong.

It should be understood that each part of the present disclosure can be implemented by hardware, software, firmware, or a combination thereof. In the above implementations, a plurality of steps or methods can be implemented by using software or firmware stored in a memory and executed by a suitable instruction execution system. For example, if hardware is used for implementation, as in another implementation, the steps can be implemented by any one or more of the following technologies known in the art: a discrete logic circuit with a logic gate circuit configured to implement logic functions on data signals, an application-specific integrated circuit with a suitable combinational logic gate circuit, a programmable gate array (PGA), a field-programmable gate array (FPGA), and the like.

Those of ordinary skill in the art can understand that the entire or part of the flow in the methods as stated in the embodiments can be implemented by a program instructing related hardware, wherein the program may be stored in a computer readable storage medium and may include one or more of the methods as stated in the embodiments during execution.

In addition, the functional units in each example of the present application may be integrated into one processing module, or each of the units may exist separately and physically, or two or more units may be integrated into one module. The integrated module above may be implemented in the form of hardware or software function module. When the integrated module is implemented in the form of a software function module and sold or used as an independent product, the module may be stored in a computer-readable storage medium.

The storage medium may be a read-only memory, a disk, a compact disc, etc.

The term "an embodiment", "some embodiments", "example", "specific example", "some examples", or the like referred to herein means that particular features, structures, materials, or characteristics described in conjunction with the embodiment or the example may be contained in at least one embodiment or example of the present disclosure. In the specification, the schematic descriptions of the above terms do not necessarily refer to the same embodiment or example. In addition, the described specific features, structures, materials, or characteristics can be combined in any one or more embodiments or examples in a suitable manner.

Although embodiments of the present disclosure have been shown and described above, it should be understood that the above embodiments are only exemplary and not intended to limit the disclosure. Any changes, modifications, replacements, and variants of the embodiments can be made within the scope of the disclosure.

The invention claimed is:

1. A network-on-chip (NoC) processing system, comprising a storage device and a plurality of computation devices, wherein the storage device and the plurality of computation devices are arranged on a same chip, at least one computation device is connected to the storage device, and at least two computation devices are directly connected to each other; wherein
    the computation device is configured to perform a machine learning computation, and the computation device includes an operation unit and a controller unit, wherein the operation unit includes a primary processing circuit and a plurality of secondary processing circuits,
    the controller unit is configured to obtain input data and a computation instruction,
    the controller unit is further configured to parse the computation instruction to obtain a plurality of operation instructions, and send the plurality of operation instructions and the input data to the primary processing circuit, the primary processing circuit is configured to perform preorder processing on the input data, and send the data and the operation instructions among the primary processing circuit and the plurality of secondary processing circuits, the plurality of secondary processing circuits are configured to perform intermediate computations in parallel according to the data and the operation instructions sent by the primary processing circuit to obtain a plurality of intermediate results, and send the plurality of intermediate results to the primary processing circuit, and the primary processing circuit is further configured to perform postorder processing on the plurality of intermediate results to obtain a computation result of the computation instruction.

2. The system of claim 1, wherein any two of the plurality of computation devices are directly connected to each other.

3. The system of claim 1, wherein the plurality of computation devices include a first computation device and a plurality of second computation devices, wherein the first computation device is connected to the storage device, and at least one of the plurality of second computation devices is connected to the first computation device.

4. The system of claim 3, wherein at least two of the plurality of second computation devices are connected to each other, and are connected to the storage device through the first computation device.

5. The system of claim 3, wherein any two of the plurality of second computation devices are directly connected to the first computation device.

6. The system of claim 1, wherein each of the plurality of computation devices is connected to the storage device, and at least two computation devices are connected to each other.

7. The computation device of claim 1, wherein the controller unit includes an instruction storage unit, an instruction storage processing unit, and a storage queue unit, wherein the instruction storage unit is configured to store a computation instruction associated with the artificial neural network operation, the instruction processing unit is configured to parse the computation instruction to obtain a plurality of operation instructions, and the storage queue unit is configured to store an instruction queue, wherein the instruction queue includes: a plurality of operation instructions or a computation instruction to be executed in an order of the instruction queue.

8. A neural network chip, comprising a storage device, a plurality of computation devices, a first interconnection device, and a second interconnection device, wherein at least one computation device is connected to the storage device through the first interconnection device, and the plurality of computation devices are connected to each other through the second interconnection device wherein, the computation device is configured to perform a machine learning computation, and the computation device includes an operation unit and a controller unit, wherein the operation unit includes a primary processing circuit and a plurality of secondary processing circuits, the controller unit is configured to obtain input data and a computation instruction, the controller unit is further configured to parse the computation instruction to obtain a plurality of operation instructions, and send the plurality of operation instructions and the input data to the primary processing circuit, the primary processing circuit is configured to perform preorder processing on the input data, and send the data and the operation instructions among the primary processing circuit and the plurality of secondary processing circuits, the plurality of secondary processing circuits are configured to perform intermediate computations in parallel according to the data and the operation instructions sent by the primary processing circuit to obtain a plurality of intermediate results, and send the plurality of intermediate results to the primary processing circuit, and the primary processing circuit is further configured to perform postorder processing on the plurality of intermediate results to obtain a computation result of the computation instruction.

9. An NoC data processing method, wherein the method is used to perform a machine learning operation, and includes:

performing, by a computation device, a machine learning computation, wherein the computation device includes an operation unit and a controller unit, wherein the operation unit includes a primary processing circuit and a plurality of secondary processing circuits;

obtaining, by the controller unit, input data and computation instruction;

parsing, by the controller unit, the computation instruction, obtaining a plurality of operation instructions, and sending the plurality of operation instructions and the input data to the primary processing circuit;

performing, by the primary processing circuit, preorder processing on the input data, and sending the data and the operation instructions among the primary processing circuit and the plurality of secondary processing circuits;

performing, by the plurality of secondary processing circuits, intermediate computations in parallel according to the data and the operation instructions sent by the primary processing circuit, obtaining a plurality of intermediate results, and sending the plurality of intermediate results to the primary processing circuit;

performing, by the primary processing circuit, postorder processing on the plurality of intermediate results and obtaining a computation result of the computation instruction;

accessing a storage device by using a first computation device to obtain first operation data;

performing an operation on the first operation data by using the first computation device to obtain a first operation result; and sending the first operation result to a second computation device.

10. The method of claim 9, comprising accessing the storage device by using the second computation device to obtain second operation data.

11. The method of claim 10, comprising performing an operation on the second operation data and the first operation result by using the second computation device to obtain a second operation result.

* * * * *